US012208296B2

(12) United States Patent
Conboy

(10) Patent No.: US 12,208,296 B2
(45) **Date of Patent: *Jan. 28, 2025**

(54) WILDFIRE DEFENSE SPRAYING PROCESS FOR AUTOMATICALLY SPRAYING ENVIRONMENTALLY-CLEAN WATER-BASED LIQUID FIRE INHIBITOR OVER COMBUSTIBLE PROPERTY SURFACES TO FORM THIN FIRE-INHIBITING POTASSIUM SALT CRYSTALLINE COATINGS THEREON BEFORE PRESENCE OF WILDFIRE

(71) Applicant: Mighty Fire Breaker LLC, Lima, OH (US)

(72) Inventor: Stephen Conboy, Carlsbad, CA (US)

(73) Assignee: MIGHTY FIRE BREAKER LLC, Lima, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,020

(22) Filed: Feb. 4, 2024

(65) Prior Publication Data

US 2024/0252860 A1 Aug. 1, 2024

Related U.S. Application Data

(63) Continuation of application No. 18/329,979, filed on Jun. 6, 2023, which is a continuation-in-part of (Continued)

(51) Int. Cl.

| | |
|---|---|
| ***A62C 3/02*** | (2006.01) |
| ***A62C 37/40*** | (2006.01) |
| ***A62D 1/00*** | (2006.01) |

(52) U.S. Cl.

CPC ............ *A62C 3/0292* (2013.01); *A62C 37/40* (2013.01); *A62D 1/0035* (2013.01)

(58) Field of Classification Search

CPC ....... A62C 3/0292; A62C 3/02; A62C 3/0214; A62C 37/40; A62D 1/0035

(Continued)

(56) References Cited

U.S. PATENT DOCUMENTS

| | | |
|---|---|---|
| 25,358 A | 9/1859 | Wilder |
| 625,871 A | 5/1899 | Busha |

(Continued)

FOREIGN PATENT DOCUMENTS

| | | |
|---|---|---|
| AU | 5986501 | 11/2001 |
| AU | 2001259865 | 2/2007 |

(Continued)

OTHER PUBLICATIONS

US 8,460,513 B2, 06/2013, Sealey (withdrawn)

(Continued)

*Primary Examiner* — Steven J Ganey
(74) *Attorney, Agent, or Firm* — THOMAS J. PERKOWSKI, ESQ. PC

(57) ABSTRACT

A wildfire defense spraying process for spraying and protecting property and combustible surfaces with an environmentally-clean water-based liquid fire inhibitor that inhibits fire ignition and flame spread caused by hot flying wildfire embers created during a wildfire storm. The wildfire defense spraying process involves maintaining a storage tank containing a supply of environmentally-clean water-based liquid fire inhibitor comprising a major amount of tripotassium citrate (TPC) and minor amount of triethyl citrate (TEC) dissolved in a major amount of water according to a pre-specified formulation, wherein the environmentally-clean water-based liquid fire inhibitor remains stable without the formation of solids at expected operating temperatures, and ready for immediate spraying on combustible property. When a spraying-trigger signal is received by an automated (Continued)

wildfire detection system, a mobile phone or other intelligent source, an electric-powered hydraulic pump system is automatically energized and pumps environmentally-clean water-based liquid fire inhibitor from the storage tank through piping, under pressure, to spray heads mounted about the property, to produce a spray pattern of environmentally-clean water-based liquid fire inhibitor that covers all the property and combustible surfaces to be defended against wildfire. When the hydraulic pump system completes its pumping operations, the hydraulic pump system automatically shuts off. As water molecules in the sprayed environmentally-clean water-based liquid fire inhibitor evaporates to the environment, thin fire-inhibiting potassium salt crystalline coatings form on the sprayed combustible surfaces, inhibiting fire ignition and flame spread in the presence of wildfire embers.

24 Claims, 36 Drawing Sheets

Related U.S. Application Data application No. 17/497,948, filed on Oct. 10, 2021, now Pat. No. 11,730,987, and a continuation-in-part of application No. 17/167,084, filed on Feb. 4, 2021, now Pat. No. 11,865,390.

(58) Field of Classification Search
USPC .......... 169/13, 16, 24, 52, 70; 239/207, 208
See application file for complete search history.

(56) References Cited

U.S. PATENT DOCUMENTS

| | | | |
|---|---|---|---|
| 867,560 | A | 10/1907 | Currey |
| 989,655 | A | 4/1911 | Sicka |
| 1,003,854 | A | 9/1911 | Adams |
| 1,009,620 | A | 11/1911 | Adams |
| 1,185,154 | A | 5/1916 | Wilds |
| 1,278,716 | A | 9/1918 | Mork |
| 1,293,377 | A | 2/1919 | Donaldson |
| 1,451,896 | A | 4/1923 | Turner |
| 1,468,163 | A | 9/1923 | Matson |
| 1,469,957 | A | 10/1923 | Rich |
| 1,504,454 | A | 8/1924 | Thomas |
| 1,532,443 | A | 4/1925 | Sammis |
| 1,561,193 | A | 11/1925 | Spring |
| 1,580,816 | A | 4/1926 | Dunn |
| 1,585,146 | A | 5/1926 | Himberger |
| 1,634,462 | A | 7/1927 | Hallauer |
| 1,665,995 | A | 4/1928 | Wiley |
| 1,708,867 | A | 4/1929 | Bronander |
| 1,786,963 | A | 12/1930 | Schoenberger |
| 1,817,342 | A | 8/1931 | Beecher |
| 1,871,096 | A | 8/1932 | Torseth |
| 1,897,318 | A | 2/1933 | McIlvaine |
| 1,907,153 | A | 5/1933 | Greider |
| 1,945,457 | A | 1/1934 | Warr |
| 1,948,880 | A | 2/1934 | Hamm |
| 1,953,331 | A | 4/1934 | Armstrong |
| 1,973,734 | A | 9/1934 | Thomas |
| 1,978,807 | A | 10/1934 | Merritt |
| 1,995,874 | A | 3/1935 | Van De Mark |
| 2,119,962 | A | 6/1938 | Raleigh |
| 2,150,188 | A | 3/1939 | Hugh |
| 2,246,616 | A | 6/1941 | Cherry |
| 2,247,608 | A | 7/1941 | De Groff |
| 2,336,648 | A | 12/1943 | Rippey |
| 2,349,980 | A | 5/1944 | Moore |
| 2,359,573 | A | 10/1944 | Mackay |
| 2,671,454 | A | 3/1954 | Williams |
| 2,886,425 | A | 5/1959 | Seibert |
| 2,931,083 | A | 4/1960 | Sidenmark |
| 3,040,816 | A | 6/1962 | Slough |
| 3,196,108 | A | 7/1965 | Nelson |
| 3,229,769 | A | 1/1966 | Bashaw |
| 3,238,129 | A | 3/1966 | Veltman |
| 3,274,105 | A | 9/1966 | Mevel |
| 3,304,675 | A | 2/1967 | Graham-Wood |
| 3,305,431 | A | 2/1967 | Peterson |
| 3,309,824 | A | 3/1967 | Barrett |
| 3,328,231 | A | 6/1967 | Sergovic |
| 3,334,045 | A | 8/1967 | Nelson |
| 3,350,822 | A | 11/1967 | Nachazel |
| 3,362,124 | A | 1/1968 | Val Cravens Du |
| 3,383,274 | A | 5/1968 | Craig |
| 3,400,766 | A | 9/1968 | Foley |
| 3,409,550 | A | 11/1968 | Gould |
| 3,427,216 | A | 2/1969 | Quinn |
| 3,442,334 | A | 5/1969 | Gousetis |
| 3,457,702 | A | 7/1969 | Brown |
| 3,468,092 | A | 9/1969 | Chalmers |
| 3,470,062 | A | 9/1969 | Ollinger |
| 3,484,372 | A | 12/1969 | Birchall |
| 3,501,419 | A | 3/1970 | Bridgeford |
| 3,506,479 | A | 4/1970 | Breens |
| 3,508,872 | A | 4/1970 | Stuetz |
| 3,509,083 | A | 4/1970 | Winebrenner |
| 3,511,748 | A | 5/1970 | Heeb |
| 3,539,423 | A | 11/1970 | Simison |
| 3,558,485 | A | 1/1971 | Skvarla |
| 3,584,412 | A | 6/1971 | Palmer |
| 3,607,811 | A | 9/1971 | Hovd |
| 3,609,074 | A | 9/1971 | Rainaldi |
| 3,621,917 | A | 11/1971 | Rosen |
| 3,635,290 | A | 1/1972 | Schneider |
| 3,639,326 | A | 2/1972 | Kray |
| 3,650,820 | A | 3/1972 | DiPietro |
| 3,661,809 | A | 5/1972 | Pitts |
| 3,663,267 | A | 5/1972 | Moran |
| 3,698,480 | A | 10/1972 | Newton |
| 3,703,394 | A | 11/1972 | Hemming |
| 3,730,890 | A | 5/1973 | Nelson |
| 3,734,191 | A | 5/1973 | Johnson |
| 3,738,072 | A | 6/1973 | Adrian |
| 3,752,234 | A | 8/1973 | Degginger |
| 3,755,163 | A | 8/1973 | Broll |
| 3,755,448 | A | 8/1973 | Merianos |
| 3,763,238 | A | 10/1973 | Adams |
| 3,795,637 | A | 3/1974 | Kandler |
| 3,809,223 | A | 5/1974 | Kendall |
| 3,827,869 | A | 8/1974 | Von Bonin |
| 3,899,855 | A | 8/1975 | Gadsby |
| 3,934,066 | A | 1/1976 | Murch |
| 3,935,343 | A | 1/1976 | Nuttall |
| 3,944,688 | A | 3/1976 | Inman |
| 3,984,334 | A | 10/1976 | Hopper |
| 3,994,110 | A | 11/1976 | Ropella |
| 4,013,599 | A | 3/1977 | Strauss |
| 4,037,665 | A | 7/1977 | Hopper |
| 4,049,556 | A | 9/1977 | Tujimoto |
| 4,049,849 | A | 9/1977 | Brown |
| 4,065,413 | A | 12/1977 | Macinnis |
| 4,076,862 | A | 2/1978 | Kobeski |
| 4,092,281 | A | 5/1978 | Bertrand |
| 4,104,073 | A | 8/1978 | Koide |
| 4,153,466 | A | 5/1979 | Smith |
| 4,168,175 | A | 9/1979 | Shutt |
| 4,172,858 | A | 10/1979 | Clubley |
| 4,176,071 | A | 11/1979 | Crouch |
| 4,176,115 | A | 11/1979 | Hartman |
| 4,184,449 | A | 1/1980 | Louderback |
| 4,184,802 | A | 1/1980 | Cook |
| 4,194,979 | A | 3/1980 | Gottschall |
| 4,197,913 | A | 4/1980 | Korenowski |
| 4,198,328 | A | 4/1980 | Bertelli |
| 4,209,561 | A | 6/1980 | Sawko |
| 4,226,727 | A | 10/1980 | Tarpley, Jr. |
| 4,228,202 | A | 10/1980 | Tjannberg |
| 4,234,044 | A | 11/1980 | Hollan |
| 4,237,182 | A | 12/1980 | Fulmer |

(56) References Cited

U.S. PATENT DOCUMENTS 4,248,976 A 2/1981 Clubley
4,251,579 A 2/1981 Lee
4,254,177 A 3/1981 Fulmer
4,265,963 A 5/1981 Matalon
4,266,384 A 5/1981 Orals
4,272,414 A 6/1981 Vandersall
4,285,842 A 8/1981 Herr
4,344,489 A 8/1982 Bonaparte
4,346,012 A 8/1982 Umaba
4,364,987 A 12/1982 Goodwin
4,382,884 A 5/1983 Rohringer
4,392,994 A 7/1983 Wagener
4,394,108 A 7/1983 Cook
4,419,256 A 12/1983 Loomis
4,419,401 A 12/1983 Pearson
4,514,327 A 4/1985 Rock
4,530,877 A 7/1985 Hadley
4,560,485 A 12/1985 Szekely
4,563,287 A 1/1986 Hisamoto
4,572,862 A 2/1986 Ellis
4,578,913 A 4/1986 Eich
4,595,414 A 6/1986 Shutt
4,652,383 A 3/1987 Tarpley, Jr.
4,659,381 A 4/1987 Walters
4,661,398 A 4/1987 Ellis
4,663,226 A 5/1987 Vajs
4,666,960 A 5/1987 Spain
4,688,643 A 8/1987 Carter
4,690,859 A 9/1987 Porter
4,714,652 A 12/1987 Poletto
4,720,414 A 1/1988 Burga
4,724,250 A 2/1988 Schubert
4,737,406 A 4/1988 Bumpus
4,740,527 A 4/1988 Von Bonin
4,743,625 A 5/1988 Vajs
4,755,397 A 7/1988 Eden
4,756,839 A 7/1988 Curzon
4,770,794 A 9/1988 Cundasawmy
4,776,403 A 10/1988 LeJosne
4,810,741 A 3/1989 Kim
4,822,524 A 4/1989 Strickland
4,824,483 A 4/1989 Bumpus
4,824,484 A 4/1989 Metzner
4,852,656 A 8/1989 Banahan
4,861,397 A 8/1989 Hillstrom
4,871,477 A 10/1989 Dimanshteyn
4,879,320 A 11/1989 Hastings
4,888,136 A 12/1989 Chellapa
4,895,878 A 1/1990 Jourquin
4,901,763 A 2/1990 Scott
4,909,328 A 3/1990 DeChant
4,913,835 A 4/1990 Mandel
4,965,296 A 10/1990 Hastings
4,986,363 A 1/1991 Nahmiaj
4,986,805 A 1/1991 Laramore
4,993,495 A 2/1991 Burchert
5,021,484 A 6/1991 Schreiber
5,023,019 A 6/1991 Bumpus
5,032,446 A 7/1991 Sayles
5,039,454 A 8/1991 Policastro
5,053,147 A 10/1991 Kaylor
5,055,208 A 10/1991 Stewart
5,062,996 A 11/1991 Kaylor
5,070,945 A 12/1991 Nahmias
5,091,097 A 2/1992 Pennartz
5,105,493 A 4/1992 Lugtenaar
5,130,184 A 7/1992 Ellis
5,156,775 A 10/1992 Blount
5,162,394 A 11/1992 Trocino
5,182,049 A 1/1993 Von Bonin
5,185,214 A 2/1993 Levan
5,214,867 A 6/1993 Weatherly
5,214,894 A 6/1993 Glesser-Lott
5,239,007 A 8/1993 Le-Khac
5,250,200 A 10/1993 Sallet
5,283,998 A 2/1994 Jong
5,284,700 A 2/1994 Strauss
5,318,504 A 6/1994 Edenbaum
5,333,426 A 8/1994 Varoglu
5,356,568 A 10/1994 Levine
5,371,986 A 12/1994 Guditis
5,383,749 A 1/1995 Reisdorff
5,391,246 A 2/1995 Stephens
5,393,437 A 2/1995 Bower
5,405,661 A 4/1995 Kim
5,422,484 A 6/1995 Brogi
5,491,022 A 2/1996 Smith
5,507,350 A 4/1996 Primlani
5,509,485 A 4/1996 Almagro
5,518,638 A 5/1996 Buil
5,534,164 A 7/1996 Guglielmi
5,534,301 A 7/1996 Shutt
5,560,429 A 10/1996 Needham
5,590,717 A 1/1997 McBay
5,605,767 A 2/1997 Fuller
5,609,915 A 3/1997 Fuller
5,626,787 A 5/1997 Porter
5,631,047 A 5/1997 Friloux
5,688,843 A 11/1997 Inaoka
5,709,821 A 1/1998 Von Bonin
5,729,936 A 3/1998 Maxwell
5,734,335 A 3/1998 Brogi
5,738,924 A 4/1998 Sing
5,746,031 A 5/1998 Burns
5,765,333 A 6/1998 Cunningham
5,778,984 A 7/1998 Suwa
5,815,994 A 10/1998 Knight
5,817,369 A 10/1998 Conradie
5,833,874 A 11/1998 Stewart
5,834,535 A 11/1998 Abu-Isa
5,840,413 A 11/1998 Kajander
5,849,210 A 12/1998 Pascente
5,857,623 A 1/1999 Miller
5,894,891 A 4/1999 Rosenstock
5,918,680 A 7/1999 Sheinson
5,929,276 A 7/1999 Kirkovits
5,931,233 A * 8/1999 La Bonte ............... A62C 37/40
169/61
5,934,347 A 8/1999 Phelps
5,945,025 A 8/1999 Cunningham
5,968,669 A 10/1999 Liu
6,000,189 A 12/1999 Breuer
6,024,889 A 2/2000 Holland
6,029,751 A 2/2000 Ford
6,042,639 A 3/2000 Valso
6,073,410 A 6/2000 Schimpf
6,090,877 A 7/2000 Bheda
6,142,238 A 11/2000 Holt
6,146,544 A 11/2000 Guglielmi
6,146,557 A 11/2000 Inata
6,150,449 A 11/2000 Valkanas
6,153,682 A 11/2000 Bannat
6,164,382 A 12/2000 Schutte
6,167,971 B1 1/2001 Van Lingen
6,173,791 B1 1/2001 Yen
6,189,623 B1 2/2001 Zhegrov et al.
6,202,755 B1 3/2001 Hardge
6,209,655 B1 4/2001 Valkanas
6,245,842 B1 6/2001 Buxton
6,271,156 B1 8/2001 Gleason
6,289,540 B1 9/2001 Emonds
6,296,781 B1 10/2001 Amiran
6,309,746 B1 10/2001 Broutier
6,311,781 B1 11/2001 Jerke
6,318,473 B1 11/2001 Bartley
6,364,026 B1 4/2002 Doshay
6,385,931 B1 5/2002 Risser
6,398,136 B1 6/2002 Smith
6,401,487 B1 6/2002 Kotliar
6,401,830 B1 6/2002 Romanoff
6,415,571 B2 7/2002 Risser
6,418,752 B2 7/2002 Kotliar
6,423,129 B1 7/2002 Fitzgibbons, Jr.
6,423,251 B1 7/2002 Blount

(56) References Cited

U.S. PATENT DOCUMENTS 6,427,779 B1 8/2002 Richman
6,436,306 B1 8/2002 Jennings
6,442,912 B1 9/2002 Phillips
6,444,718 B1 9/2002 Blount
6,453,636 B1 9/2002 Ritz
6,464,903 B1 10/2002 Blount
6,470,805 B1 10/2002 Woodall
6,491,254 B1 12/2002 Walkinshaw
6,502,421 B2 1/2003 Kotliar
6,517,748 B2 2/2003 Richards
6,557,374 B2 5/2003 Kotliar
6,558,684 B1 5/2003 Sutherland
6,560,991 B1 5/2003 Kotliar
6,581,878 B1 6/2003 Bennett
6,608,123 B2 8/2003 Galli
6,613,391 B1 9/2003 Gang
6,620,348 B1 9/2003 Vandersall et al.
6,622,966 B1 9/2003 McConnell, Sr.
6,629,392 B1 10/2003 Harrel
6,702,032 B1 3/2004 Torras, Sr.
6,706,774 B2 3/2004 Munzenberger et al.
6,713,411 B2 3/2004 Cox
6,725,941 B2 4/2004 Edwards
6,736,989 B2 5/2004 Stewart
6,772,562 B1 8/2004 Dadamo
6,777,469 B2 8/2004 Blount
6,780,991 B2 8/2004 Vandersall et al.
6,796,382 B2 9/2004 Kaimart
6,800,352 B1 10/2004 Hejna
6,802,994 B1 10/2004 Kegeler
6,810,964 B1 11/2004 Arnot
6,810,965 B2 11/2004 Matsukawa
6,828,437 B2 12/2004 Vandersall et al.
6,846,437 B2 1/2005 Vandersall
6,852,853 B2 2/2005 Vandersall
6,869,669 B2 3/2005 Jensen
6,881,247 B2 4/2005 Batdorf
6,881,367 B1 4/2005 Baker
6,889,776 B2 5/2005 Cheung
6,897,173 B2 5/2005 Bernard
6,905,639 B2 6/2005 Vandersall
6,930,138 B2 8/2005 Schell
6,982,049 B1 1/2006 Mabey
7,018,571 B1 3/2006 Camarota
7,028,783 B2 4/2006 Celorio-Villasenor
7,036,449 B2 5/2006 Sutter
7,070,704 B2 7/2006 Kang
7,082,999 B2 8/2006 Arnot
7,083,000 B2 8/2006 Edwards
7,089,862 B1 8/2006 Vasquez
7,140,449 B1 11/2006 Ebner
7,147,061 B2 12/2006 Tsutaoka
7,164,468 B2 1/2007 Correia Da Silva Vilar
7,210,537 B1 5/2007 McNeil
7,261,165 B1 8/2007 Black
7,273,634 B2 9/2007 Fitzgibbons, Jr.
7,323,248 B2 1/2008 Ramsey
7,331,399 B2 2/2008 Multer
7,337,156 B2 2/2008 Wippich
7,341,113 B2 3/2008 Fallis
7,413,145 B2 8/2008 Hale
7,478,680 B2 1/2009 Sridharan
7,479,513 B2 1/2009 Reinheimer
7,482,395 B2 1/2009 Mabey
7,487,841 B1 2/2009 Gonci
7,504,449 B2 3/2009 Mazor
7,560,041 B2 7/2009 Yoon
7,587,875 B2 9/2009 Kish
7,588,087 B2 9/2009 Cafferata
7,614,456 B2 11/2009 Twum
7,626,076 B2 12/2009 Shin
7,670,513 B2 3/2010 Erdner
7,673,696 B1 3/2010 Gunn
7,686,093 B2 3/2010 Reilly
7,744,687 B2 6/2010 Moreno
7,748,662 B2 7/2010 Hale
7,754,808 B2 7/2010 Goossens
7,766,090 B2 8/2010 Mohr
7,767,010 B2 8/2010 Curzon
7,785,712 B2 8/2010 Miller
7,789,165 B1 9/2010 Yen
7,810,724 B2 10/2010 Skaaksrud
7,815,157 B2 10/2010 Knight
7,820,736 B2 10/2010 Reinheimer
7,824,583 B2 11/2010 Gang
7,828,069 B2 11/2010 Lee
7,832,492 B1 11/2010 Eldridge
7,837,009 B2 11/2010 Gross
7,849,542 B2 12/2010 Defranks
7,863,355 B2 1/2011 Futterer
7,886,836 B2 2/2011 Haaland
7,886,837 B1 2/2011 Helfgott
7,897,070 B2 3/2011 Knocke
7,897,673 B2 3/2011 Flat
7,900,709 B2 3/2011 Kotliar
7,934,564 B1 5/2011 Stell
7,975,774 B2 7/2011 Akcasu
8,006,447 B2 8/2011 Beele
8,080,186 B1 12/2011 Pennartz
8,088,310 B2 1/2012 Orr
8,141,649 B2 3/2012 Kotliar
8,148,315 B2 4/2012 Baker
8,171,677 B2 5/2012 Flint
8,206,620 B1 6/2012 Bolton
8,217,093 B2 7/2012 Reinheimer
8,226,017 B2 7/2012 Cohen
8,263,231 B2 9/2012 Mesa
8,273,813 B2 9/2012 Beck
8,276,679 B2 10/2012 Bui
8,281,550 B1 10/2012 Bolton
8,286,405 B1 10/2012 Bolton
8,291,990 B1 10/2012 Mohr
8,344,055 B1 1/2013 Mabey
8,366,955 B2 2/2013 Thomas
8,403,070 B1 3/2013 Lowe
8,409,479 B2 4/2013 Alexander
8,453,752 B2 6/2013 Katsuraku
8,457,013 B2 6/2013 Essinger
8,458,971 B2 6/2013 Winterowd
8,465,833 B2 6/2013 Lee
8,534,370 B1 9/2013 Al Azemi
8,586,657 B2 11/2013 Lopez
8,603,231 B2 12/2013 Wagh
8,607,272 B2 12/2013 Walter
8,646,540 B2 2/2014 Eckholm
8,647,524 B2 2/2014 Rueda-Nunez
8,662,192 B2 3/2014 Dunster
8,663,427 B2 3/2014 Sealey
8,663,774 B2 3/2014 Fernando
8,663,788 B2 3/2014 Oh
8,668,988 B2 3/2014 Schoots
8,685,206 B2 4/2014 Sealey
8,698,634 B2 4/2014 Guedes Lopes Da Fonseca
8,746,355 B2 6/2014 Demmitt
8,746,357 B2 6/2014 Butz
8,757,280 B2 6/2014 Cordani
8,778,213 B2 7/2014 Guo
8,789,769 B2 7/2014 Fenton
8,801,536 B2 8/2014 O'Shea, III
8,808,850 B2 8/2014 Dion
8,820,421 B2 9/2014 Rahgozar
8,871,053 B2 10/2014 Sealey
8,871,058 B2 10/2014 Sealey
8,871,110 B2 10/2014 Guo
8,893,814 B2 11/2014 Bui
8,944,174 B2 2/2015 Thomas
8,973,669 B2 3/2015 Connery
8,980,145 B2 3/2015 Baroux
9,005,396 B2 4/2015 Baroux
9,005,642 B2 4/2015 Mabey
9,027,303 B2 5/2015 Lichtinger
9,089,730 B2 7/2015 Shalev
9,109,390 B1 8/2015 Cavuoti
9,109,649 B2 8/2015 Bohle

(56) References Cited

U.S. PATENT DOCUMENTS

| | | | |
|---|---|---|---|
| 9,120,570 | B2 | 9/2015 | Hoisington |
| 9,174,074 | B2 | 11/2015 | Medina |
| 9,187,674 | B2 | 11/2015 | Ulcar |
| 9,199,108 | B2 | 12/2015 | Guo |
| 9,248,325 | B2 | 2/2016 | Lewis |
| 9,249,021 | B2 | 2/2016 | Mundheim |
| 9,265,978 | B2 | 2/2016 | Klaffmo |
| 9,302,749 | B1 | 4/2016 | D Offay |
| 9,321,808 | B2 | 4/2016 | Seneci |
| 9,323,116 | B2 | 4/2016 | You |
| 9,328,317 | B2 | 5/2016 | Peng |
| 9,339,671 | B1 | 5/2016 | Raj |
| 9,382,153 | B2 | 7/2016 | Fisher |
| 9,409,045 | B2 | 8/2016 | Berezovsky |
| 9,420,169 | B2 | 8/2016 | Uemura |
| 9,425,111 | B2 | 8/2016 | Park |
| 9,426,984 | B2 | 8/2016 | Pascal |
| 9,458,366 | B2 | 10/2016 | Blomgreen |
| 9,498,787 | B2 | 11/2016 | Fenton |
| 9,499,677 | B2 | 11/2016 | Dukes |
| 9,597,538 | B2 | 3/2017 | Langselius |
| 9,604,960 | B2 | 3/2017 | Liu |
| 9,605,888 | B2 | 3/2017 | Shin |
| 9,616,590 | B2 | 4/2017 | Birkeland |
| 9,618,434 | B2 | 4/2017 | Mizuta |
| 9,663,943 | B2 | 5/2017 | Dimakis |
| 9,706,858 | B2 | 7/2017 | Johnson |
| 9,715,352 | B2 | 7/2017 | Craddock |
| 9,776,029 | B2 | 10/2017 | Izumida |
| 9,777,500 | B1 | 10/2017 | Reisdorff |
| 9,782,944 | B2 | 10/2017 | Martin |
| 9,792,500 | B2 | 10/2017 | Pennypacker |
| 9,803,228 | B2 | 10/2017 | Wu |
| 9,809,685 | B2 | 11/2017 | Erbes |
| 9,818,524 | B2 | 11/2017 | Vaesen |
| 9,822,532 | B2 | 11/2017 | Sherry |
| 9,851,718 | B2 | 12/2017 | Booher |
| 9,852,993 | B2 | 12/2017 | Park |
| 9,856,197 | B2 | 1/2018 | Zubrin |
| 9,861,954 | B2 | 1/2018 | Chung |
| 9,920,250 | B1 | 3/2018 | Vuozzo |
| 9,931,648 | B2 | 4/2018 | Fenton |
| 9,956,446 | B2 | 5/2018 | Connery |
| 9,986,313 | B2 | 5/2018 | Schwarzkopf |
| 10,016,643 | B2 | 7/2018 | Smith |
| 10,041,251 | B2 | 8/2018 | King |
| 10,131,119 | B2 | 11/2018 | Freres |
| 10,166,419 | B2 | 1/2019 | Springell |
| 10,260,232 | B1 | 4/2019 | Conboy |
| 10,290,004 | B1 | 5/2019 | Conboy |
| 10,332,222 | B1 | 6/2019 | Conboy |
| 10,430,757 | B2 | 10/2019 | Conboy |
| 10,464,294 | B2 | 11/2019 | Freres |
| 10,472,169 | B1 | 11/2019 | Parker, Jr. |
| 10,550,483 | B2 | 2/2020 | Khosla |
| 10,653,904 | B2 | 5/2020 | Conboy |
| 10,662,114 | B2 | 5/2020 | Lettkeman |
| 10,695,597 | B2 | 6/2020 | Conboy |
| 10,814,150 | B2 | 10/2020 | Conboy |
| 10,899,038 | B2 | 1/2021 | Conboy |
| 10,919,178 | B2 | 2/2021 | Conboy |
| 11,025,560 | B2 | 6/2021 | Singleton, IV |
| 11,247,087 | B2 | 2/2022 | McDonald |
| 11,395,931 | B2 | 7/2022 | Conboy |
| 11,400,324 | B2 | 8/2022 | Conboy |
| 11,633,636 | B2 | 4/2023 | Conboy |
| 11,638,844 | B2 | 5/2023 | Conboy |
| 11,642,555 | B2 | 5/2023 | Conboy |
| 11,697,039 | B2 | 7/2023 | Conboy |
| 11,697,040 | B2 | 7/2023 | Conboy |
| 11,697,041 | B2 | 7/2023 | Conboy |
| 11,794,044 | B2 | 10/2023 | Conboy |
| 11,826,592 | B2 | 11/2023 | Conboy |
| 11,836,807 | B2 | 12/2023 | Conboy |
| 11,865,390 | B2 | 1/2024 | Conboy |
| 11,865,394 | B2 | 1/2024 | Conboy |
| 11,911,643 | B2 | 2/2024 | Conboy |
| 2001/0000911 | A1 | 5/2001 | Stewart |
| 2001/0025712 | A1 | 10/2001 | Pagan |
| 2001/0029706 | A1 | 10/2001 | Risser |
| 2001/0029750 | A1 | 10/2001 | Kotliar |
| 2002/0005288 | A1 | 1/2002 | Haase |
| 2002/0011593 | A1 | 1/2002 | Richards |
| 2002/0023762 | A1 | 2/2002 | Kotliar |
| 2002/0045688 | A1 | 4/2002 | Galli |
| 2002/0079379 | A1 | 6/2002 | Cheung |
| 2002/0096668 | A1 | 7/2002 | Vandersall |
| 2002/0110696 | A1 | 8/2002 | Slimak |
| 2002/0111508 | A1 | 8/2002 | Bergrath |
| 2002/0125016 | A1 | 9/2002 | Cofield |
| 2002/0130294 | A1 | 9/2002 | Almagro |
| 2002/0139056 | A1 | 10/2002 | Finnell |
| 2002/0157558 | A1 | 10/2002 | Woodall |
| 2002/0168476 | A1 | 11/2002 | Pasek |
| 2003/0018695 | A1 | 1/2003 | Kagaya |
| 2003/0022959 | A1 | 1/2003 | Blount |
| 2003/0029622 | A1 | 2/2003 | Clauss |
| 2003/0047723 | A1 | 3/2003 | Santoro |
| 2003/0051886 | A1 | 3/2003 | Adiga |
| 2003/0064779 | A1 | 4/2003 | Suda |
| 2003/0066990 | A1 | 4/2003 | Vandersall |
| 2003/0132425 | A1 | 7/2003 | Curzon |
| 2003/0136879 | A1 | 7/2003 | Grabow |
| 2003/0146843 | A1 | 8/2003 | Dittmer |
| 2003/0155133 | A1 | 8/2003 | Matsukawa |
| 2003/0159836 | A1 | 8/2003 | Kashiki |
| 2003/0160111 | A1 | 8/2003 | Multer |
| 2003/0168225 | A1 | 9/2003 | Denne |
| 2003/0170317 | A1 | 9/2003 | Curzon |
| 2003/0212177 | A1 | 11/2003 | Vandersall |
| 2003/0213005 | A1 | 11/2003 | Alphey |
| 2004/0003569 | A1 | 1/2004 | Frederickson |
| 2004/0038730 | A1 | 2/2004 | Suda |
| 2004/0051086 | A1 | 3/2004 | Pasek |
| 2004/0055765 | A1 | 3/2004 | Dillman |
| 2004/0089458 | A1 | 5/2004 | Jones |
| 2004/0099178 | A1 | 5/2004 | Jones |
| 2004/0109853 | A1 | 6/2004 | McDaniel |
| 2004/0134378 | A1 | 7/2004 | Batdorf |
| 2004/0163825 | A1 | 8/2004 | Dunster |
| 2004/0173783 | A1 | 9/2004 | Curzon |
| 2004/0175407 | A1 | 9/2004 | McDaniel |
| 2004/0194657 | A1 | 10/2004 | Lally |
| 2004/0209982 | A1 | 10/2004 | Horacek |
| 2004/0231252 | A1 | 11/2004 | Benjamin |
| 2004/0239912 | A1 | 12/2004 | Correia Da Silva Vilar |
| 2004/0256117 | A1 | 12/2004 | Cheung |
| 2005/0009965 | A1 | 1/2005 | Schell |
| 2005/0009966 | A1 | 1/2005 | Rowen |
| 2005/0011652 | A1 | 1/2005 | Hua |
| 2005/0017131 | A1 | 1/2005 | Hale |
| 2005/0022466 | A1 | 2/2005 | Kish |
| 2005/0045739 | A1 | 3/2005 | Multer |
| 2005/0058689 | A1 | 3/2005 | McDaniel |
| 2005/0066619 | A1 | 3/2005 | McDonald |
| 2005/0090201 | A1 | 4/2005 | Lengies |
| 2005/0103506 | A1 | 5/2005 | Warrack |
| 2005/0103507 | A1 | 5/2005 | Brown |
| 2005/0126794 | A1 | 6/2005 | Palmer |
| 2005/0139363 | A1 | 6/2005 | Thomas |
| 2005/0161235 | A1 | 7/2005 | Chuprin |
| 2005/0167920 | A1 | 8/2005 | Rose |
| 2005/0182345 | A1 | 8/2005 | Termanini |
| 2005/0229809 | A1 | 10/2005 | Lally |
| 2005/0235598 | A1 | 10/2005 | Liggins |
| 2005/0241731 | A1 | 11/2005 | Duchesne |
| 2005/0263298 | A1 | 12/2005 | Kotliar |
| 2005/0269109 | A1 | 12/2005 | Maguire |
| 2005/0274312 | A1 | 12/2005 | Sutter |
| 2005/0279972 | A1 | 12/2005 | Santoro |
| 2006/0037277 | A1 | 2/2006 | Fitzgibbons |
| 2006/0039753 | A1 | 2/2006 | Leonberg |
| 2006/0048466 | A1 | 3/2006 | Darnell |
| 2006/0056379 | A1 | 3/2006 | Battin |

(56) References Cited

U.S. PATENT DOCUMENTS

| | | | |
|---|---|---|---|
| 2006/0060668 | A1 | 3/2006 | Gunter |
| 2006/0083920 | A1 | 4/2006 | Schnabel |
| 2006/0113513 | A1 | 6/2006 | Nilsson |
| 2006/0124322 | A1 | 6/2006 | Goldburt |
| 2006/0131035 | A1 | 6/2006 | French |
| 2006/0134265 | A1 | 6/2006 | Beukes |
| 2006/0157668 | A1 | 7/2006 | Erdner |
| 2006/0162941 | A1 | 7/2006 | Sridharan |
| 2006/0167131 | A1 | 7/2006 | Mabey |
| 2006/0168906 | A1 | 8/2006 | Tonyan |
| 2006/0174968 | A1 | 8/2006 | De Luna |
| 2006/0175067 | A1 | 8/2006 | Cover |
| 2006/0196681 | A1 | 9/2006 | Adiga |
| 2006/0208236 | A1 | 9/2006 | Gang |
| 2006/0213672 | A1 | 9/2006 | Mohr |
| 2006/0260824 | A1 | 11/2006 | Dillman |
| 2007/0007021 | A1 | 1/2007 | Regan |
| 2007/0026214 | A1 | 2/2007 | Bullock |
| 2007/0034823 | A1 | 2/2007 | Hagquist |
| 2007/0084554 | A1 | 4/2007 | Miller |
| 2007/0089431 | A1 | 4/2007 | DuBrucq |
| 2007/0090322 | A1 | 4/2007 | Yoon |
| 2007/0119334 | A1 | 5/2007 | Atkinson |
| 2007/0125880 | A1 | 6/2007 | Palle |
| 2007/0176156 | A1 | 8/2007 | Mabey |
| 2007/0193753 | A1 | 8/2007 | Adiga |
| 2007/0194289 | A1 | 8/2007 | Anglin |
| 2007/0197112 | A1 | 8/2007 | Mazor |
| 2007/0227085 | A1 | 10/2007 | Mader |
| 2007/0232731 | A1 | 10/2007 | Knocke |
| 2007/0246609 | A1 | 10/2007 | Smetannikov |
| 2007/0256842 | A1 | 11/2007 | Mohr |
| 2007/0266649 | A1 | 11/2007 | Overmyer |
| 2007/0289709 | A1 | 12/2007 | Chong |
| 2007/0289752 | A1 | 12/2007 | Beck |
| 2007/0295046 | A1 | 12/2007 | Cassan |
| 2008/0000649 | A1 | 1/2008 | Guirguis |
| 2008/0012229 | A1 | 1/2008 | Rose |
| 2008/0030074 | A1 | 2/2008 | Duong |
| 2008/0050565 | A1 | 2/2008 | Gross |
| 2008/0050578 | A1 | 2/2008 | Sinclair |
| 2008/0054230 | A1 | 3/2008 | Mabey |
| 2008/0099580 | A1 | 5/2008 | Gunter |
| 2008/0115949 | A1 | 5/2008 | Li |
| 2008/0128145 | A1 | 6/2008 | Butz |
| 2008/0145548 | A1 | 6/2008 | Bracher |
| 2008/0168798 | A1 | 7/2008 | Kotliar |
| 2008/0176141 | A1 | 7/2008 | Pan |
| 2008/0179067 | A1 | 7/2008 | Ho |
| 2008/0184642 | A1 | 8/2008 | Sebastian |
| 2008/0201787 | A1 | 8/2008 | Shin |
| 2008/0202772 | A1 | 8/2008 | Twum |
| 2008/0202775 | A1 | 8/2008 | Bordallo Alvarez |
| 2008/0217086 | A1 | 9/2008 | Ferreira Neves |
| 2008/0236846 | A1 | 10/2008 | Gamble |
| 2008/0265223 | A1 | 10/2008 | Sopheap |
| 2008/0276556 | A1 | 11/2008 | Flint |
| 2008/0289831 | A1 | 11/2008 | Kaimart |
| 2008/0314601 | A1 | 12/2008 | Cafferata |
| 2009/0014507 | A1 | 1/2009 | D Amato |
| 2009/0039660 | A1 | 2/2009 | Gonzalez |
| 2009/0044484 | A1 | 2/2009 | Berger |
| 2009/0065646 | A1 | 3/2009 | Hale |
| 2009/0075539 | A1 | 3/2009 | Dimanshteyn |
| 2009/0090520 | A1 | 4/2009 | Lee |
| 2009/0107064 | A1 | 4/2009 | Bowman |
| 2009/0120653 | A1 | 5/2009 | Thomas |
| 2009/0126948 | A1 | 5/2009 | DeSanto |
| 2009/0126951 | A1 | 5/2009 | Baek |
| 2009/0145075 | A1 | 6/2009 | Oakley |
| 2009/0188567 | A1 | 7/2009 | Mchugh |
| 2009/0194605 | A1 | 8/2009 | Lepeshinsky |
| 2009/0212251 | A1 | 8/2009 | Taylor |
| 2009/0215926 | A1 | 8/2009 | Kozlowski |
| 2009/0216163 | A1 | 8/2009 | Evans |
| 2009/0249556 | A1 | 10/2009 | Dermeik |
| 2009/0255605 | A1 | 10/2009 | Filion |
| 2009/0266025 | A1 | 10/2009 | Toas |
| 2009/0280345 | A1 | 11/2009 | Maynard |
| 2009/0301001 | A1 | 12/2009 | Kish |
| 2009/0313748 | A1 | 12/2009 | Guedes Lopes Da Fonseca |
| 2009/0313931 | A1 | 12/2009 | Porter |
| 2009/0314500 | A1 | 12/2009 | Fenton |
| 2009/0326117 | A1 | 12/2009 | Benussi |
| 2010/0000743 | A1 | 1/2010 | Cohen |
| 2010/0018725 | A1 | 1/2010 | Ramos Rodriguez |
| 2010/0032175 | A1 | 2/2010 | Boyd |
| 2010/0062153 | A1 | 3/2010 | Curzon |
| 2010/0069488 | A1 | 3/2010 | Mabey |
| 2010/0175897 | A1 | 7/2010 | Crump |
| 2010/0176353 | A1 | 7/2010 | Hanna |
| 2010/0181084 | A1 | 7/2010 | Carmo |
| 2010/0200819 | A1 | 8/2010 | Mans Fibla |
| 2010/0218959 | A1 | 9/2010 | Adiga |
| 2010/0252648 | A1 | 10/2010 | Robinson |
| 2010/0263886 | A1 | 10/2010 | Rahgozar |
| 2010/0267853 | A1 | 10/2010 | Edry |
| 2010/0269449 | A1 | 10/2010 | Bush |
| 2010/0269735 | A1 | 10/2010 | Shichtel |
| 2010/0281784 | A1 | 11/2010 | Leo |
| 2010/0314138 | A1 | 12/2010 | Weatherspoon |
| 2010/0326677 | A1 | 12/2010 | Jepsen |
| 2011/0000142 | A1 | 1/2011 | Bui |
| 2011/0005780 | A1 | 1/2011 | Rennie |
| 2011/0015411 | A1 | 1/2011 | Goto |
| 2011/0061336 | A1 | 3/2011 | Thomas |
| 2011/0073331 | A1 | 3/2011 | Xu |
| 2011/0089386 | A1 | 4/2011 | Berry |
| 2011/0091713 | A1 | 4/2011 | Miller |
| 2011/0146173 | A1 | 6/2011 | Michael |
| 2011/0162295 | A1 | 7/2011 | Cottier |
| 2011/0197530 | A1 | 8/2011 | Bahnmiller |
| 2011/0203813 | A1 | 8/2011 | Fenton |
| 2011/0224317 | A1 | 9/2011 | O'Leary |
| 2011/0266486 | A1 | 11/2011 | Orr |
| 2011/0284250 | A1 | 11/2011 | Thomas |
| 2011/0296769 | A1 | 12/2011 | Collins |
| 2011/0315406 | A1 | 12/2011 | Connery |
| 2012/0045584 | A1 | 2/2012 | Dettbarn |
| 2012/0046419 | A1 | 2/2012 | Chung |
| 2012/0067600 | A1 | 3/2012 | Bourakov |
| 2012/0073228 | A1 | 3/2012 | Fork |
| 2012/0121809 | A1 | 5/2012 | Vuozzo |
| 2012/0138319 | A1 | 6/2012 | Demmitt |
| 2012/0145418 | A1 | 6/2012 | Su |
| 2012/0168185 | A1 | 7/2012 | Yount |
| 2012/0199781 | A1 | 8/2012 | Rueda-Nunez |
| 2012/0241535 | A1 | 9/2012 | Carriere |
| 2012/0256143 | A1 | 10/2012 | Ulcar |
| 2012/0258327 | A1 | 10/2012 | McArthur |
| 2012/0279731 | A1 | 11/2012 | Howard, Sr. |
| 2012/0295996 | A1 | 11/2012 | Wang |
| 2012/0308631 | A1 | 12/2012 | Shirley |
| 2012/0312562 | A1 | 12/2012 | Woehrle |
| 2013/0000239 | A1 | 1/2013 | Winterowd |
| 2013/0001331 | A1 | 1/2013 | Palle |
| 2013/0101839 | A1 | 4/2013 | Dion |
| 2013/0111839 | A1 | 5/2013 | Efros |
| 2013/0149548 | A1 | 6/2013 | Williams |
| 2013/0181158 | A1 | 7/2013 | Guo |
| 2013/0239848 | A1 | 9/2013 | Fisher |
| 2013/0264076 | A1 | 10/2013 | Medina |
| 2013/0288031 | A1 | 10/2013 | Labock |
| 2013/0312985 | A1 | 11/2013 | Collins |
| 2013/0328322 | A1 | 12/2013 | Julian |
| 2014/0027131 | A1 | 1/2014 | Kawiecki |
| 2014/0079942 | A1 | 3/2014 | Lally |
| 2014/0090310 | A1 | 4/2014 | Greene |
| 2014/0123572 | A1 | 5/2014 | Segall |
| 2014/0130435 | A1 | 5/2014 | Paradis |
| 2014/0193201 | A1 | 7/2014 | Stauffer |
| 2014/0202716 | A1 | 7/2014 | Klaffmo |
| 2014/0202717 | A1 | 7/2014 | Klaffmo |
| 2014/0206767 | A1 | 7/2014 | Klaffmo |

(56) References Cited

U.S. PATENT DOCUMENTS

| | | | |
|---|---|---|---|
| 2014/0209330 | A1 | 7/2014 | Statter |
| 2014/0215937 | A1 | 8/2014 | Zhou |
| 2014/0216770 | A1 | 8/2014 | Gibson |
| 2014/0231106 | A1 | 8/2014 | Lewis |
| 2014/0239123 | A1 | 8/2014 | Hoisington |
| 2014/0245693 | A1 | 9/2014 | Efros |
| 2014/0245696 | A1 | 9/2014 | Anderson |
| 2014/0246509 | A1 | 9/2014 | Fenton |
| 2014/0284067 | A1 | 9/2014 | Klaffmo |
| 2014/0284511 | A1 | 9/2014 | Klaffmo |
| 2014/0284512 | A1 | 9/2014 | Klaffmo |
| 2014/0290970 | A1 | 10/2014 | Izumida |
| 2014/0295164 | A1 | 10/2014 | Parker |
| 2014/0299339 | A1 | 10/2014 | Klaffmo |
| 2014/0322548 | A1 | 10/2014 | Boldizsar |
| 2014/0338930 | A1 | 11/2014 | Smith |
| 2014/0366598 | A1 | 12/2014 | Carmo |
| 2015/0020476 | A1 | 1/2015 | Winterowd |
| 2015/0021053 | A1 | 1/2015 | Klaffmo |
| 2015/0021055 | A1 | 1/2015 | Klaffmo |
| 2015/0052838 | A1 | 2/2015 | Ritchie |
| 2015/0071978 | A1 | 3/2015 | Chang |
| 2015/0076842 | A1 | 3/2015 | Bendel |
| 2015/0129245 | A1 | 5/2015 | Weber |
| 2015/0147478 | A1 | 5/2015 | Shutt |
| 2015/0167291 | A1 | 6/2015 | Bundy |
| 2015/0175841 | A1 | 6/2015 | Parker |
| 2015/0224352 | A1 | 8/2015 | Klaffmo |
| 2015/0314564 | A1 | 11/2015 | Mancini |
| 2015/0321033 | A1 | 11/2015 | Statter |
| 2015/0322668 | A1 | 11/2015 | Quinn |
| 2015/0335926 | A1 | 11/2015 | Klaffmo |
| 2015/0335928 | A1 | 11/2015 | Klaffmo |
| 2015/0352385 | A1 | 12/2015 | Fenton |
| 2015/0354199 | A1 | 12/2015 | Segall |
| 2015/0368560 | A1 | 12/2015 | Pascal |
| 2016/0024779 | A1 | 1/2016 | Clus |
| 2016/0030789 | A1 | 2/2016 | Cordani |
| 2016/0051850 | A1 | 2/2016 | Menard |
| 2016/0059960 | A1 | 3/2016 | Fearn |
| 2016/0082298 | A1 | 3/2016 | Dagenhart |
| 2016/0096053 | A1 | 4/2016 | Beechy |
| 2016/0107014 | A1 | 4/2016 | Klaffmo |
| 2016/0132714 | A1 | 5/2016 | Pennypacker |
| 2016/0137853 | A1 | 5/2016 | Lopez |
| 2016/0216091 | A1 | 7/2016 | Erickson |
| 2016/0243789 | A1 | 8/2016 | Baroux |
| 2016/0280827 | A1 | 9/2016 | Anderson |
| 2016/0313120 | A1 | 10/2016 | Shishalov |
| 2016/0329114 | A1 | 11/2016 | Lin-Hendel |
| 2017/0007865 | A1 | 1/2017 | Dor-El |
| 2017/0008764 | A1 | 1/2017 | Labuto |
| 2017/0029632 | A1 | 2/2017 | Couturier |
| 2017/0056698 | A1 | 3/2017 | Pai |
| 2017/0059343 | A1 | 3/2017 | Spinelli |
| 2017/0072236 | A1 | 3/2017 | Cordani |
| 2017/0080404 | A1 | 3/2017 | Chung |
| 2017/0081844 | A1 | 3/2017 | Dimakis |
| 2017/0120089 | A1 | 5/2017 | Fisher |
| 2017/0121965 | A1 | 5/2017 | Dettbarn |
| 2017/0138049 | A1 | 5/2017 | King |
| 2017/0157441 | A1 | 6/2017 | Smith |
| 2017/0180829 | A1 | 6/2017 | Schwarzkopf |
| 2017/0182341 | A1 | 6/2017 | Libal |
| 2017/0210098 | A1 | 7/2017 | Moore |
| 2017/0226424 | A1 | 8/2017 | Moon |
| 2017/0294093 | A1* | 10/2017 | Smith .................. G08B 17/005 |
| 2017/0321418 | A1 | 11/2017 | Tremblay |
| 2018/0023283 | A1 | 1/2018 | Dunster |
| 2018/0086896 | A1 | 3/2018 | Appel |
| 2018/0087270 | A1 | 3/2018 | Miller |
| 2018/0089988 | A1 | 3/2018 | Schwarzkopf |
| 2018/0119421 | A1 | 5/2018 | Pospisil |
| 2018/0202051 | A1 | 7/2018 | Kinlen |
| 2018/0331386 | A1 | 11/2018 | Koh |
| 2019/0003943 | A1 | 1/2019 | King |
| 2019/0023398 | A1 | 1/2019 | Albanna |
| 2019/0083835 | A1 | 3/2019 | Mariampillai |
| 2019/0091424 | A1 | 3/2019 | Haruta |
| 2019/0168033 | A1 | 6/2019 | Conboy |
| 2019/0262637 | A1 | 8/2019 | Statter |
| 2019/0308044 | A1 | 10/2019 | Chattaway |
| 2019/0382661 | A1 | 12/2019 | Kim |
| 2020/0109253 | A1 | 4/2020 | Appel |
| 2020/0181328 | A1 | 6/2020 | Clark |
| 2020/0254290 | A1 | 8/2020 | Robles |
| 2020/0406075 | A1 | 12/2020 | Conboy |
| 2021/0052928 | A1 | 2/2021 | Kim |
| 2021/0154502 | A1 | 5/2021 | Conboy |
| 2021/0213311 | A1 | 7/2021 | Austrheim |
| 2022/0008773 | A1 | 1/2022 | Conboy |
| 2022/0126144 | A1 | 4/2022 | Conboy |
| 2022/0134151 | A1 | 5/2022 | Conboy |
| 2022/0362596 | A1 | 11/2022 | Wolf |
| 2022/0362600 | A1 | 11/2022 | Conboy |
| 2023/0129221 | A1 | 4/2023 | Wolf |

FOREIGN PATENT DOCUMENTS

| | | | |
|---|---|---|---|
| AU | 2005220194 | | 4/2007 |
| AU | 2005220196 | | 4/2007 |
| AU | 2002240521 | | 12/2007 |
| AU | 2002241169 | | 7/2008 |
| AU | 2011244837 | | 5/2012 |
| AU | 2011280137 | | 1/2013 |
| AU | 2019240416 | | 10/2020 |
| CA | 2023624 | C | 3/1997 |
| CA | 2212076 | | 7/1997 |
| CA | 2294254 | | 1/1999 |
| CA | 2406118 | | 10/2001 |
| CA | 2408944 | | 11/2001 |
| CA | 2442148 | | 10/2002 |
| CA | 2409879 | | 4/2003 |
| CA | 2593435 | | 8/2006 |
| CA | 2653817 | | 12/2007 |
| CA | 2705140 | | 5/2009 |
| CA | 2974796 | | 7/2010 |
| CA | 2811358 | | 1/2013 |
| CA | 2792793 | | 4/2013 |
| CA | 2846076 | | 9/2014 |
| CA | 2862380 | | 4/2015 |
| CA | 2868719 | | 6/2015 |
| CA | 2933553 | | 6/2015 |
| CA | 3094694 | A1 | 9/2019 |
| CN | 1397613 | | 2/2003 |
| CN | 101293752 | | 10/2008 |
| CN | 101434760 | | 5/2009 |
| CN | 201815036 | | 5/2011 |
| CN | 202045944 | | 11/2011 |
| CN | 102300610 | | 12/2011 |
| CN | 102337770 | | 2/2012 |
| CN | 202892722 | | 4/2013 |
| CN | 103562079 | | 2/2014 |
| CN | 103813835 | | 5/2014 |
| CN | 104540556 | | 4/2015 |
| DE | 1302520 | B | 10/1970 |
| EP | 0059178 | A1 | 9/1982 |
| EP | 0059178 | B1 | 5/1985 |
| EP | 173446 | A1 | 3/1986 |
| EP | 173446 | B1 | 3/1986 |
| EP | 0199131 | A2 | 10/1986 |
| EP | 0140866 | B1 | 6/1987 |
| EP | 0263570 | A1 | 4/1988 |
| EP | 2898925 | | 7/2015 |
| EP | 2902077 | | 8/2015 |
| EP | 19167771 | | 10/2019 |
| GB | 429207 | A | 5/1935 |
| GB | 831720 | A | 3/1960 |
| GB | 832691 | | 4/1960 |
| GB | 1112553 | | 5/1968 |
| GB | 2153193 | | 8/1985 |
| GB | 2301122 | | 11/1996 |
| GB | 2370766 | | 7/2002 |
| GB | 2370769 | A | 7/2002 |

(56) References Cited

FOREIGN PATENT DOCUMENTS

| | | | |
|---|---|---|---|
| GB | 2375047 | | 11/2002 |
| GB | 2386835 | | 10/2003 |
| GB | 2486959 | A | 7/2012 |
| GB | 2533262 | | 6/2016 |
| GB | 2549980 | | 11/2017 |
| GB | 2555067 | | 4/2018 |
| KR | 101675486 | | 5/2012 |
| TW | 1471153 | | 2/2015 |
| TW | 201714639 | | 5/2017 |
| WO | 8607272 | A1 | 12/1986 |
| WO | 8704145 | | 7/1987 |
| WO | 1988000482 | A1 | 1/1988 |
| WO | 8801536 | A1 | 3/1988 |
| WO | 9010668 | | 9/1990 |
| WO | 9100327 | | 1/1991 |
| WO | 9105585 | | 5/1991 |
| WO | 9109390 | A1 | 6/1991 |
| WO | 9109649 | A1 | 7/1991 |
| WO | 9300963 | | 1/1993 |
| WO | 9302749 | A1 | 2/1993 |
| WO | 9321808 | A1 | 11/1993 |
| WO | 9323116 | A1 | 11/1993 |
| WO | 9420169 | A1 | 9/1994 |
| WO | 9425111 | A1 | 11/1994 |
| WO | 9604960 | A1 | 2/1996 |
| WO | 9605888 | A1 | 2/1996 |
| WO | 9618434 | A1 | 6/1996 |
| WO | 9706858 | A2 | 2/1997 |
| WO | 9706858 | A3 | 4/1997 |
| WO | 9715352 | A1 | 5/1997 |
| WO | 9803228 | A1 | 1/1998 |
| WO | 9809685 | A1 | 3/1998 |
| WO | 9818524 | A1 | 5/1998 |
| WO | 9852993 | A1 | 11/1998 |
| WO | 9856197 | A1 | 12/1998 |
| WO | 0006667 | A2 | 2/2000 |
| WO | 0022255 | | 4/2000 |
| WO | 0029067 | A1 | 5/2000 |
| WO | 0006667 | A3 | 8/2000 |
| WO | 0107116 | A1 | 2/2001 |
| WO | 0139599 | A2 | 6/2001 |
| WO | 0145932 | | 6/2001 |
| WO | 0166669 | | 9/2001 |
| WO | 0208015 | A1 | 1/2002 |
| WO | 0228484 | A1 | 4/2002 |
| WO | 0228708 | A2 | 4/2002 |
| WO | 0139599 | A3 | 5/2002 |
| WO | 0243812 | A2 | 6/2002 |
| WO | 0244305 | A2 | 6/2002 |
| WO | 0244305 | A3 | 8/2002 |
| WO | 0228708 | A3 | 1/2003 |
| WO | 03015873 | A2 | 2/2003 |
| WO | 0243812 | A3 | 3/2003 |
| WO | 03024618 | A1 | 3/2003 |
| WO | 2003018695 | A1 | 3/2003 |
| WO | 03015873 | A3 | 5/2003 |
| WO | 03057317 | A1 | 7/2003 |
| WO | 03072201 | A1 | 9/2003 |
| WO | 03073128 | A1 | 9/2003 |
| WO | 2004000422 | A1 | 12/2003 |
| WO | 2004108528 | A2 | 12/2004 |
| WO | 2005014115 | A1 | 2/2005 |
| WO | 2005046800 | A1 | 5/2005 |
| WO | 2004108528 | A3 | 6/2005 |
| WO | 2005049144 | A2 | 6/2005 |
| WO | 2005054407 | A1 | 6/2005 |
| WO | 2005058423 | A1 | 6/2005 |
| WO | 2005119868 | | 12/2005 |
| WO | 2006006829 | | 1/2006 |
| WO | 2006010667 | | 2/2006 |
| WO | 2006013180 | | 2/2006 |
| WO | 2006017566 | A2 | 2/2006 |
| WO | 2006032130 | A1 | 3/2006 |
| WO | 2006036084 | A1 | 4/2006 |
| WO | 2006045167 | A1 | 5/2006 |
| WO | 2006053514 | A1 | 5/2006 |
| WO | 2006017566 | A3 | 6/2006 |
| WO | 2006056379 | A2 | 6/2006 |
| WO | 2006072672 | | 7/2006 |
| WO | 2006079899 | A2 | 8/2006 |
| WO | 2006081156 | | 8/2006 |
| WO | 2006081596 | | 8/2006 |
| WO | 2006097962 | | 9/2006 |
| WO | 2006056379 | A3 | 10/2006 |
| WO | 2006126181 | | 11/2006 |
| WO | 2007001403 | | 1/2007 |
| WO | 2007008098 | A1 | 1/2007 |
| WO | 2007027170 | A1 | 3/2007 |
| WO | 2007030982 | | 3/2007 |
| WO | 2007033450 | A1 | 3/2007 |
| WO | 2007048149 | | 5/2007 |
| WO | 2007065112 | | 6/2007 |
| WO | 2007092985 | A1 | 8/2007 |
| WO | 2007138132 | A1 | 12/2007 |
| WO | 2007140676 | | 12/2007 |
| WO | 2008031559 | | 3/2008 |
| WO | 2008045460 | A2 | 4/2008 |
| WO | 2008071825 | A2 | 6/2008 |
| WO | 2008071825 | A3 | 7/2008 |
| WO | 2008100348 | | 8/2008 |
| WO | 2008104617 | A1 | 9/2008 |
| WO | 2008111864 | A1 | 9/2008 |
| WO | 08118408 | | 10/2008 |
| WO | 2008150157 | | 12/2008 |
| WO | 2008150265 | | 12/2008 |
| WO | 2008155187 | | 12/2008 |
| WO | 2009004105 | A1 | 1/2009 |
| WO | 2009012546 | A1 | 1/2009 |
| WO | 2009020251 | | 2/2009 |
| WO | 2009022995 | A2 | 2/2009 |
| WO | 2005049144 | A3 | 3/2009 |
| WO | 2009022995 | A3 | 4/2009 |
| WO | 2009042847 | | 4/2009 |
| WO | 2009057104 | | 5/2009 |
| WO | 2009061471 | | 5/2009 |
| WO | 2009086826 | | 7/2009 |
| WO | 2009097112 | | 8/2009 |
| WO | 2009121682 | A1 | 10/2009 |
| WO | 2009139668 | A1 | 11/2009 |
| WO | 2009150478 | A1 | 12/2009 |
| WO | 2009150478 | A4 | 3/2010 |
| WO | 2010028416 | | 3/2010 |
| WO | 2010028538 | A1 | 3/2010 |
| WO | 2010041228 | | 4/2010 |
| WO | 2010046696 | | 4/2010 |
| WO | 2010061059 | | 6/2010 |
| WO | 2010078559 | | 7/2010 |
| WO | 2010082073 | | 7/2010 |
| WO | 2010083890 | A1 | 7/2010 |
| WO | 2010089604 | | 8/2010 |
| WO | 2010104286 | | 9/2010 |
| WO | 2010123401 | A1 | 10/2010 |
| WO | 2010139124 | | 12/2010 |
| WO | 2011015411 | A1 | 2/2011 |
| WO | 2011016773 | | 2/2011 |
| WO | 2011025310 | A2 | 3/2011 |
| WO | 2011034334 | A2 | 3/2011 |
| WO | 2011042609 | | 4/2011 |
| WO | 2011042761 | A1 | 4/2011 |
| WO | 2011049424 | A2 | 4/2011 |
| WO | 2011034334 | A9 | 5/2011 |
| WO | 2011054345 | | 5/2011 |
| WO | 2011078727 | A1 | 6/2011 |
| WO | 2011078728 | A1 | 6/2011 |
| WO | 2011025310 | A9 | 7/2011 |
| WO | 2011025310 | A3 | 9/2011 |
| WO | 2011116450 | | 9/2011 |
| WO | 2011049424 | A3 | 11/2011 |
| WO | 2011148206 | A1 | 12/2011 |
| WO | 2012002777 | A2 | 1/2012 |
| WO | 2012021146 | A1 | 2/2012 |
| WO | 2012028155 | A1 | 3/2012 |
| WO | 2012031762 | | 3/2012 |
| WO | 2012002777 | A3 | 5/2012 |

(56) References Cited

FOREIGN PATENT DOCUMENTS

| | | | |
|---|---|---|---|
| WO | 2012060491 | | 5/2012 |
| WO | 2012071577 | A2 | 5/2012 |
| WO | 2012076905 | | 6/2012 |
| WO | 2012078916 | | 6/2012 |
| WO | 2012071577 | A3 | 8/2012 |
| WO | 2012147677 | | 11/2012 |
| WO | 2012149634 | A1 | 11/2012 |
| WO | 2012164478 | | 12/2012 |
| WO | 2013003097 | | 1/2013 |
| WO | 2013030497 | A1 | 3/2013 |
| WO | 2013060848 | A1 | 5/2013 |
| WO | 2013062295 | | 5/2013 |
| WO | 2013068260 | | 5/2013 |
| WO | 2013098859 | | 7/2013 |
| WO | 2013140671 | A1 | 9/2013 |
| WO | 2013145207 | | 10/2013 |
| WO | 2013179218 | | 12/2013 |
| WO | 2014001417 | | 1/2014 |
| WO | 2014025929 | | 2/2014 |
| WO | 2014084749 | A1 | 6/2014 |
| WO | 2014115036 | | 7/2014 |
| WO | 2014115038 | A2 | 7/2014 |
| WO | 2014127604 | A1 | 8/2014 |
| WO | 2014152528 | | 9/2014 |
| WO | 2014115038 | A3 | 10/2014 |
| WO | 2014155208 | A1 | 10/2014 |
| WO | 2014179482 | | 11/2014 |
| WO | 2014179904 | | 11/2014 |
| WO | 2015020388 | | 2/2015 |
| WO | 2015051917 | | 4/2015 |
| WO | 2015055862 | | 4/2015 |
| WO | 2015061905 | | 5/2015 |
| WO | 2015076842 | A1 | 5/2015 |
| WO | 2015089467 | | 6/2015 |
| WO | 2015094014 | | 6/2015 |
| WO | 2015104006 | | 7/2015 |
| WO | 2015126854 | | 8/2015 |
| WO | 2015131631 | | 9/2015 |
| WO | 2015134810 | A1 | 9/2015 |
| WO | 2015153843 | | 10/2015 |
| WO | 2015168456 | | 11/2015 |
| WO | 2015172619 | | 11/2015 |
| WO | 2016004801 | | 1/2016 |
| WO | 2016005650 | | 1/2016 |
| WO | 2016071715 | | 5/2016 |
| WO | 2016075480 | | 5/2016 |
| WO | 2016088026 | | 6/2016 |
| WO | 2016131060 | | 8/2016 |
| WO | 2016159897 | A1 | 10/2016 |
| WO | 2016175379 | A1 | 11/2016 |
| WO | 2016186450 | | 11/2016 |
| WO | 2017014782 | | 1/2017 |
| WO | 2017015585 | | 1/2017 |
| WO | 17019566 | | 2/2017 |
| WO | 2017016142 | A1 | 2/2017 |
| WO | 2017016143 | A1 | 2/2017 |
| WO | 2017031520 | A1 | 3/2017 |
| WO | 2017070375 | A1 | 4/2017 |
| WO | 2017070375 | A8 | 6/2017 |
| WO | 2017090040 | A1 | 6/2017 |
| WO | 2017094918 | | 6/2017 |
| WO | 2017103321 | A1 | 6/2017 |
| WO | 2017116148 | A1 | 7/2017 |
| WO | 2017157406 | A1 | 9/2017 |
| WO | 2017179953 | A1 | 10/2017 |
| WO | 2017208272 | A1 | 12/2017 |
| WO | 2018006000 | | 1/2018 |
| WO | 2018134704 | | 7/2018 |
| WO | 2020163788 | | 8/2020 |

OTHER PUBLICATIONS

Office Action (Notice of Allowance and Fees Due (PTOL-85)) dated Oct. 11, 2022 for U.S. Appl. No. 17/497,941 (10 Pages ).

M. F. M. Ibrahim, H. G. Abd El-Gawad and A. M. Bondok, "Physiological Impacts of Potassium Citrate and Folic Acid on Growth, Yield, and Some Viral Diseases of Potato Plants", Middle East Journal of Agriculture, col. 4, Issue 3, Jul.-Sep. 2015 (13 Pages).

Labat Environmental, "Ecological Risk Assessment of Wildland Fire-Fighting Chemicals: Long-Term Fire Retardants", Fire and Aviation Management US Forest Service, Boise, ID, Dec. 2013, (110 Pages).

Status of REACH Registration for Jungbunzlauer Products before the European Chemicals Agency (ECHA), No. 12.19, by Jungbunzlauer Suisse AG, Basel Switzerland, Aug. 10, 2020 (2 Pages).

Jungbunzlauer Products That Comply with California Proposition 65, by Jungbunzlauer Suisse AG, Basel Switzerland, Jan. 3, 2020 (1 Page).

Material Safety Data Sheet (MSDS) for Purple K Dry Chemical Fire Extinguishant, AMEREX Corporation, Trussville, AL, Sep. 2003 (7 Pages).

"What is Foliar Spray: Learn About Different Types of Foliar Spraying", http://www.gardeningknowhow.com, Aug. 6, 2020 (2 Pages).

D. Roosendams, K. Van Wingerden, M.N. Holme and P. Hoorelbeke, "Experimental Investigation of Explosion Mitigating Properties of Aqueous Potassium Carbonate Solutions", Journal of Loss Prevention in the Process Industries, vol. 46, Feb. 20, 2017 (19 Pages).

Technical Specification Sheet for Mono-Ammonium Phosphate (12-61-0) Fertilizer, by Haifa Chemicals Ltd., Haifa Bay, Isreal, May 7, 2020 (2 Pages).

Wikipedia Entry for Diammoniun Phosphate, published at https://en.wikipedia.org/wiki/Diammonium_phosphate , Retrieved May 7, 2022 (3 Pages).

Technical Specifications for Monoammonium Phosphate (MAP,) Nutrient Source Specifics No. 9, International Plant Nutrition Institute (IPNI), Norcross, Georgia, Ref# 10069, May 2020 (1 Page).

Technical Specifications for Diammonium Phosphate (DAP), Nutrient Source Specifics No. 17, International Plant Nutrition Institute (IPNI), Norcross, Georgia, Ref# 11040, May 2020 (1 Page).

Wikipedia Entry for Potassium Citrate, published at https://en.wikipedia.org/wiki/Potassium_citrate, Last Edited Jul. 19, 201, Retrieved May 6, 2022 (3 Pages).

Technical Specifications of MonoAmmonium Phosphate (MAP), published at Mosaic Crop Nutrition Resource Library, https://www.cropnutrition.com/resource-library/monoammonium- . . . May 5, 2020 (2 Pages).

Anthony E. Finnerty, "Water-Based Fire Extinguishing Agents", US Army Research Laboratory, Aberdeen Proving Ground, Maryland, 1995 (12 Pages).

MSDS for Potassium Citrate, MSDS No. P5675 prepared on Nov. 6, 1997 by J. T. Baker of Strategic Services Division of Mallinckrodt Baker, Inc. (4 Pages).

US International Trademark Commission, "Citric Acid and Certain Citrate Salts from Canada and China (Investigation Nos. 701-TA-456 and 731-TA-1152 (Final)", ITC Publication No. 4076, Washington, DC, May 2009 (184 Pages).

Technical Product Information Sheet for Tripotassium Citrate Monohydyrate, Cargill Acidulants, Eddyville, IA, USA, Nov. 30, 2010 (1 Page).

Technical Brochure titled "FACTS: Formulating Better Tasting Infant Formula", No. 150, by Jungbunzlauer Suisse AG, Basel Switzerland, 2015 (8 Pages).

Technical Brochure titled "Lactics", No. 130, by Jungbunzlauer Suisse AG, Basel Switzerland, 2016 (8 Pages).

Product Information for Phos-Chek MVP-F (0.95 lb/Gal) Dry Concentrate Gum-Thickened, Medium Viscocity, Fugitive Color, USDA Forest Service, May 2016 (1 Page).

Tersa Berninger, Natalie Dietz, and Oscar Gonzalez Lopez of Jungbunzlauer Ladenburg GmbH , "Water-Soluble Polymers in Agriculture: Xanthan Gum as Eco-Friendly Aternative to Synthetics", Microbial Biotechnology, published by Society for Applied Microbiology and John Wiley & Sons Ltd., Jun. 2021 (16 Pages).

Brief Profile on Tripotassium Citrate, by European Chemicals Agency (ECHA), Official Journal of the European Union, Jun. 13, 2022 (18 Pages).

(56) References Cited

OTHER PUBLICATIONS

Product Brochure for Komodo®-Pro 0-0-16 Plus Micronutrients, by Solutions 4Earth, LLC, Anderson NV, Apr. 2017 (1 Page).
Safety Data Sheet for Komodo Pro Fertilizer (No. R30528) Prepared on Feb. 9, 2017 by Solutions 4 Earth LLC, Henderson NV, Feb. 2017 (4 Pages).
Tarek Alshaal and Hassan Ragab El-Ramady, "Foliar Application: From Plant to Biofortification", The Environment, Biodiversity and Soil Security, vol. 1, pp. 71-83, Jul. 2017 (14 Pages).
2017 Product Brochure of Agricultural Solutions from Sierra Natural Science, Inc., Sierra Natural Science, Inc., Salina CA, 2017, (9 Pages).
Product Brochure for Komodo@-Pro Premium Potassium Chloride-Free Fertilizer, by Solutions 4Earth, LLC, Anderson NV, Apr. 2017 (2 Pages).
Online Product Advertisement titled "What is K-Rich™? A High analysis pH-buffered liquid potassium complexed with citric acid", Agricultural Solutions Inc., https://www.agsolcanada.com/individual-product-info/nts-k-rich, Aug. 5, 2020, (7 Pages).
Tesla Battery Emergency Response Guide for Lithium Ion, TS-00040027 Revision 1.8, Tesla Inc., 2020 (14 Pages).
2021 Model S Emergency Response Guide for Tesla Model S Electric Vehicles with Lithium Ion Battery, Version 001, Tesla Inc., 2021 (32 Pages).
Installation and Quick Start Guide for the SprayLogger BackPack Lite, by AgTerra Technologies, Inc., Sheridan, Wyoming, Mar. 2019 (11 Pages).
Quick Start Guide for the SnapMapper, by AgTerra Technologies, Inc, Sheridan, Wyoming, Mar. 29, 2019 (8 Pages).
Installation & Quick Start Guide for SoprayLogger E3B, Sheridan, Wyoming, Mar. 21, 2019, AgTerra Technologies, Inc., (17 Pages).
Office Action (Notice of Allowance and Fees Due (PTOL-85)) dated Feb. 13, 2023 for U.S. Appl. No. 17/497,955 (pp. 1-8).
Office Action (Non-Final Rejection) dated Oct. 27, 2022 for U.S. Appl. No. 17/497,943 (pp. 1-9).
Office Action (Non-Final Rejection) dated Oct. 27, 2022 for U.S. Appl. No. 17/497,952 (pp. 1-8).
Office Action (Non-Final Rejection) dated Oct. 27, 2022 for U.S. Appl. No. 17/497,953 (pp. 1-9).
Office Action (Non-Final Rejection) dated Nov. 10, 2022 for U.S. Appl. No. 17/497,942 (pp. 1-8).
Office Action (Non-Final Rejection) dated Nov. 10, 2022 for U.S. Appl. No. 17/497,949 (pp. 1-7).
Office Action dated Dec. 22, 2022 for U.S. Appl. No. 17/869,777 (pp. 1-10).
Office Action (Non-Final Rejection) dated Feb. 1, 2023 for U.S. Appl. No. 17/167,084 (pp. 1-8).
Office Action (Non-Final Rejection) dated Feb. 1, 2023 for U.S. Appl. No. 17/233,461 (pp. 1-7).
Office Action (Notice of Allowance and Fees Due (PTOL-85)) dated Feb. 13, 2023 for U.S. Appl. No. 17/497,941 (pp. 1-9).
Office Action (Non-Final Rejection) dated Feb. 16, 2023 for U.S. Appl. No. 17/176,670 (pp. 1-12).
Office Action (Notice of Allowance and Fees Due (PTOL-85)) dated Mar. 1, 2023 for U.S. Appl. No. 17/497,943 (pp. 1-7).
Office Action (Notice of Allowance and Fees Due (PTOL-85)) dated Mar. 13, 2023 for U.S. Appl. No. 17/497,942 (pp. 1-8).
Office Action (Notice of Allowance and Fees Due (PTOL-85)) dated Mar. 27, 2023 for U.S. Appl. No. 17/497,945 (pp. 1-8).
Office Action (Notice of Allowance and Fees Due (PTOL-85)) dated Mar. 30, 2023 for U.S. Appl. No. 17/497,952 (pp. 1-8).
Office Action (Notice of Allowance and Fees Due (PTOL-85)) dated Apr. 26, 2023 for U.S. Appl. No. 17/497,946 (pp. 1-8).
Fire Retardant Coatings of Texas, "Product Certifications & Featured Products Screenshots", Nov. 2017, (pp. 1-4).
Fire Retardant Coatings of Texas, "Product Certifications Screenshot", Nov. 2017, (pp. 1).
Fire Retardant Coatings of Texas, "Safety Data Sheet Screenshot", Nov. 2017, (pp. 1).
Fire Retardant Coatings of Texas, "FX Lumber Guard Screenshot", (pp. 1).
Metsawood, "Kerto LVL Screenshot", Nov. 2017, (pp. 1).
Raute, "LVL Technology Screenshot on Web", (pp. 1).
Newstar Chemicals, Hartindo Anti Fire Products, Nov. 2017, (pp. 1).
Natural Fire Solutions, "Website Screenshots", Nov. 2017, (pp. 1-4).
Woodworks, "Wood Brings the Savings Home", Jan. 2013, (pp. 1-8).
Insurance Institute for Business & Home Safety (IBHS), Oct. 22, 2018, "Colorado Property & Insurance WildfirePreparedness Guide", 2018 (2 Pages).
Pendu Manufacturing, Inc., North Holland, PA, Slide Show of Youtube Video of a Pendu Automated Wood Board Dip Tank System in Operation, Feb. 8, 2012, (30 Pages).
Woodworks, "Case Study: UW West Campus Student Housing", Jan. 2013, (pp. 1-8).
Rethink Wood, "Mid-Rise Wood Construction", Apr. 2015, (pp. 1-12).
Rethink Wood, "Designing for Fire Protection: Expanding the Possibilities of Wood Design", Aug. 2015, (pp. 1-8).
Woodworks, "Design Example: Five-Story Wood-Frame structure Over Podium Slab", Sep. 2016, (pp. 1-79).
Agacad, "Wood Framing", Jan. 2016 (pp. 1-4).
Weyerhauser, Renee Strand, "Mid-Rise, Wood-Framed, Type III Construction—How to Frame the Floor to Wall Intersection at Exterior Walls", Apr. 2016, (pp. 1-8).
Louisiana-Pacific, "FlameBlock: Assemblies and Applications", Aug. 2017, (pp. 1-8).
Globenewswire, "Shazamstocks.com Announces Profile Launch of MSE Enviro-Tech Corp.", Feb. 2008, (pp. 1-3).
Benzinga, "Megola Inc. Files Application to Underwriter Laboratories for Certification", May 2010, (pp. 1-3).
Coastal Forest Products, "CP-LAM 2.0E Design Properties & Floor Beams", Nov. 2017, (pp. 1-5).
Kallesoe Machinery A/S, "System Solutions for Laminated Wood Products", Nov. 2017, (pp. 1-3).
Hy-Tech, "Insulating Ceramic Microspheres", Nov. 2017, (pp. 1-3).
Intertek, "Report of Testing FX Lumber Guard Fire Retardant for I-Joist, Truss Joist (TJI), FLoor Joist, Ceiling Joist, amd OSB", Mar. 2013, (pp. 1-9).
Intertek, "Report of Testing 7'X7' Floor/Ceiling Assembly", Aug. 2013, (pp. 1-6).
Intertek, "Report of Testing FX Lumber Guard", Nov. 2014, (pp. 1-9).
Intertek, "Report of Testing FX Lumber guard Fire Retardant Coating Applied to I-Joists in a Floor Celing Assembly", Aug. 2014, (pp. 1-6).
Intertek, "Report of Testing FX Lumber Guard on SPF Lumber", Jun. 2012, (pp. 1-6).
Intertek, "Report of Testing FX Lumber Guard (Dimensional Lumber)", Apr. 2015, (pp. 1-10).
Intertek, "Report of Testing FX Lumber Guard", Aug. 2015, (pp. 1-6).
Fire Retardant Coatings of Texas, "FX Lumber Guard", Sep. 2016, (pp. 1).
Fire Retardant Coatings of Texas, "Safety Data Sheet (SDS)" Mar. 2016, (pp. 1-7).
Hy-Tech, "ThermaCels: Insulating Ceramic Additive for Paint", Nov. 2017, (pp. 1-2).
Intertek, "Building & Construction Information Bulletin: Introduction to ASTM E84 & Frequently Asked Questions", Jun. 2017, (pp. 1-2).
Hoover Inc., "Exterior-Fire X", Nov. 2017, (pp. 1).
Hoover Inc., "Pyro-Guard", Nov. 2017, (pp. 1).
John Packer, NZ Institute of Chemistry, "Chemistry in Fire Fighting" , Oct. 2017, (6 Pages).
Flamestop, "Flamestop II: Fire Retardant Spray for Wood", Jan. 2017, (pp. 1-3).
Flamestop, "Learn About Flamestop Inc.", Jan. 2017, (pp. 1-3).
Magtech, "MagTech OSB", Nov. 2017, (pp. 1-2).
Hoover Inc., "Fasteners for Pyro-Guard: Interior Fire Retardant Treated Wood Products", Oct. 2013, (pp. 1).

(56) References Cited

OTHER PUBLICATIONS

Hoover Inc., "Code References: Fire-Retardant-Treated Wood", Mar. 2014, (pp. 1-2).
Hoover Inc., "Guidelines For Finishing and Use of Adhesives with Pyro-Guard Fire Retardant Treated Wood", Jan. 2014, (pp. 1).
Hoover Inc., "Specification for Pyro-Guard: Interior Fire Retardant Treated Wood", Apr. 2014, (pp. 1).
Hoover Inc., "Pyro-Guard Storage, Handling, and Installation Recommendations", Jan. 2014, (pp. 1).
Office Action dated Apr. 2, 2020 for U.S. Appl. No. 15/829,940 (pp. 1-8).
Ramage et al.; The Wood from the Trees: The Use of Timber in Construction; Renewable and Sustainable Energy Reviews 68 ( 2017) 333-359; published Oct. 2016.
Hartindo; Clean Anti Fire Chemicals—Dectan; as published Nov. 9, 2016 retrieved from https://web.archive.org/web/ 20161109011047/ http://hartindo.co.id/products/dectan/ (2 pages).
https://www.youtube.com/watch?v=YMgd5sAxG1o—wood finger joint production line, published Jun. 27, 2016.
Office Action dated Nov. 9, 2018 for U.S. Appl. No. 15/866,456 (pp. 1-11).
Calgary Herald, Andrea Cox, "Homebuilder Wants Buyers to be in the Pink", Oct. 2011, (pp. 1-6).
Andrew Crampton, "Cross Laminated Timber: The Future of Mid-Rise Construction, "Jun. 2016, (pp. 1-5).
Callisonrtkl, "Seattle Mass Timber Tower, Feasibility Study: Design and Construction Analysis " Aug. 2016, (pp. 1-34).
Fire Engineering, "Charred Wood and Fire Resistance", Oct. 2016, (pp. 1-6).
Maureen Puettmann, Woodlife Environmental Consultants, LLC, Dominik Kaestner, Adam Taylor, University of Tennessee, "Corrim Report—Module E Life Cycle assessment of Oriented Strandboard (OSB) Production", Oct. 2016, (pp. 1-71).
Rubner Holzbau, "Timber Engineering in the 21st Century", Jan. 2017, (pp. 1-21).
Metroscape, "Building the Future: New Technology and the Changing Workforce", Jan. 2017, (pp. 1-32).
Stora Enso, "Stora Enso CLT Technical Brochure", Feb. 2017, (pp. 1-32).
Spiritos Properties, "Mass Timber—101 and Beyond", Apr. 2017, (pp. 1-17).
Inland Marine Underwriters Association, "CLT and Builder's Risk", May 2017, (pp. 1-26).
Asia Pacific Fire, "Approaching the Flame Fire Fighting", Jun. 2017, (pp. 1-2).
Rubner Holzbau, "Wood Culture 21: Construction Expertise for Architects, Designers and Building Owners", Jul. 2017, (pp. 1-23).
Treehugger, Lloyd Alter, "Katerra to Build Giant New CLT Factory in Spokane, Washington", Sep. 2017, (pp. 1-16).
Fire Engineering, Phillip Paff, "Mass Timber Construction in High-Rise Residential Structures: How Safe is it?", Jan. 2018, (pp. 1-9).
Fire Engineeering, Len Garis, Karin Mark, "Tall Wood Buildings: Maximizing Their Safety Potential", Jan. 2018, (pp. 1-12).
XLam, "Technical: XLam Panel Specifications", Jan. 2018, (p. 11).
AIG, "AIG Global Property Construction Risk Engineering", Nov. 2017, (pp. 1-6).
Firetect, "Safe-T-Guard Product Data Sheet", Apr. 2008, (pp. 1-6).
ICL Performance Products LP, "Material Safety Data Sheet", Jul. 2014, (pp. 1-6).
Treehugger, Lloyd Alter, "Wood Frame Construction is Safe, Really", Dec. 2014, (pp. 1-5).
LP Building Products, "Material Safety Data Sheet", May 2014, (pp. 1-4).
Gizmodo, Esther Inglis-Arkell, "The Deadliest Ways to Try to Put Out a Fire", May 2015, (pp. 1-3).
Lon H. Ferguson and Christopher A. Janicak, "Fundamentals of Fire Protection for the Safety Professional", Governmenta Institutes, The Rowman & Littlefield Publishing Group, Inc., 2005 (341 Pages).
Dr. Anthony E. Finnerty, U.S. Army Research Laboratory, "Water-Based Fire-Extinguishing Agents", Jan. 1995, (pp. 1-12).
Roseburg Forest Products, "Wood I-Joists", Jan. 2016, (pp. 1-6).
Spraying Systems Co., "Industrial Hydraulic Spray Products", Jan. 2015, (pp. 1-220).
Conrad Forest Products, "Bluwood: The Color of Protection", http://www.conradfp.com/building-products-bluwood.php, Nov. 2017, (pp. 1-8).
DRJ, "AAF21 Fire Treated Wood Protection Coating Applied to Lumber", Sep. 2017, (pp. 1-8).
Roseburg Forest Products, "Roseburg EWP Commerical Design and Installation Guide", Mar. 2017, http://www.roseburg.com., (pp. 1-48).
Fire Retardant Coatings of Texas, "FX Lumber Guard XT: Technical Data Submittal Sheet", Aug. 2018, (pp. 1).
Fire Retardant Coatings of Texas, M. Mueller, "Residential Home Builders", Oct. 2016, (pp. 1-5).
Fire Retardant Coatings of Texas, M. Mueller, "Architects", Oct. 2016, (pp. 1-5).
Trusjoist, Weyerhauser, "Fire-Rated Assemblies and Sprinkler Systems", May 2017, (pp. 1-24).
Archpaper Antonio Pacheco, "Katerra's Approach Could Make Factory Construction a Model for the Future", Apr. 2018, (pp. 1-4).
Office Action dated Oct. 11, 2018 for U.S. Appl. No. 15/866,454 (pp. 1-12).
Office Action dated Oct. 12, 2018 for U.S. Appl. No. 15/874,874 (pp. 1-15).
Hoover Inc., "Pyro-Guard, Exterior Fire-X", Dec. 2017, (pp. 1-12).
Coastal Forest Products, "Multi-Ply CP-LAM Beam Assembly", Nov. 2017, (pp. 1-5).
Kallesoe Machinery, "CLT Production Line", Nov. 2017, (pp. 1-5).
Hoover, "2hr Fire Resistant Load Bearing Wall", Nov. 2017, (pp. 1).
RDR Technologies, "Fire Retardant Spray for Artificial Tree and Decorations", Nov. 2017, (pp. 1).
ECO Building Products, "ECO Disaster Break: Class A Fire Rated, UV Resistant, High Performance, Non-Toxic, Acrylic Coating", Feb. 2013, (pp. 1).
ECO Building Products, "Affiliate Program Screenshots", Apr. 2013, (pp. 1-3).
OSB, "Trust Joist 2JI 210 Screenshot", Jan. 2012, (pp. 1).
Mitsui Home America, "Mitsui Homes Inc. Website and Screenshots", Dec. 2012, (pp. 1-38).
Fire Retardant Coatings of Texas, "FlameStop Screenshots", Nov. 2017, (pp. 1-2).
Fire Retardant Coatings of Texas, "FX Flame Guard Screenshot", Nov. 2017, (pp. 1).
RDR Technologies, "BanFire Screenshot", Nov. 2017, (pp. 1).
Lousiana-Pacific, "LP Solutions Software", Mar. 2012, (pp. 1-8).
RDR Technologies, Fire Retardant Coatings of Texas, "FX Lumber Guard Screenshots", Nov. 2017, (pp. 1-2).
Anthony C. Yu, Hector Lopez Hernandez, Andrew H. Kim, Lyndsay M. Stapleton, Reuben J. Brand, Eric T. Mellor, Cameron P. Bauer, Gregory D. McCurdy, Albert J. Wolff III, Doreen Chan, Craig S. Criddle, Jesse D. Acosta, and Eric A. Appel, "Wildfire prevention through prophylactic treatment of high-risk landscapes using viscoelastic retardant fluids," Proceedings of The National Academy of Science (PNAS), published Sep. 30, 2019, https://www.pnas.org/content/ 117/2/1233, (10 Pages).
Flexterra Brochure "Profile Flexterra® HP-FGM High Performance Erosion Control Medium", HP-02-02/18, Febuary 2018, Profile Products, LLC, (4 Pages).
Press Release "Perimeter Solutions Acquires LaderaTech and FORTIFY-Brand Fire Retardant Technology", Perimeter Solutions, St. Louis Missouri, May 7, 2020 (2 Pages).
Material Safety Data Sheet (MSDS) for FIRE-TROL® 936 Fire Retardant Used in Wildfire Control, by ICL France—ICL Biogemea S.A.S, Revision 09, updated Mar. 29, 2013 , (4 Pages).
Product Brochure for FIRE-TROL® 934 and FIRE-TROL 936 Long-Term Fire Retardants Used in Wildfire Control Ground Applications, by ICL France—ICL Biogemea S.A.S, Revision 12, updated Mar. 29, 2013 , (1 Page).
Rossi Jean-Louis, Marcelli Thierry, Chatelon François Joseph, Université de Corse, Systèmes Physiques pour l'Environnement UMR-CNRS 6134, Corte, France Morvan Dominique, Simeoni Albert, Rossi Jean-Louis, Marcelli Thierry, and Chatelon François

(56) References Cited

OTHER PUBLICATIONS

Joseph, "Fuelbreaks: a Part of Wildfire Prevention", published in Global Assessment Report on Disaster Risk Reduction 2019, as a Contributing Paper, United Nations Office for Disaster Risk Reduction, Jul. 2019, (25 Pages).
Fire Terminology, Glossary Containing Fire Terms, by National Park Service, USDA Forest Service, captured at https://www.fs.fed.us/nwacfire/home/terminology.html on Mar. 28, 2021, (14 Pages).
Product Brochure for MICRO-BLAZE OUT® Class A/B Fire Fighting Agent (i.e. Microbial Wettinig Agent) Concentrated Water Additive (1-3%), Containing Foaming Agents and Emulsifiers, Verde Environmental, Inc. Houston Texas, 2021, (2 Pages).
Jungbunzlauer White Paper "Jungbunzlauer Tripotassium Citrate: Environmental and health friendly flame retardant in wood application", Product Group Special Salts, Tripotassium Citrate, Protection TPC Fire Retardant Wood, published on Jungbunzlauer Website 2019 (2 Pages).
Product Brochure for Longray Model:TS 35A[E} Hand-Held Thermal Foggier Machine, Shenzhen Longray Technology Co., Ltd., Shenzhen, China, 2013, p. 1 of Fogger Brochure, (16 Pages Total).
Product Brochure for Longray Model: TS-95 Truck-Mounted Thermal Fogging Machine, Shenzhen Longray Technology Co., Ltd., Shenzhen, China, 2013, (1 Page Total).
Product Brochure for Longray Model: TS-50 Truck-Mounted/Wheeled Battery-Powered ULV Cold Fogger, Shenzhen Longray Technology Co., Ltd., Shenzhen, China, 2013, (1 Page Total).
Jesse Roman, "Build. Burn. Repeat?", NFPA Journal, NFPA.org, Jan./Feb. 2018 , (9 Pages).
Minimax Fire Products White Paper The Cost-benefit Advantages of Replacing Halon with 725 PSI MX 1230 Clean Agent Fire Suppression Systems, MiniMax Fire Products, 2014, (7 Pages).
Product Brochure "Hi-Fog Water Mist Fire Protection—Fire Protection for Buildings—HI-FOG® High-Presure Water Mist", Marioff Corporation Oy, 2017, (12 Pages).
"Mulch—Fire in California", University of California Cooperative Extension (UCCE)—Fire in California, published at https://ucanr.edu/sites/fire/Prepare/Landscaping/Mulch/, captured on Jun. 20, 2021, (3 Pages).
Web Pages Showing Invatech Italia 868 Backpack Duster Mister Fogger Unit, Invatech Italia, Sumas, Washington, published at https://invatechitalia.com/?gclid=EAIaIQobChMIxKuVyu6c8QIVGYblCh12ggwOEAAYASAAEglkefD_BWE captured onJune 16, 2016, (11 Pages).
Web Pages Showing a BUCKEYE™ Wet Chemical Fire Extinguisher containing Potassium Citrate, Buckeye Fire Equipment Company, Kings Mountain, North Carolina, published at http://buckeyefire.com/products/liquid-agent-fire-systems/captured on Jun. 16, 2021, (3 Pages).
Joseph W. Mitchell and Oren Patashnik, "Firebrand Protection as the Key Design Element for Structure Survival during Catastrophic Wildland Fires", M-bar Technologies & Consulting, published at https://www.slideserve.com/mari/firebrand-protection-as-the-key-design-element-for-structure-survival-during-catastrophic-wildland-fires , uploaded on Aug. 22, 2013, (15 Pages).
Joseph W. Mitchell, PhD, "Wind-Enabled Ember Dousing: A Comparison of Wildland Fire Protection Strategeies" Prepared for Ramona Fire Recovery Center, M-bar Technologies and Consulting, LLC, Aug. 12, 2008, (53 Pages).
Cheryl Hogue, "SEEING RED: Controversy Smolders over Federal Use of Aerially Applied Fire Retardants", Aug. 29, 2021, ACS vol. 89, No. 35, pp. 11-15, published at http://pubsapp.acs.org/cen/coverstory/89/8935cover.html, (6 Pages).
"Colorless Long Term Fire Retardant—Successful Applications", Phos-Chek® Home Defese Long Term Fire Retardant, ICL Performance Products LP, 2014, (1Page).
Product Overview of Phos-Chek Wildfire Home Defense, Mfg. No. LC-95W, ICL Performance Products, St Louis Missouri, 2020, (1 Page).
Safety Data Sheet for Phos-Chek® LC95W Solution (AST10150.173), Perimeter Solutions, St. Louis, Missouri, Jun. 10, 2015 (5 Pages).
Gerry Parlevliet and Steven McCoy, "Organic Grapes and Wine: A Guide to Production", Department of Primary Industries and Regional Development, Govt. of Australia, Bullentins 4000—Research Publications, Jul. 2001, (41 Pages).
W. Gill Giese, Slide Show on "Potassium in the Vineyard and Winery", New Mexico State University, Viticulture Extension , Nov. 2016, (25 Pages).
Thierry Carriere, Jim Butz, Sayangdev Naha and Angel Abbud-Madrid, "Fire Suppression Tests Using A Hand-Held Water Mist Extinguisher Designed For Space-Craft Applications", SUPDET 2012 Conference Proceedings, Mar. 5-8, 2012, Phoenix, AZ, (3 Pages).
Khrystyna Regata, Christoph Bannwarth, Stehan Grimme and Michael Allan, "Free electrons and ionic liquids: study of excited states by means of electron-energy loss spectroscopy and the density functional theory multireference configuration interaction method", Phys. Chem. Chem Phys. 2015, 17 15771, (10 Pages).
Scott T. Handy, "Applications of Ionic Liquids in Science and Technology" , Published by InTech, Rijeka, Croatia, 2011, (528 Pages).
Teresa Dobbins, "Electrostatic Spray Heads Convert Knapsack Mistblowers to Electrostatic Operation", International Pest Control, Sep./Oct. 1995, vol. 37, No. 5, (4 Pages ).
Ester Inglis-Arkell, "The Deadliest Ways to Try To Put Out A Fire," GIZMODO published at https://gizmodo.com/the-deadliest-ways-to-try-to-put-out-a-fire , Aug. 20, 2018, (3 Pages).
Mohamed Fayek Abdrabbo, Ayoub Mostafa Ayoub, Mohamed Aly Ibrahim and Abdelsalam M. Shara Feldin, "The Effect of Water Mist Droplet Size and Nozzle Flow Rate on Fire Extinction in Hanger by Using FDS", Journal of Civil & Environmental Eng. 2016, vol. 6, Issue 2, (12 Pages).
Zhen Wang, "Optimization of Water Mist Droplet Size in Fire Suppression by Using CFD Modeling", Masters of Science Degree Thesis, Graduate College of the Oklahoma State University, Oklahome, Dec. 2015, (68 Pages).
Training Manual for Thermo-Gel® POK Nozzle Backpack System, Thermo Technologies, LLC, Bismarck, North Dekota, 2020, (55 Pages).
Material Safety Data Sheet for Hartindo AF31 Eco Fire Break, Eco Building Products, Inc., Feb. 4, 2013, (4 Pages).
MSDS for Potassium Citrate published at https://hazard.com//msds/mf/baker/baker/files/p5675.htm , Nov. 6, 1997, (4 Pages).
Wikipedia for Potassium Citrate, published on https://en.wikipedia.org/wiki/Potassium_citrate, Jun. 17, 2021, Wikipedia.org, (3 Pages).
Product Brochure "Product Range Bio-Based Ingredients—Jungbunzlauer—from Nature to Ingredients®", Jungbunzlauer Suisse AG, Basel, Switzerland, (16 Pages), 2017.
Product Brochure "Special Salts—Functional Minerals—Jungbunzlauer—from Nature to Ingredients®", Jungbunzlauer Suisse AG, Basel, Switzerland, (8 10 Pages), 2017.
Product Brochure "Facts—Formulating Better Tasting Infant Formula—Jungbunzlauer—from Nature to Ingredients®", Jungbunzlauer Suisse AG, Basel, Switzerland, (8 Pages), 2015.
Technical Brief "Jungbunzlauer Tripotassium Citrate: Environmental and Health Friendlky Flame Retardant in Wood Application", Jungbunzlauer Suisse AG, Basel, Switzerland, (2 Pages).
Product Information about Jungbunzlauer brand Tripotassium Citrate, captured at https://www.jungbunzlauer.com/en/products/special-salts/tripotass, Jungbunzlauer Suisse AG, Basel, Switzerland, (3 Pages), 2020.
Product Properties Information about Jungbunzlauer brand Tripotassium Citrate, captured at https://www.jungbunzlauer.com/en/products/special-salts/tripotass, Jungbunzlauer Suisse AG, Basel, Switzerland, (2 Pages), 2020.
Legal Information about Jungbunzlauer brand Tripotassium Citrate, captured at https://www.jungbunzlauer.com/en/products/special-salts/tripotass, Jungbunzlauer Suisse AG, Basel, Switzerland, (2 Pages), 2020.

(56) References Cited

OTHER PUBLICATIONS

Nutrient Source Specifics Sheet for Monoammonium Phoshate (MAP), International Plant Nutrition Institute (IPNI), Norcross, Georgia, Ref#10069, 2019, (1 Page).
Specification for Water Enhancers for Wildland Firefighting, 5100-306b, Sep. 2018 Superseding Specification 5100-306a, Jun. 1, 2007, U.S. Department of Agriculture Forest Service (24 Pages).
Specification for Fire Suppressant Foam for Wildland Firefighting (Class a FOAM), 5100-307b, Jun. 1, 2007, (Amendments Inserted into the Text, May 17, 2010) U.S. Department of Agriculture Forest Service (31 Pages).
Stephen Quarles and Ed Smith, "The Combustibility of Landscape Mulches" (SP-11-04), University of Nevada Cooperative Extension, 2011 (8 Pages).
Profile® Products Base Hydraulic Mulch Loading Chart and Application Guide (ESP-02), Oct. 2011, Profile Products, LLC, Buffalo Grove, Illinois, (1 Page).
Datasheet for Tearra-Blend® withg Tacking Agent 3® Hydraulic Mulch, Oct. 2017, Profile Products, LLC, Buffalo Grove, Illinois, (1 Pages).
Office Action (Notice of Allowance and Fees Due (PTOL-85)) dated Apr. 27, 2023 for U.S. Appl. No. 17/497,949 (pp. 1-8).
Office Action (Notice of Allowance and Fees Due (PTOL-85)) dated May 10, 2023 for U.S. Appl. No. 17/497,953 (pp. 1-8).
Office Action (Notice of Allowance and Fees Due (PTOL-85)) dated May 17, 2023 for U.S. Appl. No. 17/497,962 (pp. 1-9).
International Search Report (ISR) issued in PCT/US22/15055 dated Jul. 18, 2022 (6 Pages).
PCT Third Party Observation submitted in PCT/US2022/015004 (Applicant: Mighty Fire Breaker LLC) on May 24, 2023 under PCT Administrative Instructions Part 8 by Anonymous Third Party (2 Pages).
Amendment under Article 34 (2)(b) filed by Mighty Fire Breaker LLC in PCT Application No. PCT/US2022/015004 on May 27, 2023 (37 Pages).
Replacement Claims filed by Mighty Fire Breaker LLC in PCT Application No. PCT/US2022/015004 on May 27, 2023 (24 Pages).
Applicant's Reply to Written Opinion filed in Application No. PCT/US2022/015004 on May 27, 2023 (24 Pages).
2012 International Symposium on Safety Science and Technology Study on Water-based Fire Extinguishing Agent Formulations and Properties by Yinsheng Huang, Wencheng Zhang , Xiaojing Dai , and Yu Zhao , Procedia Engineering, vol. 45, pp. 649-654, 2012 (6 Pages).
Product Application Bulletin for F-500 Encapsulator Multi-Purpose Fire Suppression Agent for Class A, Class B and Class D Type Fires, Hazard Control Technologies, Inc. (HCT), Fayetteville, Georgia 2015 (2 Pages).
Product Brochure (V5B) for F-500 Encapsulator Agent Technology—Multi-Purpose Fire Suppression Agent for Class A, Class B and Class D Type Fires, Hazard Control Technologies, Inc. (HCT), Fayetteville, Georgia 2015 (6 Pages).
Product Overview (V3) for F-500 Encapsulator Agent (EA) Technology—Multi-Purpose Fire Suppression Agent for Class A, Class B and Class D Type Fires, Hazard Control Technologies, Inc. (HCT), Fayetteville, Georgia 2017 (2 Pages).
Green Corrosion Inhibitors from Natural Sources and Biomass Wastes, by Stefania Marzorati , Luisella Verotta and Stefano P. Trasatti, Molecules 2019, vol. 24, Dec. 2018 (24 Pages).
Role of Organic and Eco-Friendly Inhibitors on the Corrosion Mitigation of Steel in Acidic Environments—A State-of-Art Review, by Hyun-Min Yang, Molecules 2021, vol. 26, Jun. 2021 (20 Pages).
PCT Third Party Observation submitted in PCT/US2022/015005 (Applicant: Mighty Fire Breaker LLC) on May 24, 2023 under PCT Administrative Instructions Part 8 by Anonymous Third Party (2 Pages).
Notice of Allowance dated Jun. 5, 2023 for U.S. Appl. No. 17/497,948 )pp. 1-8).
Office Action (Notice of Allowance and Fees Due (PTOL-85)) dated Jun. 5, 2023 for U.S. Appl. No. 17/497,948 (pp. 1-8).
Office Action (Final Rejection) dated Jun. 21, 2023 for U.S. Appl. No. 17/167,084 (pp. 1-5).
Office Action (Final Rejection) dated Jun. 21, 2023 for U.S. Appl. No. 17/233,461 (pp. 1-5).
Office Action (Notice of Allowance and Fees Due (PTOL-85)) dated Jul. 14, 2023 for U.S. Appl. No. 17/869,777 (pp. 1-9).
Office Action (Notice of Allowance and Fees Due (PTOL-85)) dated Jul. 19, 2023 for U.S. Appl. No. 17/167,084 (pp. 1-7).
Office Action (Notice of Allowance and Fees Due (PTOL-85)) dated Sep. 12, 2023 for U.S. Appl. No. 17/233,461 (pp. 1-7).
Office Action (Notice of Allowance and Fees Due (PTOL-85)) dated Oct. 6, 2023 for U.S. Appl. No. 17/591,592 (pp. 1-10).
International Preliminary Report on Patentability (IPRP) and Applicant's ART34 Amendment Claims 1-98, issued in PCT/US22/15004 dated Aug. 31, 2023 (30 Pages).
Article 34 Amendment and Reply to Written Opinion (RWO) filed in PCT/US22/15004 filed on May 27, 2023 (112 Pages).
Vivian Merk, Munish Chanana*, Sabyasachi Gaan and Ingo Burgert, "Mineralization of wood by calcium carbonate insertion for improved flame retardancy", Holzforschung, vol. 70, No. 9, pp. 867-876 (10 Pages).
Vivian Merk, Munish Chanana, Tobias Keplinger, Sabyasachi Gaand and Ingo Burgert, "Hybrid wood materials with improved fire retardance by bio-inspired mineralisation on the nano- and submicron level", Green Chemistry, 2015, vol. 17 , pp. 1423-1428 (6 Pages).
Philip D. Evans, Hiroshi Matsunaga, Alan F. Preston, Cameron M. Kewish, "Wood Protection for Carbon Sequestration—a Review of Existing Approaches and Future Directions", Current Forestry Reports (2022) vol. 8, pp. 181-198 (18 Pages).
Office Action (Non-Final Rejection) dated Feb. 16, 2023 for U.S. Appl. No. 17/176,670 (pp. 1-99).
Office Action (Notice of Allowance and Fees Due (PTOL-85)) dated Nov. 1, 2023 for U.S. Appl. No. 17/167,084 (pp. 1-7).
Office Action (Notice of Allowance and Fees Due (PTOL-85)) dated Oct. 20, 2023 for U.S. Appl. No. 17/591,592 (pp. 1-8).
Office Action (Notice of Allowance and Fees Due (PTOL-85)) dated Nov. 13, 2023 for U.S. Appl. No. 17/233,461 (pp. 1-7).
Office Action (Notice of Allowance and Fees Due (PTOL-85)) dated Nov. 27, 2023 for U.S. Appl. No. 17/591,592 (pp. 1-10).
U.S. Department of Energy, "Method for Calculating Carbon Sequestration by Trees in Urban and Suburban Settings", Apr. 1998, (pp. 1-16).
State of California Environmental Protection Agency, "Chemicals Known to the State to Cause Cancer or Reproductive Toxicity", Jan. 2017, (pp. 1-22).
U.S. Department of Agriculture, "Carbon Storage and Accumulation in United States Forest Ecosystems", Aug. 1992, (pp. 1-55).
Ncasi, Brad Upton, Reid Miner, Kirsten Vice, "The Greenhouse Gas and Carbon Profile of the Canadian Forest Products Industry", Oct. 2007, (pp. 1-41).
Fpinnovations, "A Synthesis of Research on Wood Products & Greenhouse Gas Impacts 2nd Edition", Oct. 2010, (pp. 123).
Forest and Wood Products Australia, Andrea Jane Leys PhD, "How is Carbon Stored in Trees and Wood Products?", Jan. 2012, (pp. 1-10).
Cornell Law School, "26 U.S. Code § 45Q—Credit for Carbon Dioxide Sequestration", Dec. 2014, (pp. 1-3).
Rethink Wood, "Evaluating the Carbon Footprint of Wood Buildings: Reducing Greenhouse Gases with High-Perfromance Structures", Apr. 2015, (pp. 1-8).
Global CSS Institute, "The Global Status of CSS: 2017", Oct. 2017, (pp. 1-43).
SFPE, Peter Johnson, "Fire Safety Engineering Education—Part of a Certification Framework", Jan. 2012, (pp. 1-11).
Greentech Media, "Can Updated Tax Credits Bring Carbon Capture Into the Mainstream?", Feb. 2018, (pp. 1-8).
Woodworks, "Carbon Calculator: Reference & Notes", Jan. 2016, (pp. 1-8).
Woodworks, "Carbon Estimator", Jul. 2018, (pp. 1).
NFPA Journal, Jesse Roman, "Build. Burn. Repeat?", Feb. 2018, (pp. 1-9).
Woodworks, "Carbon Calculator and Estimator App", Jul. 2018 , (pp. 1-12).

(56) References Cited

OTHER PUBLICATIONS

RFID Journal, Ask The Experts Forum, "How Is RFID Being Used in the Construction Industry?", Jun. 27, 2013, (2 Pages).
Autodesk, Inc., "AUTODESK® BIM 360 Docs: A Cloud-Based Document Management Service for Construction Project and Project Teams," 2017 (3 Pages).
J. Craig Voelkert, "Fire and Fire Extinguishment: A Brief Guide to Fire Chemistry and Extinguishment Theory for Fire Equipment Service Technicians", Jan. 2015, (28 Pages).
FM Approvals, "Approval Standard for Hybrid (Water and Inert Gas) Fire Extinguishing Systems", Nov. 2011, (pp. 1-196).
Thierry Carriere, Jim Butz, Sayangdev Naha, Angel Abbud-Madrid, "Fire Supression Tests Using a Handheld Water Mist Extinguisher Designed for Spacecraft Application", Mar. 2012, (pp. 1-3).
Minimax, "The Cost-Benefit Advantages of Replacing Halon with 725 PSI MX 1230 Clean Agent Fire Suppression Systems", Mar. 2014, (pp. 1-7).
3M, "Novec 1230 Fire Protection Fluid: Helping Protect Critical Military Assets Through Sustainable Fire Protection Technology", Aug. 2014, (pp. 1-2).
Zhen Wang, "Optimization of Water Mist Droplet size in Fire Supression by Using CFD Modeling", Dec. 2015, (pp. 1-68).
Khrystyna Regeta, Christoph Bannwarth, Stefan Grimme, Michael Allan, Royal Society of Chemistry, "Free Electrons and lonic Liquids: study of excited states by means of electron-energy loss spectroscopy and the density functional theory multireference configuration interaction method", May 2015, (pp. 1-10).
FM Approvals, "FM Approvals: History", Jan. 2018, (pp. 1-7).
FM Approvals, "Approval Standard for Water Mist Systems", Apr. 2016, (pp. 1-314).
Clive Buckley and David Rush, Ministry of Defence, "Water Mist Developments for the Royal Navy", Apr. 1996, (pp. 1-14).
Daniel Madrzykowski, National Institute of Standards and Technology, "Water Additives for Increased Efficiency of Fire Protection and Suppression", Jan. 1998, (pp. 1-6).
Robert L. Darwin, Hughes Associates Inc., Frederick W. Williams, Navy Technology Center for Safety and Survivability, "Overview of the Development of Water-Mist Systems for U.S. Navy Ships", Apr. 1999, (pp. 1-8).
National Refrigerants Inc., "R123 Safety Data Sheet", May 2015, (pp. 1-8).
NFPA, "Standard on Water Mist Fire Protection Systems", Feb. 2006, (pp. 1-135).
Amerex, "Safety Data Sheet: Deionized Water, Pressurized Water Extinguisher", Mar. 2018, (pp. 1-8).
National Academy Press, "Fire Suppression Substitutes and Alternatives to Halon for U.S. Navy Applications", Jan. 1997, (pp. 1-111).
OCV Control Valves, " Engineering / Technical Section", Jun. 2013, (pp. 1-12).
Kjayyani C. Adiga, Researchgate, "Ultra-fine Water Mist as a Total Flooding Agent: A Feasibility Study", Jan. 2014, (pp. 1-13).
Gokhan Balik, "The Use of Air Atomizing Nozzles to Produce Sprays with Fine Droplets", Apr. 2014, (pp. 1-7).
Christopher E. Chwedyk, Burnham, "Re-examining Residential high-Rise Sprinklers: Where Does Chicago Stand?", Aug. 2017, (pp. 1-4).
Industrial Fire Journal, "Rising to the Challenge", Sep. 2017, (pp. 1-2).
Fike, "DuraQuench: Pumped Water Mist System", Sep. 2015, (pp. 1-8).
Fike, "DuraQuench: A New Era in Water-Based Fire Protection", Sep. 2015, (pp. 1-2).
Fike, "Even in the Age of Cloud Computing, Data Center Downtime Can Spell Disaster", Aug. 2016. (pp. 1-2).
Marioff, "Fire Fighting Excellence: HI-FOG Water Mist Fire Protection", Jan. 2017, (pp. 1-8).
Marioff, "Hi-Fog for Buildings", Jan. 2014, (pp. 1-16).
Marioff, Hi-Fog Electric Pump Unit, Jan. 2016, (pp. 1-2).
VicTualic, William, Reilly, "Dual Agent Extinguishing System: Victualic Vortex", Apr. 2008, (pp. 1-6).
VicTualic, "Victaulic Vortex 1000 Fire Supression System", Feb. 2011, (pp. 1-2).
VicTualic, "Victaulic Vortex 1500 Fire Suppression System", Jun. 2016, (pp. 1-3).
Josef Hainzl, "High Pressure Water Mist for Protection of High Rise Buildings", Nov. 2016, (pp. 1-3).
3M, "Novec 1230 Fire Protection Fluid", Jan. 2017, (pp. 1-4).
3M, "Novec 1230 Fire Protection Fluid, " Jan. 2018, (pp. 1-11).
FM Approvals, "Approval Standard for Pressure Actuated Waterflow Switches", Aug. 1970, (pp. 1-6).
FM Approvals"Approval Standard for Audible Notification Appliances for Automatic Fire Alarm Signaling", Nov. 2003, (pp. 1-16).
FM Approvals, "Approval Standard for Residential Automatic Sprinklers for Fire Protection", Aug. 2009, (pp. 1-68).
FM Approvals, "Approval Standard for Smoke Actuated Detectors for Automatic Alarm Signaling", Jan. 2012, (pp. 1-25).
FM Approvals, Approval Standard for Automatic and Open Water-Spray Nozzles for Installation in Permanently Piped Systems, Feb. 2010, (pp. 1-23).
FM Approvals, "Approval Standard for Hydrocarbon Leak Detectors", Oct. 2012, (pp. 1-18).
FM Approvals, "Approval Standard for Clean Agent Extinguishing Systems", Apr. 2013, (pp. 1-74).
FM Approvals, Ansi, "American National Standard for Radiant Energy-Sensing Fire Detectors for Automatic Fire Alarm Signaling", Feb. 2014, (pp. 1-16).
FM Appovals, "Approval Standard for Heavy Duty Mobile Equipment Protection Systems", Aug. 2015, (pp. 1-79).
FM Approvals, "Approval Standard for Spark Detection and Extingushing Systems", Nov. 2015, (pp. 1-32).
FM Approvals, Approval Standard for Public Mode Visible Signaling Appliances for Automatic Fire Alarm Signaling, Nov. 2016, (pp. 1-18).
FM Approvals, "Approval Standard for Sprinkler Valve Supervisory Devices—Standard Security and Enhanced Security", Dec. 2017, (pp. 1-17).
FM Approvals, "Approval Standard for Combustible Gas Detectors", Jan. 2018, (pp. 1-21).
FM Approvals, "Approval Standard for Heat Detectors for Automatic Fire Alarm Signaling", Jan. 2018, (pp. 1-29).
FM Approvals, "Approval Standard for Automatic Sprinklers for Fire Protection", Feb. 2018, (pp. 1-119).
FM Approvals, "Approval Standard for Explosion Suppression Systems", Feb. 2018, (pp. 1-57).
FM Approvals, "Approval Standard for Quick Response Storage Sprinklers for Fire Protection", Feb. 2018, (pp. 1-87).
3M, Building and Commerical Services Division, "Brochure for 3M FireDam™ Spray 200 Sealing Agent", 2009,(2 Pages).
Wildfire Defense Systems, Inc., Web Brochure on WDSPRo Mobile Application For Wildfire Hazard Property Assessment, 2017, (3 Pages).
Wildfire Defense Systems, Inc., Web Brochure on WDSFire Wildfire Reporting Dashboard Service For Wildfire Risk During an Active Wildfire, 2017, (2 Pages).
Office Action dated Janary 25, 2019 for U.S. Appl. No. 15/829,945 (pp. 1-7).
Office Action dated Mar. 26, 2020 for U.S. Appl. No. 15/829,943 (pp. 1-8).
Office Action dated Mar. 27, 2020 for U.S. Appl. No. 15/829,944 (pp. 1-8).
Office Action dated Apr. 2, 2020 for U.S. Appl. No. 15/829,941 (pp. 1-8).
Notice of Allowance dated Dec. 1, 2020 for U.S. Appl. No. 15/829,943 (pp. 1-7).
Notice of Allowance dated Dec. 8, 2020 for U.S. Appl. No. 15/829,944 (pp. 1-9).
Corrected Notice of Allowability dated Dec. 21, 2020 for U.S. Appl. No. 15/829,943 (pp. 1-2).
Corrected Notice of Allowability dated Jan. 7, 2021 for U.S. Appl. No. 15/829,944 (pp. 1-2).

(56) References Cited

OTHER PUBLICATIONS

Hoover Inc., "Leed and FSC Chain of Custody Information", Feb. 2016, (pp. 1).
Fire Safe Council, "Get Ready For Fire Season—Fire Safe Your Home", Nov. 2017, (pp. 1).
Rossroof Group, "Tilcor: High Performance Roofing Systems", Nov. 2017, (pp. 1-2)).
Insurance Institute for Business & Home Safety, "Protect Your Property from Wildfire", Jan. 2011, (pp. 1-40).
Fike, "MicroMist: The Self Contained Fire Protection Alternative", Aug. 2012, (pp. 1-2).
Thomas Schroeder, Klaus Kruger, Felix Kuemmerlen, "Fast Detection of Deflagrations Using Image Processing", Jan. 2012, (pp. 1-113).
Tom Toulouse, Lucile Rossi, Turgay Celik, Moulay Akhloufi, "Automatic Fire Pixel Detection Using Image Processing: A Comparative Analysis of Rule-Based and Machine Learning-Based Methods", Jun. 2016, (pp. 1-8).
Col Michael Receniello, "Fire Suppression Systems (FSS) Enhance Tactical Wheeled Vehicle (TWV) Survivability", Jul. 2010, (pp. 1-3).
Marioff, "HI-FOG Water Mist Fire Protection: Fire Protection for Buildings", Jan. 2017, (pp. 1-12).
Panasonic Corporation, "PIR Motion Sensor 'PaPIRs'", Jul. 2017, (pp. 1-9).
Pillar Technologies Inc., "Pillar Technologies Presentation", Jul. 2018, (pp. 1-16).
Bete, "Low Flow", Nov. 2017, (p. 1).
Bete, "MicroWhirl: Fine Atomization", Nov. 2017, (pp. 1).
Bete, "P. Fine Atomization", Nov. 2017, (pp. 1).
Bete, "PJ: Fine Atomization", Nov. 2017, (pp. 1).
Bete, "UltiMist", Nov. 2017, (pp. 1).
Marioff, "HI-FOG System Components", Nov. 2017, (pp. 1-2).
La Times, Sam Byker, "Fire Retardants That Protect the Home", Nov. 25, 2007, (pp. 1-4).
International Fire Chiefs Association, "Guidelines for Managing Private Resources on Wildland Fire Incidents", Jan. 2016, (pp. 1-2).
Simplex Aerospace, "Spray Systems Overview", Jan. 2016, (pp. 1-3).
Tyco Fire Products, "AquaMist: Watermist Fire Protection", Jan. 2013, (pp. 1-7).
Tyco Fire Products, "AquaMist", Jan. 2016, (pp. 1-5).
Danfoss Semco Fire Protection, "SEM-SAFE: High-Pressure Water Mist System", Feb. 2014, (pp. 1-8).
Cyril N. Hinshelwood, "Chemical Kinetics in the Past Few Decades", Nobel Lecture, Dec. 1956, (pp. 1-11).
Diversified Protection Systems Inc., "Fire Protection Protection Presentation", Jan. 2004, (pp. 1-35).
Joseph W. Mitchell, Oren Patashnik, "Firebrand Protection as the Key Design Element for Structure Survival During Catastrophic Wildland Fires", Aug. 2006, (pp. 1-15).
Joseph W. Mitchell, M-Bar Technologies and Consulting, "Wind-Enabled Ember Dousing: A Comparison of Wildland Fire Protection Strategies", Aug. 2008, (pp. 1-53).
Mike Kirby, Fire Rescue, "Nozzles Types, Pros and Cons", Jun. 2012, (pp. 1-7).
FM Approvals, "American National Standard for Water Mist Systems", Nov. 2017, (pp. 1-191).
Michelle D. King, Jiann C. Yang, Wnedy S. Chien and William L. Grosshandler, "Evaporation of A Small Water Droplet Containing An Additive" Proceedings of the ASME National Heat Transfer Conference, Baltimore, Aug. 1997 (6 Pages).
BETE, "BETE Announces High-Performance Nozzles for Fire Protection Systems", Nov. 2017, (pp. 1-2).
Surfire Services Limited, "UltraGuard: The personal protection system from Surefire", Nov. 2017, (pp. 1-3).
The University of Chicago, Salen Churi, Harrison Hawkes, Noah Driggs, "Internet of Things: Risk Manager Checklist, U.S.", Dec. 2016, (pp. 1-23).
FM Approvals, "Approval Standard for Video Image Fire Detectors for Automatic Fire Alarm Signaling", Dec. 2011, (pp. 1-22).
FM Approvals, "Approval Standard for Radiant Energy-Sensing Fire Detectors for Automatic Fire Alarm Signaling", Jan. 2018, (pp. 1-17).
NRCC, Zhigang Liu, Andrew K. Kim, "A Review of Water Mist Fire Suppression Technology: Part II—Application Studies", Feb. 2001, (pp. 1-29).
Defence Research and Development Canada, John A. Hiltz, "Additives for Water Mist Fire Suppression Systems—A Review", Nov. 2012, (pp. 1-40).
Elsevier, Zhang Tianwei, Liu Hao, Han Zhiyue, Du Zhiming, Wang Yong, "Research Paper: Active Substances Study in Fire Extinguishiing by Water Mist with Potassium Salt Additives Based on Thermoanalysis and Thermodynamics", May 2017, (pp. 1-10).
Mark L. Robin, FS World, "Fire Detection & Suppression", Apr. 2011, (pp. 1-10).
Office Action dated Jun. 1, 2018 for U.S. Appl. No. 15/829,914 (pp. 1-7).
Ledinek, "X-Press", Nov. 2017, (pp. 1-5).
Underwriters Laboratories Inc., "BPVV R7002 Lumber, Treated", Jan. 2011, (pp. 1-5).
Underwriters Laboratories Inc., BUGV R7003 Treated Plywood, Oct. 2011, (pp. 1-4).
Chemical Specialties Inc., "D-Blaze Fire Retardant Treated Wood, The New Generation Building Material", Mar. 2004, (pp. 1-2).
Treated Wood, "TimberSaver", Nov. 2017, (pp. 1-6).
Reed Construction Data, "Osmose Inc., FirePro Fire Retardant", Jan. 2004, (pp. 1-3).
ICC Evaluation Service Inc., "FirePro", Nov. 2005, (pp. 1-4).
Marketwired, "WoodSmart Solutions, Inc. Tests Hartindo AF21 in BluWood Solution", Nov. 2007, (pp. 1-2).
Marketwired, "Megola Announces AF21 Test Results", Aug. 2007, (pp. 1-2).
Marketwired, Megola Updates on Hartindo AF21, a Total Fire Inhibitor, Aug. 2010, (pp. 1-3).
Treated Wood, "Fire Retardant Treated Wood For Commercial and Residential Structures", Jan. 2012, (pp. 1-73).
Fire Retardant Coatings of Texas, "FX Lumber Guard", Nov. 2015, (pp. 1).
Qai Laboratories, "Test Report #T1003-1: FX Lumber Guard", Apr. 2015, (pp. 1-10).
Treated Wood, "D-Blaze: Fire Retardant Treated Wood", Jan. 2015, (pp. 1-13).
Arch Wood Protection Inc., "Dricon: Application Guide", Jan. 2016, (pp. 1-28).
ICC Evaluation Service Inc., "ICC-ES Listing Report: FX Lumber Guard/FX Lumber Guard XT Fire-Retardant Coatings", Oct. 2016, (pp. 1-3).
ICC Evaluation Service Inc., "ICC-ES Report: Pyro-Guard Fire Retardant-Treated Wood", Dec. 2016, (pp. 1-8).
Intelligent Wood Systems, "Treated Timber—Customer Information", Nov. 2016, (pp. 1-8).
Intelligent Wood Systems, "IWS FR Fire Retardant Treated Wood Corrosion Information", Jan. 2016, (pp. 1).
Intelligent Wood Systems, "Treated Timber—Consumer Information", Nov. 2016, (pp. 1-15).
Nelson Pine, "How LVL is Made", Nov. 2017, (pp. 1).
Eco Building Products Inc, "Eco Red Shield Material Safety Data Sheet : Wood Dust", Jun. 2005, (pp. 1-2).
LSU Agcenter Wood Durability Laboratory, Eco Building Products, "Eco Red Shield: Technical Specifications—Strength Testing", Aug. 2011, (pp. 1-21).
Eco Building Products, "Technical Bulletin: Corrosive Effects From Eco Red Shield Coatings", Jan. 2011, (pp. 1).
Underwriters Laboratories Inc., "Greenguard Certification Test for Eco Building Products, Inc.: Eco Red Shield—01", Mar. 2015, (pp. 1-21).
DRJ, "Technical Evaluation Report: Eco Red Shield Fire Treated Wood Protection Coating", Apr. 2016, (pp. 1-8).
Eco Building Products, "Safety Data Sheet: Eco Red Shield", May 2016, (pp. 1-6).

(56) References Cited

OTHER PUBLICATIONS

CSE Inc, "AC479: Proposed AC for Wood Structural Panels with Factory-Applied Fire-Retardant Coating", Feb. 2017, (pp. 1-101).
ASTM International, "Standard Test Method for Hygroscopic Properties of Fire-Retardant Wood and Wood-Based Products", Jul. 2013, (pp. 1-3).
ASTM International, "Standard Test Method for Extended Duration Surface Burning Characteristics of Building Materials (30 min Tunnel Test), " Aug. 2011, (pp. 1-4).
Phos-Chek, "Protect Your Home From Wildfire", Nov. 2017, (pp. 1-4).
American Wood Council, "Design for Code Acceptance: Flame Spread Performance of Wood Products Used for Interior Finish", Apr. 2014, (pp. 1-5).
Glenalmond Timber Company, "IWS FR Fire Retardant Treated Wood: Corrosion Information", Nov. 2017, (p. 1).
Department of the Navy, "Military Specification: Lumber and Plywood", Jun. 1984, (pp. 1-16).
Bank Insurance, Michael D. White, "How Benjamin Franklin Became the 'Father of Insurance'", Dec. 1998, (pp. 1-3).
ASTM International, "Standard Test Methods for Fire Tests of Building Construction and Materials", Oct. 2000, (pp. 1-24).
ASTM International, "Standard Test Method for Evaluating the Flexural Properties of Fire-retardant Treated Softwood Plywood Exposed to Elevated Temperatures", May 2001, (pp. 1-7).
Treated Wood "D-Blaze Fire Retardant Treated Wood: The New Generation Building Material", Mar. 2004, (pp. 1-2).
Swiss Krono, "Swiss Krono OSB: Prefabricated Construction" Nov. 2017, (pp. 1-6).
NRC CNRC, "Fire Performance of Houses. Phase I. Study of Unprotected Floor Assemblies in Basement Fire Scenarios. Summary Report", Dec. 2008, (pp. 1-55).
Underwriters Laboratories, "Report on Structural Stability of Engineered Lumber in Fire Conditions", Sep. 2008, (pp. 1-178).
Mike H. Freeman, Paul Kovacs, "Metal and Fastener Corrosion in Treated Wood from an Electrochemical—Thermodynamic Standpoint", Jan. 2011, (pp. 1-22).
D.G. Fraser, "Break the Flame Chain Reaction", Jun. 1962, (pp. 1-3).
Green Building Advisor, Martin Holladay, "Is OSB Airtight?", Aug. 2015, (pp. 1-4).
National Fire Protection Association, "Standard for Fire Retardant-Treated Wood and Fire-Retardant Coatings for Building Materials", Jan. 2015, (pp. 1-16).
Underwriters Laboratories, "Project 90419—GREENGUARD and GREENGUARD Gold Annual Certification Test Results", Mar. 2015, (pp. 1-21).
Structural Building Components Association, "Fire Retardants and Truss Design", Jan. 2015, (pp. 1-48).
Western Wood Preservers Institute, "Fire Retardant Wood and the 2015 International Building Code", Jan. 2015, (pp. 1-2).
Structural Building Components Association, "Research Report: Lumber Use in Type III—A Buildings", Jul. 2016, (pp. 1-8).
ASTM International, "Standard Test Method for Evaluating the Effects of Fire-Retardant Treatments and Elevated Temperatures on Strength Properies of Fire-Retardant treated Lumber", Jul. 2010, (pp. 1-6).
ASTM International, "Standard Practice for Calculating Bending Strength Design Adjustment Factors For Fire- Retardant-Treated Plywood Roof Sheathing", Oct. 2015, (pp. 1-6).
ASTM International, "Standard Practice for Calculating Design Value Treatment Adjustment Factors for Fire- Retardant-Treated Lumber", Apr. 2016, (pp. 1-7).
American Wood Preservers' Association, "Standard Method of Determining Corrosion of Metal in Contact With Treated Wood", Jan. 2015, (pp. 1-4).
Nordson Corporation, "Airless Spray Systems: The Efficient Choice for Many Liquid Painting Applications", Jan. 2004 (pp. 1-8).
Marketwired, "Megola Obtains Class A Rating for Hartindo AF31", Nov. 2007, (pp. 1-2).
Marketwire, "Megola Inc. Signs 'Hartindo AF21' Licensing Agreement with Eco Blu Products, Inc.", Nov. 2009, (pp. 1-2).
Conception R.P. Inc., "The Cutting Edge of Finger Jointing", Feb. 2005, (pp. 1-16).
Marketwired, "Megola Continues Sales of Hartindo AF21 to EcoBlu Products, Inc.", Dec. 2010, (pp. 1-2).
Woodworking Network, "Megola to Buy Wood-Protecting Hartindo AF21 Fire Inhibitor", Aug. 2011, (pp. 1-2).
CMA Robotics, "GR 630", Nov. 2017, (pp. 2).
Office Action dated Jun. 1, 2018 for U.S. Appl. No. 15/829,948 (pp. 1-13).
Hoover Inc., "Exterior Fire-X Treated Wood: Material Safety Data Sheet", Oct. 2005, (pp. 1-9).
CMA Robotics, "GR 650", Nov. 2017, (pp. 1-2).
CMA Robotics, "GR 6100-HW", Nov. 2017, (pp. 1-2).
CMA Robotics, "GR 6100-HW-S", Nov. 2017, (pp. 1-2).
USDA Forest Service, "Mass Laminated Timber in the United States: Past, Present, and Future", Nov. 2017, (pp. 1-13).
Western Wood Products Association, "Flame-spread Ratings & Smoke-Developed Indices; Conformance with Model Building codes", Nov. 2017, (pp. 1-2).
Robert H. White, Erik V. Nordheim, "Charring Rate of Wood for ASTM E 119 Exposure", Feb. 1992, (pp. 1-2).
Yang Xuebing, "Change in the Chinese Timber Structure Building Code", Jan. 2006, (pp. 1-11).
Forest Products Laboratory, Robert H. White, Mark A. Dietenberger, "Chapter 17: Fire Safety", Feb. 1999, (pp. 1-17).
Hoover Wood Products, "Exterior Fire-X Material Safety Data Sheet", Oct. 2005, (pp. 1-5).
Hardwood Plywood & Veneer Association, "Report on Surface Burning Characteristics Determined by ASTM E 84 Twenty-Five Foot Tunnel Furnace Test Method", Jan. 2008, (pp. 1-7).
Chemical Online, "Mse Enviro-Tech Corp. Introduces Dectan", May 2007, (pp. 1).
Studiengemeinschaft Holzleimbau, "Building with Cross Laminated Timber", Jan. 2011, (pp. 1-36).
FP Innovations, M. Mohammad, "Connections in CLT Assemblies", Sep. 2011, (pp. 1-59).
James Hardie Technology, "30-Year Limited Warranty", Oct. 2011, (pp. 1-8).
James Hardie Technology, "HardieBacker: With Moldblock Technology", Jan. 2012, (pp. 1-10).
MGB Achitecture & DESIGN, "The Case for Tall Wood Buildings: How Mass Timber Offers A Safe, Economical, and Environmentally Friendly Altermative for Tall Building Structures", Feb. 2012, (pp. 1-240).
NY Times, "Building with Engineered Timber", Jun. 2012, (pp. 1-3).
Gerhard Schickhofer, Andreas Ringhofer, "The Seismic Behaviour of Buildings Erected in Solid Timber", Aug. 2012, (pp. 1-124).
Jerrold E. Winandy, Qingwen Wang, Robert E. White, "Fire-Retardant-Treated Strandboard: Properties and Fire Performance", May 2007, (pp. 1-10).
2012 CLT Handbook, Christian Dagenais, Robert H. White, Kuma Sumathipala, "Chapter 8—Fire", Nov. 2012, (pp. 1-55).
FPInnovations, "CLT Handbook: Cross-Laminated Timber", Jan. 2013, (pp. 1-572).
Siemens, "Transforming Timbers into Houses", Jan. 2013, (pp. 1-3).
Holzforschung Austria, "Construction with Cross-Laminated Timber in Multi-Storey Buildings: Focus on Building Physics", Apr. 2013, (pp. 1-160).
Fire Protection Research Foundation, Robert Gerard, David Barber, "Fire Safety Challenges of Tall Wood Buildings", Dec. 2013, (pp. 1-162).
Andrew Buchanan, Birgit Ostman, Andrea Frangi, "Fire Resistance of Timber Structures", Mar. 2014, (pp. 1-20).
Teco, "Wood-Based Structural-Use Panels and Formaldehyde Emissions", May 2009, (pp. 1-3).
American Wood Council, "2015 NDS Changes", Jul. 2015, (pp. 1-66).
USDA, "Hygrothermal Performance of Mass Timber Construction", Nov. 2015, (pp. 1-21).

(56) References Cited

OTHER PUBLICATIONS

Holzforshung Austria, “Short Report: Renewal of the abridged report on the fire resistance REI 60 according to EN 13501-2 of ’Stora Enso CLT” as load-carying cross-laminated timber wall elements ≥80 mm unplanked and planked with plaster boards, Dec. 2012, (pp. 1-5).
Charlotte Pipe and Foundry Company, “Technincal Bulletin: Understanding Flame Spread Index (FSI) and Smoke Developed Index (SDI) Ratings”, Jan. 2016, (pp. 1-2).
Drjohnson Lumber Company, “Cross Laminated Timbers: Mass Timber Construction”, Jan. 2016, (pp. 1).
Globe Advisors, “Study of Insurance Costs for Mid-Rise Wood Frame and Conrete Residential Buildings”, Jan. 2016, (pp. 1-61).
Stora Enso, “CLT Engineer: The Stora Enso CLT Design Software User Manual, ”Jan. 2016, (pp. 1-118).
Stora Enso, “CLT—Cross Laminated Timber: Fire Protection”, Jan. 2016, (pp. 1-51).
Wood Works, “The Case for Cross Laminated Timber”, Jan. 2016, (pp. 1-212).
Lendlease, Jeff Morrow, “More with Less: An Overview of the 1st CLT Hotel in the U.S.”, Apr. 2016, (pp. 1-45).
DCI Engineers, “Cross-Laminate Timber”, May 2016, (pp. 1-5).
Safety Data Sheet for DAYGLOR® ECO-21 Corona Magneta Pigment™ , Day Glo Color Corp., Cleveland, Ohio, Aug. 9, 2022 (7 Page).
Safety Data Sheet for DAYGLOR® ECO-2100FR Corona Magneta Pigment™ , Day Glo Color Corp., Cleveland, Ohio, Aug. 9, 2022 (7 Page).
USDA Forest Service Product Information on Fortress FR-700 Pretreatment Retardant Usingf Magnesium Cloride, Gum Thickened, Medium Viscosity, Uncolored, USDA Forest Service, May 2023 (1 Page).
Safety Data Sheet for Fortress™ FR-100 Fire Retardant, Fortress North America, LLC, Rocklin, California , Jul. 10, 2020 (3 Pages).
Safety Data Sheet for Fortress™ FR-200 Fire Retardant, Fortress North America, LLC, Rocklin, California , Jul. 19, 2020 (3 Pages).
Safety Data Sheet for Fortress™ FR-600 Fire Retardant, Fortress North America, LLC, Rocklin, California , Feb. 8, 2022 (3 Pages).
Safety Data Sheet for Fortress™ FR-700 Fire Retardant, Fortress North America, LLC, Rocklin, California , Apr. 19, 2022 (3 Pages).
Brochure for Clore Wildfire Defense, Clore Corp., Aug. 2024 (2 Pages).
Website Decription of Clore Wildfire Defense, Clore Corp., captured at https://clorefr.com/clore-wildfire-defense on Aug. 6, 2024 (4 Pages).
Online Wikipedia Entry for Carboxylic Acid, https://en.wikipedia.org/wiki/Carboxylic_acid , captured Apr. 2, 2023 (10 Pages).
Online Wikipedia Entry for Alkali Metals, https://en.wikipedia.org/wiki/Alkali_metal, captured Apr. 12, 2023 (48 Pages).
Online Wikipedia Entry for List of Carboxylic Acids, https://en.wikipedia.org/wiki/List_of_carboxylic_acids , captured Feb. 13, 2023 (10 Pages).
Online Wikipedia Entry for Ester, https://en.wikipedia.org/wiki/Ester, captured Feb. 15, 2024 (15 Pages).
Online Wikipedia Entry for Alkali , https://en.wikipedia.org/wiki/Alkali , captured Apr. 12, 2023 (3 Pages).
Online Britannica Entry for Carboxylic Acid, https://www.britannica.com/science/carboxylic-acid, captured Mar. 16, 2024 (15 Pages).
Online Wikipedia Entry for Chromophore , https://en.wikipedia.org/wiki/Chromophore, captured Sep. 26, 2024 (5 Pages).
Online Britannica Entry for Chromphore, https://www.britannica.com/science/chromophore , captured Sep. 26, 2024 (4 Pages).
Online Wikipedia Entry for Saturated and Unsaturated Compounds , https://en.wikipedia.org/wiki/Saturated_and_unsaturated_compounds, captured Mar. 16, 2023 (3 Pages).
Chemistry LibreTexts Entry for Properties of Esters , https://chem.libretexts.org/Bookshelves/Organic_Chemistry/Supplemental_Modules_(Organic_Chemistry)/Esters/Properties_of_Esters , captured Sep. 26, 2024 (4 Pages).
Office Action (Non-Final Rejection) dated Sep. 20, 2024 for U.S. Appl. No. 18/432,014 (pp. 1-9).
Eva Snejdrova and Milan Dittrich, Pharmaceutical Application of Plasticized Polymers, https://www.researchgate.net/publication/221929431_Pharmaceutical_Applications_of_Plasticized_Polymers, Mar. 2012, (23 Pages).
A. A. Shindia, G. A. El-Sherbeny, A. E. El-Esawy and Y. M. M. M. Sheriff, Production of Gluconic Acid by Some Local Fungi, Mycobiology 34(1):22-29 (2006) (8 Pages).
Alexander Kremsmair, Johannes H. Harenberg, Kuno Schwarzer, Andreas Hess and Paul Knochel , Preparation and reactions of polyfunctional magnesium and zinc organometallics in organic synthesis, Published by the Royal Society of Chemistry Chem. Sci., 2021, 12, 6011-6019 |(9 Pages).
Allison Soult, Ph.D. (Department of Chemistry, University of Kentucky), 3.3: The Dissolving Process—Chemistry LibreTexts, captured on Oct. 6, 2024 at https://chem.libretexts.org/Courses/Brevard_College/CHE_104%3A_Principles_of_Chemistry_II/03%3A_Solutions_and_Colloids/3.03%3A_The_Dissolving_Process, (4 Pages).
Marisa Alviar-Agnew, 9.7: Carboxylic Acids and Esters—Chemistry LibreTexts, captured on Oct. 6, 2024 at https://chem.libretexts.org/Bookshelves/Introductory_Chemistry/Chemistry_for_Changing_Times_(Hill_and_McCreary)/09%3A_Organic_Chemistry/9.08%3A_Carboxylic_Acids_and_Esters, (7 Pages).
9.8: Esters: Structures and Names—Chemistry LibreTexts, captured on Oct. 6, 2024 at https://chem.libretexts.org/Courses/Sacramento_City_College/SCC%3A_Chem_309 _-_General_Organic_and_Biochemistry_(Bennett)/Text/09._Organic_Functional_Groups%3A_Structure_and_Nomenclature/9.08%3A_Esters%3A_Structures_and_Names (3 Pages).
11.3 Alcohols, Acids, and Esters—Chemistry LibreTexts, captured on Oct. 6, 2024 at https://chem.libretexts.org/Courses/Grand_Rapids_Community_College/CHM_110%3A_Chemistry_of_the_Modern_World_(Neils)/11%3A_Organic_Chemistry/11.3_Alcohols%2C_Acids%2C_and_Esters (9 Pages).
21.7: Chemistry of Esters—Chemistry Libre Texts, captured on Oct. 6, 2024 at https://chem.libretexts.org/Workbench/LCDS_Organic_Chemistry_OER_Textbook_-_Todd_Trout/21%3A_Carboxylic_Acid_Derivatives-_Nucleophilic_Acyl_Substitution_Reactions/21.07%3A_Chemistry_of_Esters (6 Pages).
Stephen Vesper, Nathan Sienkiewicz, lan Struewing, David Linz and Jingrang Lu, Prophylactic Addition of Glucose Suppresses Cyanobacterial Abundance in Lake Water, Life 2022, 12, p. 38. (13 Pages).
Chapter 9.2: Solubility and Structure—Chemistry LibreTexts, captured on Oct. 6, 2024, at https://chem.libretexts.org/Courses/Prince_Georges_Community_College/CHEM_2000%3A_Chemistry_for_Engineers_(Sinex)/Unit_3%3A_States_of_Matter/Chapter_9%3A_Solutions/Chapter_9.2%3A_Solubility_and_Structure, (12 Pages).
Jim Clark, Group 1_Properties of Alkali Metals—Chemistry LibreTexts, captured on OC (tober 6, 2024 T https://chem.libretexts.org/Bookshelves/Inorganic_Chemistry/Supplemental_Modules_and_Websites_(Inorganic_Chemistry)/Descriptive_Chemistry/Elements_Organized_by_Block/1_s-Block_Elements/Group_1%3A_The_Alkali_Metals/1Group_1%3A_Physical_Properties_of_Alkali_Metals (3 Pages).
Group 1: Hydrogen and the Alkali Metals—Chemistry LibreTexts, captured on Oct. 6, 2024 at https://chem.libretexts.org/Bookshelves/Inorganic_Chemistry/Supplemental_Modules_and_Websites_(Inorganic_Chemistry)/Descriptive_Chemistry/Elements_Organized_by_Block/1_s-Block_Elements/Group_1%3A_The_Alkali_Metals (2 Pages).
History of Dr. Paul Lohmann, published by Dr. Paul Lohmann GmbH & Co. KGaA Hauptstrasse 2 • 31860 Emmerthal Germany, captured on Oct. 6, 2024 at https://www.lohmann-minerals.com/company/history/ (17 Pages).
Iron Salts from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/iron-salts/ (7 Pages).
Magnesium Salts from the manufacturer—Dr. Paul Lohmann, published by Dr. Paul Lohmann GmbH & Co. KGaA Hauptstrasse 2 •

(56) References Cited

OTHER PUBLICATIONS

31860 Emmerthal Germany, captured on Oct. 6, 2024, at https://www.lohmann-minerals.com/ products/mineral-salts/magnesium-salts/ (8 Pages).
Mineral Salt Product from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/ products/mineral-salts/ (4 Pages).
Potassium Salts from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/potassium-salts/ (6 Pages).
Sodium Salts from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/sodium-salts/ (7 Pages).
Zinc Salts from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/zinc-salts/ (6 Pages).
Calcium Salts from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/calcium-salts/ (6 Pages).
Scientific Opinion by EFSA Panel on Food Additives and Nutrient Sources added to Food (ANS), comprising Maged Yo"unes, Peter Aggett, et al, "Evaluation of di-magnesium malate, used as a novel food ingredient and as a source of magnesium in foods for the general population, food supplements, total diet replacement for weight control and food for special medical purposes", published in EJ EFSA Journal, EFSAEFSA Journal 2018; 16(6):5292 (24 Pages).
Adewale Giwa ete al , Green dispersants for oil spill response: A comprehensive review of recent advances, Marine Pollution Bulletin, vol. 193, Aug. 2023, 115118 (6 Pages).
Safety Data Sheet for Potassium Oxalate Monohydrate (CAS RN 6487-48-5), by Fisher Scientific Company, Revised Dec. 24, 2024 (7 Pages).
Sellsheet for Green Design Engineering (GDE)—Earth-Friendly Solutions for Sustainable Results™—by Profile Products LLC, Mar. 2014, Profile Products, LLC, Buffalo Grove, Illinois, (2 Pages).
J28 . W. Hastie, "Molecular Basis of Flame Inhibitition", Journal of Research of the National Bureau of Standards—A Physics and Chemistry, vol. 77A, No. 6, Nov.-Dec. 1973, (22 Pages).
Guomin Zhao, Guanghji Xu, Shuang Jin, Qingsong Zhang and Zhongxian Liu, Fire-Entinguishing Efficiency of Superfine Powders under Different Injection Pressures, Hindawi International Journal of Chemical Engineering, vol. 2019, Article ID 2474370, May 19, 2019, (8 Pages).
D. Roosendans, K. Van Wingerden, M. H. Holme, and P. Hoorelbeke, "Experimental Investigation of Explosion Mitigating Properties of Aqueous Potassium Carbonate Solutions," Journal of Loss Prevention in the Process Industries, vol. 46, 2017 (19 Pages).
Office Action dated Oct. 5, 2021 for U.S. Appl. No. 16/805,811 (10 Pages ).
Office Action dated Nov. 24, 2021 for U.S. Appl. No. 16/914,067 (10 Pages).
Keith Klassen, "Aspirating Foam Nozzles", Oct. 20, 2011 (6 Pages).
Brian R. Donner, "Dry Chemical Suppression for Lithium Compounds" Jan. 2012 (32 Pages).
Safety Data Sheet for M-Fire AAF31 Job Site Spray, M-Fire Holdings LLC., Jan. 2018 (7 Pages).
Yavuz HK, Ozcan MM, Lemiasheuski VK, "The Effect of Some Chemical Additives on the Foaming Performance of the Pasteurized Liquid Egg White" Jan. 31, 2018 (4 Pages).
UL Greenguard Certification Test Report for AF21 Clean Fire Inhibitor, M-Fire Suppression Inc., May 29, 2018 (23 Pages).
Tyco Fire Protection Products, "Foam Systems—Acceptable Materials of Construction" Jan. 2018 (2 Pages).
C. I. Onwulata, R. P. Konstance, P. M. Tomasula, American Dairy Science Association, "Minimizing Variation in Functionality of Whey Protien Concentrates from Different Sources" Sep. 25, 2003 (8 Pages).
William R. Smythe, "The Spectrum of Fluorine", Apr. 1921 (7 Pages).
H. A. Krebs, W. A. Johnson, "36 The role of citric acid in intermediate metabolism in animal tissues" Aug. 25, 1980 (9 Pages ).
Frank Rustincovitch, US Environmental Protection AuaryENCY, "Environmental Impact Guidelines: For New Source Phosphate Fertilizer Manufacturing Facilities" Oct. 1981 (227 Pages).
National Wildfire Coordinating Group, "Foam Vs Fire: Class A Foam for Wildland Fires" Oct. 1993 (36 Pages)6.
M.L Vitosh, J.W. Johnson, D.B. Mengel, Michigan State University, Ohio State University, Purdue University, "Tri-state Fertilizer Recommendation for Corn, Soybeans, Wheat, and Alfalfa" Jul. 1995 (24 Pages ).
Morflex Inc., "Pharmaceutical Coatings Bulletin 102-4: Influence Of Triethyl Citrate On The Properties Of Tablets Containing Coated Pellets" Jan. 1996 (10 Pages ).
S.T Lebow, J. E. Winandy, "Effect of fire-retardant treatment on plywood pH and the relationship of pH to strength properties" Jan. 8, 1997 (14 Pages ).
D.J. Spring, D.N. Ball, "Alkali Metal Salt Aerosols As Fire Extinguishants" , Jan. 1998 (7 Pages).
Data Sheet for Chemguard S-761P High Performance Anionic Fluorosurfactant, Tyco Fire Protection Products, Jan. 2018 (1 Page).
Data Sheet for Chemguard S-764P-12A High Performance Anionic Fluorosurfactant, Tyco Fire Protection Products, Jan. 2018 (2 Pages ).
Material Safety Data Sheet for Purple K Dry Chemical Fire Extinguishant, Amerex Corporation, Sep. 2003 (7 Pages).
Paint & Coatings Industry, "Making the Transition: Coalescing for Latex Paint" Feb. 29, 2000 (8 Pages).
Hui Zhang, Rice University, "Effect of Oils, Soap and Hardness on the Stability of Foams" Sep. 2003, (221 Pages).
H. Wang, L. A. Johnson, T. Wang, "Preparation of Soy Protein Concentrate amd Isolate from Extruded-Expelled Soybean Meals" Jul. 2004 (6 Pages).
Data Sheet for Chemguard 3% Fluoroprotein Foam Concetrate, Chemguard, Sep. 2005 (2 Pages).
General Information Sheet for Chemguard Class "A" Foam, Chemguard, Sep. 2005 (2 Pages).
Preeti Singh, R. Kumar, S. N. Sabapathy, A. S. Bawa, Comprehensive Reviews in Food Science and Food Safety, Functional and Edible Uses of Soy Protein Products Aug. 2, 2007 (15 Pages).
General Information Sheet for Chemguard Foam Products, Chemguard, Sep. 2005 (6 Pages).
Material Safety Data Sheet for Knockdown Class A Foam, National Foam Inc., Oct. 1, 2007 (8 Pages).
A. Poshadri, Aparna Kuna, "Microencapsulation Technology: A Review" Jan. 2010 (17 Pages).
Dr. Inge Krämer, Basf, "Acronal PRO & Joncryl: Water based Resins for Metal Protection" Oct. 3, 2011, (21 Pages).
Safety Data Sheet for Angus Fire FP 70 Foam, Angus Fire Ltd, Dec. 3, 2014 (9 Pages).
Material Safety Data Sheet for Ansul 3% Fluorprotein Foam Concentrate, Tyco Fire Protection Products, Oct. 7, 2011 (4 Pages).
Office Action (Notice of Allowance and Fees Due (PTOL-85)) dated Mar. 25, 2022 for U.S. Appl. No. 16/805,811 (10 Pages).
Huang Yingsheng, Zhang Wencheng, Dai Xiaojing, Zhao Yu, "2012 International Symposium on Safety Science and Technology: Study on water-based fire extinguishing agent formulations and properties", Elsevier Procedia Engineeering, vol. 45 (6 Pages).
Safety Data Sheet for Citroflex 4 , Vertellus Performance Materials Inc., Jul. 12, 2012 (9 Pages).
Moince M. Fiume et al., "Safety Assesment of Citric Acid, Inorganic Citrate Salts, and Alkyl Citrate Esters as Used in Cosmetics" Jan. 2014 (31 Pages).

(56) References Cited

OTHER PUBLICATIONS

Safety Data Sheet for Phos-Chek 1% AFF—[Aquafilm AF-1U], Auxquimia, Jul. 7, 2014 (13 Pages ).
N. M. Kovalchuk, A. Tybala, V. Starov, O. Matar, N. Ivanova, “Fluoro—vs hydrocarbon surfactants: Why do they differ in wetting performance?” Advances in Colloid and Interface Science, vol. 210, Aug. 2014, (7 Pages ).
Technical Evaluation Report for Citroflex 2 (Triethyl Citrate), OMRI for the USDA, Nov. 5, 2014 (15 Pages).
Patrick Mackary, UK Journal of Pharmaceutal and Biosciences, “Principles of Salt Formation”, Aug. 2, 2014, (4 Pages).
Pongsathron Issarayungyuen, Wiwat Pichayakorn, Thawatchai Phaechamud, “Cast Natural Rubber Films Comprising Triethyl Citrate” Nov. 15, 2013 (5 Pages).
Data Sheet for Towalex FFFP ARC 3×6, Incendium Fire Solutions, Nov. 2014 (2 Pages ).
Andrzej Jankowski, Radosław Balwiariz, Dominik Marciniak, Dariusz Łukowiec, Janusz Pluta, “Influence of Spray Drying Manufacturing Parameters on Quality of Losartan Potassium Microspheres”, Acta Poloniae Pharmaceutica and Drug Research, vol. 71, No. 5, 2014 , (9 Pages).
Technical Evaluation Report for Citric Acid, OMRI for the USDA, Feb. 17, 2015 (31 Pages).
Matthew E. Benfer, Joseph L. Ffey, “valuation of Water Additives for Fire Control and Vapor Mitigation—Two and Three Dimensional Class B Fire Tests” Mar. 15, 2015 (34 Pages).
Cosmetics Info, “Citric Acid and its Salts and Esters” Jan. 15, 2021 (3 Pages).
Safety Data Sheet for Bio Fluopro 3E, BIOEX SAS, Nov. 11, 2005 (2 Pages).
Pau Loke Show, Kehinde Opeyemi Oladele, Qi Yan Siew, Fitri Abdul Aziz Zakry, John Chi-Wei Lan, Tau Chuan Ling, Frontiers in Life Science, “Overiview of citric acid production from aspergillus niger” Apr. 20, 2015 (14 Pages).
Aida Adlimoghaddam, Mohammad G. Sabbir, Bendeict C. Albensi, Frontiers in Molecular Neuroscience, “Ammonia as a Potential Neurotoxic Factor in Alzheimer’s Disease” Aug. 2016 (11 Pages).
Alagappa Rammohan, James A. Kaduk, Crystallographic Communications, “Crystal structure of anhydrous tripotassium citrate from laboratory X-ray powder diffraction data and DFT comparison” Jul. 14, 2016 (9 Pages).
Fact Sheet for PFOA & PFOS, EPA, Nov. 2016 (5 Pages).
Safety Data Sheet for Chemguard: Direct Attack Class A Foam, Tyco Fire Protection Products, Feb. 22, 2016 (8 Pages).
Fire Fighting Foam Coalition, “Best Practice Guidance for Use of Class B Firefighting Foams” May 2016 (8 Pages).
Josephine Christina, Youngsoo Lee, Jounral of Food Science, “Modification of Sodium Release Using Porous Corn Starch and Lipoproteic Matrix” Jan. 22, 2016 (9 Pages).
Yi-Yuan Shao, Kuan-Hung Lin, Yu-Ju Kao, Journal of Food Quality, “Modification of Foaming Properties of Commercial Soy Protein Isolates and Concentrates by Heat Treatments” Aug. 10, 2016 (12 Pages).
Tyco Fire Protection Products, “Alcohol Resistant—Aqueous Film-Forming Foam (AR-AFFF) Concentrates” Jan. 19, 2016 (2 Pages).
Tyco Fire Protection Products, “Storage of Foam Concentrates: Recommended4 Storage, Handling and Inspection of Foam Concentrates” Jan. 2018 (3 Pages).
G. S. Grigoryan, Z. G. Grigorya, A. Ts. Malkhasyan, Yerevan State University, “Obtaining Esters of Citric Acid with High Aliphatic Alcohols” Jan. 2017 (4 Pages).
D. Roosendans, K. Van Wingerden, M. N. Holme, P. Hoorelbeke, Elsevier, “Experimental investigation of explosion mitigating properties of aqueous potassium carbonate solutions” Feb. 14, 2017 (19 Pages).
Safety Data Sheet for Chemguard DirectAttack Foam Concentrate, Tyco Fire Protection Products, Jan. 2018 (2 Pages).
Data Sheet for Purple K Dry Suppressing Agent, Tyco Fire Protection Products, Jan. 2018 (1 Page ).
Data Sheet for Leader Mix, Leader Group, Jun. 2018 (2 Pages).
Data Sheet for 36 Chemguard 36 Gallon 2 Foam Station, Tyco Fire Protection Products, Jan. 2018 (4 Pages).
Data Sheet for Chemguard S-764P High Performance Anionic Fluorosurfactant, Tyco Fire Protection Products Jan. 2018 (2 Pages)2.
Data Sheet for Chemguard S-760P High Performance Anionic Fluorosurfactant, Tyco Fire Protection Products, Jan. 2018 (1 Page).
Data Sheet for FLOWmix, Leader Group, Jun. 2018 (2 Pages).
Safety Data Sheet for Citroflex A-4, Vertellus LLC, Jun. 29, 2018 (8 Pages).
Data Sheet for Chemguard S-550 High Performance Nonionic Fluorosurfactant, Tyco Fire Protection Products, (1 Page), 2018.
Data Sheet for Ansul AFP6B 6% Fluoroprotein Foam Concentrate, Tyco Fire Protection Products, Jan. 2019 (2 Pages).
Hyeon Kim, Young Seok JI, Shaheed UR Rehman, Min Sun Choi, Myung Chan Gye, Hye Hyun Yoo, “Pharmacokinetics and Metabolism of Acetyl Triethyl Citrate, a Water-Soluble Plasticizer for Pharmaceutical Polymers in Rats” Apr. 3, 2019 (13 Pages).
Tyco Fire Protection Products, “Chemguard: Foam Concentrates and Hardware” Jan. 2019 (7 Pages).
Data Sheet for Chemguard CFP3B 3% Fluoroprotein Foam Concentrate, Tyco Fire Protection Products, Jan. 2019 (2 Pages).
Firesafe, “History of Fire Extinguishers” Dec. 18, 2019 (12 Pages).
Product Information for BIO FOR, BIOEX SAS, Mar. 12, 2019, (2 Pages).
Product Selection Guide for BASF Resins, BASF, Feb. 2019 (77 Pages).
Leyla-Cann Sogutoglu, Michael Steiger, Jelle Houben, Daan Biemans, Hartmut R. Fischer, Pim Dinkers, Henk Huinink, Olaf C. G. Adan, Crystal Growth & DESIGN, “Understanding the Hydration Process of Salts: The Impact of a Nucleation Barrier” Feb. 14, 2019 (10 Pages).
Jungbunzlauer, “Facts: Citrofol as coalescent agent” Jan. 2019 (12 Pages).
Jungbunzlauer, “Wood treatment—TPC as fire retardant” Jan. 2019 (11 Pages ).
Guomin Zhao, Guangji Xu, Shuang Jin, Qinsong Zhang, Zhongxian Liu, International Journal of Mechanical Engineering, “Fire-Extinguishing Efficiency of Superfine Powders Under Different Injection Temperatures” May 2, 2019 (8 Pages).
Safety Data Sheet for Phos-Chek 1% Fluorine Free, Perimeter Solutions, Sep. 13, 2019 (6 Pages).
Product Information for Phos-Chek 1% Fluorine Free Class A/B Foam Concentrate, Perimeter Solutions, Jan. 2019 (2 Pages).
Johnson Controls, “SaboFoam: Firefighting Foam Suppression Technology” Jan. 2019 (6 Pages).
Safety Data Sheet for Citroflex A-2, Vertellus LLC, Nov. 30, 2010 (9 Pages).
Anna Wiegand, Gioia Fischer, Harald Seeger, Daniel Fuster, Nasser Dhayat, Oliver Bonny, Thomas Ernandez, Min-Jeong Kim, Carsten A. Wagner, Nilufar Mohebbi, Clinical Kidney Journal, “Impact of potassium citrate on urinary risk profile, glucose and lipid metabolism of kidney stone formers in Switzerland” Aug. 19, 2019 (12 Pages).
Data Sheet for Williams Fire & Hazard Control Inline Foam Eductors, Williams Fire & Hazard Control, Jan. 2019 (1 Page).
Johnson Controls , “Aqueous Film-Forming Foam (AFFF) Concentrates: Aspirated Versus Nonaspirated AFFF” Jan. 2020 (4 Pages)6.
Data Sheet for Ansul AFP6B 6% Fluoroprotein Foam Concentrate, Johnson Controls, Jan. 2019 (2 Pages).
Data Sheet for ANSUL Foam Testing/ Foam Test Kit, Johnson Controls, Jan. 2020 (1 Page).
General Information Sheet for Chemguard Foam System Solutions, Johnson Controls, Jan. 2020 (12 Pages).
Clean Production Action, “GreenScreen Certified: Standard for Firefighting Foam” Feb. 25, 2020 (48 Pages).
Product Brochure for Citrofol, Jungbunzlauer Suisse AG, Jan. 9, 2020 (6 Pages).
Brochure for Jungbunzlauer Range of Products, Jungbunzlauer Suisse AG, May 7, 2020 (20 Pages).
White Paper for Johnson Controls, “Types of firefighting foam agents: Properties and applications”, Jan. 2020 (4 Pages).

(56) References Cited

OTHER PUBLICATIONS

Wood Environment & Infrastructure Solutions UK Ltd., "The use of P15 Fas and fluorine-free alternatives in fire-fighting foams" Jun. 2020 (534 Pages).
Wikipedia article on Potassium Citrate, Wikipedia .org captured May, 6, 2020 at https://en.wikipedia.org/wiki/Potassium_citrate (2 Pages).
Safety Data Sheet fo KV-Lite Forming Fluoro Pr10 otein (FFFP) Foam Concentrate 3 & 6%, M/S K.V. Fire Chemicals PVT. LTD, Dec. 2009 (3 Pages).
Danfoss Semco Fire Protection, "High Pressure CO2 Fire Fighting System", Aug. 2016, (pp. 1-4).
Danfoss Semco Fire Protection, "Dry Powder Fire Fighting System", Aug. 2016, (pp. 1-4).
Fike, "Micromist Suppression System Data Sheet", Sep. 2005, (pp. 1-2).
Fike, "Intelligent Graphic Annunciators", Mar. 2009, (pp. 1-2).
GS Environment, "Stat-X Condensed Aerosol Fire Suppression Systems", Nov. 2017, (pp. 1-6).
Megola, "Re: File No. 0-49815—Response to Comments—Form 10K for Fiscal Year Ended Jul. 31, 2009", Sep. 2010, (pp. 1-4).
Department of Financial Services, "Certification of Insurance Fire Protection System Contractor, State of Florida," Aug. 2007, (pp. 1).
Marleyeternit, "JB FireSafe Scaffold Boards", Jan. 2016, (pp. 1-2).
Danfoss Semco Fire Protection, "Deck Foam Fire Fighting System", Aug. 2016, (pp. 1-4).
3M, "From Our Labs to Your Life", Jan. 2016, (pp. 1-12).
Dupont, "Some facts you should know about NOVEC 1230 and ECARO-25 . . . ", Oct. 2004, (pp. 1-2).
Profile Products LLC, "Profile Soil Solutions Software: Getting Started", Nov. 2017, (pp. 1-21).
Profile Products LLC, "Profile Products Base Hydrualic Mulch Loading Chart and Application Guide", Oct. 2011, (pp. 1).
Profile Products LLC, "Ghs Safety Data Sheet: ConTack", Jan. 2017, (pp. 1-6).
Profile Products LLC, "Terra-Blend with Tacking Agent 3", Oct. 2017, (pp. 1).
Profile Products LLC, "Flexterra HP-FGM", Feb. 2018, (pp. 1-4).
National Research Council of Canada, Zhigang Liu, Andrew K. Kim, Don Carpenter, Fountain Fire Protection Inc., Ping-Li Yen, "Portable Water Mist Fire Extinguishers as an Alternative for Halon 1211", Apr. 2001, (pp. 1-5).
Honeywell, "Viewguard PIR", Jan. 2007, (pp. 1-2).
Pentair, "Hypro—SHURflo: Agriculture Products Catalog", Mar. 2013, (pp. 1-28).
Researchgate, Kayyani C. Adiga, "Ultra-fine Water Mist as a Total Flooding Agent: A Feasibility Study", Jan. 2014, (pp. 1-13).
Yong-Liang Xu, Lan-Yun Wang, Don-Lin Liang, Ming-Gao Yu, Ting-Xiang Chu, "Experimental and Mechanism Study of Electrically Charged Water Mist for Controlling Kerosene Fire in a Controlled Space", Apr. 2014, (pp. 1-7).
Hughes Associates Europe, "The Water Mist Technology Future; How the Test and Approval Process May Affect the next Developments", Jan. 2015, (pp. 1-23).
FLIR, "M100/M200 Series: Quick Start Guide", Oct. 2017, (pp. 1-5).
Plumis, Plumis Declaration of Testing and Conformity with Applicable Standards (Automist SmartScan), Jan. 2017, (pp. 1-3).
Plumis, "Automist Fixed Wall Head Handbook", Jan. 2017, (pp. 1-30).
Exova Warringtonfire, "Ad-hoc tests on watermist systems utilising the principles of the procedure defined in Draft BS 8458: 2014: Annex B", Sep. 2015, (pp. 1-19).
Plumis, "Automist Personal Protection System Handbook", Jan. 2016, (pp. 1-18).
Plumis, "Automist Personal Protection System: The plug & play mobile watermist fire sprinkler", Jan. 2016, (pp. 1-2).
Plumis, "Automist vs. Alternatives", Jan. 2016, (pp. 1-4).
Exova Warringtonfire, "Bs 8458:2015: Annex C" Jan. 2016, (pp. 1-22).
Exova Warringtonfire, Test on a watermist system utilising the principles of the procedure defined in BS 9252:2011: Annex S (21 pages).
Plumis, "Autmist Smartscan: The smarter, modern alternative to a fire sprinkler system", Jan. 2017, (pp. 1-2).
Plumis, "Austomist Tap Mount: The discreet watermist sprinkler alternative ideal for kitchen fire protection", Jan. 2017, (pp. 1-2).
Plumis, "Registered Details Fact Sheet: Automist Fixed Wall Head", Jan. 2017, (pp. 1).
Plumis, "Automist Smartscan Handbook" Jan. 2017, (pp. 1-66).
Tyco Fire Products, "Ultra Low Flow AQUAMIST Solution for Protecting Office Spaces, False Ceilings and False Floors—VdS Approval Criteria", May 2016, (pp. 1-6).
Fike, "Specification—Micromist Fire Suppression System with Cheetah Xi Control Panel", Dec. 2012, (pp. 1-10).
Fike, "Prolnert: Inert Gas Fire Protection System", May 2012, (pp. 1-6).
Fike, "Cheetah Xi: Intelligent Suppression Control System", Sep. 2012, (pp. 1-6).
Fike, "Specification—Micromist Fire Suppression System with SHP-Pro Control Panel", Dec. 2009, (pp. 1-9).
Fike, "Single Hazard Panel SHP PRO", Dec. 2009, (pp. 1-2).
CSIRO, "Certificate for Conformity: Fike Micromist, Pre-engineered Water Mist Fire Suppression System", Jan. 2012, (pp. 1-5).
Fike, "Intelligent Ionization Detector", Mar. 2014, (pp. 1-2).
Fike, "Intelligent Photoelectric Detector", Mar. 2014, (pp. 1-2).
Fike, "Mini Monitor Module", Apr. 2014, (pp. 1-2).
Fike, "Intelligent Manual Pull Station", Jun. 2014, (pp. 1-2).
Fike, "Intelligent Non-Relay Photoelectric Duct Housing", Jun. 2014, (pp. 1-2).
Fike, "Prolnert® 2 Agent Storage Cylinder IG—IG-55" Jan. 2016, (pp. 1-7).
James R. Butz, Technologies Inc, Richard Carey, David Taylor Research Center, "Application of Fine Water Mists to Fire Suppression", Nov. 2017, (pp. 1-11).
Scott T. Hardy, "Applications of lonic Liquids in Science and Technology", Sep. 2011, (pp. 1-528).
USDA Forest Service Product Information on Phos-Chek 259-F (1.14 lb/gal) Retardant for Aerial or Ground Application, Gum Thickened, Low Viscosity, Fugitive Colored, USDA Forest Service, Sep. 2024 (1 Page).
USDA Forest Service Product Information on Phos-Chek 259-F (1.60 lb/gal) Retardant for Aerial or Ground Application, Gum Thickened, Low Viscosity, Fugitive Colored, USDA Forest Service, Sep. 2024 (1 Page).
USDA Forest Service Product Information on Phos-Chek 259-R (1.14 lb/gal) Retardant for Aerial or Ground Application, Gum Thickened, Low Viscosity, Iron Oxide Colored, USDA Forest Service, Sep. 2024 (1 Page).
USDA Forest Service Product Information on Phos-Chek 259-R (1.60 lb/gal) Retardant for Aerial or Ground Application, Gum Thickened, Low Viscosity, Iron Oxide Colored, USDA Forest Service, Sep. 2024 (1 Page).
USDA Forest Service Product Information on Phos-Chek D75-R and D75-F Retardant for Aerial or Ground Application, Gum Thickened, High Viscosity, Iron Oxide and Fugitive Colored, USDA Forest Service, Sep. 2024 (1 Page).
USDA Forest Service Product Information on Phos-Chek G75-F and G75-W Retardant for Aerial or Ground Application, Gum Thickened, Low Viscosity, Fugitive Colored and Uncolored, USDA Forest Service, Sep. 2024 (1 Page).
USDA Forest Service Product Information on Phos-Chek LC-95A-R (5.5:1) Retardant for Aerial or Ground Application, Gum Thickened, Low Viscosity, Iron Oxide Colored, USDA Forest Service, Sep. 2024 (1 Page).
USDA Forest Service Product Information on Phos-Chek LV-R and MV-R (3.5:1) Retardant for Aerial or Ground Application, Fluid Concentrate, Gum Thickened, Iron Oxide Colored, USDA Forest Service, Sep. 2024 (1 Page).
Product Brochure for "259-Fx Long-Term Fire Retardant Low Viscosity (LV) Powder Concentrate by Phos-Chek" (PCC-2019036-2), Perimeter Solutions LP, 2023 (3 Pages).

(56) References Cited

OTHER PUBLICATIONS

Product Brochure for "Phos-Chek 259-Fx Long-Term Fire Retardant Low Viscosity (LV) Powder Concentrate" (PCC-2019036-v4), Perimeter Solutions LP, 2023 (3 Pages).
Product Brochure for "Ground Applied Phos-Chek Long-Term Fire Retardant" (PCC-2019019-0), Perimeter Solutions LP, 2020 (6 Pages).
Product Brochure for "Phos-Chek Preventive Wildfire Solutions" (PCC-2020064), Perimeter Solutions LP, 2020 (2 Pages).
Whitepaper Brochure by Perimter Solutions—"Long-Term Fire Retardants: History, Innovation and Preparing for the Future of Wildfires", Perimeter Solutions LP, Jan. 2022 (20 Pages).
Press Release captioned "Perimeter Solutions's Phos-Chek® Fortify® Now Qualified by USDA Forest Service for Application as a Proactive Wildfire Solution", Oct. 5, 2021, Perimeter Solutions LP, (3 Pages).
Safety Data Sheet by NEXREG Compliance Inc. for Phos-Chek® Fortify Solution, Perimeter Solutions LP, Apr. 21, 2021 (5 Pages).
Technical Bulletin for Phos-Chek® Retardants for Wildfire Control IC/SCS-312 by Monsanto, Monsanto Company, 1964 (7 Pages).
Preliminary Investigation (PI-0284) by Caltrans Division of Research , Innovation and System Information, DRSI, Surface Applications of Fire Retardants Requested by Kenneth Murray, Division of Maintenance, Nov. 11, 2020, California Department of Transportation, 2020 (25 Pqges).
US Department of Agriculture Forest Service Specification 5100-304d, Long-Term Retardant, Wildland Firefighting, USDA Forest Service, Jan. 7, 2020, (32 Pages).
S. Chen, A. Nussinovitch, The Role of Xanthan Gum in Traditional Coatings of Easy Peelers, Food Hydrocolloids, vol. 14, Issue 4, Jul. 2000, pp. 319-326, (7 Pages).
Wikipedia Entry for Sodium Benzoate Aug. 14, 2024, Wikipedia.org, (8 Pages).
Safety Data Sheet for Sodium Benzoate, Lab Grade, CAS 532-32-1, Manufacturer: AquaPhoenix Scientific, Hanover, PA, SDS Created by Global Safety Management, Inc. Effective Date Dec. 28, 2014, Last Updated Mar. 19, 2015 (6 Pages).
Safety Data Sheet for Iron Oxide Pigment Red (E172), CAS 1309-37-1 Diion Trioxide-32-1, Manufacturer: LGC Limited, Teddington, United Kingdom, Printing Date Jul. 6, 2016, Revision Aug. 26, 2014 (7 Pages).
USDA Forest Service Product Information on Phos-Chek® LCE20W—Pre-Mixed Pretreatment Retardant, Gum Thickened, Low Viscosity, Colorless, USDA Forest Service, Nov. 2021 (1 Page).
USDA Forest Service Product Information on Phos-Chek® Fortify—Pre-Mixed Pretreatment Retardant, Gum Thickened, Low Viscosity, Colorless, USDA Forest Service, Nov. 2021 (1 Page).
Material Safety Data Sheet for D96026 Chromtint Green 2726 Concentrated Colorant, Chromatech Inc., Canton Michigan CAS No. Blend, Jan. 4, 2011 (6 Pages).
Ten Questions to Ask Before Testing a Dye or Pigment Disperson in Your Product, Chromtech Inc., Canton, Michigan, Sep. 2024 (3 Pages).
Ghafoor, A.; Khan, F.A .; Khorsandi, F.; Khan, M.A.; Nauman, H.M.; Farid, M.U., Development and Evaluation of a Prototype Self-Propelled Crop Sprayer for Agricultural Sustainability in Small Farms, Sustainability 2022, 14, 9204 (22 Pages).
A. A. Shindia, G. A. El-Sherbeny, A. E. El-Esawy and Y. M. M. M. Sheriff, Production of Gluconic Acid by Some Local FungiProduction of Gluconic Acid by Some Local Fungi, The Korean Society of Mycology, Mycobiology 34(1): 22-29 (2006), (8 Pages).
Toxicological and Environmental Safety Brochure on PHOS-CHeK® Fire Retardants For the Use in Preventing and Controll Fires in Willand Fuels, ICL Performance Products LP, 2008 (8 Pages).
Safety Data Sheet for The Amazing Docter Zymes Eliminator, The Amazing Doctor Zymes, Laytonville, CA, Revision Jul. 10, 2017 (2 Pages).
Safety Data Sheet for TROY PolyPhase PW40, Troy Corporation, Revised Aug. 23, 2018 (2018).
S. Foghmoes, T. Klemensøl, K. Brodersen, J. J. Bentzen and M. Della Negra, "Citrate- and glycerol triesters as novel dual-functional dispersants and plasticisers for ceramic processing", Department of Energy Conversion and Storage, Technical University of Denmark, Frederiksborgvej 399, DK-4000 Roskilde, Denmark, 2018 Elsevier (24 Pages).
Product Brochure for First Alert® Tundra™ AF400 Fire Extinguishing Spray, BRK Brands, Inc. Aurora, Illinois, 2020 (3 Pages).
Safety Data Sheet for First Alert® TUNDRA™ EZ Fire Spray™ Mixture, BRK Brands, Inc. Aurora, Illinois, Jun. 18, 2020 (6 Pages).
Binu Kundukad , Gayathri Udayakumar, Erin Grela, Dhamanpreet Kaur, Scott A. Rice, Staffan Kjelleberg, Patrick S. Doyle, Weak acids as an alternative anti-microbial therapy, Elsevier B. V., Biofilm 2, 2020 100019 (8 Pages).
Product Brochure for First Alert® TUNDRA™ AF400 Fire Extinguishing Spray, BRK Brands, Inc. Aurora, Illinois, 2007 (2 Pages),.
Blog on LifeMaidEasy.com, Cleaning and Killing Black Mold With Common, Nontoxic, Household Product, posted Mar. 17, 2020, https://www.lifemaideasy.com/post/cleaning-and-killing-black-mold-with-common-non-toxic-household-products, Mar. 17, 2020 (9 Pages).
SNS-DC™ All Natural Disease and Fungal Control Application & Use Guide, Sierra Natural Science, Inc. Salinas, CA, , 2020 (7 Pages).
Safety Data Sheet for Purple K Dry Chemical (Fire Extinguishing Agent—Pressurized and Nonb-Pressurized) containing Potassium Bicarbonate and Calcium CA, Badger Fire Protection, Ruckersville, VA, Nov. 23, 2015 (10 Pages).
List of Corrosion Inhibitors a Surface Protection from Polygon Chemie AG, Olten 4600, Switzerland, 2023 (5 Pages).
Costas Emmanuel Synolakis and Georgios Marios Karagiannis, Wildfire risk management in the era of climate change, PNAS Nexus, May 2024, 3, (12 Pages).
Custom Product Technical Data Sheet for DAYGLO® ECO-2100ER Corona Magneta Pigment™—Rev. 1.00_2023 10.12, Day Glo Color Corp., Cleveland, Ohio, 2023 (1 Page).
Technical Data Sheet for DAYGLO® Eco Pigments™—Rev. 1.00_2023 08.11, Day Glo Color Corp., Cleveland, Ohio, 2023 (2 Page).
EPA's Safer Choice Criteria for Processing Aids and Additives, US Environmental Protection Agency (EPA) Safer Choice Program, published at https://www.epa.gov/saferchoice/safer-choice-criteria-processing-aids-and-additives , US EPA, Aug. 7, 2024 (5 Pages).
CFR—Code of Federal Regulations, Title 21 Food and Drugs, vol. 1, Salts iof Fatty Acids, As Food Additive, US FDA, Oct. 17, 2023 (1 Page).
Frank Wigglesworth Clarke, The Constitution of Natural Silicates, Department of the Interior, United States Geological Survey, Bullentin 588, Washington, Government Printing Office (128 Pages).
Victoria J. Nikiforova, Pieter Giesbertz, JanWiemer, Bianca Bethan, Ralf Looser, Volker Liebenberg, Patricia Ruiz Noppinger, Hannelore Daniel, and Dietrich Rein, Research Article "Glyoxylate, a New Marker Metabolite of Type 2 Diabetes", Hindawi Publishing Corporation, Journal of Diabetes Research, vol. 2014, Article ID 685204, (9 Pages).
Vesper, S.; Sienkiewicz, N.; Struewing, I.; Linz, D.; Lu, J., Prophylactic Addition of Glucose Suppresses Cyanobacterial Abundance in LakeWater. Life 2022, 12, 385. (13 Pages).
Stefania Marzorati *, Luisella Verotta and Stefano P. Trasatti, Green Corrosion Inhibitors from Natural Sources and Biomass Wastes, Molecules 2019, 24, 48 (24 Pages).
D.Jones Joseph Jebaraja, N. Rajesh Jesudoss Hynesb*, Basanth Navin KC, Corrosion Inhibition in Magnesium by using Green Inhibitor, IOP Conf. Series: Materials Science and Engineering 1258 (2022) 012035, (9 Pages).
FLIR, "VUE Pro: Thermal Camera for SUAS", Jul. 2009, (pp. 1-2).
FLIR, "FLIR K2 Brochure", May 2015, (pp. 1-2).
FLIR, "FLIR KF6 Datasheet", Jan. 2016, (pp. 1-2).
FLIR, "A65/A35/A15/A5 Brochure", Sep. 2014, (pp. 1-2).
FLIR, "FLIR C3 Brochure", Dec. 2016, (pp. 1-2).
FLIR, "FLIR A65", Jan. 2018, (pp. 1-7).
FLIR, FLIR "AX8 Brochure", Nov. 2017, (pp. 1-2).
NFPA, "Certified Fire Protection Specialist: Candidate Handbook", Apr. 2018, (pp. 1-34).

(56) References Cited

OTHER PUBLICATIONS

FLIR, "FC-Series R: Fixed Network thermal Cameras", Nov. 2017, (pp. 1-2).
FLIR, "IR Automation Guidebook: Temperature Monitoring and Control with IR Cameras", Jan. 2018, (pp. 1-68).
FLIR, "Thermal Imaging for Machine Vision and Industrial Safety Applications", Aug. 2014, (pp. 1-12).
FLIR, "User's Manual: FLIR A3xx Series", May 2016, (pp. 1-126).
FLIR, "FLIR AA315 f", Jan. 2018, (pp. 1-4).
FLIR, "FLIR FC-Series R (Automation)", Jan. 2018, (pp. 1-5).
FLIR, "Integration AX8 & A-B Overview", Oct. 2017, (pp. 1-9).
FLIR, "M100/M200 Series: Installation & Operation Instructions", Oct. 2017, (pp. 1-112).
FLIR, "FLIR ONE Pro Series Datasheet", Jun. 2018, (pp. 1-2).
FLIR, "FLIR Saros: Multi-Spectral Intrusion Solution", Jan. 2018, (pp. 1-3).
Patol, "500 Series: Model 5410 Infra-Red Transit Heat Sensor Infosheet", Nov. 2017, (pp. 1-2).
Bruker, "S1 Titan Brochure", Nov. 2017, (pp. 1-8).
Wikipedia, "Phos-Chek Screenshots", Nov. 2017, (pp. 1-3).
Carole Walker, Director Rmiia, Presentation—"Wildfire & Insurance: Insurance Communications Challenges & Opportunities", Sep. 2018 (8 Pages).
Sam Baker, "Fire Retardants That Protect The Home", La Times, Nov. 25, 2007, https://www.latimes.com/business/realestate/la-re-fire25nov25-story.html, (4 Pages).
REALFIRE® Realtors Promoting Community Wildfire Awareness, Eagle County, Colorado, "Wildfire Reference Guide: A Guide For Realtors® To Assist Home Sellers & Buyers With Understanding Wildfire", http: www.REALFire.net , Mar. 2017 (8 Pages).
Carol Walker, Executive Director of RMIIA, "Wildfire & Insurance: Insurance Communications Challenges a& Opportunities", https://www.iii.org/sites/default/files/docs/pdf/cc_presentation_carole_walker_111416.pdf , Oct. 2016, (8 Pages).
Marketwired, "MSE Enviro-Tech Corp.'s AF31 Fire Extinguishing Agent Addresses Need for More Effective Forest Fire Fighting Technology", Jul. 2007, (pp. 1-2).
FLAMESTOP, "FLAMESTOP I-DS: Fire Retardant for Foam, Thatch, and Porous Materials", Jan. 2017, (pp. 1-3).
Office Action dated May 31, 2019 for U.S. Appl. No. 15/866,451 (pp. 1-6).
Office Action dated Feb. 6, 2020, for U.S. Appl. No. 15/866,451 (pp. 1-9).
Office Action dated Oct. 10, 2019 for U.S. Appl. No. 16/055,001 (pp. 1-9).
Office Action dated Apr. 17, 2024 for U.S. Appl. No. 18/482,901 (pp. 1-6).
Office Action (Notice of Allowance and Fees Due (PTOL-85)) dated Oct. 12, 2022 for U.S. Appl. No. 17/497,955 (pp. 1-9).
American Chemical Society, "Seeing Red: Controversy smolders over federal use of aerially applied fire retardants", Aug. 2011, (p. 1-6).
Journal of Civil & Environmental Engineering, Mohamed Fayek Abdrabbo et al., "The Effect of Water Mist Droplet Size and Nozzle Flow Rate on Fire Extinction in Hanger by Using FDS", Oct. 2010, (pp. 1-12).
Department of Homeland Security, "Class A Foam for Structural Firefighting", Dec. 1996, (pp. 1-62).
Robert Zalosh, Gregory Gallagher, "Water Mist Sprinkler Requirements for Shipboard Fire Protection", May 1996, (pp. 1-97).
U.S. Department of Agriculture, "Aerial Application of Fire Retardant", May 2011, (pp. 1-370).
OCV Control Valves, "Solenoid Control Valve Series 115", May 2017, (pp. 1-6).
Profile, "Product Screenshots", Nov. 2017, (pp. 1-5).
Firefy AB, "Firefly Conveyer Guard: Fire Protection Solution for Conveyers", Nov. 2017, (pp. 1-4).
Hansentek, Model 120 Spark Detector Brochure, Nov. 2017, (pp. 1-2).
Firefly AB, "Firefly Training Brochure", Nov. 2017, (pp. 1-4).
Firefly AB, "Firefly EXIMO Brochure", Nov. 2017, (pp. 1-8).
Firefly AB, "Firefly Spark Detection: Higher Safety with Patented Technology", Jan. 2018, (pp. 1-12).
FLIR, "FLIR ONE Pro Series: Professional-Level Thermal Imaging for Your Smartphone", Jun. 2018, (pp. 1-2).
Profile Products LLC, "Certificate of Compliance, Terra-Blend with Tacking Agent 3", Jan. 2016, (pp. 1).
Profile Products LLC, "Earth-Friendly Solutions for Sustainable Results", Feb. 2014, (pp. 1-2).
Fike, "Fire Alarm Solutions: Ready for the Future Fike Fire Panels", May 2007, (pp. 1-2).
Dupont, Mark L. Robin, "DuPont Fire Extinguishants: Comparison Testing of FE-25 and Automatic Sprinklers in a Simulated Data Processing/Telecommunications Facility", Jul. 2008, (pp. 1-20).
Fike, "Micromist System Package Data Sheet", Sep. 2005, (p. 1-2).
Leader Group S.A.S, "Foam Proportioning: Multi-Flow Inductors" Oct. 2020 (15 Pages).
Brochure for SKUM Firefighting Foam Concentrates and Hardware, Johnson Controls, Oct. 2019 (8 Pages).
Webpage for TriFone BRAVO 600 Line of Sprayers, hhspray.com, H&H Farm Machine Company, Jan. 2020 (4 Pages).
Yuri B. Vysotsky, Elena Kartashynska, Dieter Vollhardt, Valentin B. Fainerman, "Surface pKa of Saturated Carboxylic Acids at the Air/Water Interface" A Quantum Chemical Approach Jun. 5, 2020 (10 Pages).
Article on Carboxylic Acid, Britannica Online Encyclopedia, captured Jan. 24, 2021 at https://www.britannica.com/print/article/95261 (41 Pages)9.
Wikipedia Article on Fluorocarbon, Wikipedia.org, captured Apr. 11, 2021 at https://en.wikipedia.org/wiki/Fluorocarbon (11 Pages).
Clean Production Action, "GreenScreen Certified: Standard for Firefighting Foam" Apr. 1, 2021 (28 Pages).
Brochure for AkroFoam Master Stream Nozzle with Pickup Tube Style 4475, Akron Brass Company, Apr. 2021 (2 Pages).
Ryan S. McMullen, "Research of Alkali Metal-Ammonia Microjets Published in Journal Science" Jun. 4, 2020 (9 Pages).
Brochure for Chemguard NFF 3x3 UL201 Non-Fluorinated Alcohol Resistant Firefighting Foam Concentrate, Johnson Controls, Jan. 14, 2021 (4 Pages).
Wikpedia Article on Per- and Polyfluoroalkyl Substances, Wikipedia.org, captured Apr. 11, 2021 at https://en.wikipedia.org/wiki/Per-_and_polyfluoroalkyl_substances, (26 Pages).
Wikipedia Article on Greek Fire, Wikipedia.org, captured Jan. 28, 2021 at https://en.wikipedia.org/wiki/Greek_fire (14 Pages).
A.M. Kaja, K. Schollbach, S. Melzer, S.R. Van Der Laan, H.J.H. Brouwers, Qingliang Yu, Hydration of potassium citrate-activated BOF slag, Nov. 13, 2020 (11 Pages).
Specification Data Sheet for Instant & Non Instant Whey Protein Concentrate 80%, The Milky Whey Inc., Jan. 2021 (1 Page).
Safety Data Sheet for PHOS-CHEK WD-881's Fish Toxicity Values, Perimeter Solutions, May 2019 (2 Pages).
General Information Sheet for WD881 Class A Foam Concentrate, Perimeter Solutions Jan. 2019 (5 Pages).
Gabrielle Kassel, What is Soy Protein Isolate and Is It Bad For You? Jan. 24, 2020 (4 Pages).
60 Data Sheet for Hydro Blanket BFM, Profile Products, Feb. 2017 (1 Pages).
Profile Products LLC, "Hydraulically-Applied Erosion Control Bonded Fiber Matrix" Mar. 2017 (5 Pages).
Wei-Tao Luo, Shun-Bing Zhu, Jun-Hui Gong, Zheng Zhao, "Research and Development of Fire Extinguishing Technology for Power Lithium Batteries", 2017 8th International Conference on Fire Science and Fire Protection Engineering (on the Development of Performance-based Fire Code), Elsevier, Procedia Engineering, Dec. 2017 (7 Pages).
2017 Model 3 Emergency Response Guide for Tesla 400 Volt Lithium-ion Battery, Tesla Inc., Aug. 2018 (37 Pages).
Mohammadmahdi Ghiji, Vasily Novozhilov, Khalid Moinuddin, Paul Joseph, Ian Burch, Brigitta Suendermann, Grant Gamble, MDPI, "A Review of Lithium-Ion Battery Fire Suppression" Oct. 1, 2020 (30 Pages).

(56) References Cited

OTHER PUBLICATIONS

J. G. Quintiere, QDOT LLC, "Literature Review: Packaging Technique to to Defeat Fires and Explosions due to Lithium-ion and Related High-Energy-Density Batteries" Mar. 2020 (64 Pages).
Safety Report titled "Safety Risks to Emergency Responders from Lithium-ion Battery Fires in Electric Vehicles", National Transportation Safety Board, Nov. 13, 2020 (80 Pages).
D. Roosendans, K. Van Wingerden, M.N. Holme, P. Hoorelbeke, "Experimental investigation of explosion mitigating properties of aqueous potassium carbonate solutions" Feb. 20, 2017 (19 Pages).
General Information Sheet for Wildland Fire Chemical Products: Toxicity and Environmental Concerns, Wildland Fire Chemical Systems, USDA WFS, Jan. 17, 2007 (2 Pages).
J. W. Hastie, "Molecular Basis of Flame Inhibition" Jul. 19, 1973 (22 Pages).
Specification Document for Water Enhancers for Wildland Firefighting, U.S. Department of Agriculture Forest Service, Jun. 1, 2007 (24 Pages).
Specification Document for Fire Suppressant Foam for Wildland Firefighting (Class A Foam), U. S. Department of Agriculture Forest Service, Jun. 1, 2007 (31 Pages).
Product Brochure for Surfactant-Loaded-Citrate, Jungbunzlauer Suisse AG, Jan. 2018 (8 Pages).
Safety Data Sheet for Lankem BioLoop 84L, Lankem Ltd, Feb. 18, 2018 (7 Pages).
2 Technical Data Sheet for Lankem BioLoop 84L, Lankem Ltd, Feb. 2018 (12 Pages).
Safety Data Sheet for Lankem BioLoop 68L, Lankem Ltd, May 3, 2020 (7 Pages).
Technical Data Sheet for Lankem BioLoop 68L, Lankem Ltd, May 2020 (2 Pages).
Safety Data Sheet for The Amazing Doctor Zymes Eliminator, The Amazing Doctor Zymes, Jul. 10, 2017 (2 Pages).
Safety Data Sheet for Polyphase PW40, Troy Corporation, Aug. 23, 2018 (14 Pages ).
Binu Kundukad, Gayathri Udayakumar, Erin Grela, Dhamanpreet Kaur, Scott A. Rice, Staffan Kjelleberg, Patrick S. Doyle, Elsevier, "Biofilm: Weak acids as an alternative anti-microbial therapy" Jan. 15, 2020 (8 Pages).
Blog Article titled, "Cleaning and Killing Black Mold with Common, Non-Toxic, Household Products" captured on Feb. 1, 2021 at https://www.lifemaideasy.com/cleaning-and-killing-black-mold-w (pp. 1-9).
Data Sheet for SNS-D2 C Alltural Disease and Fungal Control Application & Use Guide, Sierra Natural Science, Jan. 2020 (pp. 1-7).
Jungbunzlauer Suisse AG, "Trisodium Citrate Anhydrous" Feb. 2021 (4 Pages ).
Screenshot of webpage for Lankem Products, Lankem Ltd, captured on Feb. 7, 2021 at https://www.lankem.com/products (1 Page ).
Screenshot of webpage for Lankem Bioloop Surfactants, Lankem Ltd, captured on Feb. 7, 2021 at https://www.lankem.com/bioloop-surfactants (1 Pag 1).
Office Action (Non-Final Rejection) dated Oct. 6, 2022 for U.S. Appl. No. 17/497,946 (pp. 1-6).
Office Action (Non-Final Rejection) dated Oct. 6, 2022 for U.S. Appl. No. 17/497,945 (pp. 1-6).
Technical Brochure titled "Product Range: Bio-Based Ingredients", No. 217, by Jungbunzlauer Suisse AG, Basel Switzerland, 2017 (16 Pages).
Technical Brochure titled "Specialty Salts: Functional Minerals", No. 038, by Jungbunzlauer Suisse AG, Basel Switzerland, 2017 (16 Pages).
International Search Report (ISR) and Written Opinion of The International Searching Authority (WO) dated Jun. 8, 2022 issued in PCT International Patent Application No. PCT/US22/15004 filed Feb. 2, 2022 by Applicant, M-Fire Holdings LLC, Assigned to Mighty Fire Breaker LLC, (37 Pages).
Office Action (Non-Final Rejection) dated Oct. 6, 2022 for U.S. Appl. No. 17/497,962 (pp. 1-5).
Office Action (Non-Final Rejection) dated Oct. 11, 2022 for U.S. Appl. No. 17/497,948 (pp. 1-5).
PLabat-Anderson Incorporated, "Human Health Risk Assessment: Wildland Fire-Fighting Chemical" Prepared for Missoula Technology and Development Center USDA Forest Service, Missoula, MT, Mar. 17, 2003 (37 Pages).
Autodesk, Inc., "AUTODESK® BIM 360 Docs: A Cloud-Based Document Management Service for Construction Project and Project Teams," 2016 (1 Pages).
Autodesk, Inc., "AUTODESK® BIM 360 Docs: A Cloud-Based Document Management Service for Construction Project and Project Teams," 2017 (2 Pages).
Autodesk, Inc., Sander Lijbers, AEC Industry Manager, Presentation at CADAC BIM Congres 2015 on AUTODESK® BIM 360®, 2015 (33 Pages).
Procore Technologies, Inc, Brochure for Procore® Cloud-Based Construction Management Software, Nov. 2018, (11 Pages).
Procore Technologies, Inc, Brochure for Procore® Construction Operating System and Cloud-Based Construction Management System , 2018, (15 Pages).
National Enhanced Oil Recovery Initiative (NEORI), "Recommended Modifications To The 45Q Tax Credit For Carbon Dioxide Sequestration", Feb. 2012, (12 Pages).
Woodworks, "Options for Brick Veneer on Mid-Rise Wood-Frame Buildings", Oct. 2015, (pp. 1-8).
Mamoru Kohno, "Outline of the Fire Resistance Verification Method in the Building Standard Law of Japan", May 2000, (pp. 1-7).
Australian Building Codes Board, "NCC 2019, Fire Safety Verification Method", Jan. 2018, (pp. 1-95).
Tzoulis et al. Emerging Traceability Technologies as a Tool for Quality Wood Trade. Procedia Technology 8 ( 2013 ) 606-611.
Iacovidou et al. The use of smart technologies in enabling construction components reuse: A viable method or a problem creating solution? Journal of Environmental Management 216 (2018) 214-223. Online May 5, 2017.
Bergman et al. The Carbon Impacts of Wood Products. Forest Products Journal vol. 64, No. 7/8. 2014.
Taylor et al. EPD-Environmental Product Declarations for Wood Products—An Application of Life Cycle Information About Forest Products. Forest Products Journal, vol. 61, No. 3, pp. 192-201; 2011.
Office Action (Non-Final Rejection) dated Jun. 28, 2022 for U.S. Appl. No. 16/029,861 (pp. 1-11).
Office Action dated Mar. 2, 2023 for U.S. Appl. No. 16/029,861 (pp. 1-8).
Office Action (Notice of Allowance and Fees Due (PTOL-85)) dated Sep. 20, 2023 for U.S. Appl. No. 16/029,861 (pp. 1-9).
Office Action (Non-Final Rejection) dated Jun. 5, 2024 for U.S. Appl. No. 18/492,642 (pp. 1-9).
Office Action (Non-Final Rejection) dated Jun. 5, 2024 for U.S. Appl. No. 18/492,649 (pp. 1-10).
Office Action dated May 9, 2024 for U.S. Appl. No. 18/487,044 (pp. 1-7).
Office Action (Non-Final Rejection) dated Aug. 28, 2024 for U.S. Appl. No. 18/432,017 (pp. 1-10).
Office Action (Notice of Allowance and Fees Due (PTOL-85)) dated Sep. 3, 2024 for U.S. Appl. No. 18/496,866 (pp. 1-7).
Material Safety Data Sheet for FT JN1010-Green Firefighting Solution for Class A/B/C/D Fires, by Fire Terminator International Pte Ltd, Singapore 408 704, dated May 21, 2022 (4 Pages).
Material Safety Data Sheet for FT JN669-Green Firefighting Solution for Forest/Peat Fires, by Fire Terminator International Pte Ltd, Singapore 408 704, dated May 25, 2022 (4 Pages).
Material Safety Data Sheet for Fire Terminator Sachet (Class F / K Fires) by Fire Terminator International Pte Ltd, Singapore 408 704, dated May 25, 2022 (4 Pages).
Material Safety Data Sheet for FT Slam (Class A/B/C Fires) by Fire Terminator International Pte Ltd, Singapore 408 704, dated May 25, 2022 (4 Pages).
Hyun-Min Yang, The role of Organic and Eco-Friendly Inhibitors on the Corrosion Mitigation of Steel in Acidic Environments—A State-of-Art Review, Molecules 2021, 26, 3473 (20 Pages).

(56) References Cited

OTHER PUBLICATIONS

Brochure for GreenFire Pro Defense Wetting Agent, by Fire Suppression Innovations, Placentia CA, Jul. 2022 (2 Pages).
CutSheet for GreenFire Pro Defense Wetting Agent, by Fire Suppression Innovations, Placentia CA, Jul. 1, 2022 (2 Pages).
SDS for GreenFire Pro Defense Wetting Agent, by Fire Suppression Innovations, Placentia CA, Aug. 16, 2022 (4 Pages).
Huang Yinsheng, Zhang Wencheng, Dai Xiaojing, and Zhao Yu, "2012 International Symposium on Safety Science and Technology Study on water-based fire extinguishing agent formulations and properties", Published by Elsevier Ltd. Selection and/or peer-review under responsibility of the Beijing Institute ofTechnology, 2012, (6 Pages).
Office Action (Non-Final Rejection) dated Sep. 9, 2024 for U.S. Appl. No. 18/432,018 (pp. 1-12).
Trackabout, "Asset Tracking Industry Selection Guide", Nov. 2017, (pp. 1-8).
Trackabout, "Follow-On Tracking", Jan. 2013, (pp. 1-2).
United Nations, "Globally Harmonized System of Classification and Labelling of Chemicals (GHS)", Oct. 2011, (pp. 1-568).
Office Action dated Feb. 26, 2019 for US App. No. 15/952, 183 (pp. 1-12).
Notice of Allowance dated Jan. 18, 2019 for U.S. Appl. No. 15/921,617 (pp. 1-7).
Notice of Allowance dated Apr. 10, 2019 for U.S. Appl. No. 15/866,454 (pp. 1-5).
Notice of Allowance dated May 13, 2019 for U.S. Appl. No. 15/874,874 (pp. 1-5).
Office Action dated Mar. 18, 2020 for U.S. Appl. No. 16/449,389 (pp. 1-5).
Notice of Allowance dated Oct. 29, 2020 for U.S. Appl. No. 16/449,389 (pp. 1-5).
Corrected Notice of Allowability dated Dec. 23, 2020 for U.S. Appl. No. 16/449,389 (pp. 1-4).
Notice of Allowance dated Feb. 11, 2021 for U.S. Appl. No. 16/449,389 (pp. 1-7).
Briefing "Assessing Aerial Suppresion Drop Effectiveness", Issue 38, Sep. 2009, Fire Note Background Briefs, published jointly by theBushfire Cooperative Research Centre (Bushfire CRC ) and the Australasian Fire and Emergency Service Authorities Council (AFAC) (4 Pages).
USDA Forest Service "Guidelines for Aerial Delivery of Retardant or Foam Near Waterways", USDA Forest Service, Apr. 2000 (2 Pages).
USDA Forest Service List of Long-Term Retardant for Wildland Fire Management—Pretreatment—Product Qualified by US Forest Service in Accordance with Forest Service Specification 5100-301d, US Forest Service, Washington Office, Fire & Aviation Management, Aug. 5, 2023 (1 Page).
Canadian Interagency Forest Fire Centre (CIFFC) Products Meeting the Canadian Specification for Longh-Term Retardants (Meeting Qualifying Performance Requiremens for Long-Term Fire Retardants and Pretreatment Produts, US Forest Service 5100-304d, Canadian Interagency Forest Fire Centre (CIFFC) , Fire & Aviation MAnagement, May 5, 2024 (2 Pages).
USDA Forest Service List of Long-Term Retardant for Wildland Fire Management—Aerial Applications—Qualified by US Forest Service in Accordance with Forest Service Specification 5100-301d, US Forest Service, Washington Office, Fire & Aviation Management, May 5, 2024 (2 Pages).
Bo Madsen and E. Kristofer Gamstedt, Review Article "Wood versus Plant Fibers: Similarities and Differences in Composite Applications", Hindawi Publishing Corporation Advances in Materials Science and Engineering vol. 2013, Article ID 564346, (14 pages).
USDA Forest Service Product Information on Phos-Chek Fortify Pretreatment Retardant, Gum Thickened, Low Viscosity, Colorless, USDA Forest Service, Nov. 2021 (1 Page).
USDA Forest Service Product Information on Phos-Chek LCE20W Pretreatment Retardant, Gum Thickened, Low Viscosity, Colorless, USDA Forest Service, Nov. 2021 (1 Page).
Tyco, "AquaMist Introduction" by Steve Burton, Certfied Fire Engineer, Tyco Fire Protection Products, Nov. 2015, (pp. 1-108).
Cease Fire, "CFCA 900 Clean Agent Fire Supression System Unit Specifications", Nov. 2017, (pp. 1).
Stephen Preece, Paul Mackay, Adam Chattaway, "The Cup Burner Method—Parametric Analysis of the Factors Influencing the Reported Extinguishing Concentrations of Inert Gases", Jan. 2001, (pp. 1-13).
Elsevier, Chao Man, Zhu Shunbing, Jia Litao, Wu Xiaoli, "Surfactant-containing Water Mist Suppression Pool Fire Experiemental Analysis", Oct. 2010, (pp. 1-7).
National Fire Protection Inc., "FM-200 / HFC-227ea: Clean Agent Fire Suppression", Jan. 2016, (pp. 1-5).
Elsevier, Qiang Chen, Jun-Cheng Jiang, Fan Wu, Meng-Ya Zou, "Performance Evaluation of Water Mist with Mixed Surfactant Additives Based on Absorption Property", Dec. 2017, (pp. 1-9).
Newszak, "Hfc-227Ea Fire Extinguishers Market Outlook 2023: Top Companies, Trends and Future Prospects Details for Business Development", Sep. 2018, 5 pages.
Cease Fire, "Why Choose Waterless Fire Suppression", Sep. 2018, (pp. 1-2).
Kostas D. Kalabokidis, "Effects of Wildfire Suppression Chemicals on People and the Environment—A Review", Sep. 2000, (pp. 1-9).
Ted A. Moore, Joseph L. Lifke, Robert E. Tapscott, "In Search of an Agent for the Portable Fire Extinguisher", Jan. 1996, (pp. 1-12).
Navair, "NATOPS U.S. Navy Aircraft Firefighting Manual", Oct. 2003, (pp. 1-200).
Robert L. Darwin, Hughes Associates Inc., "Aircraft Carrier Flight and Hangar Deck Fire Protection: History and Current Status", Jan. 2001, (pp. 1-102).
Navair, "Natops U.S. Navy Aircraft Emergency Rescue Information Manual", Jan. 2009, (pp. 1-288).
Tyco, "NOVEC 1230: Gaseous Fire Suppression Solution", Feb. 2013, (pp. 1).
Tyco, "Gaseous Fire Suppression Systems", Sep. 2013, (pp. 1-16).
3M, "Novec 1230 : Specification", Jan. 2018, (pp. 1-10).
Boss Products, "EcoMAXX Brochure", Apr. 2016, (pp. 1-2).
FLIR, "Application Story: Impact Thermal Imaging Camera From FLIR Continuously Monitors Packaging Quality", Nov. 2017, (pp. 1-2).
FLIR, "Application Story: FLIR Arms Intelligent Power Inspection Robot with 'Hot Eye", Nov. 2017, (pp. 1-2).
National Instruments, "Imaq Vision Concepts Manual", Oct. 2000, (pp. 1-313).
FLIR, "FLIR A315/A615", Jan. 2018, (pp. 1-8).
Hartindo, "AF31 Air Bombing Screenshots", Nov. 2017, (pp. 1-4).
Canada Department of Forest and Rural Development, Ottawa, Canada, "The Sprayer-Duster As A Tool For Forest Fire Control", D. G. Fraser, Forestry Branch Departmental Publication No. 1167, 1967 (19 Pages).
Turbo Technologies, Inc. "Specifications for Turbo Turf's HY-750-HE Hybrid Hydroseeder", https://turboturf.com/hy-750-he/, Jan. 2018, (4 Pages).
Dealer News, "SiteOne Introduces New LESCO Smart Guided Precision Spray System", Nov. 5, 2018, https://www.rurallifestyledealer.com/articles/7715-siteone-introduc , (4 Pages).
Erdal Ozkan, Ohio State University Professor and Extension Agriculture Engineer, "One-of-a-kind Intelligent Sprayer Being Developed in Ohio", Jun. 20, 2018, https://www.michfb.com/MI/Farm-News/One-of-a-kind-Intelligent-sprayer-being-developed-in-Ohio/, (6 Pages).
Chip Tuson, Ohio State News, "World's First "Intelligent" Sprayer", Aug. 2, 2018, https://news.osu.edu/the-worlds-first-intelligent-sprayer/, (4 Pages).
Mylene Merlo, "San Diego Wildfires, Parts 1, 2, 3 and 4: Myths and Reality", Jun. 2, 2014, http://www.mylenemerlo.com/blog/san-diego-wildfires-myths-reality/ , (42 Pages).
North American Green, Inc., Installation Guide for HydroMax™ Hydraulic Erosion Control Products, Dec. 2017, http://www.nagreen.com, (2 Pages).

(56) References Cited

OTHER PUBLICATIONS

USDA, Natural Resources Conservation Service, Denver Colorado, “2012 Fact Sheet on HydroMulching”, 2012, (2 Pages).
R. W .. Walker, “Free Radicals in Combustion Chemistry”, Science Progress Oxford, 1990, vol. 74, No. 2, pp. 163-188, (22 Pages).
Office Action mailed Sep. 19, 2019 for US App. No. 15/911, 172 (pp. 1-8).
Product Brochure for Longray Model: TS-18 Truck-Mounted ULV Cold Fogger, Shenzhen Longray Technology Co., Ltd., Shenzhen, China, 2013, (1 Page Total).
Technical Paper titled “Jungbunzlauer Tripotassium Citrate: Environmental and Health Friendly Flame Retardant in Wood Application”, Product Group Special Salts, by Jungbunzlauer Suisse AG, Basel Switzerland, Aug. 10, 2020 (2 Pages).
Angus Fire Ltd., “TankMaster: Which Foam to Use for Hydrocarbon Tank Fires” Jan. 2004 (23 Pages ) 17.
Office Action dated Dec. 9, 2020 for U.S. Appl. No. 16/805,811 (pp. 1-9).
PHOS-CHEK® LC95W Safety Data Sheet, Version 1.1, Issue Date Mar. 18, 2019, Published by Perimeter Solutions, LP, (5 Sheets).
Product Brochure PCE-2019052-0 for PHOS-CHEK® Pc Avenger All-Terrain Mobile Unit, Published by Perimeter Solutions, LP, 2019, (12 Sheets).
Product Brochure PCE-2019058-0 for PHOS-CHECK® Fabricated Equipment Solutions, by Perimeter Solutions, LP., 2019, (4 Sheets).
Product Brochure PCC-2019057-0 for PHOS-CHECK® Airbase and Mobile Services Guide, by Perimeter Solutions, LP, 2020, (12 Sheets).
Press Release by Perimeter Solutions, Inc,. published Oct. 8, 2020, “Perimeter Solutions and CCSAA Group Partner to Provide Wildfire Defense”, Perimeter Solutions, LP, (2 Sheets).
Product Brochure PCC-2019019-0 for PHOS-CHEK® Ground Applied Long-Term Fire Retardant Groun Application, by Perimeter Solutions, LP, 2020, (6 Sheets).
Product Brochure PCC-2019014-0 for PHOS-CHEK® Code—Combined On Demand Equipment (CODE)—Mobile Multi-Chemical System, by Perimeter Solutions, LP, 2020, (4 Sheets).
Product Brochure for PHOS-CHEK® Wildfire Home Defense Authorizd Service Provider Program, Perimeter Solutions, LP, 2020, (1 Sheet).
Product Label for PHOS-CHEK® Wildfire Home Defense Long-Term Fire Retardant Concentrated Formula (0.75 Makes 5 Gallons) and Easy Mixing and Spraying Instructions, Perimeter Solutions, LP, 2020, (2 Sheets).
Produce Brochure for PCC-2020064 PHOS-CHEK® Preventive Wildfire Solutions Using PHOS-CHEK® Long-Term Retardants—PHOS-CHEK® Fortify Fire Retardant and PHOS-CHEK® LC95/259-FX Fire Retardant Technology, Perimeter Solutions, LP, 2020, (2 Sheets).
Product Catalogue for Foam Tech Brand of Anti-Fire Chemicals, FoamTech Antifire Company, Kundli, India, Aug. 2021 (9 Pages).
Website Pages from Frontline Wildfire Defense Systems, System Brochure, captured from https://www.frontlinewildfire.com/ on Mar. 8, 2021, Frontline Wildfire Defense Systems, Wildomar, California, (5 Pages).
Website Pages from Fire Break Protection Systems Inc., captured from https://www.dnb.com/business-directory/company-profiles.fire_break_protection_systems.04a9c4cc966d5ffce0e52d19515a79a7.html on Mar. 8, 2021, Fire Break Protection Systems, Simi Valley, California, (6 Pages).
Website Pages from Perimeter Solutions Inc. regarding PHOSCHEK® Fortify® Fire Retardant, Perimeter Solutions Inc., captured at https://www.perimeter-solutions.com/fire-safety-fire-retardants/phos-chek-fortify/ on Jun. 15, 2021, (5 Pages).

* cited by examiner

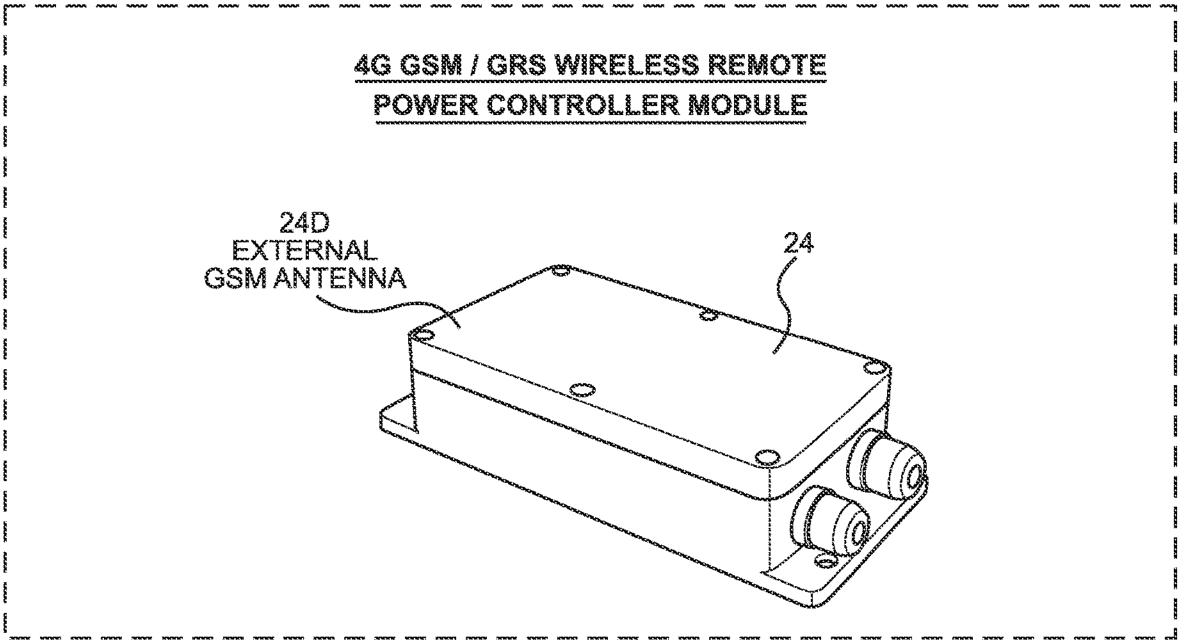
FIG. 3C1
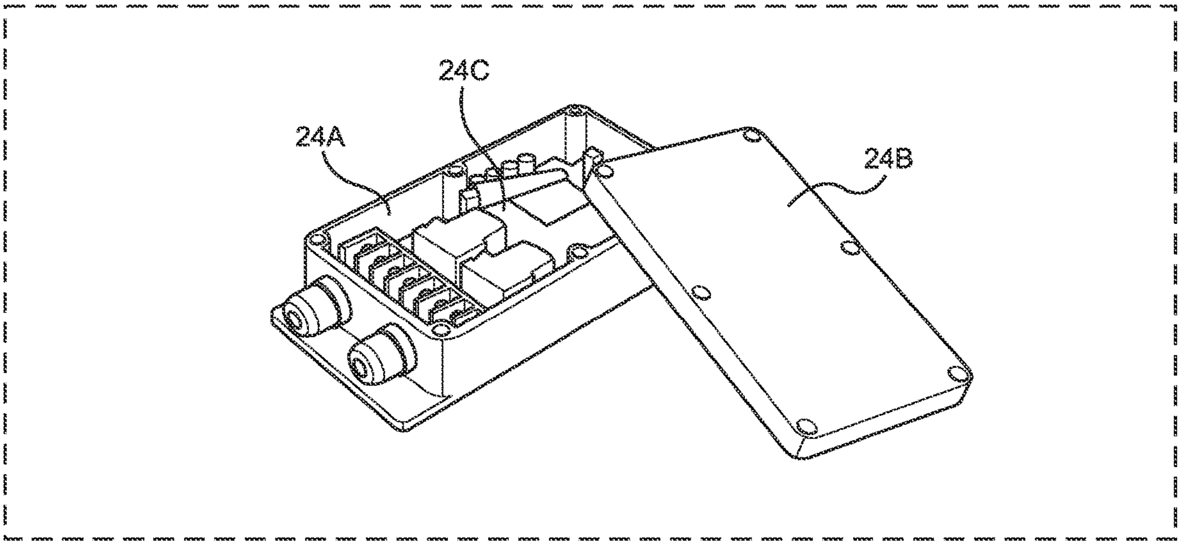
FIG. 3C2

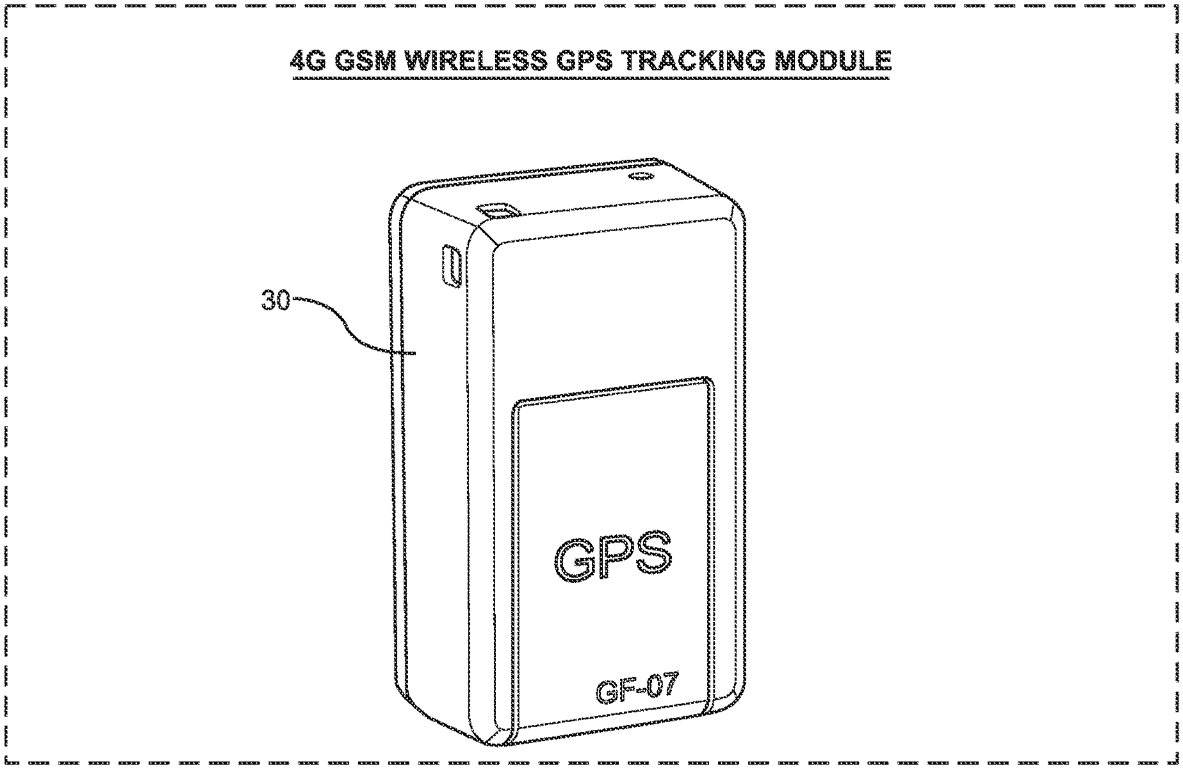
FIG. 3D1
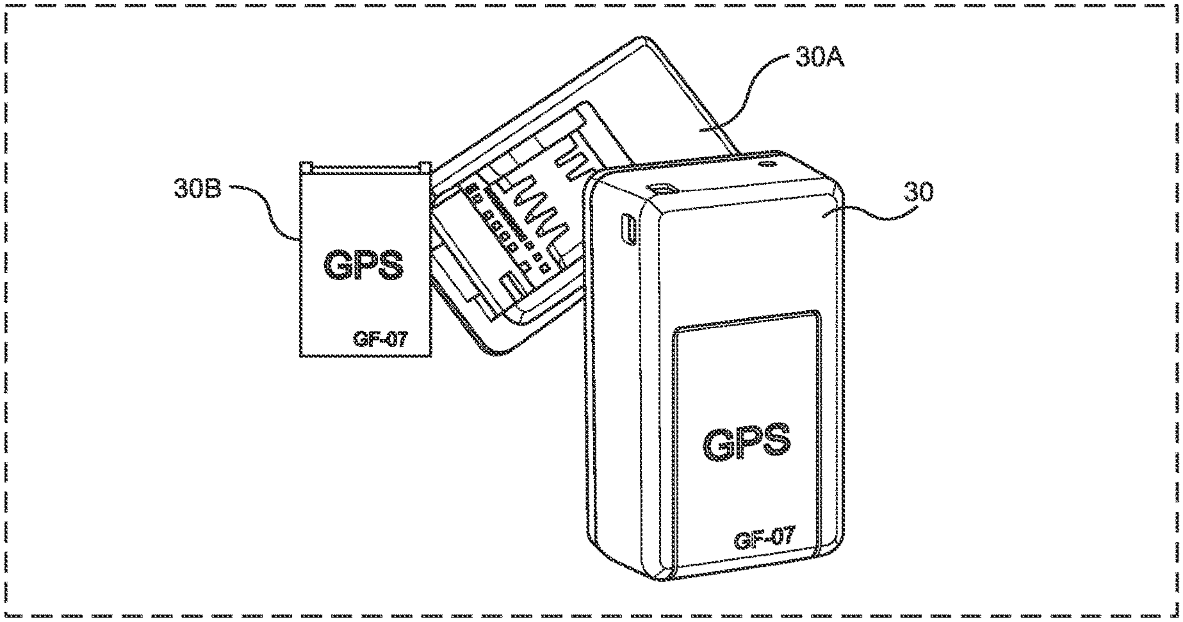
FIG. 3D2

SPRINKLER SPRAYHEAD

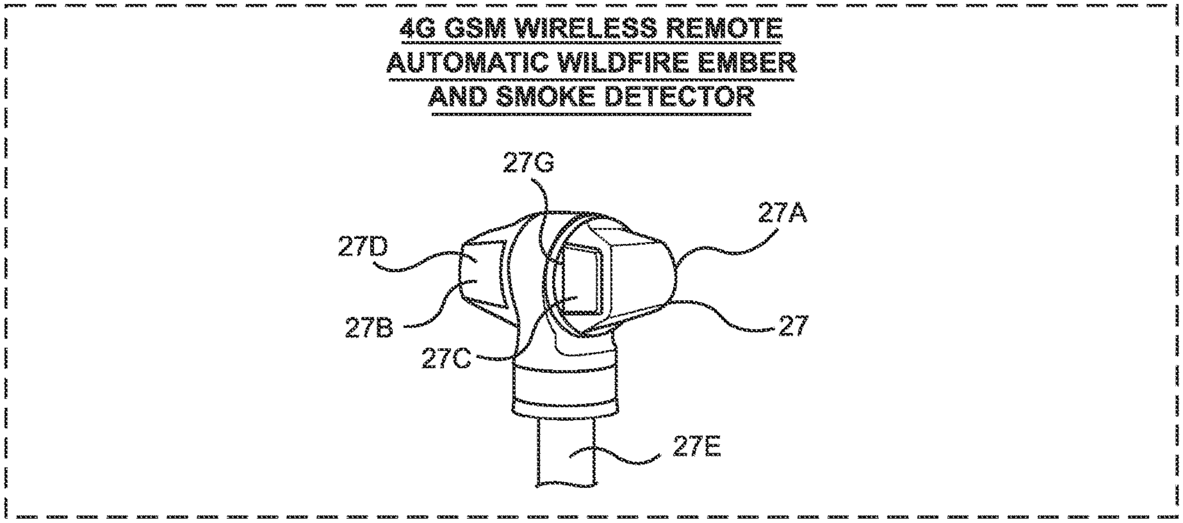
FIG. 3F1
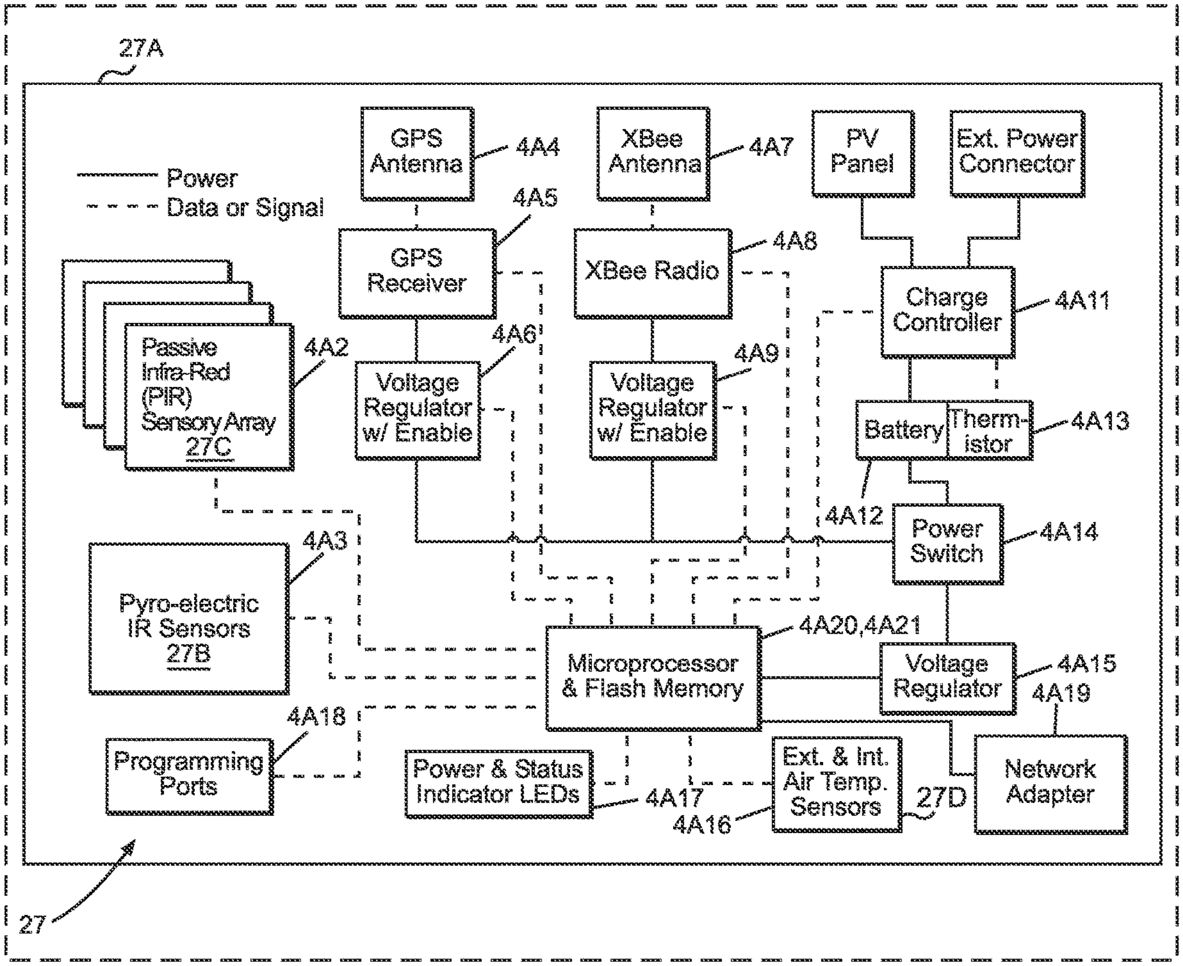
FIG. 3F2

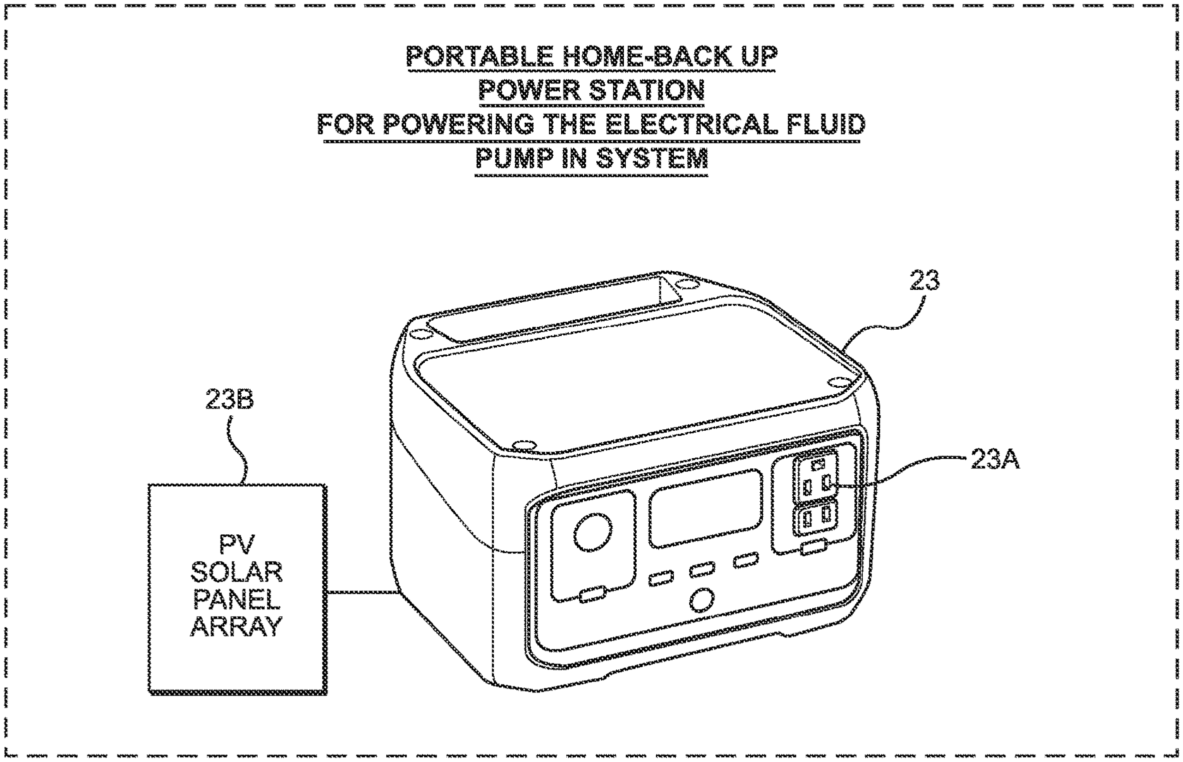
FIG. 3I1
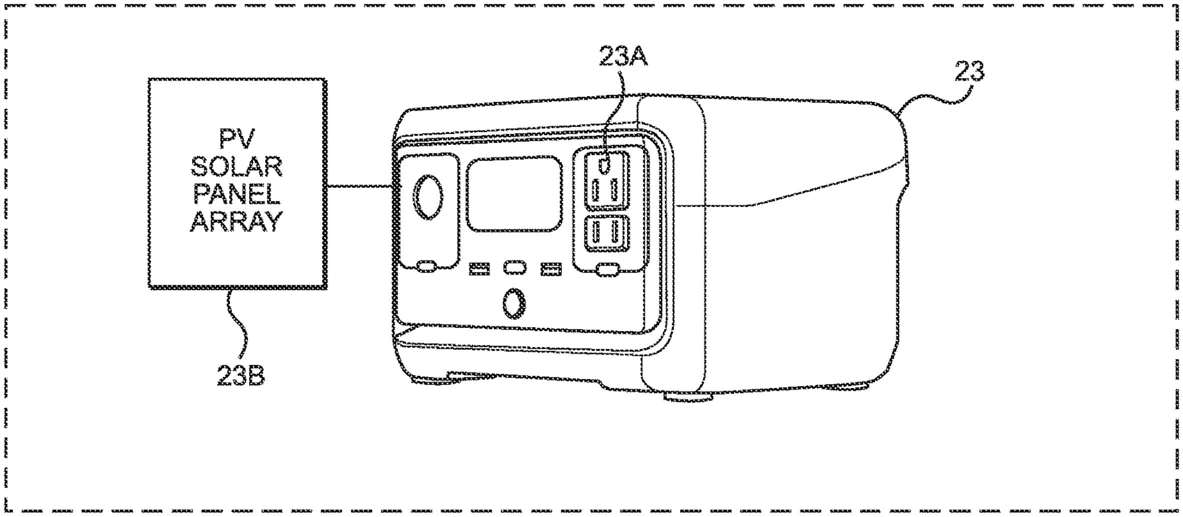
FIG. 3I2

TWO-WAY FLOW VALVE ASSEMBLY USED TO CONTROL (I) THE FLOW OF WATER FROM A WATER SOURCE INTO THE ELECTRIC PUMP WHEN ARRANGED IN ITS FIRST FLOW POSITION DURING SPRINKLER SPRAY HEAD TESTING OPERATIONS, AND (II) THE FLOW OF CITROTECH® LIQUID FIRE INHIBITOR FROM THE STORAGE TANK INTO THE ELECTRIC PUMP WHEN ARRANGED IN ITS SECOND FLOW POSITION WHEN THE SYSTEM IS CONFIGURED FOR FIRE INHIBITOR SPRAYING OPERATIONS

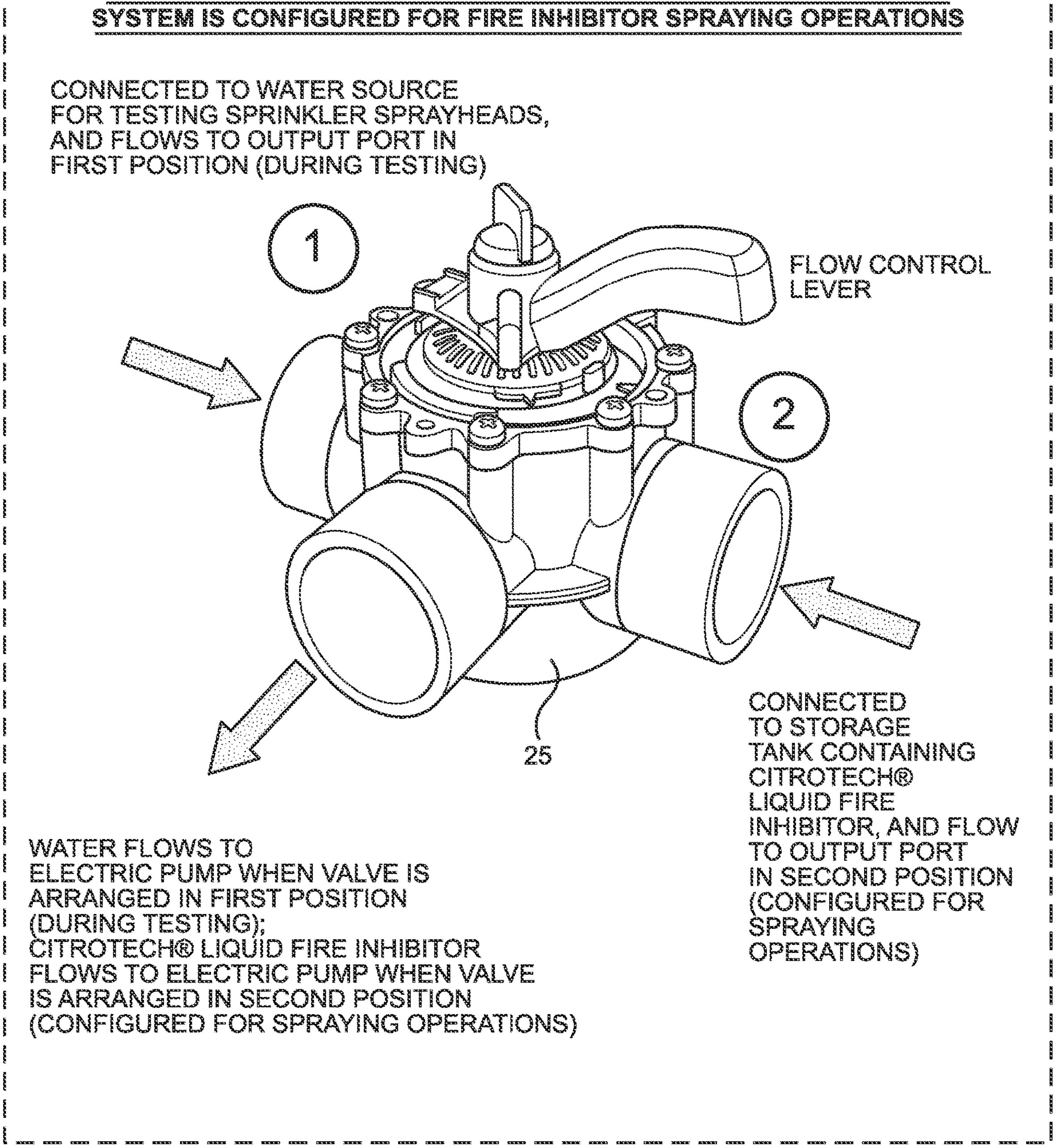

FIG. 3J

ELECTRICALLY-POWERED TEMPERATURE-CONTROLLED IMMERSIBLE HEATER FOR CHEMICAL LIQUID STORED IN THE STORAGE TANK OF THEWILDFIRE DEFENSE SPRAYING SYSTEM (OPTIONAL)

ELECTRICALLY-POWERED TEMPERATURE-CONTROLLED HEATING BLANKET FOR WRAPPING ABOUT THE STORAGE TANK USED IN THE WILDFIRE DEFENSE SPRAYING SYSTEM
(OPTIONAL)
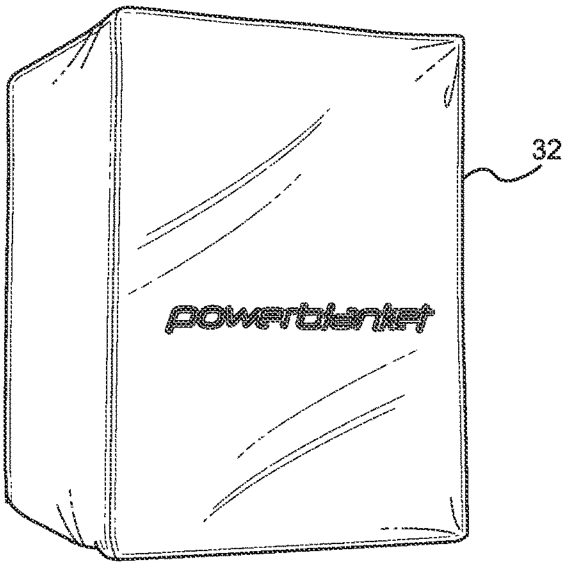
FIG. 3L1
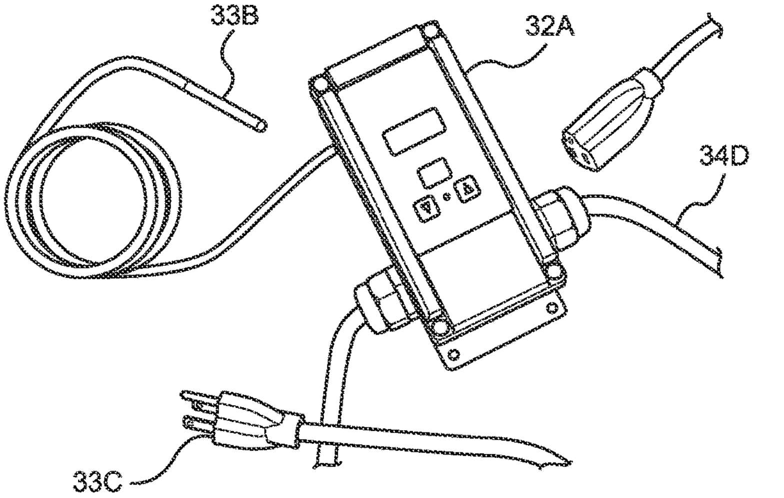
FIG. 3L2

WILDFIRE INHIBITOR BIOCHEMICAL COMPOSITION (LIQUID FORM)

Potassium citrate

Names

IUPAC name
tripotassium citrate

Formula: $C_6H_7K_3O_8$

Melting Point: 275 C (527 F)

Solubility in water: 226 g/L (20°C)

+

Triethyl citrate[1]

Names

IUPAC name
Triethyl citreate[2]

(Ester of citric acid)

Formula: $C_{12}H_{20}O_7$

Melting Point: -55F (-67 C)

Solubility in water: 65 g/L

Boiling Point: 561.2 F (294C)

+

35

The asymmetric unit of the title compound, showing the atom numbering. Atoms are represented by 50% probability spheroids.

The crystal structure of $K_3C_6H_5O_7$, view down the c axis, with coordination spheres of the potassium cations in polyhedral representation.

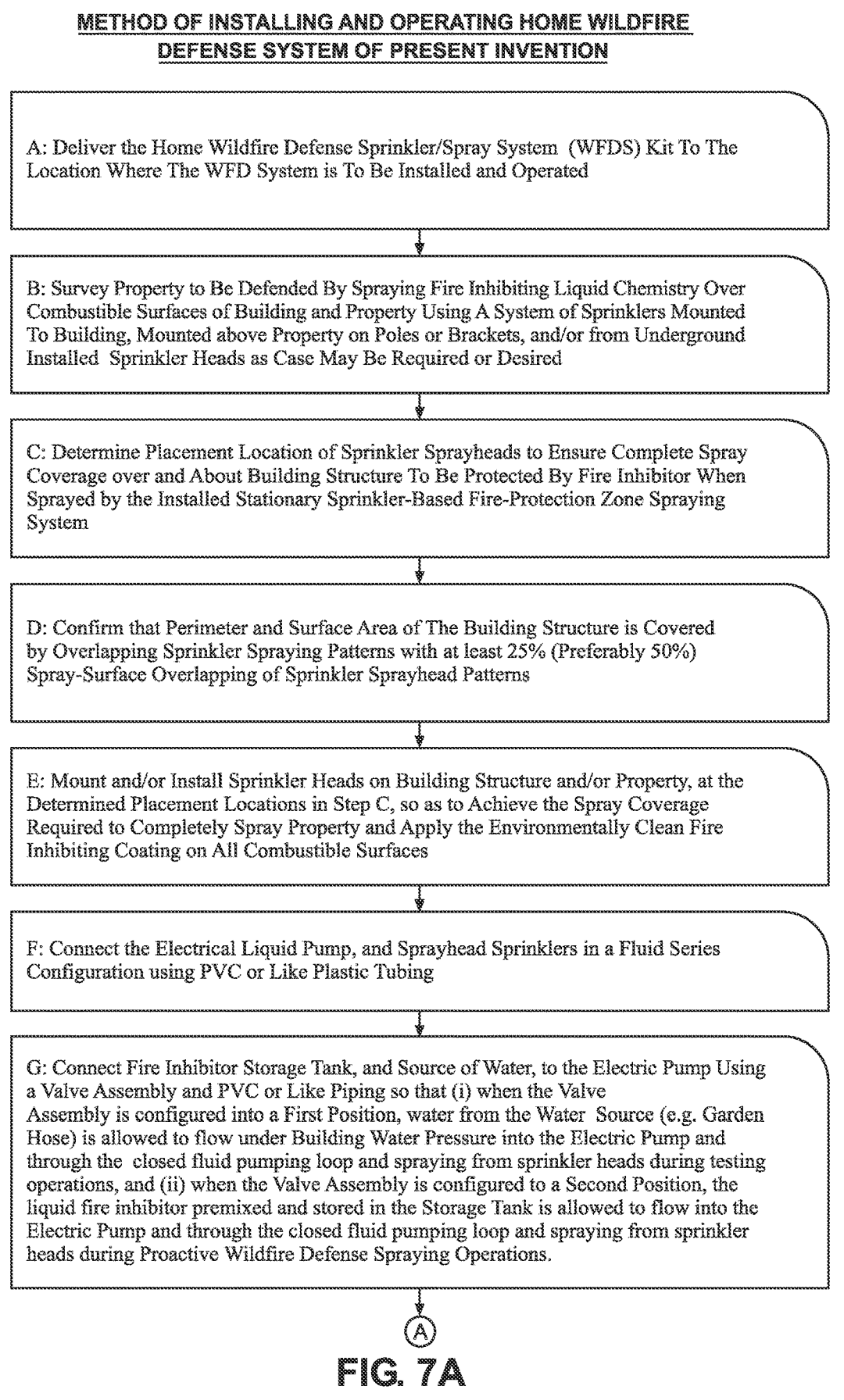

METHOD OF INSTALLING AND OPERATING HOME WILDFIRE DEFENSE SYSTEM OF PRESENT INVENTION

A: Deliver the Home Wildfire Defense Sprinkler/Spray System (WFDS) Kit To The Location Where The WFD System is To Be Installed and Operated

↓

B: Survey Property to Be Defended By Spraying Fire Inhibiting Liquid Chemistry Over Combustible Surfaces of Building and Property Using A System of Sprinklers Mounted To Building, Mounted above Property on Poles or Brackets, and/or from Underground Installed Sprinkler Heads as Case May Be Required or Desired

↓

C: Determine Placement Location of Sprinkler Sprayheads to Ensure Complete Spray Coverage over and About Building Structure To Be Protected By Fire Inhibitor When Sprayed by the Installed Stationary Sprinkler-Based Fire-Protection Zone Spraying System

↓

D: Confirm that Perimeter and Surface Area of The Building Structure is Covered by Overlapping Sprinkler Spraying Patterns with at least 25% (Preferably 50%) Spray-Surface Overlapping of Sprinkler Sprayhead Patterns

↓

E: Mount and/or Install Sprinkler Heads on Building Structure and/or Property, at the Determined Placement Locations in Step C, so as to Achieve the Spray Coverage Required to Completely Spray Property and Apply the Environmentally Clean Fire Inhibiting Coating on All Combustible Surfaces

↓

F: Connect the Electrical Liquid Pump, and Sprayhead Sprinklers in a Fluid Series Configuration using PVC or Like Plastic Tubing

↓

G: Connect Fire Inhibitor Storage Tank, and Source of Water, to the Electric Pump Using a Valve Assembly and PVC or Like Piping so that (i) when the Valve Assembly is configured into a First Position, water from the Water Source (e.g. Garden Hose) is allowed to flow under Building Water Pressure into the Electric Pump and through the closed fluid pumping loop and spraying from sprinkler heads during testing operations, and (ii) when the Valve Assembly is configured to a Second Position, the liquid fire inhibitor premixed and stored in the Storage Tank is allowed to flow into the Electric Pump and through the closed fluid pumping loop and spraying from sprinkler heads during Proactive Wildfire Defense Spraying Operations.

↓

(A)

FIG. 7A

METHOD OF INSTALLING AND OPERATING HOME WILDFIRE DEFENSE SYSTEM OF PRESENT INVENTION

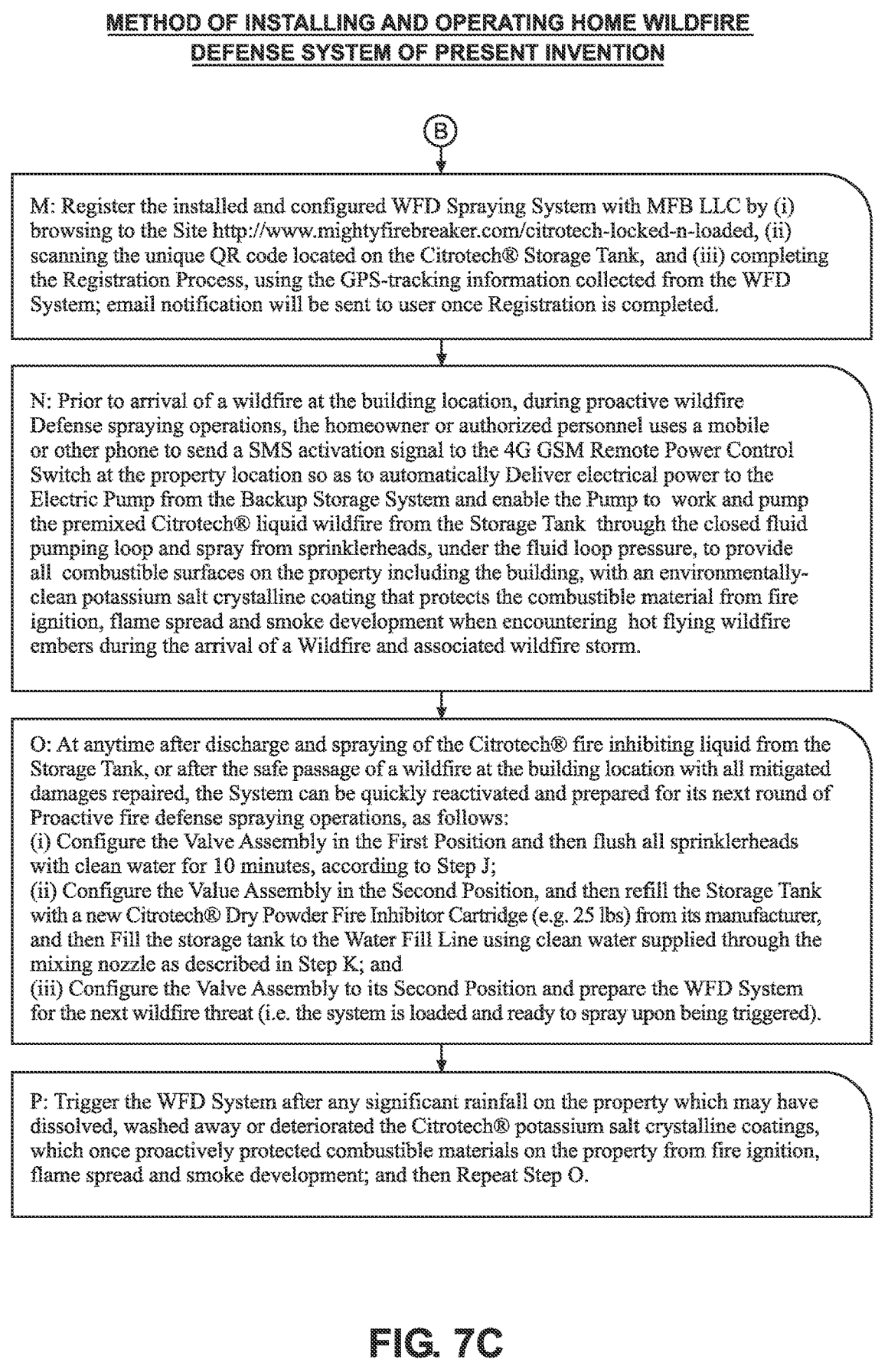

METHOD OF INSTALLING AND OPERATING HOME WILDFIRE DEFENSE SYSTEM OF PRESENT INVENTION (B)

M: Register the installed and configured WFD Spraying System with MFB LLC by (i) browsing to the Site http://www.mightyfirebreaker.com/citrotech-locked-n-loaded, (ii) scanning the unique QR code located on the Citrotech® Storage Tank, and (iii) completing the Registration Process, using the GPS-tracking information collected from the WFD System; email notification will be sent to user once Registration is completed.

N: Prior to arrival of a wildfire at the building location, during proactive wildfire Defense spraying operations, the homeowner or authorized personnel uses a mobile or other phone to send a SMS activation signal to the 4G GSM Remote Power Control Switch at the property location so as to automatically Deliver electrical power to the Electric Pump from the Backup Storage System and enable the Pump to work and pump the premixed Citrotech® liquid wildfire from the Storage Tank through the closed fluid pumping loop and spray from sprinklerheads, under the fluid loop pressure, to provide all combustible surfaces on the property including the building, with an environmentally-clean potassium salt crystalline coating that protects the combustible material from fire ignition, flame spread and smoke development when encountering hot flying wildfire embers during the arrival of a Wildfire and associated wildfire storm.

O: At anytime after discharge and spraying of the Citrotech® fire inhibiting liquid from the Storage Tank, or after the safe passage of a wildfire at the building location with all mitigated damages repaired, the System can be quickly reactivated and prepared for its next round of Proactive fire defense spraying operations, as follows:
(i) Configure the Valve Assembly in the First Position and then flush all sprinklerheads with clean water for 10 minutes, according to Step J;
(ii) Configure the Value Assembly in the Second Position, and then refill the Storage Tank with a new Citrotech® Dry Powder Fire Inhibitor Cartridge (e.g. 25 lbs) from its manufacturer, and then Fill the storage tank to the Water Fill Line using clean water supplied through the mixing nozzle as described in Step K; and
(iii) Configure the Valve Assembly to its Second Position and prepare the WFD System for the next wildfire threat (i.e. the system is loaded and ready to spray upon being triggered).

P: Trigger the WFD System after any significant rainfall on the property which may have dissolved, washed away or deteriorated the Citrotech® potassium salt crystalline coatings, which once proactively protected combustible materials on the property from fire ignition, flame spread and smoke development; and then Repeat Step O.

FIG. 7C

WILDFIRE DEFENSE SPRAYING PROCESS FOR AUTOMATICALLY SPRAYING ENVIRONMENTALLY-CLEAN WATER-BASED LIQUID FIRE INHIBITOR OVER COMBUSTIBLE PROPERTY SURFACES TO FORM THIN FIRE-INHIBITING POTASSIUM SALT CRYSTALLINE COATINGS THEREON BEFORE PRESENCE OF WILDFIRE

RELATED CASES

The present Patent Application is a Continuation of copending U.S. patent application Ser. No. 18/329,979 filed Jun. 6, 2023, which is a Continuation-in-Part of co-pending: U.S. patent application Ser. No. 17/167,084 filed Feb. 4, 2021; and U.S. patent application Ser. No. 17/497,948 filed Oct. 10, 2021; wherein each said US Patent Application is commonly owned by Mighty Fire Breaker LLC and incorporated herein by reference as if fully set forth herein.

BACKGROUND OF INVENTION

Field of Invention

The present invention is directed towards improvements in science and technology applied in the defense of human and animal life and property, against the ravaging and destructive forces of wildfire.

Brief Description of the State of Knowledge in the Art

Over the past century, millions of people have developed and settled towns, counties and neighborhoods in regions that today are called the Wildfire Urban Interface (WUI), which are at high risk to wildfires, and this is impacting home owners and property insurance industry. For man to live and survive a sustainable future in the urban-wildfire interface, human society must quickly adapt to survive the destructive effects of wildfires.

Conventional methods of wildfire fighting defense include:

- Making firebreaks with bulldozers and shovels, which has not viable in most urbanized communities;
- Making firebreaks with backfires has proven ineffective in many cases, and often dangerous as wildfires themselves;
- Dropping PhosChek® AMP-based liquid chemical from 5000 feet heights in urban areas, which is dangerous and not viable or effective in wildfire defense;
- Thinning forests of dead trees and debris in urban regions, especially near power poles, buildings, and structures.

Current methods of wildfire defense and fighting are becoming unsustainable because the financial losses due to wildfire are exceeding what the insurance industry is willing to insure, as the damage caused by wildfire to the environment is typically catastrophic and destruction.

For several decades now, wildfire defense methods have proposed proactively spraying homes, buildings, and properties with chemical fire retardants—to defend against hot wildfire embers flying in the direction of prevailing winds, in search of combustible fuel.

In 2006, US Patent Application Publication No. 2006/0113403A1 (Aamodt of Firebreak Spray Systems LLC) disclosed a fire-retardant distribution system designed for use with any type of structure such as residences, out buildings, barns, commercial buildings, and others. This prior art system is designed to prevent structures from catching fire when a wildfire approaches, and relies upon a spray system that when activated coats the exterior of the structures, decks, and surrounding landscape very rapidly with a liquid, decolorized fire retardant that remains on the surface until washed off. The system is self-contained and relies upon tanks pressurized with inert gas to deliver the fire retardant to spray valves positioned on and around the structures and surrounding areas. In an alternate embodiment, compressed gas-powered pumps deliver fire retardant to desired areas to flank a wildfire and control its direction and behavior. In general, such firebreak spray systems are expense to install and use liquid fire retardants that are less than optimal from performance criteria, as well as from an environmental sustainability perspective.

Wildfire defense methods have also proposed the use of hydrogels as disclosed in U.S. Pat. Nos. 3,229,769 and 5,849,210, for the purpose of cooling the source of the fire by retaining water close to the flame. In general, such hydrogels are produced from a water-absorbing polymer and water. The hydrogel binds the water and so stops the water from flowing away from the source of the fire. Because hydrogels can maintain a large amount of water near the fire, hydrogels have a good immediate extinguishing effect. In contrast, the long-term effect of hydrogels is poor. Hydrogels can dry and thereby rapidly lose their effect. The remaining salt-like dried hydrogels have a very low fire-retarding effect.

U.S. Pat. No. 8,273,813 (assigned to BASF) also proposes combining water-absorbing polymers with fire-retarding salts to form fire-retarding compositions having a good immediate extinguishing effect and a good long-term effect, but are not ideal for use in automated firebreak spraying systems discussed above.

For over a decade, Hartindo's anti-fire (AF) chemical solution AF31 has been used in proactive fire defense applications including wildfire defense. While AF31 solution employs tripotassium citrate dissolved in water with minor amounts of a natural gum added to provide cling, the natural gum tends to clog spray nozzles requiring additional cleaning and maintenance, and adversely impacts many species of plant life including flowing plants, tender perennials, and vegetables.

Clearly, there is a great need in the art for better, more effective, and less expensive ways of and means for proactively defending property parcels, houses and buildings constructed thereon, from the threat of fire ignition and flame spread caused by hot wind-driven wildfire embers associated with wildfires.

OBJECTS AND SUMMARY OF THE PRESENT INVENTION

Accordingly, a primary object of the present is to provide new and improved home wildfire defense spraying system installation kit, and method of installing and operating the same on a parcel of property, for proactively spraying environmentally-clean liquid fire inhibitor on the property to inhibit fire ignition and flame spread caused by hot wind-driven wildfire embers, while overcoming the shortcomings and drawbacks of prior art methods and apparatus.

Another object of the present invention is to provide such a wildfire defense spraying system installation kit, wherein environmentally-clean wildfire inhibiting biochemical compositions in dry powder phase are pre-mixed and loaded in the storage tank of the spraying system, and ready for the addition of a proper quantity of water at the time of system installation and activation, to thereby formulate a high-performance liquid chemical fire inhibitor at the installation site in a simple and reliable manner, so that the system can automatically spray the liquid chemistry over combustible ground surfaces, native ground fuel, living plants, trees and shrubs, and when dried, forms thin potassium salt crystalline coatings having improved surface coverage and providing excellent inhibition to fire ignition, flame spread, and smoke development in the presence of wildfire.

Another object of the present invention is to provide a new and improved wildfire defense spraying system for spraying an environmentally-clean wildfire inhibitor liquid biochemical solution that is formulated at the system installation site by (i) dissolving in a predetermined quantity of water, a first quantity of dry powder tripotassium citrate (TPC) functioning as a fire inhibitor with a second quantity of liquid triethyl citrate (TEC) functioning as a coalescent agent, wherein both first and second quantities are preloaded in a liquid storage tank connected to an electric battery-powered spray pump, so as to form a clear wildfire inhibitor solution which, after sprayed over combustible surfaces to be protected against wildfire, (ii) allows potassium cations dissolved in the solution to disperse and participate in the formation thin potassium citrate salt crystalline coatings on treated surfaces and function as optically-transparent wildfire inhibitor coatings, which once dried, can reabsorb water at the surface without rapid dissolution to improve the duration of fire protection offered by the wildfire inhibitor composition in the presence of rain and ambient moisture levels.

Another object of the present invention is to provide a kit of apparatus for installing a home wildfire defense for installation on a home property so that it can be triggered to spray a new and improved wildfire inhibitor liquid having a coalescent agent that promotes the formation of thin potassium salt crystalline coatings deposited onto organic fuel surfaces to be protected against the threat of ignition by wildfire, providing optimized methods of wildfire inhibitor deposition in outdoor environments.

Another object of the present invention is to provide a new and improved fire inhibiting biochemical composition kit comprising: a major amount of dry tripotassium citrate (TPC), and a minor amount of triethyl citrate (TEC), as components for mixing with a predetermined major amount of water functioning as a solvent, carrier and dispersant, to make up a predetermined quantity of environmentally-clean liquid fire inhibiting biochemical composition for proactively protecting combustible property and wood products.

Another object of the present invention is to provide a new and improved home wildfire defense spraying system for installation on a property to be protected against wildfire, and automatically triggered to spray an environmentally-clean aqueous-based fire inhibiting liquid biochemical solution on the property when receiving a radio signal transmitted by smartphone operating over a 4G GSM digital cellular communication network.

Another object of the present invention is to provide a new and improved system installation kit that contains all of the components and instructions required for any home owner or contractor to quickly and affordably install and support a wildfire defense spraying system on a specified parcel of property so that, prior to arrival of a wildfire, the home owner can remotely command the proactive spraying of their property with a clean and sustainable liquid fire inhibitor stored in a liquid storage tank.

Another object of the present invention is to provide such a wildfire defense spraying system installed on a specified parcel of property, wherein the liquid fire inhibitor stored in the storage tank comprises: (a) a dispersing agent realized in the form of a quantity of water, for dispersing metal ions dissolved in the water; (b) fire inhibiting agent realized in the form of tripotassium citrate, for providing metal potassium ions dispersed in the water when tripotassium citrate is dissolved in the water; and (c) a coalescing agent realized the form of triethyl citrate, an ester of citric acid, for dispersing and coalescing the potassium ions when the fire inhibiting liquid composition is applied to a surface to be protected against fire, and while water molecules in the water evaporate during drying, the potassium ions cooperate to form thin potassium citrate salt crystalline coatings on treated surfaces to be protected against ignition by wildfire.

Another object of the present invention is to provide new and improved wildfire defense spraying system (WFDS) kits including chemical liquid storage tanks having a 50 or 100 gallon capacity and shipped preloaded with food-grade chemical constituents based on the weights and measures that support ASTM fire testing accreditations, EPA Safer Choice Labeling Certification, UL GreenGuard Gold Certification, and passes California Aquatic Testing and EPA and meets Prop 65—when the proper quantity of water is added and blended in the storage tank based on the manufacturer's instructions.

Another object of the present invention is to provide a new and improved system and method of mitigating the damaging effects of wild fires by spraying environmentally-clean fire inhibiting biochemical liquid on property prior to arrival of wildfire to form thin, optically-clear potassium salt crystalline coatings on combustible property, that inhibits fire ignition and flame spread without depending on water, so long as such potassium salt crystalline coatings remain present on the combustible property surfaces.

These and other benefits and advantages to be gained by using the features of the present invention will become more apparent hereinafter and in the appended Claims to Invention.

BRIEF DESCRIPTION OF THE DRAWINGS

The following Objects of the Present Invention will become more fully understood when read in conjunction of the Detailed Description of the Illustrative Embodiments, and the appended Drawings, wherein:

FIG. 3C1 is a perspective view of the 4G GSM remote power control switch module used, in conjunction with a smartphone and 4G GSM digital cellular communication network, to control 120V/30 A electrical power supplied to the electric pump system in the sprinkler-based wildfire defense property spraying system of the present invention, when constructed from the kit of system components shown in FIG. 3;

FIG. 3C2 is a perspective view of the 4G GSM remote power control switch module of FIG. 3C1 shown with its weatherproof housing cover removed from the housing to reveal its internal circuit board, 4G GSM antenna, and electrical power relay bar to which wires are connected;

FIGS. 3D1 is a perspective view of the 4G GSM GPS sensor that is permanently factory-mounted to the fire inhibitor storage tank that is used in the sprinkler-based wildfire defense property spraying system of the present invention, when constructed from the kit of system components shown in FIG. 3;

FIG. 3D2 is a perspective view of the 4G GSM GPS sensor of FIG. 3D1 shown with its battery power and SIM card module removed for access and activation;

FIG. 3F1 is a perspective view of a 4G GSM wireless remote wildfire ember and smoke detector module that can be optionally used in the sprinkler-based wildfire defense property spraying system of the present invention, when constructed from the kit of system components shown in FIG. 3, for the purpose of automatically activating and remotely triggering the spraying of specified property, with liquid fire inhibitor stored in the storage tank, prior to the actual arrival of the remotely-detected wildfire in the vicinity of the protected property region;

FIG. 3F2 is a perspective view of the 4G wireless remote automatic wildfire ember and smoke detector module for use in the sprinkler-based wildfire defense property spraying system of the present invention, when constructed from the kit of system components shown in FIG. 3;

FIGS. 311 and 312 are perspective views of the lithium-battery electrical power storage system optionally used in providing an un-interrupted electrical power supply (UPS) from a 120/220V electrical power service to the electric pump system and other electrical power consuming components used in the sprinkler-based wildfire defense property spraying system of the present invention, when constructed from the kit of system components shown in FIG. 3;

FIG. 3J is a perspective view of a two-way flow valve assembly used to control (i) the flow of water from a water source into the electric pump when arranged in its first flow position during sprinkler sprayhead testing operations, and (ii) the flow of Citrotech® liquid fire inhibitor from the storage tank into the electric pump when arranged in its second flow position when the system is configured for fire inhibitor spraying operations;

FIGS. 3L1 is a perspective view of the (optional) electrically-powered temperature-controlled heating blanket adapted for wrapping about the storage tank used in the sprinkler-based wildfire defense property spraying system of the present invention, when constructed from the kit of system components shown in FIG. 3, to heat the liquid fire inhibitor in the storage tank as required to prevent freezing and malfunction of the system;

FIGS. 3L2 is a perspective view of the electrically-powered temperature-controller designed for use with the heating blanket shown in FIG. 3L1, supplying electrical power to the heating elements within the blanket, and monitoring the temperature of the liquid fire inhibitor in the storage tank, as required to prevent freezing thereof and system malfunction;

FIGS. 7A, 7B and 7C, taken together, shows a flow chart describing the steps to be undertaken when practicing the preferred method of assembling, installing, and operating the sprinkler-based wildfire defense fire inhibitor spraying system of the present invention, suitable for do-it-yourself (DYI) home-owner and contractor-assisted installations alike;

DETAILED DESCRIPTION OF THE ILLUSTRATIVE EMBODIMENTS OF THE PRESENT INVENTION

Figure 1:
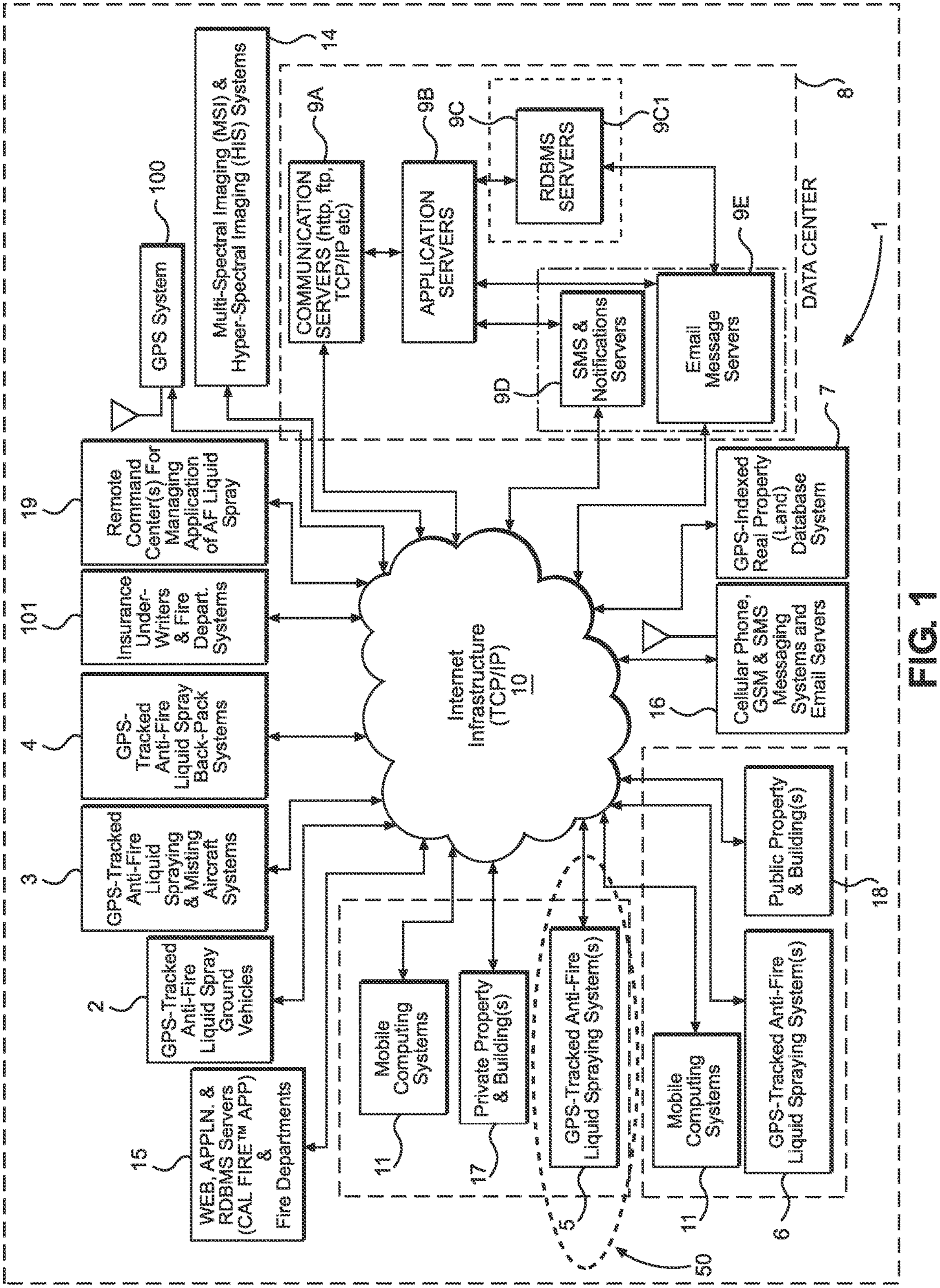
FIG. 1 is schematic representation of the wireless system network of the present invention designed for managing the supply, delivery, and spray-application of the environmentally-clean anti-fire (AF) liquid composition of the present invention, on private and public property to reduce the risks of property damage and/or destruction and harm to life caused by wild fires.

Referring to the accompanying Drawings, like structures and elements shown throughout the figures thereof shall be indicated with like reference numerals.

Figure 4A:
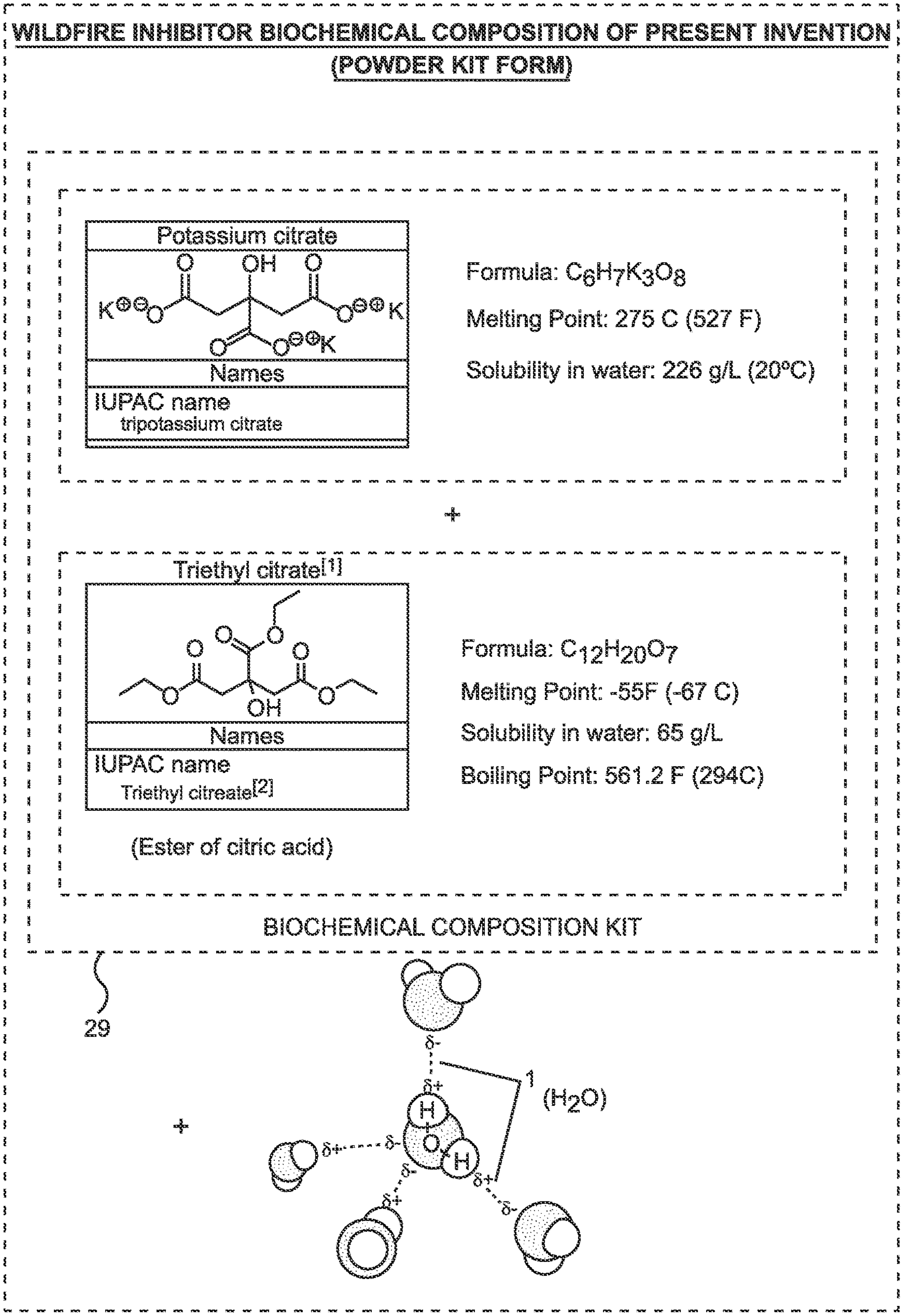
FIG. 4A is a schematic representation illustrating the primary components of a first fire inhibiting biochemical composition kit of the present invention, consisting of major amounts of dry tripotassium citrate monohydrate (TPC) and minor amounts of triethyl citrate (TEC), as components in a package prepared and ready for mixing with a predetermined quantity of water functioning as a solvent, carrier and dispersant, to make up a predetermined quantity of environmentally-clean liquid fire inhibiting biochemical composition for proactively treating and protecting wood products.
Figure 4B:
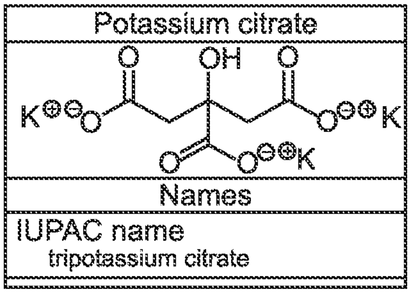
FIG. 4B is a schematic representation illustrating the primary components of a first environmentally-clean aqueous-based fire inhibiting liquid biochemical composition of the present invention consisting of major amounts of tripotassium citrate (TPC) and minor amounts of triethyl citrate (TEC) formulated with water functioning as a solvent, carrier, and dispersant.
Figure 4B:
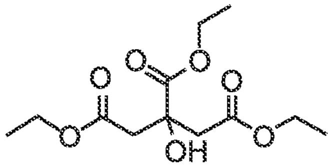
Figure 4B:
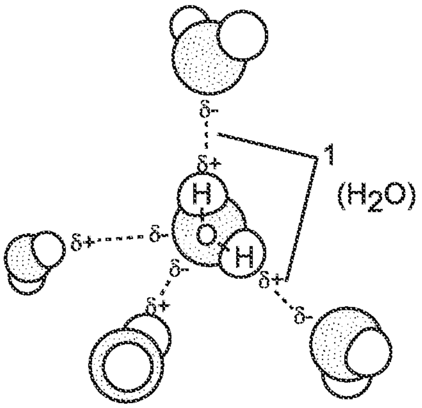

Wireless System Network for Managing the Supply, Delivery and Spray-Application of Environmentally-Clean Fire-Inhibiting Biochemical Liquid on Private and Public Property to Reduce the Risks of Damage and/or Destruction Caused by Wild Fires FIG. 4A shows the wireless system network of the present invention 1 designed for managing the supply, delivery, and spray-application of environmentally-clean anti-fire (AF) biochemical liquid composition of the present invention, on private and public property to reduce the risks of damage and/or destruction caused by wild fires. This system network is described in Applicant's U.S. Pat. No. 10,653,904B2, et al incorporated herein by reference. As disclosed therein, the system network comprises a distribution of system components, namely: GPS-tracked fire inhibiting (or anti-fire) liquid spray ground vehicles 2 (e.g. all-terrain vehicles or ATVs), for spray applying liquid chemical fire inhibitor, formulated according to the present invention, to ground surfaces, brush surfaces, and the surfaces of other forms of organic combustible material on property; GPS-tracked anti-fire liquid spray air-based vehicles 3, for applying fire inhibiting chemical liquid spray of the present invention (formulated as illustrated in FIGS. 4A and 4B and specified herein) from the air to ground surfaces, brush, bushes and other forms of organic material; GPS-tracked mobile anti-fire liquid back-pack spraying systems 4 (e.g. including wheel supported, and backpack-carried systems), for applying fire inhibiting chemical liquid spray to combustible ground surfaces, brush, bushes, decks, houses, buildings, and other forms of organic material and property surrounding houses; GPS-tracked/GSM-linked liquid spraying systems 5, for applying fire inhibiting chemical liquid spray to combustible surfaces on private real property, buildings and surrounding areas, and further specified in the present Patent Specification; GPS-tracked/GSM-linked liquid spraying systems 6, for applying fire inhibiting chemical liquid spray to combustible surfaces on public real property and buildings and surrounding properties; a GPS-indexed real-property (land) database system 7 for storing the GPS coordinates of the vertices and maps of all land parcels, including private property and building 17 and public property and building 18, situated in every town, county and state in the region over which the system network 1 is used to manage wild fires as they may occur; a cellular phone, GSM, and SMS messaging systems and email servers, collectively 16; and one or more data centers 8 for monitoring and managing GPS-tracking/GSM-linked liquid supply and spray systems, including web servers 9A, application servers 9B and database servers 9C (e.g. RDBMS) operably connected to the TCP/IP infrastructure of the Internet 10, and including a network database 9C1, for monitoring and managing the system and network of GPS-tracking anti-fire liquid spraying systems and various functions supported by the command center 19, including the management of wild fire suppression and the GPS-guided application fire inhibiting chemical liquid over public and private property, as will be described in greater technical detail hereinafter. As shown, each data center 8 also includes an SMS server 9D and an email message server 9E for communicating with registered users on the system network 1 who use a mobile computing device (e.g. an Apple® iPhone or iPad tablet) 11 with the mobile application 12 installed thereon and configured for the purposes described herein. Such communication services will include SMS/text, email and push-notification services known in the mobile communications arts.

As shown in FIG. 1, the system network architecture shows many different kinds of users supported by mobile computing devices 11 running the mobile application 12 of the present invention, namely: the plurality of mobile computing devices 11 running the mobile application 12, used by fire departments and firemen to access services supported by the system network 1; the plurality of mobile computing systems 11 running mobile application 12, used by insurance underwriters and agents to access services on the system network 1; the plurality of mobile computing systems 11 running mobile application 12, used by building architects and their firms to access the services supported by the system network 1; the plurality of mobile client systems 11 (e.g. mobile computers such as iPad, and other Internet-enabled computing devices with graphics display capabilities, etc.) used by spray-project technicians and administrators, and running a native mobile application 12 supported by server-side modules, supporting client-side and server-side processes on the system network of the present invention; and a GPS-tracked anti-fire liquid spraying systems for spraying buildings and ground cover to provide protection and defense against wild-fires. These subsystems are further specified in detail in U.S. Pat. No. 10,653,904B2.

Figure 2:
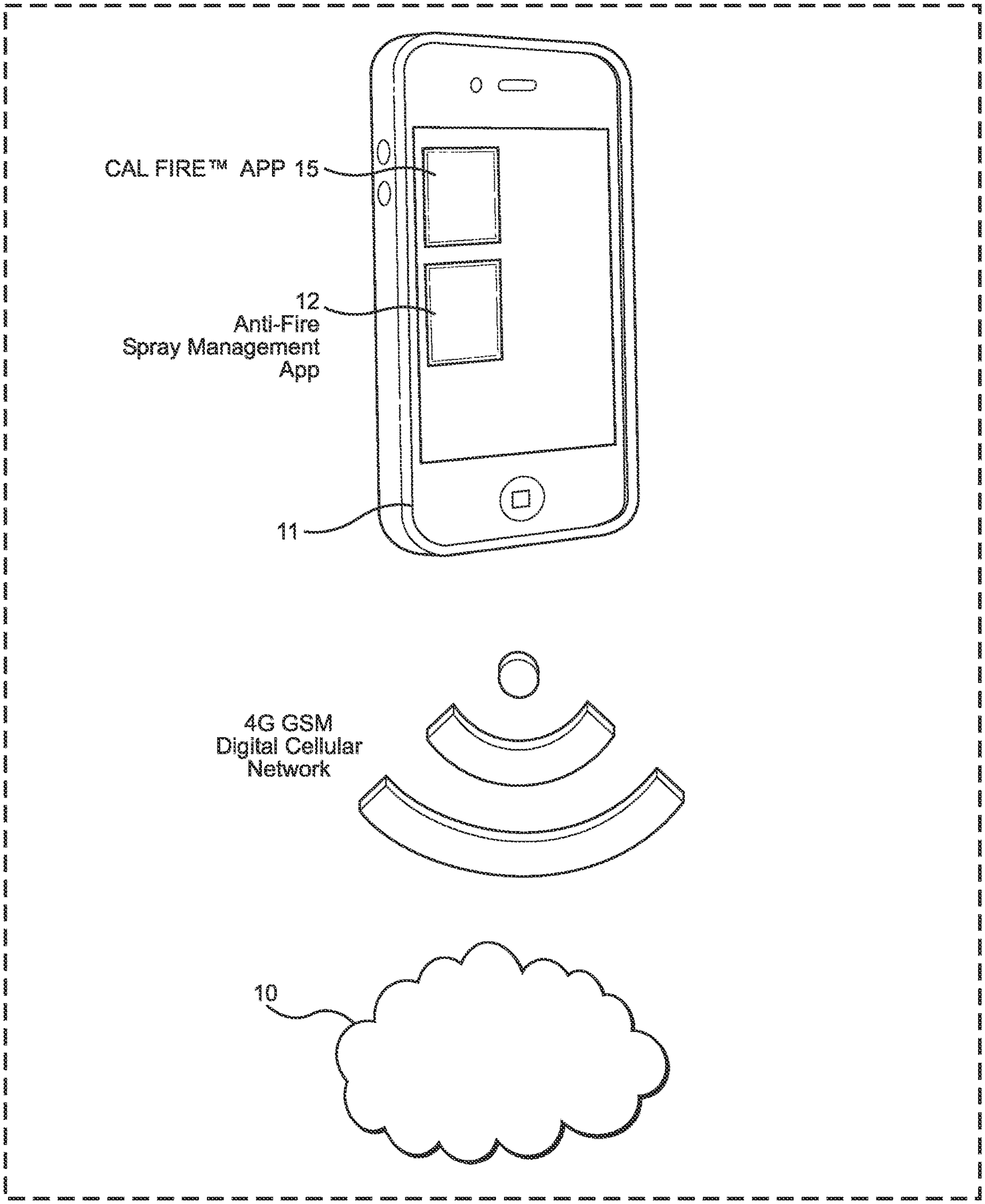
FIG. 2 is a perspective view of an exemplary mobile computing device deployed on the system network of the present invention, supporting mobile fire inhibiting spray management applications of the present invention deployed as a component of the system network of the present invention as shown in FIG. 1.

FIG. 2 shows an exemplary mobile computing device 11 deployed on the system network of the present invention. Such mobile computing systems support conventional wildfire alert and notification systems (e.g. CAL FIRE® wild fire notification system 14), as well as the mobile fire inhibitor spraying management application 12 of the present invention, that is deployed as a component of the system network 1. The features of mobile smartphone device 11 can be found in U.S. Pat. No. 8,631,358 incorporated herein by reference in its entirety.

Notably, new and improved the GPS-tracked/GSM-linked, sprinkler-based wildfire defense (fire inhibiting liquid) spraying systems 5 indicated in the system network of FIG. 1, and kits for constructing such systems, will be further specified in detail hereinafter in the present Patent Specification.

Specification of Environmentally-Clean Aqueous-Based Liquid Fire Inhibiting Bio-Chemical Compositions and Formulations, and Methods of Making the Same at the Installation Site in Accordance with the Principles of the Present Invention A primary object of the present invention is to provide new and improved environmentally-clean aqueous-based fire inhibiting biochemical solutions for use by homeowners around the world which demonstrate very good long-term fire inhibiting effects when being proactively applied to protect combustible surfaces against the threat of fire. In general, the novel fire inhibiting liquid biochemical compositions of the present invention comprise: (a) a dispersing agent in the form of a quantity of water, for dispersing metal ions dissolved in water; (b) a fire inhibiting agent in the form of at least one alkali metal salt of a nonpolymeric saturated carboxylic acid, for providing metal ions dispersed in the water when the at least one alkali metal salt is dissolved in the water; (c) a coalescing agent in the form of an organic compound containing three carboxylic acid groups (or salt/ester derivatives thereof), such as triethyl citrate, an ester of citric acid, for dispersing and coalescing the metal ions when the fire inhibiting liquid composition is applied to a surface to be protected against fire, while water molecules in the water evaporate during drying, and the metal ions cooperate to form potassium salt crystal structure on the surface; and (d) if appropriate, at least one colorant.

Useful alkali metal salts of nonpolymeric saturated carboxylic acids for inclusion in the compositions of the present invention preferably comprise: alkali metal salts of oxalic acid; alkali metal salts of gluconic acid; alkali metal salts of citric acid; and alkali metal salts of tartaric acid. Alkali metal salts of citric acid are particularly preferred, as will be further explained hereinafter.

Notably, while the efficacy of the alkali metal salts increases in the order of lithium, sodium, potassium, cesium and rubidium, the salts of sodium and salts of potassium are preferred for cost of manufacturing reasons. Potassium carboxylates are very particularly preferred, but tripotassium citrate monohydrate (TPC) is the preferred alkali metal salt for use in formulating the environmentally-clean fire inhibiting biochemical compositions of the present invention.

While it is understood that other alkali metal salts are available to practice the biochemical compositions of the present invention, it should be noted that the selection of tripotassium citrate as the preferred alkali metal salt, includes the follow considerations: (i) the atomic ratio of carbon to potassium (the metal) in the utilized alkali metal salt (i.e. tripotassium citrate); (ii) that tripotassium citrate is relatively stable at transport and operating temperatures; (iii) tripotassium citrate is expected to be fully dissociated to citrate and potassium when dissolved in water, and that the dissociation constant is not relevant for the potassium ions, while citric acid/citrate has three ionizable carboxylic acid groups, for which pKa values of 3.13, 4.76 and 6.4 at 25° C. are reliably reported the European Chemicals Agency (ECHA) handbook; and (iv) that tripotassium citrate produces low carbon dioxide levels when dissolved in water.

Tripotassium citrate is an alkali metal salt of citric acid (a weak organic acid) that has the molecular formula $C_6H_8O_7$. While citric acid occurs naturally in citrus fruit, in the world of biochemistry, citric acid is an intermediate in the celebrated "Citric Acid cycle, also known as the Krebs Cycle (and the Tricarboxylic Acid Cycle), which occurs in the metabolism of all aerobic organisms. The role that citric acid plays in the practice of the biochemical compositions of the present invention will be described in greater detail hereinafter.

Preferably, the water-soluble coalescing agent should have a melting point at least 32 F (0 C) or lower in temperature, and be soluble in water. Triethyl citrate (TEC) is a preferred coalescing agent when used in combination with tripotassium citrate (TPC) having excellent compatibility given that both chemical compounds are derived from citric acid.

In some applications, the use of colorants may be advantageous with or without opacifying assistants, to the fire inhibiting biochemical liquid compositions of the present invention. Opacifying assistants make the fire-retarding biochemical composition cloudy and prevent any interaction between the color of the added colorant used and the background color.

The concentration of the dye in the fire-retarding biochemical composition is preferably in the range from 0.005% to 10% by weight, more preferably in the range from 0.01% to 5% by weight and most preferably in the range from 0.015% to 2% by weight.

Of advantage are dyes, food dyes for example, which fade as the fire-retarding composition dries and gradually decompose or are otherwise easily removable, for example by flushing with water.

The fire inhibiting liquid biochemical compositions of the present invention are producible and prepared by mixing the components in specified amounts with water to produce the fire inhibiting composition. The order of mixing is discretionary. It is advantageous to produce aqueous preparations by mixing the components other than water, into water.

Specification of Preferred Embodiments of the Dry Fire Inhibiting Biochemical Compositions of Matter Assembled as a Fire Inhibiting Biochemical Composition Kit for Use with Specified Quantities of Water at System Installation Site In the preferred embodiment of the fire inhibiting liquid biochemical composition of the present invention, the components are realized as follows: (a) the fire inhibiting agent is realized in the form of an alkali metal salt of a nonpolymeric saturated carboxylic acid, specifically, tripotassium citrate, for providing metal potassium ions to be dissolved and dispersed in a quantity of water (supplied at the time and site of system installation at the homeowner's property); (b) a coalescing agent realized the form of an organic compound containing three carboxylic acid groups (or salt/ester derivatives thereof), specifically triethyl citrate, an ester of citric acid, for dispersing and coalescing the metal potassium ions when the fire inhibiting liquid composition is applied to a surface to be protected against fire, and while water molecules in the water evaporate during drying, the metal potassium ions cooperate to form potassium citrate salt crystal structure on the treated surface.

Selecting Tripotassium Citrate (TCP) as a Preferred Fire Inhibiting Agent for Use in the Fire Inhibiting Biochemical Compositions of the Present Invention In the preferred embodiments of the present invention, tripotassium citrate (TPC) is selected as active fire inhibiting chemical component in fire inhibiting biochemical composition. In dry form, TPC is known as tripotassium citrate monohydrate ($C_6H_5K_3O_7 \cdot H_2O$) which is the common tribasic potassium salt of citric acid, also known as potassium citrate. It is produced by complete neutralization of citric acid with a high purity potassium source, and subsequent crystallization. Tripotassium citrate occurs as transparent crystals or a white, granular powder. It is an odorless substance with a cooling, salty taste. It is slightly deliquescent when exposed to moist air, freely soluble in water and almost insoluble in ethanol (96%).

Tripotassium citrate is a non-toxic, slightly alkaline salt with low reactivity. It is chemically stable if stored at ambient temperatures. In its monohydrate form, TPC is very hygroscopic and must be protected from exposure to humidity. Care should be taken not to expose tripotassium citrate monohydrate to high pressure during transport and storage as this may result in caking. Tripotassium citrate monohydrate is considered "GRAS" (Generally Recognized As Safe) by the United States Food and Drug Administration without restriction as to the quantity of use within good manufacturing practice. CAS Registry Number: [6100-05-6]. E-Number: E332.

Tripotassium citrate monohydrate (TPC) is a non-toxic, slightly alkaline salt with low reactivity. It is a hygroscopic and deliquescent material. It is chemically stable if stored at ambient temperatures. In its monohydrate form, it is very hygroscopic and must be protected from exposure to humidity. Its properties are:

Monohydrate
White granular powder
Cooling, salty taste profile, less bitter compared to other potassium salts
Odorless
Very soluble in water
Potassium content of 36%
Slightly alkaline salt with low reactivity
Hygroscopic
Chemically and microbiologically stable
Fully biodegradable
Allergen and GMO free Jungbunzlauer (JBL), a leading Swiss manufacturer of biochemicals, manufactures and distributes TPC for food-grade, healthcare, pharmaceutical and over the counter (OTC) applications around the world. As disclosed in JBL's product documents, TPC is an organic mineral salt which is so safe to use around children and adults alike. Food scientists worldwide have added TPC to (i) baby/infant formula powder to improve the taste profile, (ii) pharmaceuticals/OTC products as a potassium source, and (iii) soft drinks as a soluble buffering salt for sodium-free pH control in beverages, improving stability of beverages during processing, heat treatment and storage.

Selecting Triethyl Citrate (TEC) as a Preferred Coalescing Agent with Surface Tension Reducing and Surfactant Properties for Use in the Fire Inhibiting Biochemical Compositions of the Present Invention In the preferred illustrative embodiments of the present invention, the coalescing agent used in the fire inhibitor biochemical compositions of the present invention is realized as a food-grade additive component, namely, triethyl citrate (TEC) which functions as a coalescing agent with surface tension reducing properties and surfactant properties as well. Triethyl citrate belongs to the family of tricarboxylic acids (TCAs) and derivatives, organic compounds containing three carboxylic acid groups (or salt/ester derivatives thereof).

In the aqueous-based fire inhibiting liquid composition, the coalescing agent functions as temporary dispersing agent for dispersing the metal ions dissolved and disassociated in aqueous solution. As water molecules evaporate from a coating of the biochemical composition, typically spray/atomized applied to a surface to be protected from fire, the coalescing agent allows the formation of thin metal (e.g. potassium citrate) salt crystal structure/films at ambient response temperature conditions of coating application. The coalescent agent promotes rapid potassium salt crystalline structure/coating formation on combustible surfaces to be protected against wildfire, and have a hardness evolution that promotes durability against rain and ambient moisture, while apparently allowing vital oxygen and CO2 gas transport to occur, without causing detrimental effects to the vitality of living plant tissue surfaces sought to be protected against wildfire.

A relatively minor quantity of triethyl citrate (TEC) liquid is blended with a major quantity of TCP powder in specific quantities by weight and dissolved in a major quantity of water to produce a clear, completely-dissolved liquid biochemical formulation consisting of food-grade biochemicals mixed with water and having highly effective fire inhibiting properties, as proven by testing. The resulting aqueous biochemical solution remains stable without the formation of solids at expected operating temperatures (e.g. 34 F to 120 F).

Jungbunzlauer (JBL) also manufactures and distributes its CITROFOL® A1 branded bio-based citrate esters for food-grade, healthcare, pharmaceutical and over the counter (OTC) applications around the world. CITROFOL® A1 triethyl citrate (TEC) esters have an excellent toxicological and eco-toxicological profile, and provide good versatility and compatibility with the tripotassium citrate (TPC) component of the biochemical compositions of the present invention. CITROFOL® A1 branded citrate esters are particularly characterized by highly efficient solvation, low migration, and non-VOC (volatile organic compound) attributes. As an ester of citric acid, triethyl citrate is a colorless, odorless liquid which historically has found use as a food additive (E number E1505) to stabilize foams, especially as a whipping aid for egg whites.

Broadly described, the fire inhibiting biochemical liquid coatings of the present invention consist of an aqueous dispersion medium such as water which carries dissolved metal salt cations that eventually form a thin metal salt crystalline structure layer on the surface substrate to be protected from ignition of fire. The aqueous dispersion medium may be an organic solvent, although the preferred option is water when practicing the present invention. After the application of a coating onto the combustible surface to be protected against fire ignition and flame spread and smoke development, the aqueous dispersion medium evaporates, causing the metal salt (i.e. potassium salt) cations to draw together. When these metal salt particles come into contact, the coalescing agent, triethyl citrate, takes effect, uniformly dispersing the same while reducing liquid surface tension, and giving rise to the formation of a relatively homogeneous metal salt crystalline structure layer over the surface. In practice, this interaction is more complex and is influenced by various factors, in particular, the molecular interaction of the potassium salt cations and the coalescing agent, triethyl citrate, as the water molecules are evaporating during the drying process.

While offering some surface tension reducing effects, the main function of the coalescing agent in the biochemical composition of the present invention is to ensure a relatively uniform and optimal formation of the salt crystalline structure layers on the combustible surfaces to be protected, as well as desired mechanical performance (e.g. offering scrub resistance and crystal coating hardness) and aesthetic values (e.g. gloss and haze effects).

The fact that CITROFOL® A1 triethyl citrate (TEC) esters are bio-based, odorless, biodegradable, and label-free, represents a great advantage over most other coalescing agents, and fully satisfies the toxicological and environmental safety requirements desired when practicing the biochemical compositions of the present invention.

In the preferred embodiments of the present invention, the use of CITROFOL® AI triethyl citrate (TEC) esters with tripotassium citrate monohydrate (TPC) dissolved in water as a dispersion solvent, produce fire inhibiting biochemical formulations that demonstrate excellent adhesion, gloss, and hardness properties. The chemical and colloidal nature of potassium salt ions (which are mineral salt dispersions) present in TPC dissolved in water, is highly compatible with the CITROFOL® A1 triethyl citrate (TEC) ester used as the coalescing agent in the preferred embodiments of the present invention. Also, CITROFOL® A1 triethyl citrate esters are REACH registered and are safe, if not ideal, for use in environmentally sensitive products such as fire and wildfire inhibitors which must not adversely impact human, animal and plant life, ecological systems, or the natural environment.

Specification of Preferred Formulations for the Fire Inhibiting Biochemical Compositions of Matter According to the Present Invention Example #1: Dry-Powder Fire Inhibiting Biochemical Composition (Made on Site)

FIG. 4A illustrates the primary components of a first fire inhibiting biochemical composition kit of the present invention, consisting of dry tripotassium citrate (TPC) and triethyl citrate (TEC) components for mixing with a predetermined quantity of water functioning as a solvent, carrier, and dispersant, to make up a predetermined quantity of environmentally-clean liquid fire inhibiting biochemical composition for proactively protecting wood products.

Example 1: Schematically Illustrated in FIG. 4A: A fire-extinguishing and/or fire-retarding biochemical composition was produced by blending the following components, in amounts proportional to the formulation comprising: 0.05 pounds by weight of triethyl citrate as coalescing agent, (20.3 milliliters by volume); 5.2 pounds by weight of tripotassium citrate (64 fluid ounces by volume); packaging the blended components together in a container or package for mixing with 4.4 pounds by weight of water (64 fluid ounces by volume), to produce a resultant solution of total weight of 9.61 pounds having 128 ounces or 1 gallon of volume. A primary advantage of this dry powder embodiment of the present invention is achieving significantly reduced shipping costs for the finished goods, because of the significant reduction in weight of finished goods achieved by eliminating the weight of water from the formulation prior to shipping. Specifically, a reduction in weight of 416 lbs. is for the 50-gallon storage tank, and a reduction in weight of 833 lbs. is achieved for a 100-gallon storage tank, because each US gallon of water weighs approximately 8.33 lbs.

In the preferred embodiment, the WFDS kit of the present invention is equipped with fire inhibitor storage tanks having either a 50 or 100 gallon capacity, to support different size property sizes, and will be shipped from the factory containing all Citrotech® fire inhibitor constituents based on weights and measures required to support ASTM fire testing accreditations along with UL GreenGuard Gold, LENS, California Aquatic Testing, EPA Safer Choice Labeling, and meeting Prop 65, but only when the proper quantity of water has been added (indicated by the water fill line) and blended properly based on manufacturer's instructions for filling the storage tank.

Example #2: Liquid-Based Fire Inhibiting Biochemical Composition (Made at Factory)

In this alternative embodiment shown in FIG. 4B, illustrates the primary components of a first environmentally-clean aqueous-based fire inhibiting liquid biochemical composition of the present invention are mixed at the factory under strict quality control, and consist of tripotassium citrate (TPC) and triethyl citrate (TEC) formulated with water functioning as a solvent, carrier, and dispersant in the biochemical composition.

Example 2: A fire-extinguishing and/or fire-retarding biochemical composition was produced by stirring the components into water. The composition comprising: 0.05 pounds by weight of triethyl citrate as coalescing agent, (20.3 milliliters by volume); 5.2 pounds by weight of tripotassium citrate (64 fluid ounces by volume); and 4.4 pounds by weight of water (64 fluid ounces by volume), to produce a resultant solution of total weight of 9.61 pounds having 128 ounces or 1 gallon of volume. A primary disadvantage of this embodiment of the invention is the cost of the finished goods, weighing in at least 8.4 lbs. per gallon of water used, which contributes significantly to the cost of shipping.

Preferred Weights Percentages of the Components of the Fire Inhibiting Biochemical Formulation of the Present Invention In the biochemical compositions of the present invention The ratio of the ester of citrate (e.g. triethyl citrate) to the alkali metal salt of a nonpolymeric carboxylic acid (e.g. tripotassium citrate) may be major amount between 1:100: to 1:1000 and is typically in the range from 1:1 to 1:100, preferably in the range from 1:2 to 1:50, more preferably in the range from 1:4 to 1:25 and most preferably in the range from 1:8 to 1:15.

A preferred biochemical composition according to the present invention comprises: a major amount from 1% to 65% by weight, preferably from 20% to 50% by weight and more preferably from 30% to 55% by weight, of at least one alkali metal salt of a nonpolymeric saturated carboxylic acid (e.g. tripotassium citrate monohydrate or TPC); and minor amount from 0.08% to 5% by weight, preferably from 0.5% to 2% by weight and more preferably from 0.1% to 1.0% by weight, of triethyl citrate (an ester of citrate acid); wherein the sum by % weight of the components (a) and (b) should not exceed 100% by weight.

In a preferred embodiment, the fire inhibiting composition further comprises water. The water content is present in a major amount and is typically not less than 30% by weight, preferably not less than 40% by weight, more preferably not less than 50% by weight and most preferably not less than 60% by weight and preferably not more than 60% by weight and more preferably not more than 70% by weight, all based on the fire inhibiting biochemical composition.

The viscosity of the aqueous preparation is preferably at least 5 [mPas] (millipascal-seconds, in SI units, defined as the internal friction of a liquid to the application of pressure or shearing stress determined using a rotary viscometer), and preferably not more than 50 [mPas], or 50 centipois) [cps], for most applications.

Figure 5A:
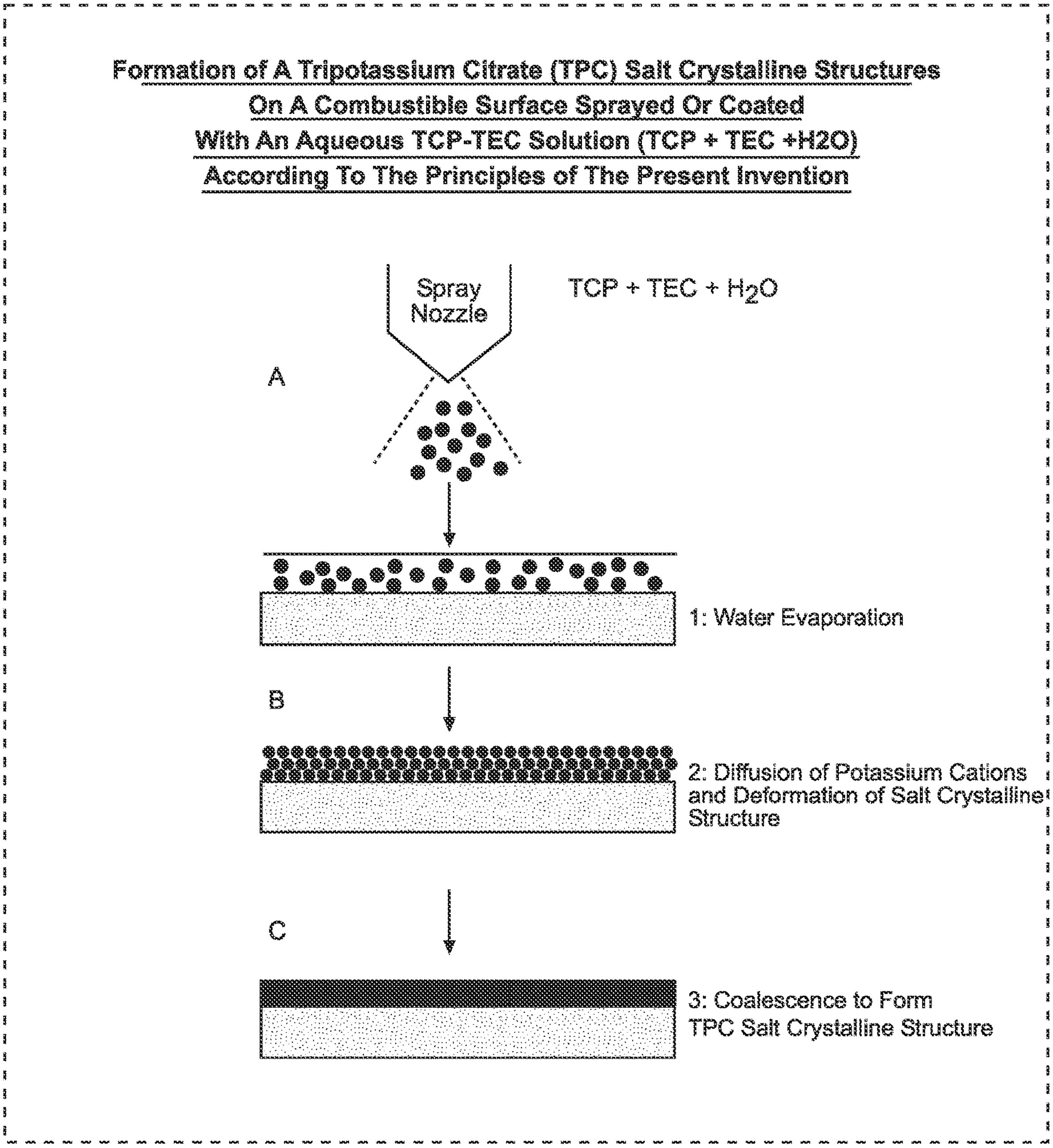
FIG. 5A is a schematic representation illustrating a process of forming a tripotassium citrate (TPC) crystalline structures on combustible surfaces, such as ground cover, native fuel, lumber, living plant tissue, tree bark, and other combustible tissue and like materials that are sprayed with atomized sprays, or otherwise coated, with the chemical material comprising the aqueous-based fire inhibiting solutions of the present invention.

Physical Examination and Fire-Performance Testing of Thin Potassium Salt Crystalline Coatings Formed Using the Biochemical Compositions and Methods and Apparatus of the Present Invention One method of viewing the resulting potassium salt crystal structures formed upon a surface substrate to be protected against fire, as illustrated in FIG. 5A, would be by using atomic force microscope to form atomic force microscopy (AFM) images of the biochemical coatings applied in accordance with the principles of the present invention. Another method of viewing the resulting potassium salt crystal structures would be to use a scanning electron microscope to form scanning electron microscopy (SEM) images. Expectedly, using either instrument, such images of potassium salt crystal structures formed using a greater wt. % of coalescent agent (e.g. triethyl citrate dissolved in water with tripotassium citrate) will show that the coalescent agent resulted in metal salt crystal structures that are more coalesced and smoother, and demonstrating higher hardness evolution and better water repulsion, than when the potassium salt crystal structures are formed using a lower wt. % coalescent agent in the aqueous-based fire inhibiting liquid composition.

FIG. 5A illustrates the primary steps involved during the formation of tripotassium citrate (potassium) salt crystalline structure coatings on spray treated surfaces to be proactively protected against ignition and flame spread of incident fire.

At Step A, a spray nozzle is used to spray a liquid coating of a biochemical composition of the present invention, and once applied, the water molecules being to evaporate at a rate determined by ambient temperature and wind currents, if any. When the minimum film formation temperature (MFT) is reached for the biochemical composition, the potassium cations can inter diffuse within the triethyl citrate (TEC) coalescent agent and water molecule matrix that is supported on the surface that has been sprayed and to be proactively treated with fire inhibiting properties by virtue of a thin film deposition of tripotassium salt crystalline structure, modeled and illustrated in FIGS. 7B and 7C.

At Step B, potassium cations diffuse and the TPC crystalline structure deforms. During the coalescence of potassium cations, interparticle potassium cation diffusion (PCD) occurs within the TEC coalescing agent to produce a semi-homogenous tripotassium citrate salt crystalline structure.

At Step C, coalescence occurs to form the TPC salt crystalline structure. The mechanical properties of tripotassium citrate crystalline structures are highly dependent on the extent of PCD within the TEC coalescent agent.

Figure 5B:
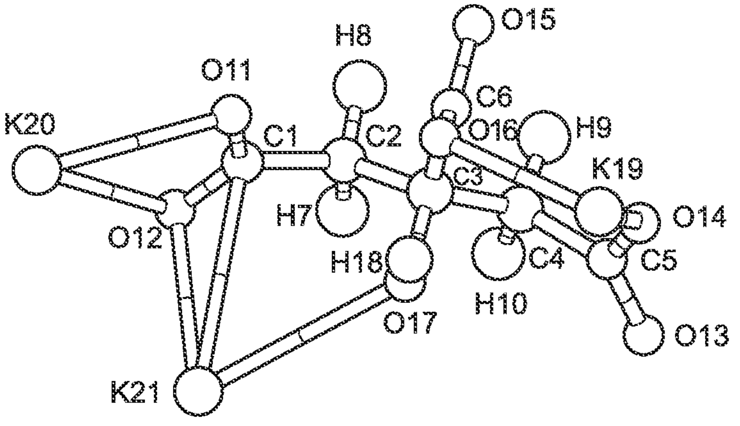
FIG. 5B is a schematic representation illustrating the atoms and atom numbering in the crystal structure of the compound, tripotassium citrate (K3C6H5O7) formed on treated surfaces in accordance with the principles of the present invention.
Figure 5C:
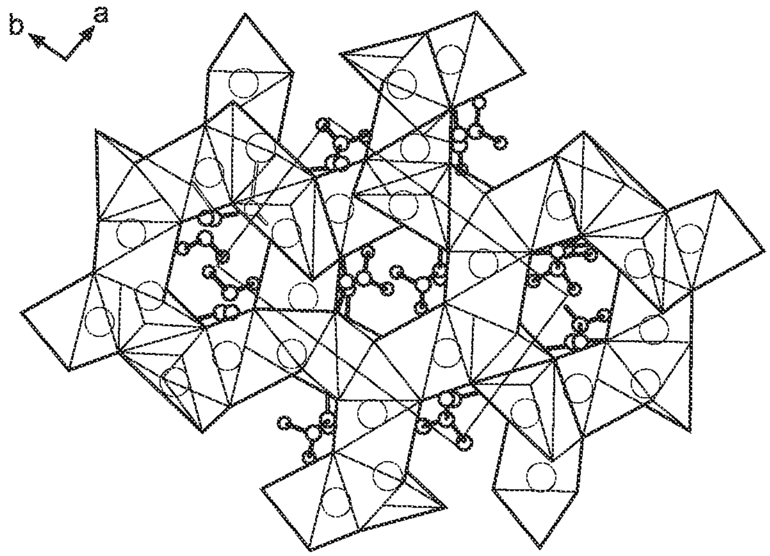
FIG. 5C is a schematic representation of the atomic crystal structure of a small piece of the crystalline structure of tripotassium citrate (K3C6H5O7) salt structure formed on a substrate to be protected against fire by way of application of the fire inhibiting chemical solution of the present invention, graphically illustrated the stage C illustration of FIG. 5A when water molecules mixed therein have evaporated to the ambient environment during air-drying.

Upon complete evaporation of water molecules from the biochemical liquid coating, the resulting fire inhibiting coating that is believed to be formed on the sprayed and dried surface comprises a thin film of tripotassium citrate salt crystalline structures formed on the structure, with substantially no water molecules present. The nature and character of such tripotassium citrate salt crystalline structures are believed to be reflected in models provided in FIGS. 5 and 5C, which were first reported in 2016 in a published research paper by Alagappa Rammahon and James A. Kaduk, titled "Crystal Structure of Anhydrous Tripotassium Citrate From Laboratory X-Ray Diffraction Data and DFT Comparison" cited in ACTA CRYSTL (2016) Vol. E72, Pages 1159-1162, and published by Crystallographic Communications.

To determine and confirm that the fire inhibiting liquid compositions of the present invention produce potassium citrate salt crystalline structures on treated surfaces that have attained certain standards of fire inhibiting protection, it is necessary to test such treated surface specimens according to specific fire protection standards. In the USA, ASTM E84 Flame Spread and Smoke Development Testing can be used to test how well surfaces made of wood, cellulose and other combustible materials perform during E84 testing, and then compared against industry benchmarks. The environmentally-clean fire inhibiting chemical liquid composition disclosed herein is currently being tested according to ASTM E84 testing standards and procedures, and these ASTM tests have shown that fire-protected surfaces made of Douglas Fir (DF) demonstrate Flame Spread Indices and Smoke Development Index to qualify for Class-A fire protected certification, when treated by the fire inhibiting biochemical composition of the present invention disclosed and taught herein.

Figure 6:
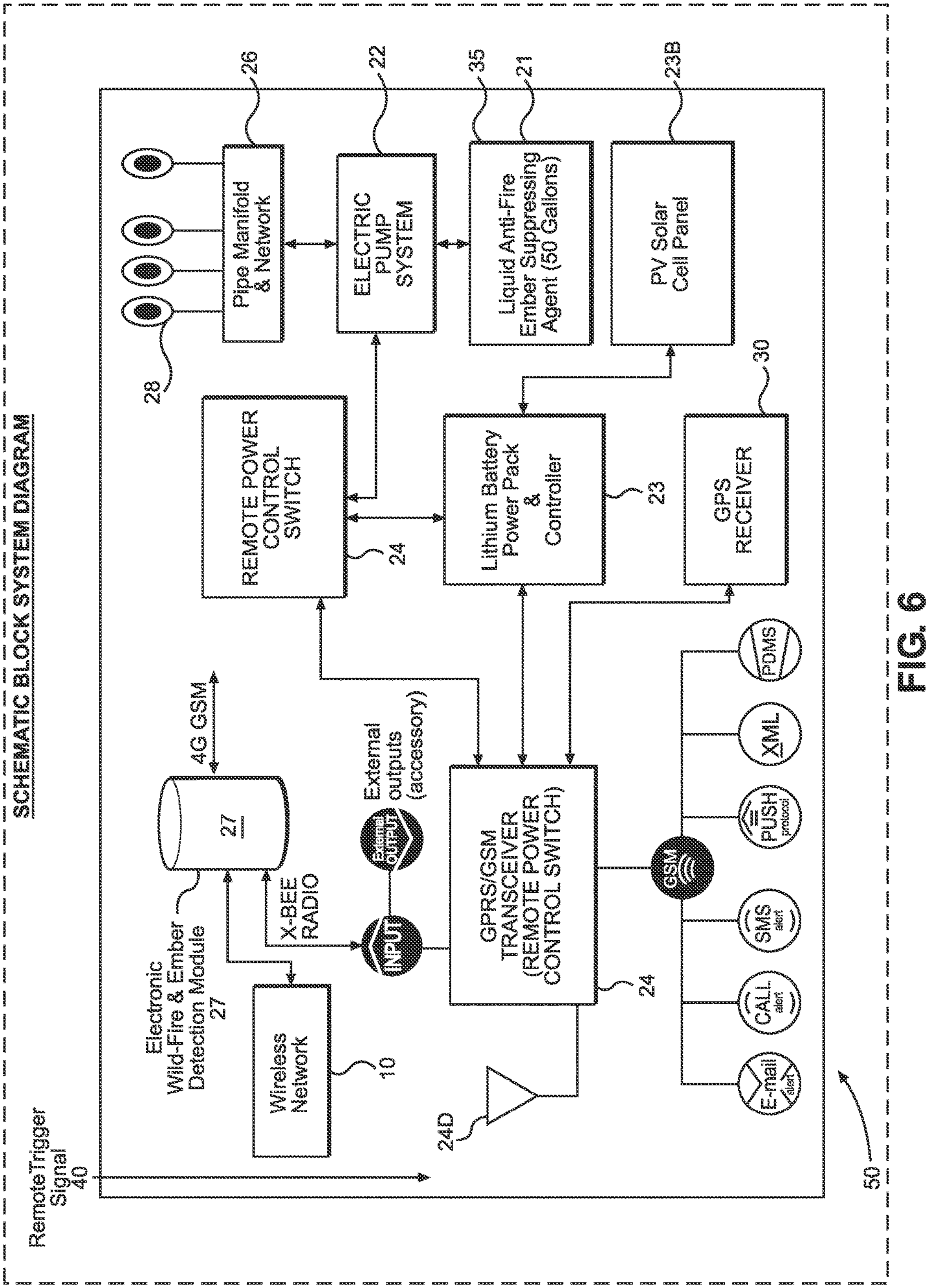
FIG. 6 is a block schematic representation of a generalized wireless remotely-activatable sprinkler-based wildfire defense fire inhibitor spraying system of the present invention, comprising: (i) a wildfire ember detection module for mounted on the top of a building to automatically detect the presence of a wildfire well before its arrival many miles away, and sensing a SMS-spray-triggering signal to the wireless remotely-activatable sprinkler-based wildfire defense fire inhibitor spraying system of the present invention, (ii) Storage Tank (50 or 100 Gallon) capacity for storage of dry powder fire inhibitor formulation loaded at the factory for mixing with an amount of water that is added to the storage tank at the time of installation and setup, (iii) 4G GSM GPS Sensor for mounting to the Storage Tank for monitoring the GPS location thereof, (iv) Electric Pump connected to the Storage Tank and a supply of pressurized water at installation location via a Valve assembly with first and second positions, (v) a Lithium-Battery Backup Power Supply System with photovoltaic (PV) recharging panel and 120 V line input from a local source of electrical power, for supplying electrical power to the electric pump, (vi) sprinkler spray heads, PVC piping for forming the necessary fluid pumping circuits from the electric pump to the sprinkler sprayheads during spraying operations, and (vii) a 4G GSMGPRS Transceiver and the Remote Power Control Switch for remotely controlling electrical power to the Electric Pump via the 4G GSM remote control power switch.

Specification of Wireless Remotely-Activatable Sprinkler-Based Wildfire Defense Fire Inhibitor Spraying System of the Present Invention FIG. 6 shows a generalized wireless remotely-activatable sprinkler-based wildfire defense fire inhibitor spraying system (WFDS) of the present invention 50, comprising the following components contained in WFDS kit 20, namely: (i) a wildfire ember detection module 2 shown in FIGS. 3E1 and 3E2 for mounting on the top of a building, pole or tree to automatically detect the presence of a wildfire (i.e. via automated wildfire ember and/or smoke detection) well before its arrival many miles away, and sensing a SMS-spray-triggering signal 40 to the wireless remotely-activatable sprinkler-based wildfire defense fire inhibitor spraying system of the present invention 20 operate the automated spraying of Citrotech® liquid fire inhibitor 35 all over the property to be protected from fire ignition and/or flame spread by an incident wildfire; (ii) a plastic, fiberglass or metallic storage tank 21 shown in FIG. 3A having a 50 or 100 US gallon liquid storage capacity, for storage of dry powder fire inhibitor formulation 29 loaded at the factory for mixing and blending with a specified amount of water that is added to the storage tank 21 at the time of installation and setup according to the chemical formulation of the present invention; (iii) a 4G GSM GPS sensor 30 shown in FIGS. 3D1 and 3D2 for mounting to the storage tank 21 for monitoring the GPS location thereof using 4G GSM digital cellular communications (e.g. AT&T); (iv) an electric-motor (120V/20-30 A) fluid hydraulic pump 22 shown in FIG. 3A, operably connected to the storage tank 21 and a supply of pressurized water at installation location via a valve assembly 25 having first and second (flow directing) positions; (v) a Lithium-battery backup power supply system (e.g. EcoFlow® River 2 Pro Portable Power Station—768 Wh capacity and 800 W output) 23 shown in FIGS. 311 and 312, provided with photovoltaic (PV) recharging panel for recharging the lithium-ion battery 23 while collecting sunlight with the PV solar panel as solar conditions allow, and 120 V line input plug for connection to a local source of electrical power, for supplying electrical power to the electric pump 22; (vi) at least 4 to 6 sprinkler spray heads 28 shown in FIG. 3E provided with conventional roof/pole mounting brackets, for spraying the Citrotech® liquid fire inhibitor 35 in the storage tank, all over the target property 36 where needed for proactive wildfire protection; heat-resistant PVC or PET piping 26 shown in FIG. 3H, for forming the necessary fluid pumping circuits passing through the electric pump 22 to operate the sprinkler sprayheads 28 under adequate hydraulic pressure during spraying operations, and thus support sufficient flow rates of Citrotech® fire inhibiting chemical liquid 35, determined in a manner well known in the fluid hydraulic arts; (vii) a 4G GSM/GPRS transceiver and the remote power control switch (e.g. 4G GSM Dual Channel Remote Switch Controller with SMS Command Remote Board with Relay Output and GSM CTL-4G Relay Control Box by Shanghai Wafer Microelectronics Co., Ltd) 24 shown in FIGS. 3C1 and 3C2 for remotely controlling electrical power supplied to the electric-motor hydraulic pump 22 via the 4G GSM remote control power switch 24, automatically triggered when receiving an SMS trigger message/signal 40 from the smartphone 11 operated by a homeowner and/or authorized contractor or other personnel; an optional electrically-powered temperature-controlled thermal blanket 30 for surrounding the storage tank 21, and associated controller 32A for maintaining the temperature of the chemical liquid in the storage tank 21 in extreme temperature climates shown in FIG. 3J, or electrically-powered temperature-controlled immersible heater 33A for maintaining the temperature of the chemical liquid in the storage tank 21 below freezing temperatures in extreme climates shown in FIGS. 3K1 and 3K2.

Preferably, the GPRS/GSM transceiver 24 shown in FIGS. 3C1 and 3C2 is suitably adapted for transmitting and receiving digital data packets using GPRS and GSM communication protocols, over the network, to support a suite of digital communication services and protocols specified herein. Also, a suite of communication services and protocols (e.g. email, SMS alert, PUSH protocol, XML, PDMS, and CALL alert) are supported by GSM for sending and receiving messages. Also, preferably, the electronic wildfire ember and smoke detection module 27 shown in FIGS. 3F1 and 3F2, supports 360 degrees of sensing and associated field of views (FOVs), and in wireless communication with the 4G GSM digital cellular communication network 10.

FIG. 3J shows the two-way flow valve assembly 25 that is used in the illustrative embodiment to control (i) the flow of water from a water source 37 into the electric pump 22 when arranged in its first flow position during sprinkler sprayhead testing operations, and (ii) the flow of Citrotech® liquid fire inhibitor 35 from the storage tank 21 into the electric pump 22 when arranged in its second flow position, and the system is configured for fire inhibitor spraying operations on the property.

In some application environments, ambient temperatures on the property parcel being defended against wildfire may fall below freezing, and in such environments, it will be wise if not necessary to adapt the wildfire defense spraying system to prevent freezing of the liquid fire inhibitor in its storage tank. FIGS. 3K and 3L1 and 3L2 illustrate two different options for controllably heating the liquid fire inhibitor in the storage tank 21 and prevent freezing, and system malfunction, prior to spraying operations are completed on the parcel of property.

Figure 3:
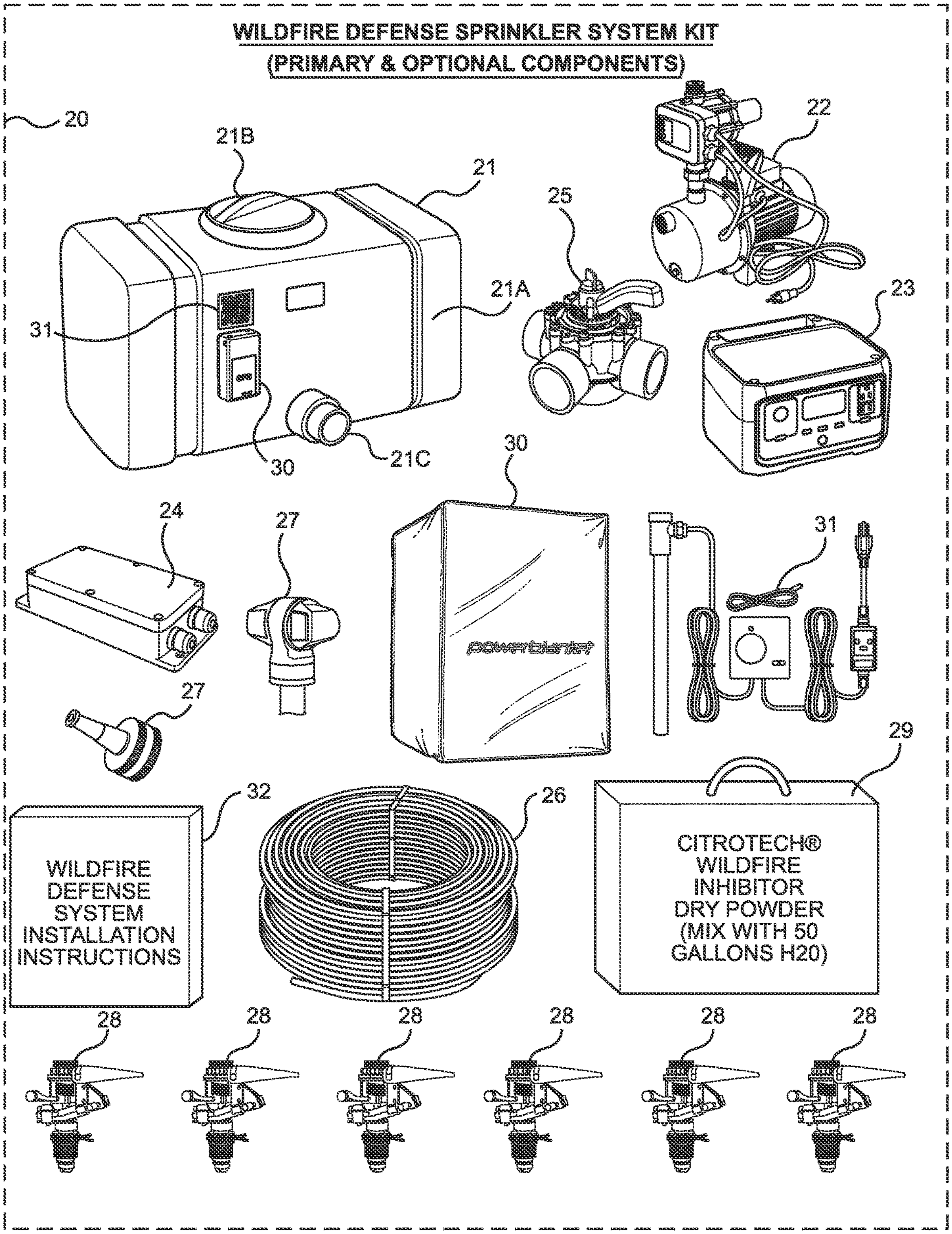
FIG. 3 is a schematic representation showing the components in a wildfire defense spraying system installation kit for use in the quick and affordable assembly, installation and operation of a wildfire defense spraying system on a property parcel according to the method described in FIGS. 7A, 7B and 7C, which can be triggered to automatically spray and cover the property surfaces with an environmentally-clean liquid fire inhibitor, before the arrival of wildfire so as to reduce and mitigate the risk of loss of property and life due to wildfire.
Figure 3A:
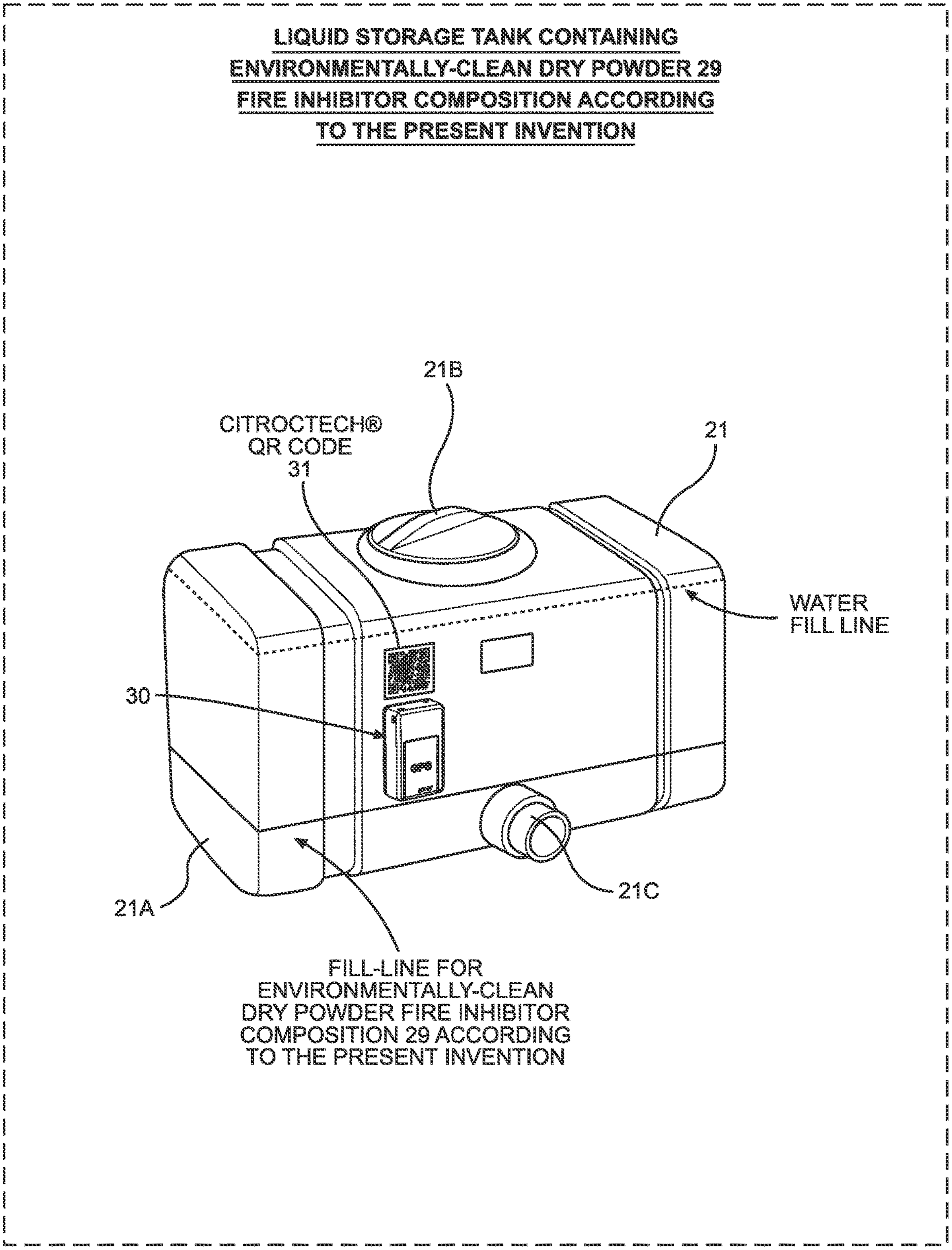
FIG. 3A is a perspective view of the storage tank used for storing environmentally-clean liquid wildfire inhibitor chemicals in the sprinkler-based wildfire defense property spraying system of the present invention, when constructed from the kit of system components shown in FIG. 3.
Figure 3B:
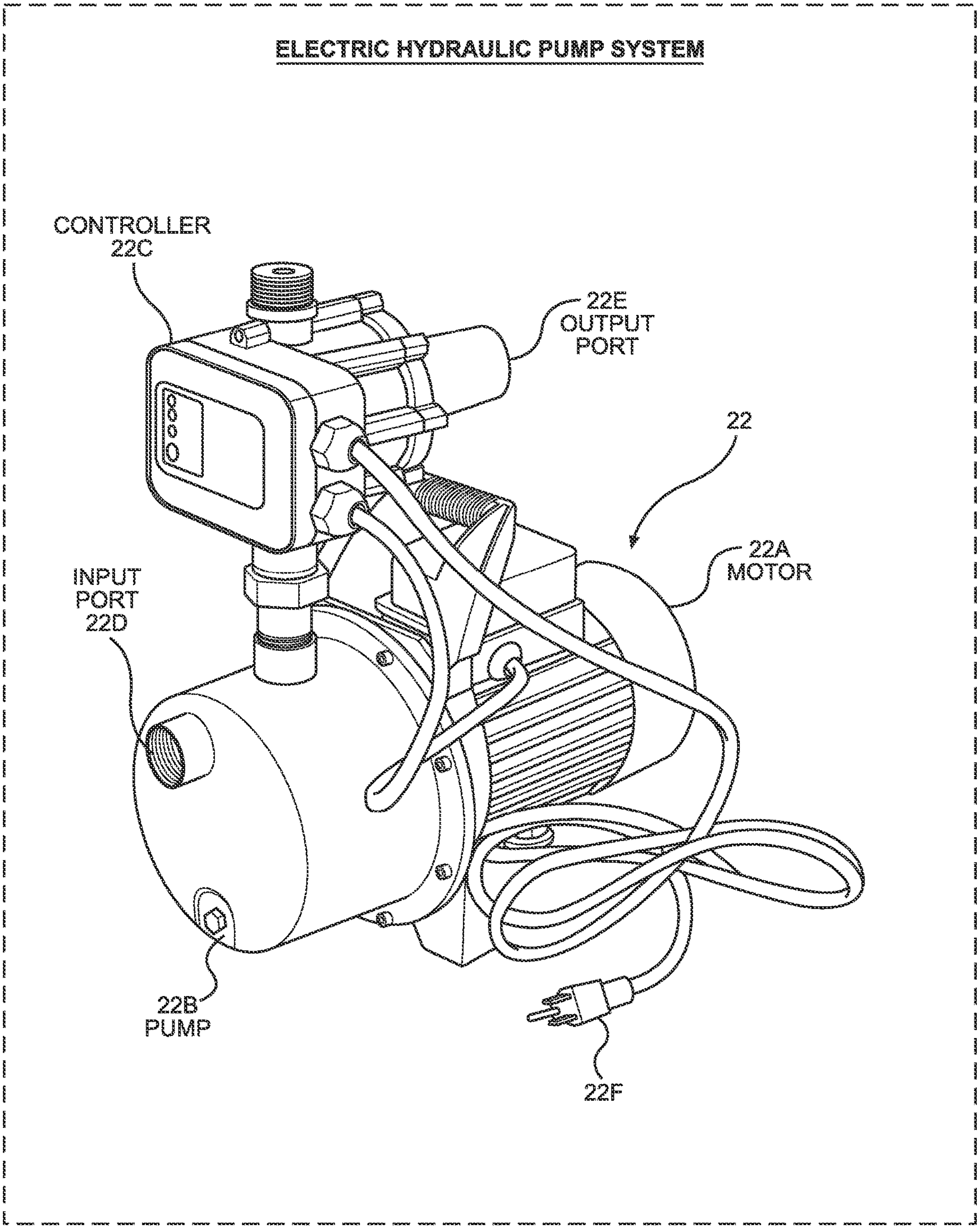
FIG. 3B is a perspective view of the electric-motor driven fluid pump system that is used in the sprinkler-based wildfire defense property spraying system of the present invention, when constructed from the kit of system components shown in FIG. 3.
Figure 3E:
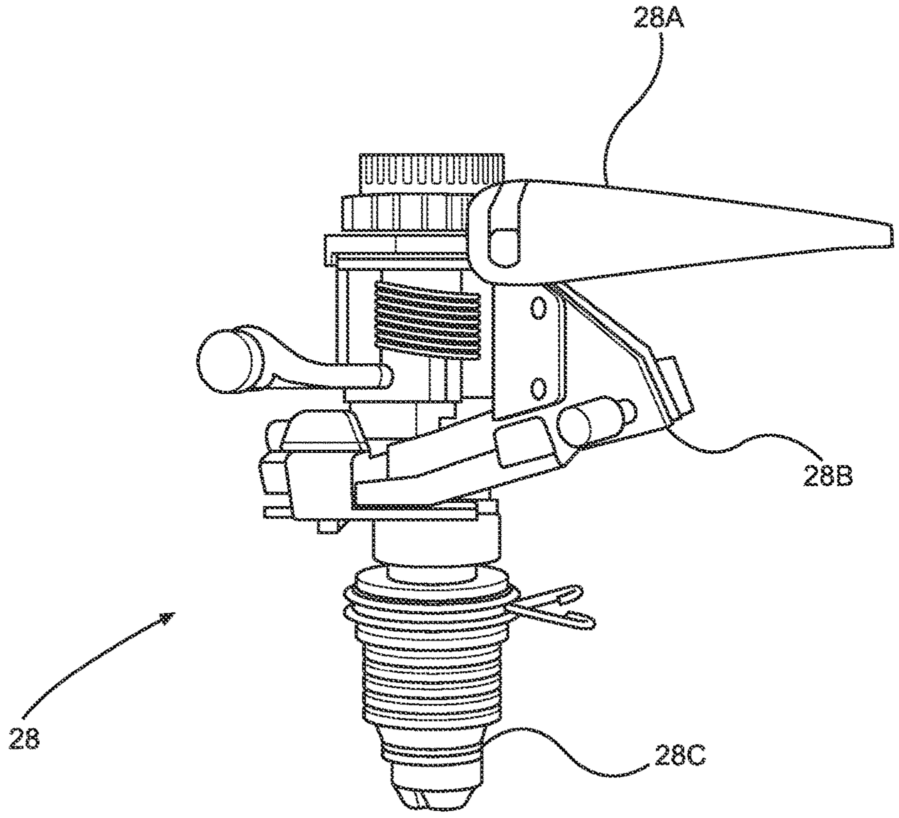
FIG. 3E is a perspective view of one 360-degree (30' range) sprinkler spray head device used in the sprinkler-based wildfire defense property spraying system of the present invention, when constructed from the kit of system components shown in FIG. 3.
Figure 3G:
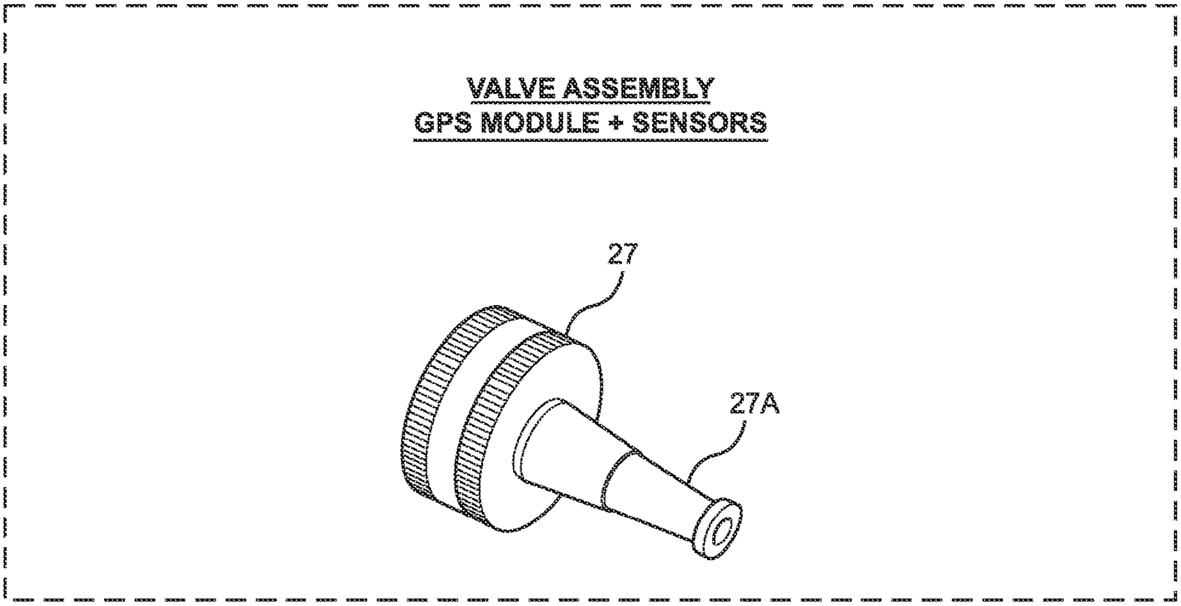
FIG. 3G is a perspective view of the mixing nozzle for attachment to a garden house that can be used to add a quantity of water to the dry powder fire inhibitor chemicals that are preloaded into the storage tank at the factory, for making a liquid fire inhibitor in the storage tank at the system installation site, and used for spraying in the sprinkler-based wildfire defense property spraying system of the present invention when constructed from the kit of system components shown in FIG. 3.
Figure 3H:
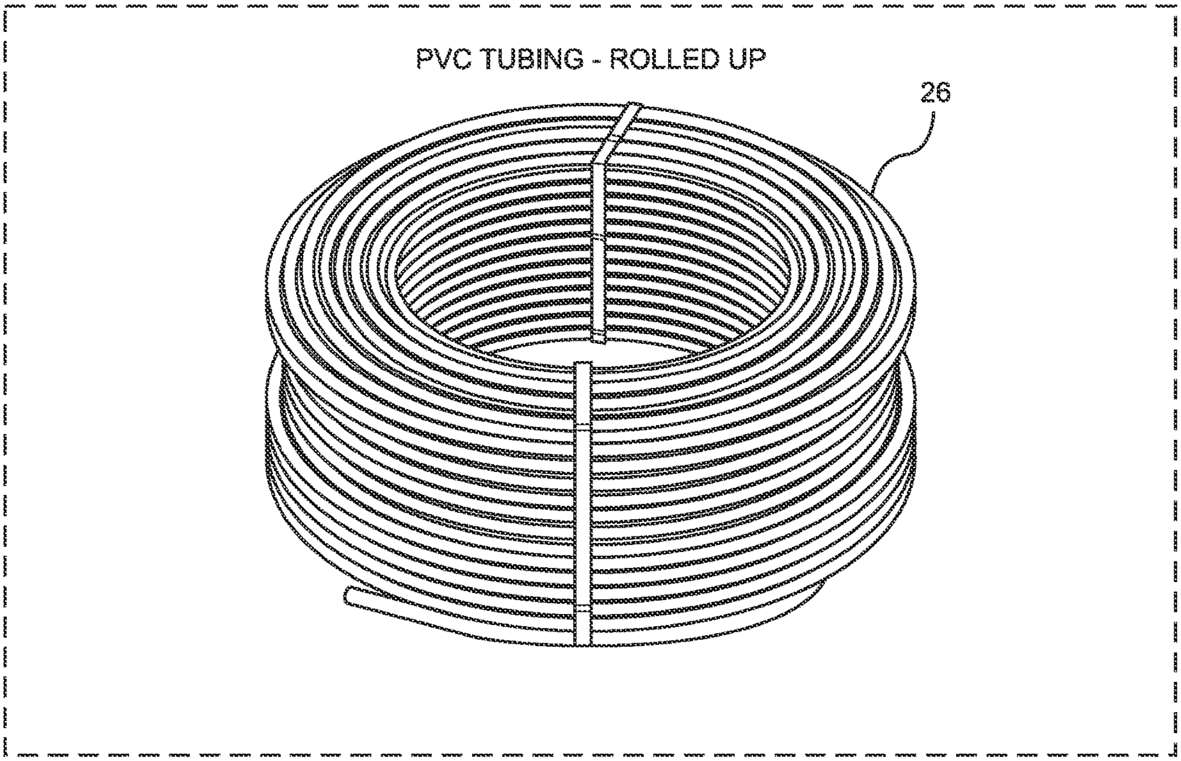
FIG. 3H is a perspective view of the roll of PVC tubing for use in connecting the sprinkler heads, the electric pump system, the storage tank and 2-way valve assembly, and creating the fluid pumping circuit supporting the sprinkler-based wildfire defense property spraying system of the present invention, when constructed from the kit of system components shown in FIG. 3.
Figure 3K:
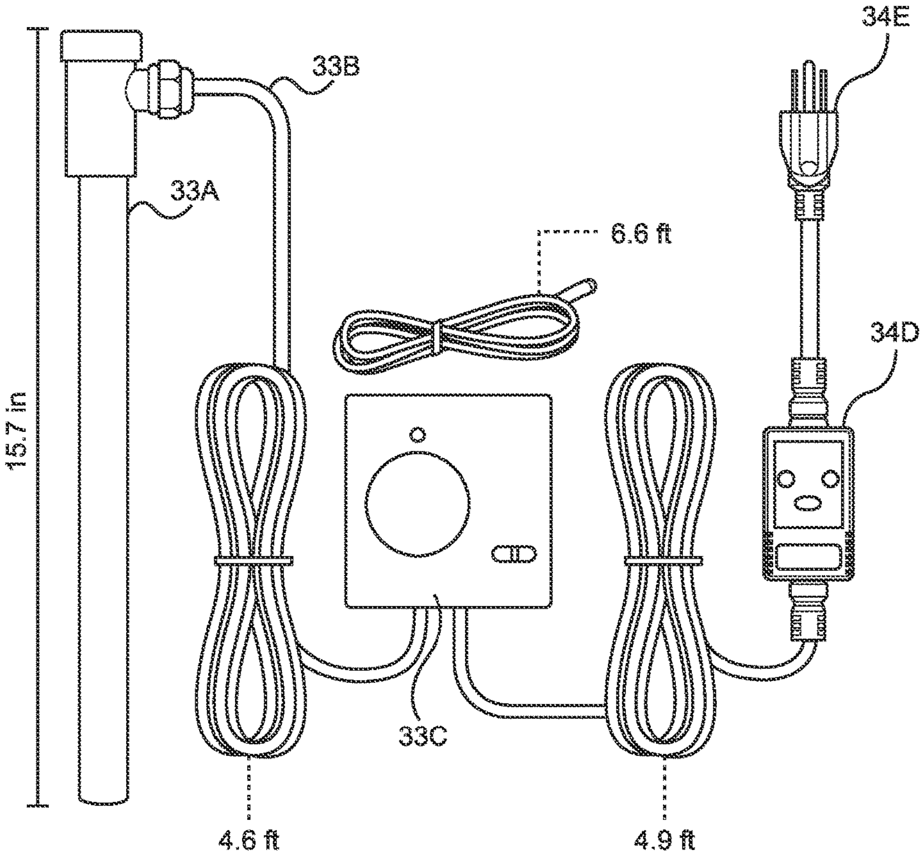
FIG. 3K is a perspective view of the (optional) electrically-powered temperature-controlled immersible heating system for immersion in the chemical liquid stored in the storage tank of the wildfire defense spraying system of the present invention, when the system is constructed from the kit of system components shown in FIG. 3, to heat the liquid fire inhibitor in the storage tank as required to prevent freezing and malfunction of the system.

FIG. 3K shows an electrically-powered temperature-controlled immersible heating system 31 for immersion in the chemical liquid stored in the storage tank 21 of the wildfire defense spraying system of the present invention 50, when the system is constructed from the kit of system components shown in FIG. 3. The purpose of the heating system is to controllably heat the liquid fire inhibitor 35 in the storage tank 21 using temperature sensor integrated in heating element 33A and controller 33C, as required to prevent freezing and malfunction of the system. Power plug 34E can be directly plugged into a power supply socket 23A supported on the lithium battery power supply unit 23 when powered from 120V AC power service at the installation site (e.g. home).

FIGS. 3L1 and 3L2 show an electrically-powered temperature-controlled heating blanket 32 adapted for wrapping about the storage tank 21 used in the sprinkler-based wildfire defense property spraying system of the present invention 50, when constructed from the kit of system components shown in FIG. 3. The electrically-powered temperature-controller 32A is designed for use with the heating blanket 32 shown in FIG. 3L1, supplying electrical power to the heating elements within the blanket, and monitoring the temperature of the liquid fire inhibitor 35 with a sensor 33B inserted in the storage tank 21, as required to prevent freezing thereof and system malfunction. Power plug 33C can be directly plugged into a power supply socket 23A supported on the lithium battery power supply unit 23 when powered from 120V AC power service at the installation site (e.g. home).

Specification of the Wireless 4G GSM GPS-Tracked Wildfire Ember and Smoke Detector Used in the Wildfire Defense Spraying System of the Present Invention FIG. 3F1 shows the wireless 4G GSM GPS-tracked wildfire ember and smoke detection 27 for use as an auxiliary sensor in communication with the wildfire defense spraying systems of the present invention 50. Each wireless GPS-tracked wildfire ember detection module 27 deployed on the 4G GSM digital cellular network 10 comprises: a fire-protective housing cover 27A; and various sensors and signal and data processing and storage components arranged and configured about a microprocessor and flash memory (i.e. control subsystem) include: one or more passive infrared (PIR) thermal-imaging sensors connected together with suitable IR optics to project IR signal reception field of view (FOV) before the IR receiving array 27B; multiple pyrometric sensors 27C for detecting the spectral radiation of burning, organic substances such as wood, natural gas, gasoline and various plastics; a GPS antenna 27D; a GPS signal receiver; GSM antenna; GSM radio transceiver an Xbee antenna; an Xbee radio transceiver; a voltage regulator; an external power connector; a charge controller; a battery; thermistors; a power switch; external and internal temperature sensors; power and status indicator LEDs; programming ports; a digital/video camera 27G; other environment sensors adapted for collecting and assessing intelligence, in accordance with the spirit of the present invention; and mounting base 27E for mounting on a support bracket that can be affixed to a pole, tree, or building as the case may suggest or require. Alternatively, the wildfire detection module 27, and supporting wireless wildfire intelligence network, may be realized using the technical disclosure of U.S. Pat. No. 8,907,799, incorporated herein by reference. However, the present invention should not be limited by such prior art teachings.

Preferably, the optical bandwidth of the IR sensing arrays 27B used in the thermal sensors will be adequate to perform 360 degrees thermal-activity analysis operations, and automated detection of wildfire and wildfire embers. Specifically, thermal sensing in the range of the sensor can be like the array sensors installed in forward-looking infrared (FLIR) cameras, as well as those of other thermal imaging cameras, use detection of infrared radiation, typically emitted from a heat source (thermal radiation) such as fire, to create an image assembled for video output and other image processing operations to generate signals for use in early fire detection and elimination system of the present invention.

The pyroelectric detectors 27C detect the typical spectral radiation of burning, organic substances such as wood, natural gas, gasoline, and various plastics. To distinguish a flame from the sun or other intense light source such as light emissions from arc welding, and thus exclude a false alarm, the following independent criteria are considered: a typical flame has a flicker frequency of (1 . . . 5) Hz; a hydrocarbon flame produces the combustion gases carbon monoxide (CO) and carbon dioxide ($CO_2$); and in addition, burning produces water which can also be detected in the infrared range. Each pyroelectric detector 27C is an infrared sensitive optoelectronic component specifically used for detecting electromagnetic radiation in a wavelength range from (2 to 14) µm.

Each system 50 will use a GPS referencing system available in the USA and elsewhere, supporting transmission of GPS signals from a constellation of satellites to the Earth's surface, so that local GPS receivers within the GPS sensor 30 located on each Citrotech® containing storage tank 21, and also each remote wildfire ember and smoke detector 27, will receive the GPS signals and compute locally GPS coordinates indicating the location of the networked device within the GPS referencing system. This GPS location information is then automatically transmitted to a central database server 12 using 4G GSM digital cellular communications, in the preferred embodiment. By managing the GPS location of storage tanks 21, the manufacturer of Citrotech® fire inhibitor can continuously track and map the location of its fire inhibiting chemical liquid around the globe, in relation to the current location of active wildfires, and forecasted risk of wildfire, as part of its supply chain, inventory, and customer service management operations around the world.

When practicing the remote wildfire sensor of the present invention 27, any low power wireless networking protocol of sufficient bandwidth can be used. However, in the preferred embodiment, its 4G GSM digital cellular transceiver circuit will be used to send SMS-based triggering signals 40 directly to its linked wildfire defense spraying system of the present invention 20. Such SMS-based triggering signals 40 will activate its 4G GSM remote power control switch 24, energize the electric pump 22, and spray Citrotech® liquid fire inhibitor 35 all over the property 36 to provide the proactive protection it requires in the presence of a wildfire and its flying embers 41. Such 4G GSM signaling 40 can support SMS between the wireless ember and smoke detector 27, and the one or more linked wildfire defense spraying system(s) 20 that the automated ember detector 27 might be ordered to serve in any given application.

In the illustrative embodiment, the wildfire ember detection system 27 supports a computing platform, network-connectivity (i.e. IP Address), and is provided with native application software installed on the system as client application software, designed to communicate over the system network and cooperate with application server software running on the application servers of the system network, thereby fully enabling the functions and services supported by the system, as described above. In the illustrative embodiment, a wireless mess network may be implemented using conventional IEEE 802.15.4-based networking technologies to interconnect these wireless subsystems into subnetworks and connect these subnetworks to the internet infrastructure of the system of the present invention. However, such wireless 4G GSM wildfire ember and smoke sensor 27 can be used alone with at least one wildfire defense spraying system 50, in which case SMS messaging 40 transmitted to its host WFD spraying system 50 can automatically trigger the 4G GSM controlled spraying system 20 to spray all the Citrotech® liquid fire inhibitor 35 in its storage tank 21, all over the property 36 prior to wildfire arrival for proactive wildfire defense.

Figure 7B:
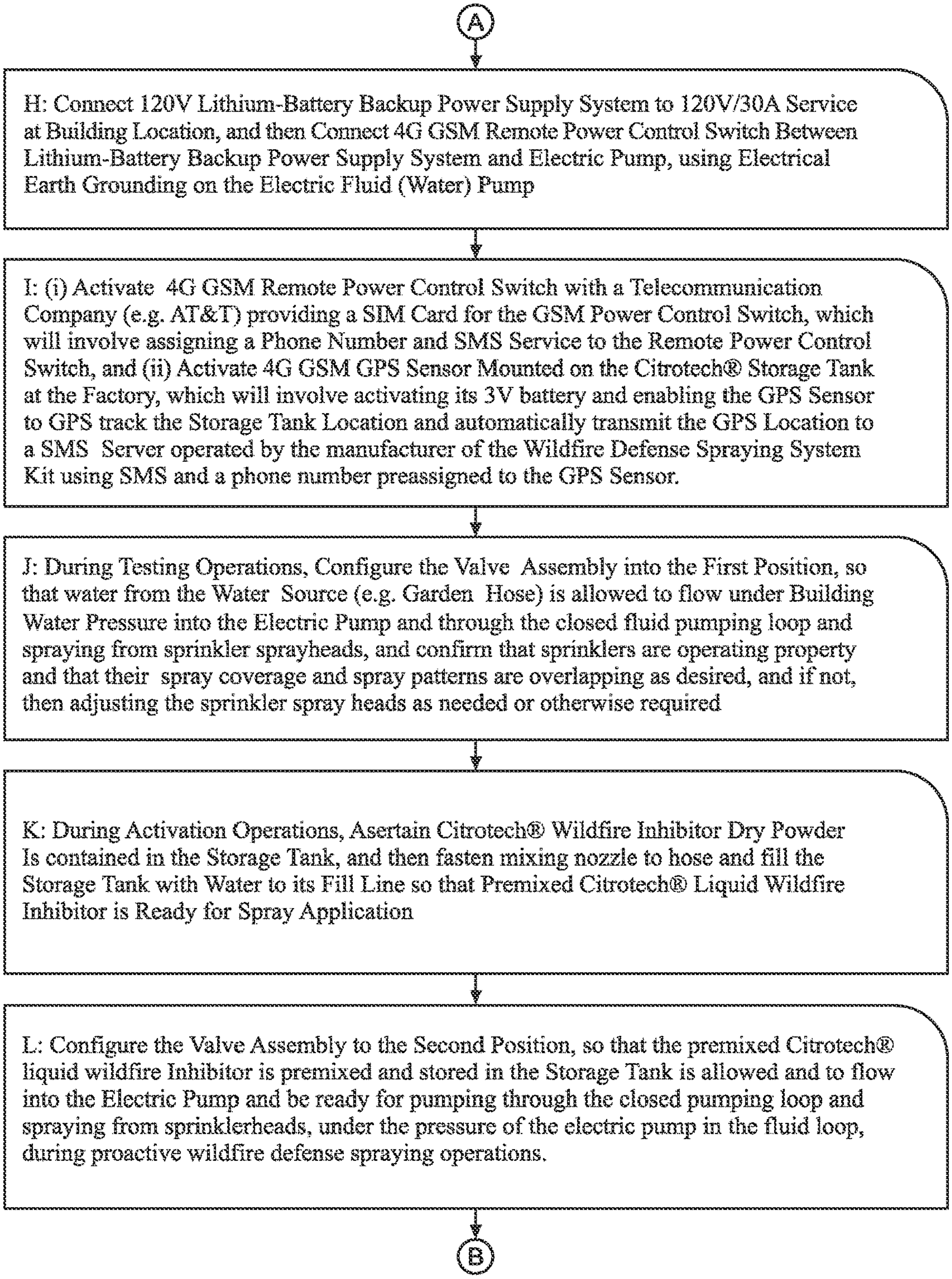

Specification of the Method of Assembling, Installing and Operating the Sprinkler-Based Wildfire Defense Fire Inhibitor Spraying System of the Present Invention FIGS. 7A, 7B and 7C describe the steps to be undertaken when practicing the preferred method of assembling the components contained in the kit shown in FIG. 3, and thereby installing and operating the sprinkler-based wildfire defense fire inhibitor spraying system of the present invention 50 on a homeowner's property parcel 36, making the kit 20 and method most suitable for do-it-yourself (DYI) homeowner and contractor-assisted installations alike. Typically, it is expected that most installations of the system 50 using the kit of the present invention will requiring between 3-6 hours, following system installation and operating instructions 32 based on the present Patent Specification.

As indicated at Block A in FIG. 7A, the first step involves delivering the Home Wildfire Defense Sprinkler/Spray System (WFDS) Kit 20 to the geographical location where the WFD System 50 is to be installed and operated.

As indicated at Block B in FIG. 7A, the second step involves surveying the property 36 to be defended by spraying fire inhibiting liquid chemistry over combustible surfaces of building and property using a system of sprinklers mounted to building, mounted above property on poles or brackets, and/or from underground installed sprinkler heads as case may be required or desired.

As indicated at Block C in FIG. 7A, the third step involves determining the physical placement location of sprinkler sprayheads 28 to ensure complete spray coverage over and about building structure to be protected by fire inhibitor when sprayed by the installed stationary sprinkler-based fire-protection zone spraying system 50.

As indicated at Block D in FIG. 7A, the fourth step involves confirming that perimeter and surface area of the building structure 36 is covered by overlapping sprinkler spraying patterns with at least 25% (preferably 50%) spray-surface overlapping of sprinkler spray patterns.

As indicated at Block E in FIG. 7A, the fifth step involves mounting and/or installing sprinkler heads on building structure and/or property 36, at the determined placement locations in step c, to achieve the spray coverage required to completely spray property and apply the environmentally clean fire inhibiting coating on all combustible surfaces.

As indicated at Block F in FIG. 7A, the sixth step involves connecting the electrical liquid pump 22, and sprinkler sprayheads 28 in a fluid series configuration using PVC or like plastic tubing 26.

As indicated at Block G in FIG. 7A, the seventh step involves connecting fire inhibitor storage tank 21, and source of water 37, to the electric pump 22 using a valve assembly 25 and PVC or like piping so that either (i) when the 2-way valve assembly 25 which when configured into a first position, water from the water source (e.g. garden hose) is allowed to flow under building water pressure into the electric pump 22 and through the closed fluid pumping loop and spraying from sprinkler heads 28 during testing operations, and (ii) when the valve assembly is configured to a second position, the liquid fire inhibitor 35 premixed and stored in the storage tank 21 is allowed to flow into the electric pump 22 and through the closed pumping loop and spraying from sprinkler heads 28 during proactive wildfire defense spraying operations.

As indicated at Block I in FIG. 7B, the eighth step involves connecting 120V lithium-battery backup power supply system to 120V/30 A service at building location, and then connect 4G GSM remote power control switch between lithium-battery backup power supply system and electric pump, using electrical earth-grounding on the electric fluid (water) pump.

As indicated at Block H in FIG. 7B, the ninth step involves activating (i) the 4G GSM remote power control switch 24 with telecommunication company (e.g. AT&T) providing SIM card for the GSM power control switch 24, which will involve: assigning a phone number and SMS service to the remote power control switch 24, and also (ii) assigning a phone number and SMS service to the 4G GSM GPS sensor 30 mounted on the Citrotech® storage tank 21 at the factory. This will involve activating its 3V battery and enabling the GPS sensor 30 to GPS track the storage tank 21 location and automatically transmit the GPS location data to a SMS server operated by the manufacturer of the wildfire defense spraying system kit 20, and support a GPS tracking and monitoring of each Citrotech® containing storage tank 21 deployed around the globe.

As indicated at Block J in FIG. 7B, the tenth step involves, during sprinkler spray pattern testing operations, configuring the valve assembly 25 into its first flow control position, so that water from a water source (e.g. garden hose or house facet) 37 is allowed to flow under building water pressure into the electric pump 22 and through the closed fluid circulation loop and spraying from sprinkler heads 28, and confirm that the sprinklers 28 are operating property and that their spray coverage and spray patterns are overlapping as desired, and if not, then adjusting the sprinkler heads as needed or otherwise required.

As indicated at Block K in FIG. 7B, the eleventh step involves, during activation operations, ascertaining that the adequate amount of Citrotech® wildfire inhibitor dry powder 29 is contained in the storage tank 21 (to the dry powder fill line), and then fasten mixing nozzle 27 to hose and fill the storage tank 21 with water 37 to its water fill line so that premixed Citrotech® liquid wildfire inhibitor 35 will be ready for spray application once the proper quantity of water has been added to the storage tank 21.

As indicated at Block L in FIG. 7B, the twelfth step involves configuring the Valve Assembly to the Second Position, so that the premixed Citrotech® liquid wildfire inhibitor 35 is premixed and stored in the storage tank 21 is allowed and to flow into the electric pump 22 and be driven through the closed irrigation loop and spraying from sprinkler heads 28, under the pressure of the electric pump 22 in the fluid loop during proactive wildfire defense spraying operations.

As indicated at Block M in FIG. 7C, the thirteenth step involves registering the installed and configured WFD spraying system 50 with Mighty Fire Breaker, LLC by (i) browsing to the Site http://www.mightyfirebreaker.com/citrotech-locked-n-loaded, (ii) scanning the unique QR code (or RFID tag or other machine-readable code) 31 assigned to and located on the Citrotech® liquid chemical storage tank 21, and (iii) completing the Registration Process, using the GPS-tracking information collected from the WFD spraying system 50; an email notification will be sent to user once Registration Process is completed.

As indicated at Block N in FIG. 7C, the fourteenth step involves, prior to arrival of a wildfire at the building location, and just prior to proactive wildfire defense spraying operations, the homeowner or authorized personnel using a mobile smartphone 11 or other phone device to send a SMS activation signal 40 over the digital cellular network to the 4G GSM remote power control switch 24 at the property location, so as that electrical power is automatically delivered to the electric pump 22 from the backup batter storage system 23 and enables the electric pump 22 to work and start pumping the premixed Citrotech® liquid wildfire from the storage tank 21 through the closed pumping loop and spraying out from sprinkler heads 28, under the fluid loop pressure, to provide all combustible surfaces on the property including the building 36, with a Citrotech® environmentally-clean potassium salt crystalline coating—that protects the combustible material from fire ignition, flame spread and smoke development when encountering hot flying wildfire embers during a wildfire storm.

As indicated at Block O in FIG. 7C, the fifteenth step involves any time after discharge and spraying of the Citrotech® fire inhibiting liquid 35 from the storage tank 21, and/or after the safe passage of a wildfire at the building location with all mitigated damages repaired, reactivating, and preparing the wildfire defense spraying system 50 for its next round of proactive fire defense spraying operations, as follows:

(i) Configuring the valve assembly 25 in the First Position and then flush all sprinkler heads with clean water for 10 minutes, according to Step J;

(ii) Configuring the value assembly 25 in the Second Position, and then refill the storage tank 21 with a new Citrotech® dry powder fire inhibitor cartridge (e.g. 25 lbs.) 29 from its manufacturer, and then fill the storage tank 21 to the Water Fill Line using clean water supplied through the mixing nozzle 27 as described in Step K; and (iii) Configuring the valve assembly 25 to its Second Position and prepare and configure the WFD System 50 as loaded and ready for the next wildfire threat (i.e. the system is loaded and ready to spray upon being triggered).

As indicated at Block P in FIG. 7C, the thirteenth step involves triggering the WFD system after any significant rainfall on the property which may have dissolved, washed away, or deteriorated the Citrotech® potassium salt crystalline coatings, which once proactively protected combustible materials on the property from fire ignition, flame spread and smoke development.

At this juncture it will be appropriate to describe three topologically different kinds of clean-chemistry wildfire breaks and protection-zones that might be proactively formed about, before, or over targeted properties, using the wireless remotely activated wildfire defense spraying system, with respect to prevailing winds in the environment under consideration.

Figure 8:
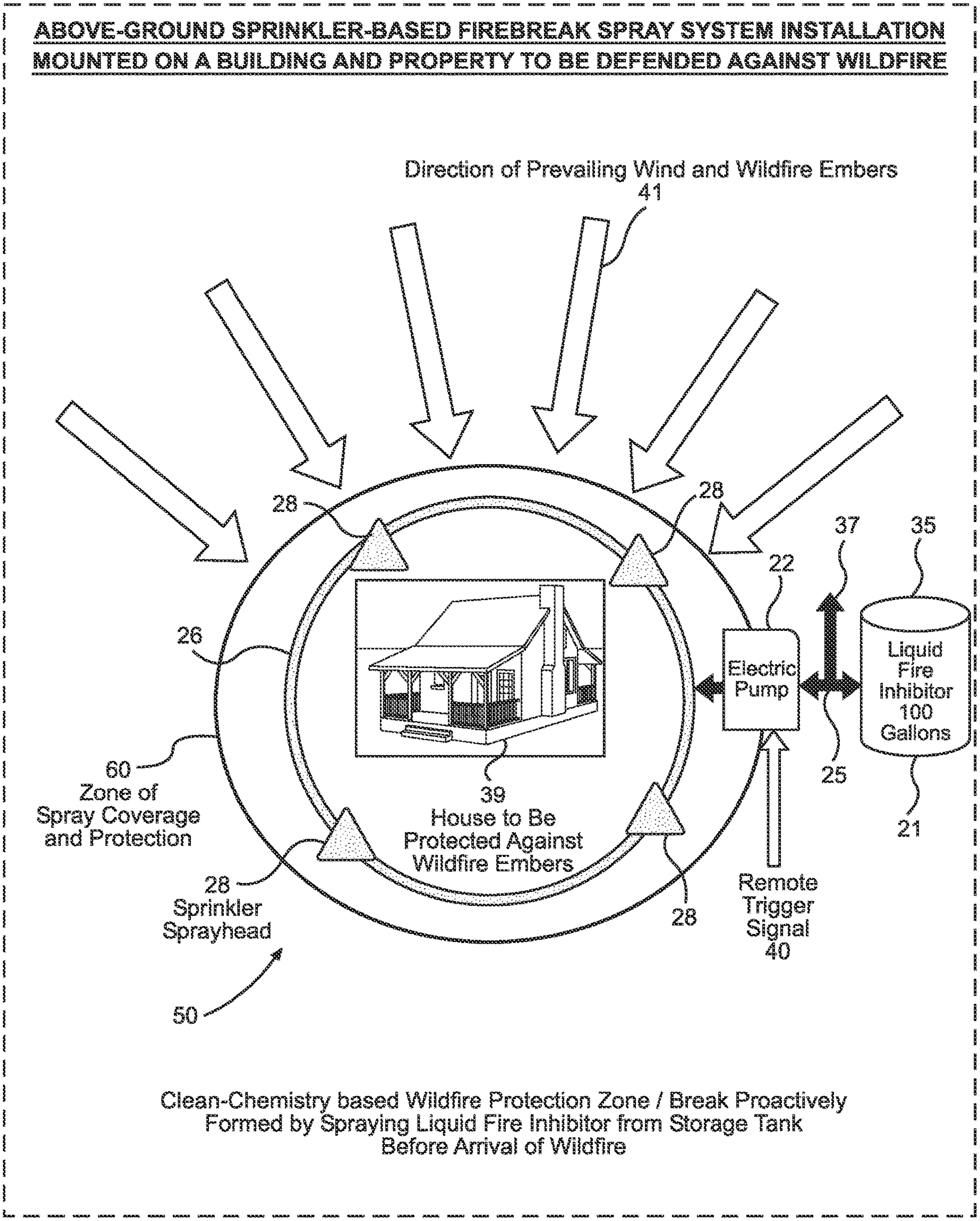
FIG. 8 is a schematic representation of an above-ground sprinkler-based firebreak spraying system installation of the present invention mounted on a building and property to spray the region with an environmentally-clear liquid fire inhibitor for defending against wildfire by inhibiting fire ignition and flame spread by hot flying wildfire embers created during a wildfire storm.

Specification of an Above-Ground Sprinkler-Based Firebreak Spray System Installation Mounted on a Building and Property to be Defended Against Wildfire FIG. 8 shows an above-ground sprinkler-based firebreak spray system installation 50 of the present invention mounted on a building and property to spray the region with an environmentally-clear liquid fire inhibitor for defending against wildfire by inhibiting fire ignition and flame spread by hot flying wildfire embers created during a wildfire storm. During operation, the system proactively forms a clean-chemistry based wildfire protection zone/break 60 over and about a house/property to be protected/defended by spraying liquid fire inhibitor 35 from storage tank 21 before arrival of wildfire.

Figure 9:
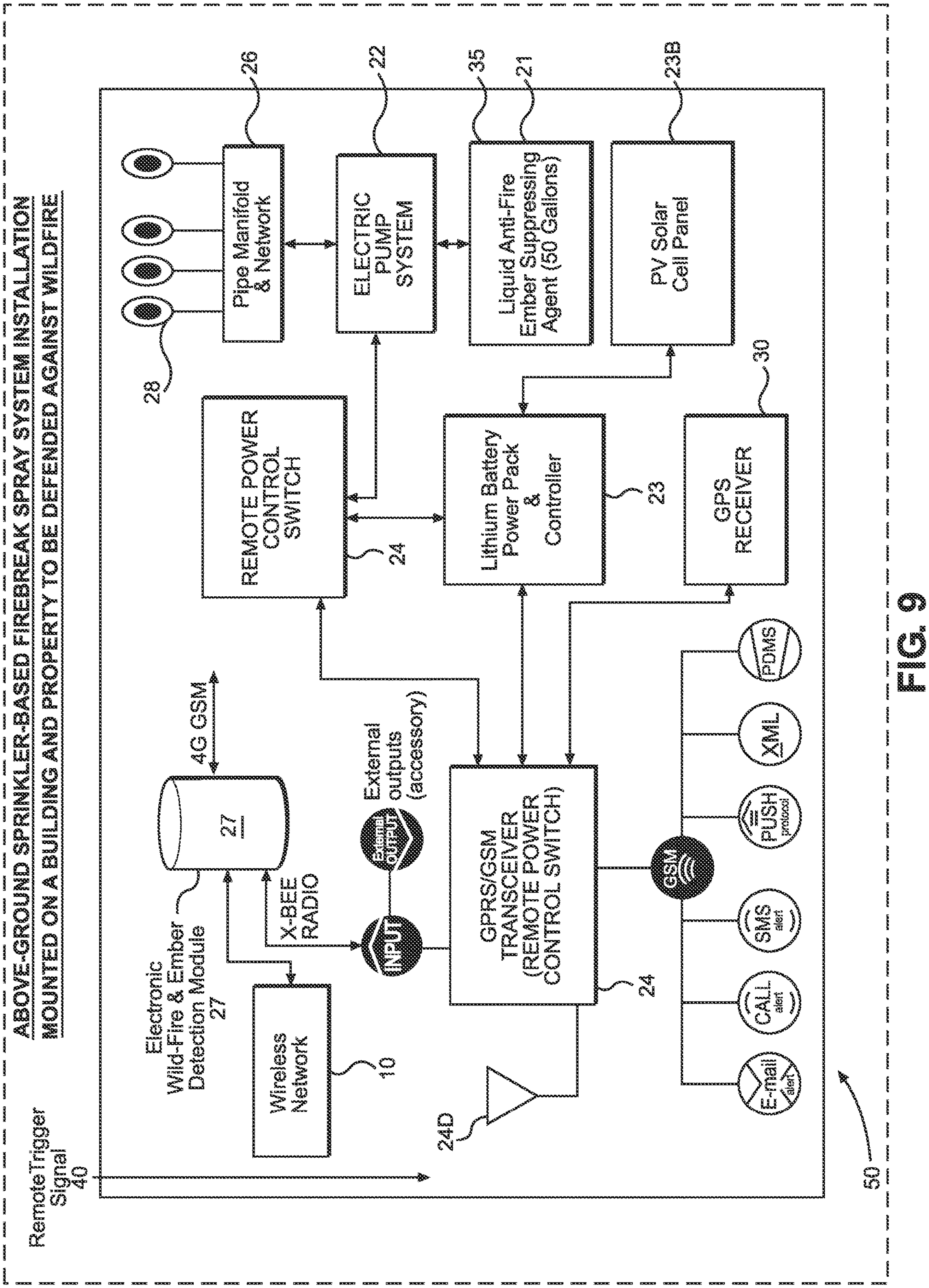
FIG. 9 is a block schematic representation of a wireless remotely-activatable sprinkler-based wildfire defense fire inhibitor spraying system of the present invention deployed in FIG. 8.

FIG. 9 shows the wireless remotely-activatable sprinkler-based wildfire defense fire inhibitor spraying system of the present invention 50 deployed in FIG. 8, which is modeled after the general system shown in FIG. 6 and described above.

Figure 10:
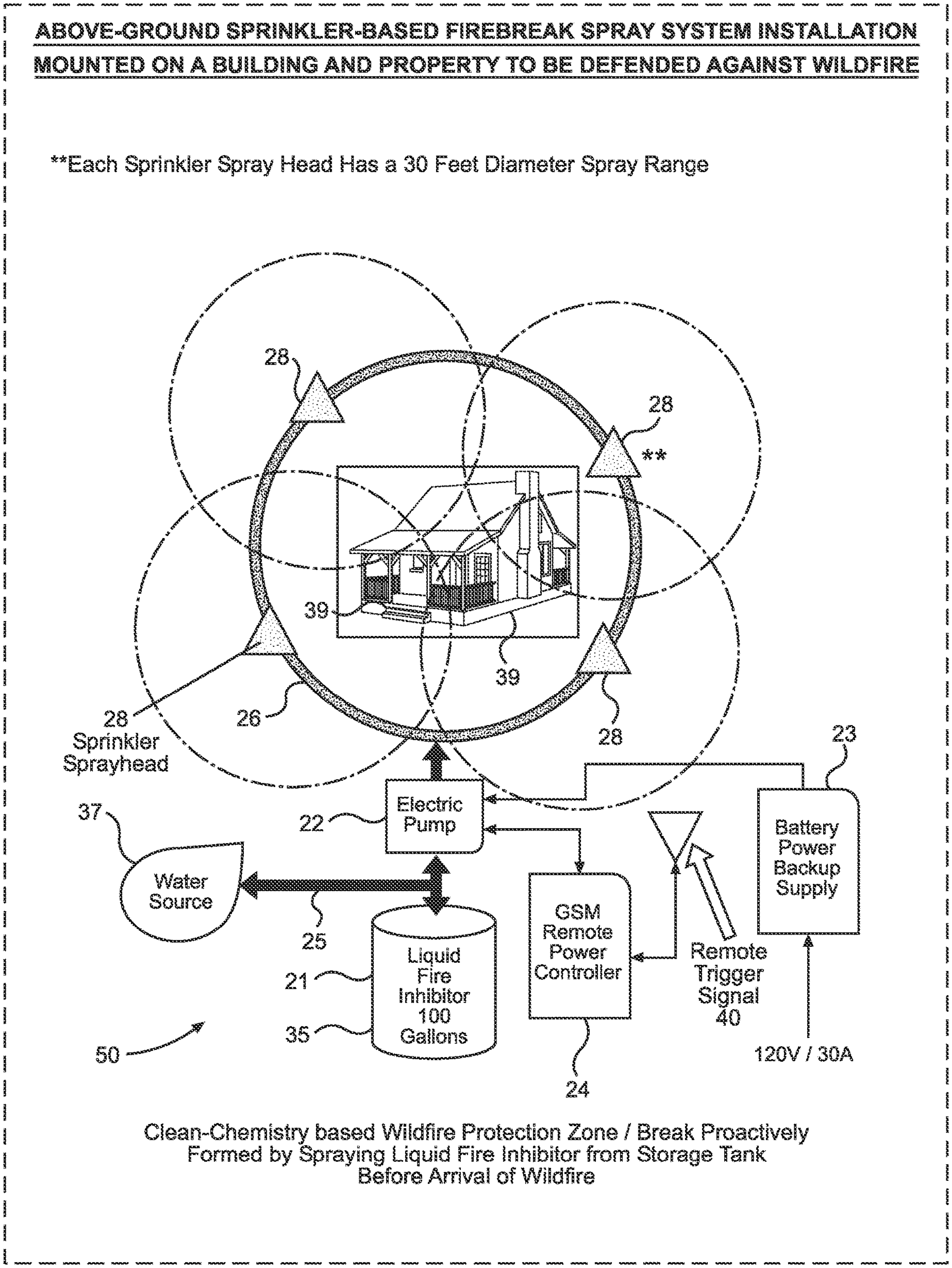
FIG. 10 is a schematic diagram showing the spray patterns generated by the sprinkler sprayheads mounted about the building, and driven by the wildfire defense fire inhibiting spraying system of this illustrative embodiment of the present invention.

FIG. 10 is a schematic diagram shows the spray patterns generated by the sprinkler heads 28 mounted about the building, and driven by the wildfire defense fire inhibiting spraying system 50 of this illustrative embodiment of the present invention.

Figure 11:
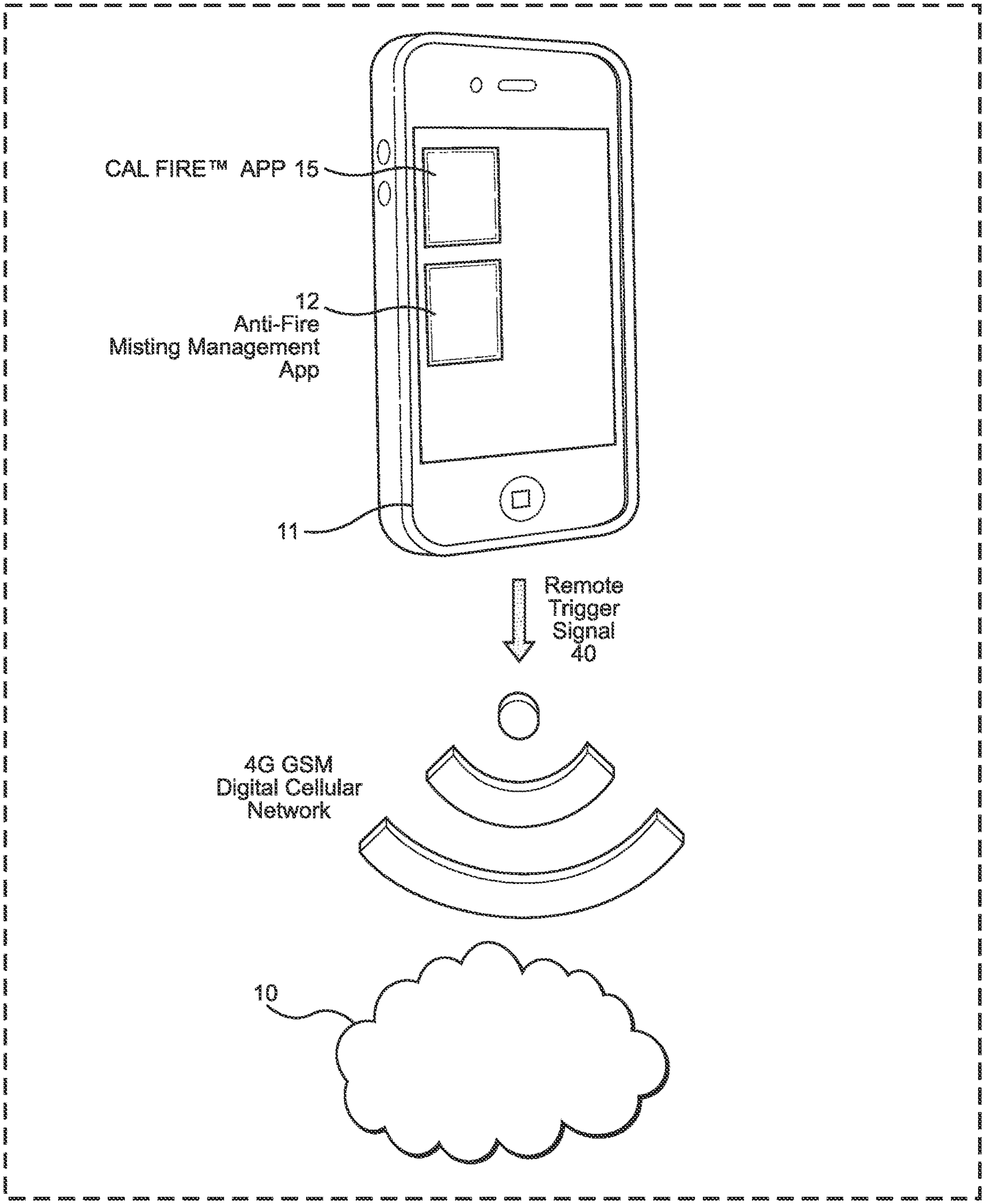
FIG. 11 is a schematic representation of mobile smartphone being used to remotely activate the spraying of fire inhibitor before the arrival of a wildfire on the property of the system installation of FIGS. 9 and 10, using SMS supported by a 4G GSM digital cellular communication link between the smartphone and the 4G GSM remote power control switch employed at the spraying system installation.

FIG. 11 shows mobile smartphone 11 being used to remotely activate the spraying of Citrotech® fire inhibitor before the arrival of a wildfire on the property of the system installation 50 of FIGS. 9 and 10, using SMS supported by a 4G GSM digital cellular communication link between the smartphone 11 and the 4G GSM remote power control switch 24 employed at the spraying system installation. Specifically, the homeowner sends a text message 40 via SMS over 4G GSM digital cellular network to automatically activate electric pump 22 via the 4G GSM remote power control switch 24 used in the wildfire defense spraying system 50. When the pump 21 completes pumping and spraying all the fire inhibitor 35 in the storage tank 21, the electric pump will automatically shut off, and water molecules in the liquid fire inhibitor will begin to immediately evaporate forming fire-inhibiting potassium salt crystalline coatings on sprayed property.

Figure 12:
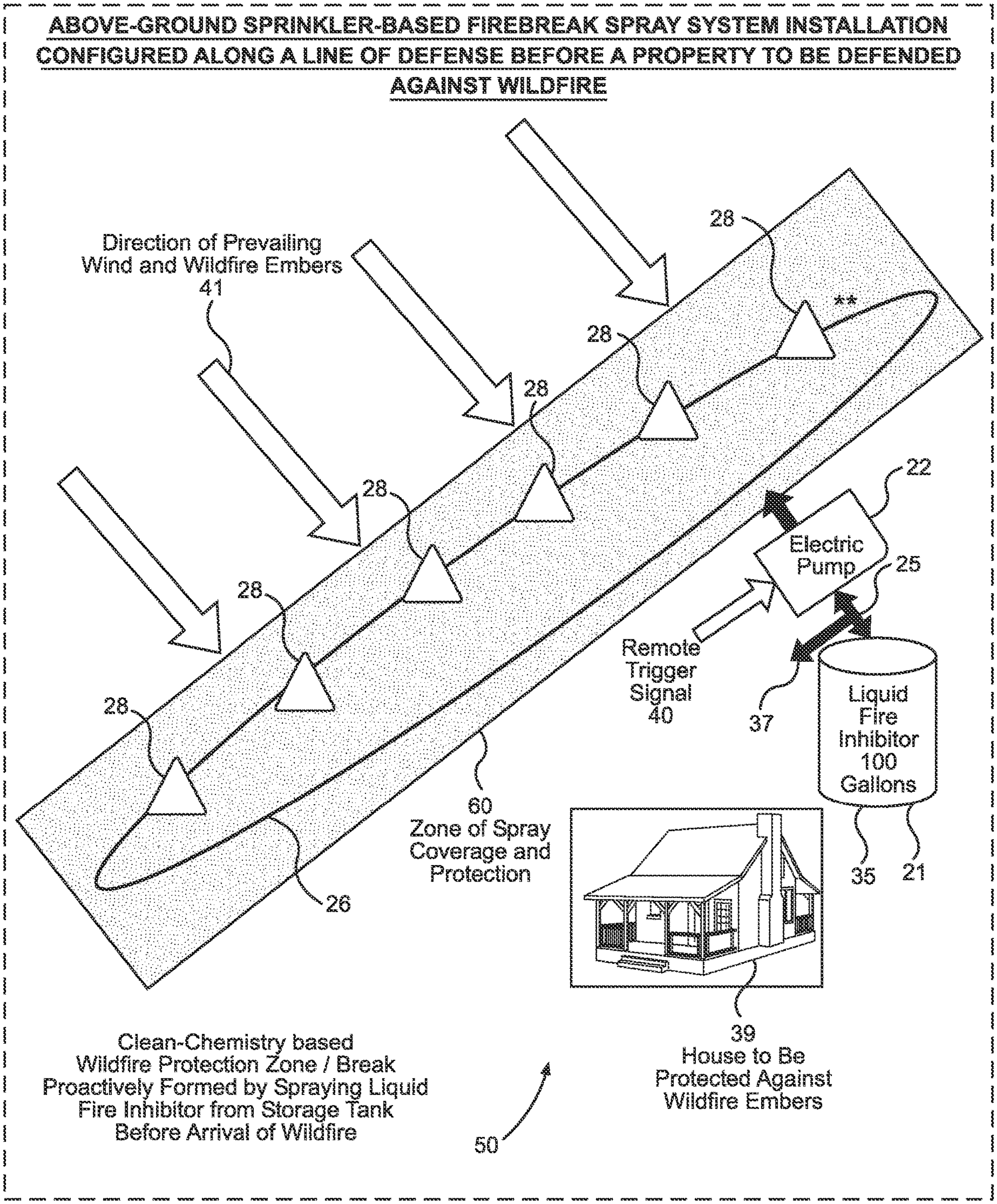
FIG. 12 is a schematic representation of an above-ground sprinkler-based firebreak spraying system installation of the present invention configured before a property to be defended against wildfire by spraying a zone of fire inhibiting chemistry that inhibits fire ignition and flame spread by hot flying wildfire embers created during a wildfire storm.

Specification of an Above-Ground Sprinkler-Based Firebreak Spray System Installation Mounted on a Building and Property to be Defended Against Wildfire FIG. 12 shows an above-ground sprinkler-based firebreak spray system installation of the present invention 50 configured before a property and building 36 to be defended against wildfire by spraying a zone of fire inhibiting chemistry 60 that inhibits fire ignition and flame spread by hot flying wildfire embers created during a wildfire storm 41.

Figure 13:
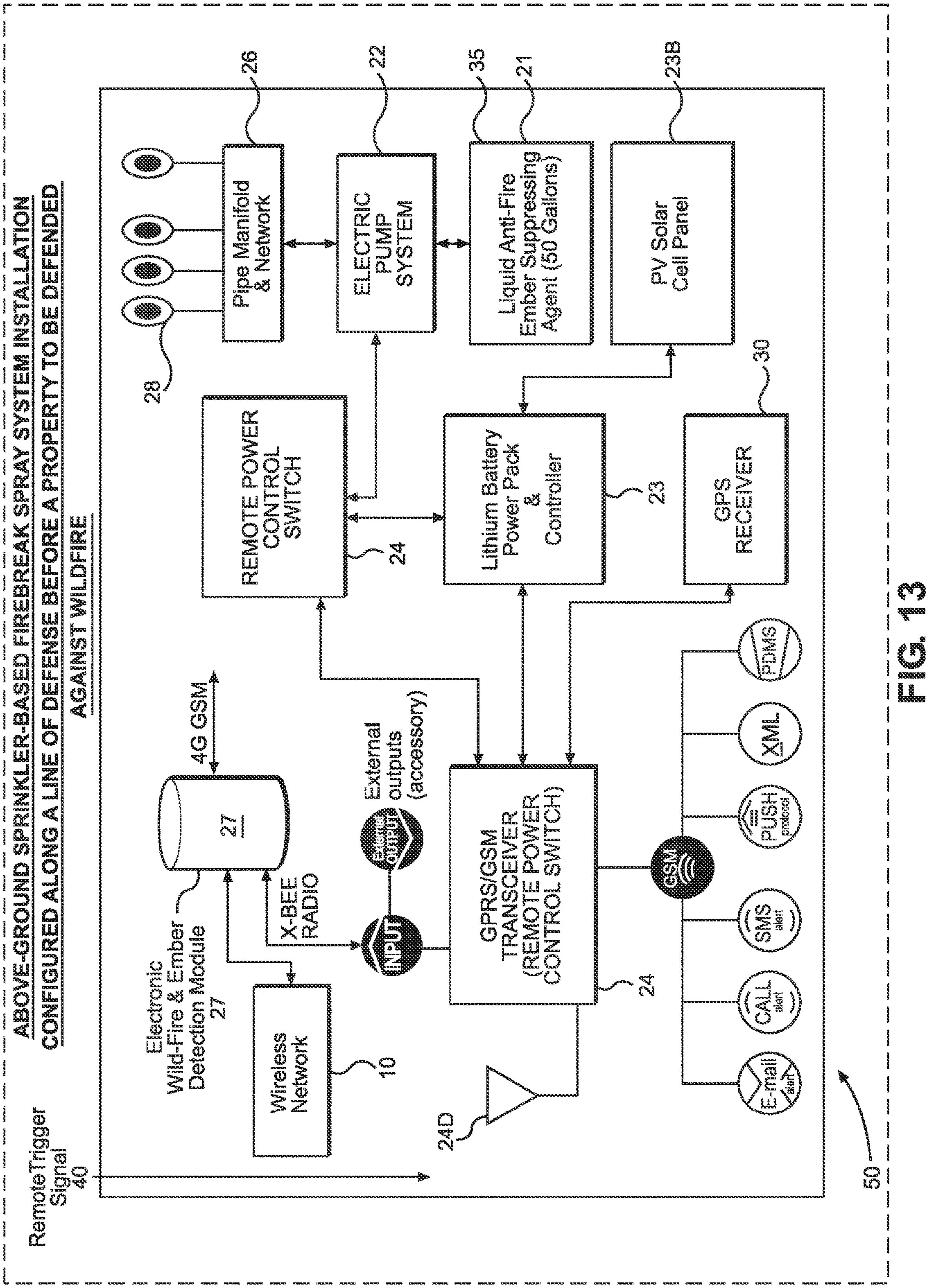
FIG. 13 is a block schematic representation of a wireless remotely-activatable sprinkler-based wildfire defense fire inhibitor spraying system of the present invention deployed in FIG. 12.

FIG. 13 shows a wireless remotely-activatable sprinkler-based wildfire defense fire inhibitor spraying system of the present invention 50 deployed in FIG. 12, which is modeled after the general system shown in FIG. 6 and described above.

Figure 14:
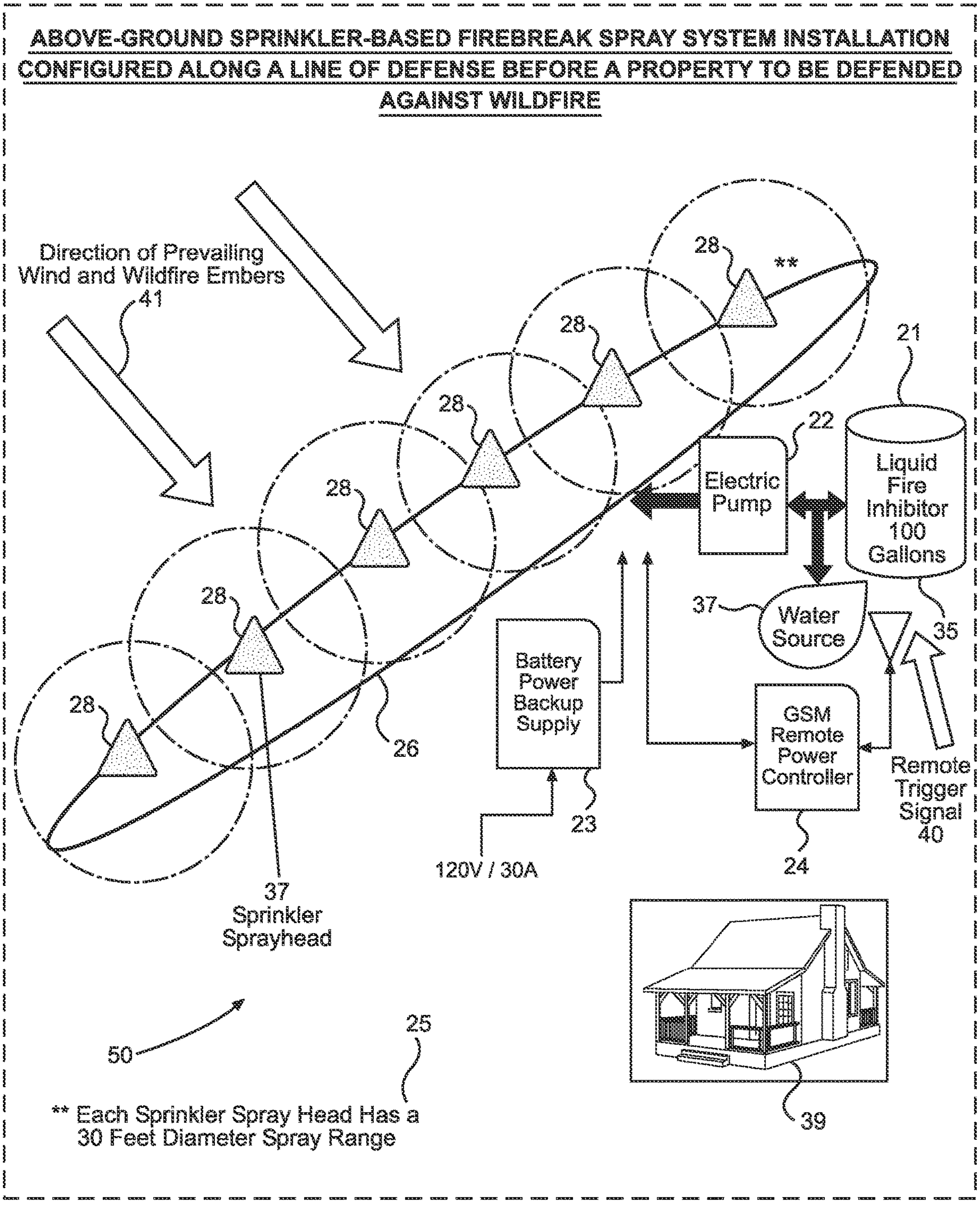
FIG. 14 is a schematic diagram showing the resulting linear spray pattern generated by the sprinkler sprayheads mounted above the ground before the property to be protected and driven by the wildfire defense fire inhibiting spraying system of this illustrative embodiment of the present invention.

FIG. 14 shows the resulting linear spray pattern generated by the sprinkler heads 28 mounted above the ground before the property to be protected and driven by the wildfire defense fire inhibiting spraying system 50 of this illustrative embodiment of the present invention.

Figure 15:
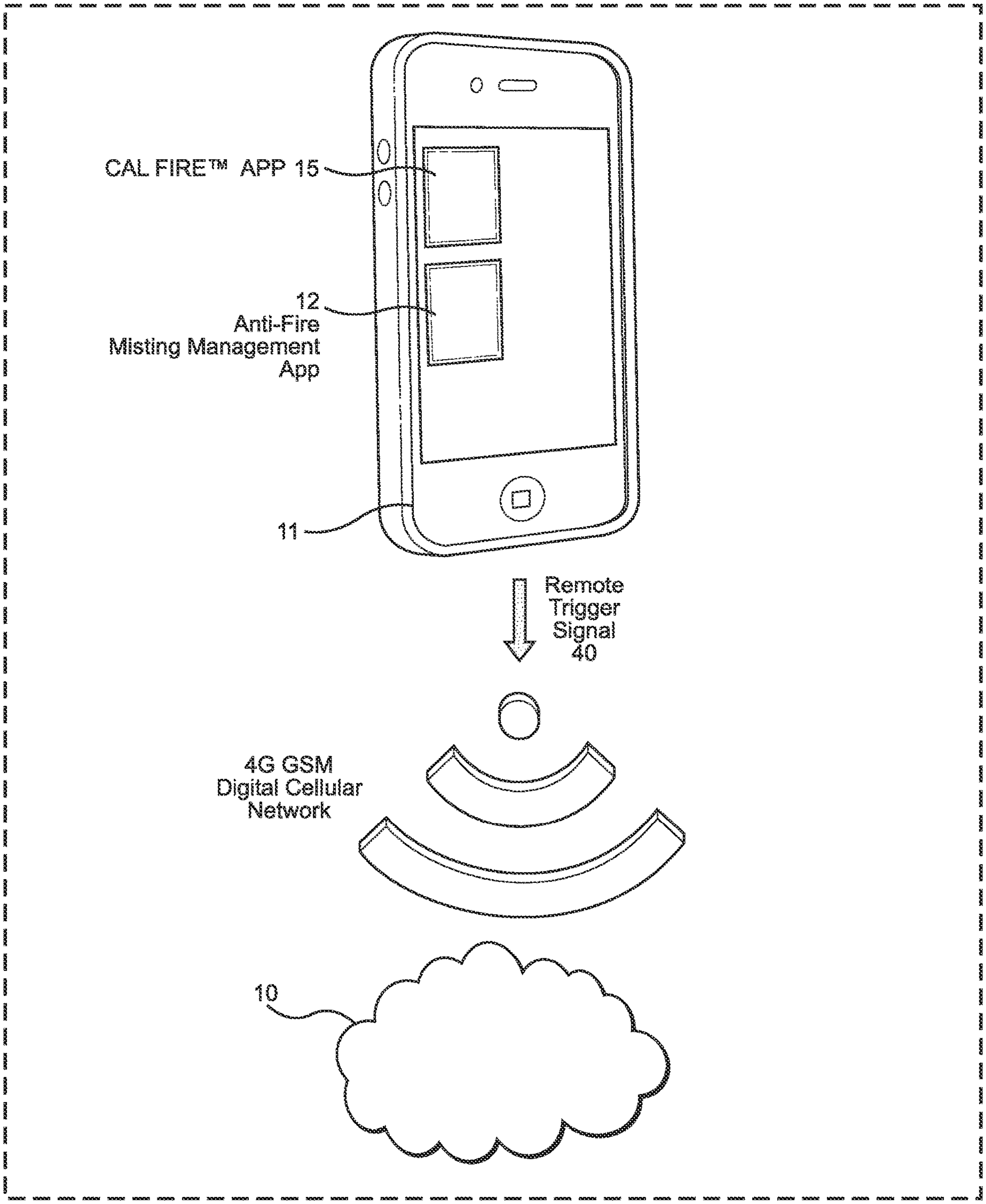
FIG. 15 is a schematic representation of mobile smartphone being used to remotely activate the spraying of fire inhibitor before the arrival of a wildfire on the property of the system installation of FIGS. 13 and 14, using SMS supported by a 4G GSM digital cellular communication link between the smartphone and the 4G GSM remote power control switch employed at the spraying system installation.

FIG. 15 shows a mobile smartphone 11 being used to remotely activate the spraying of fire inhibitor 35 before the arrival of a wildfire on the property of the system installation 50 of FIGS. 13 and 14, using SMS supported by a 4G GSM digital cellular communication link between the smartphone 11 and the 4G GSM remote power control switch 24 employed at the spraying system installation. Specifically, the homeowner sends a text message 40 via SMS over 4G GSM digital cellular network to automatically activate electric pump 22 via the 4G GSM remote power control switch 24 used in the wildfire defense spraying system. When the pump 21 completes pumping and spraying all the fire inhibitor 35 in the storage tank 21, the electric pump will automatically shut off, and water molecules in the liquid fire inhibitor will begin to immediately evaporate forming fire-inhibiting potassium salt crystalline coatings on sprayed property.

Figure 16:
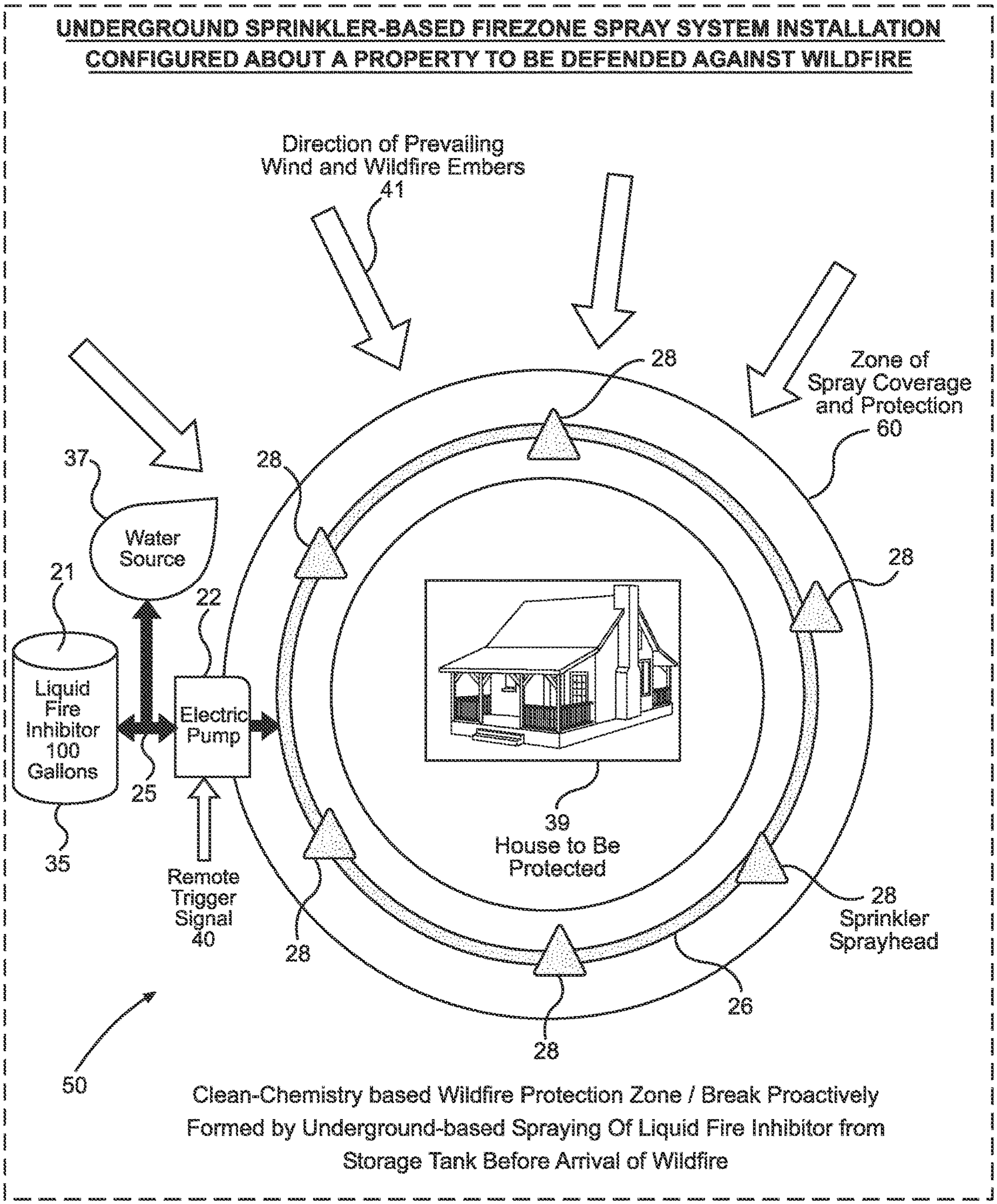
FIG. 16 is a schematic representation of an under-ground sprinkler-based firebreak spraying system installation of the present invention configured about a property to be defended against wildfire by spraying a zone of fire inhibiting chemistry that inhibits fire ignition and flame spread by hot flying wildfire embers created during a wildfire storm.

Specification of Underground Sprinkler-Based Fire-Zone Spray System Installation Configured about a Property to be Defended Against Wildfire FIG. 16 shows an under-ground sprinkler-based firebreak spray system installation of the present invention 50 configured about a property to be defended against wildfire by spraying a zone of fire inhibiting chemistry 60 that inhibits fire ignition and flame spread by hot flying wildfire embers 41 created during a wildfire storm.

Figure 17:
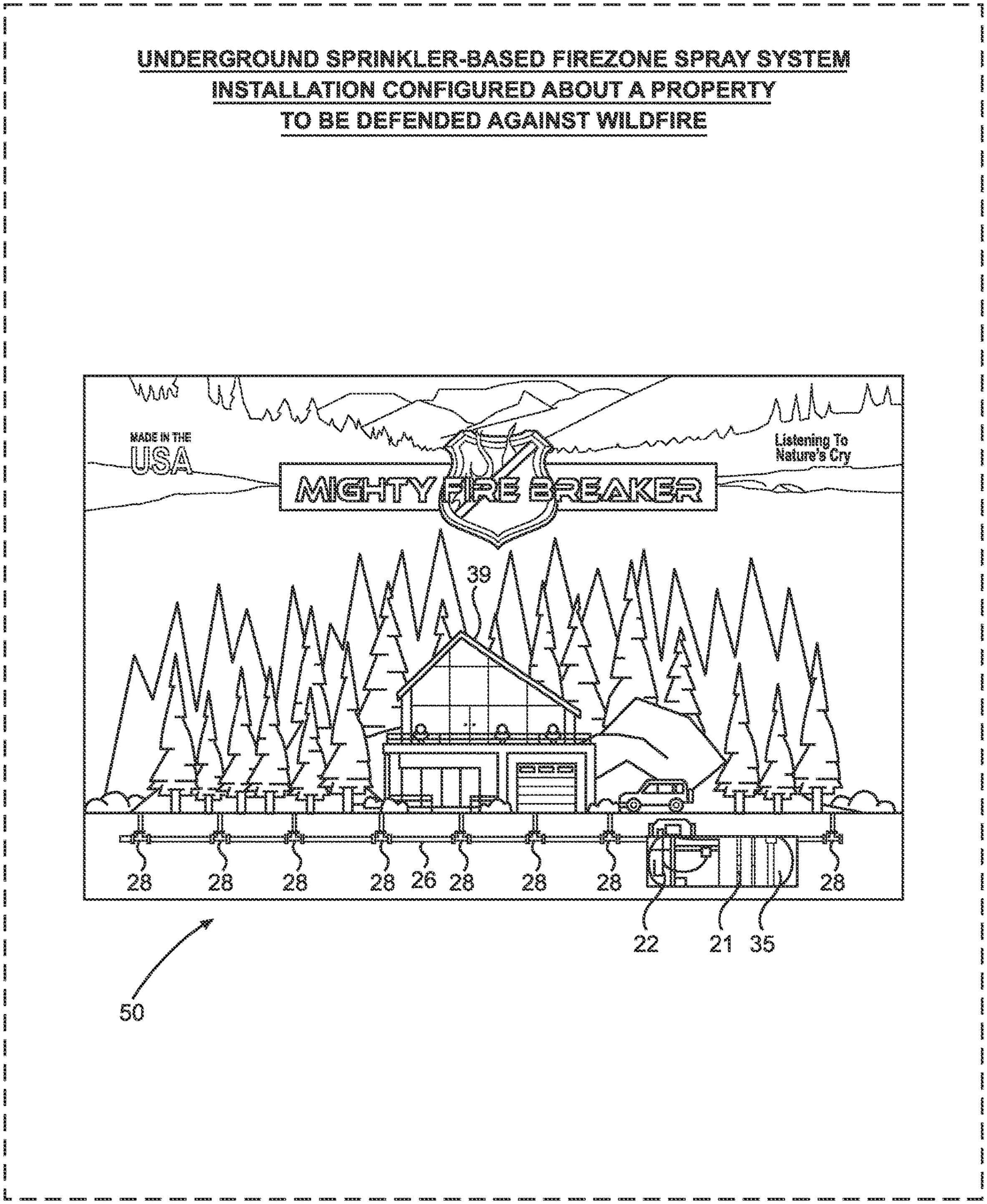
FIG. 17 is a cross-sectional block schematic representation of the wireless remotely-activatable sprinkler-based wildfire defense fire inhibitor spraying system of the present invention deployed in FIG. 16.

FIG. 17 shows the wireless remotely-activatable sprinkler-based wildfire defense fire inhibitor spraying system of the present invention 50 deployed in FIG. 16.

Figure 18A:
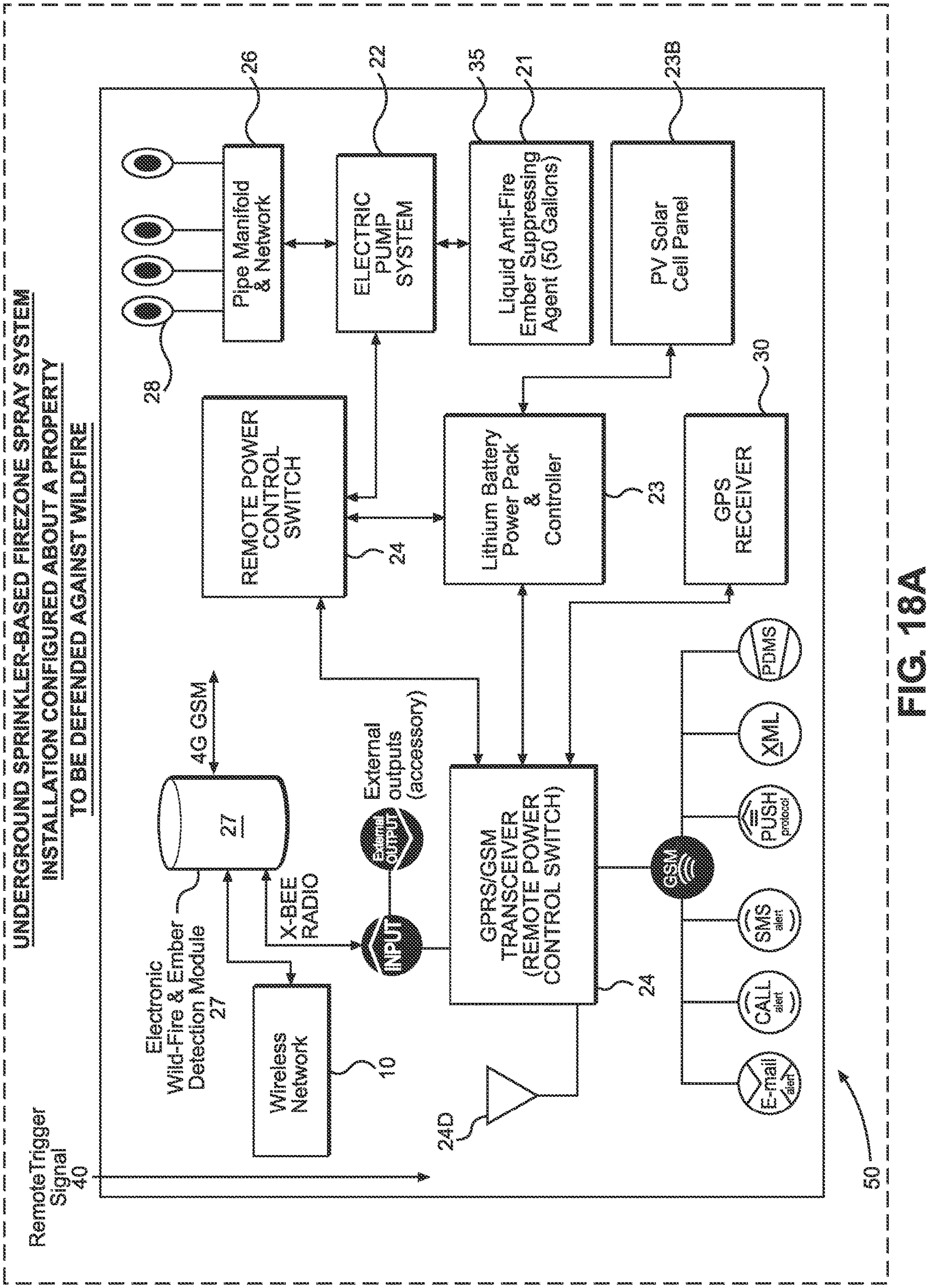
FIGS. 18A and 18B, taken together, set forth a schematic diagram showing the system of the present invention shown in FIGS. 16 and 17, providing an inground spraying solution around the property, wherein spreadheads, chemical storage tank and electric pump and components are mounted underground, and configured for automatically spraying preconfigured patterns of environmentally-clean fire inhibitor on ground surfaces requiring proactive protection against wildfires.

FIG. 18A shows the system of the present invention depicted in FIGS. 16 and 17, which is modeled after the general system shown in FIG. 6 and described above.

Figure 18B:
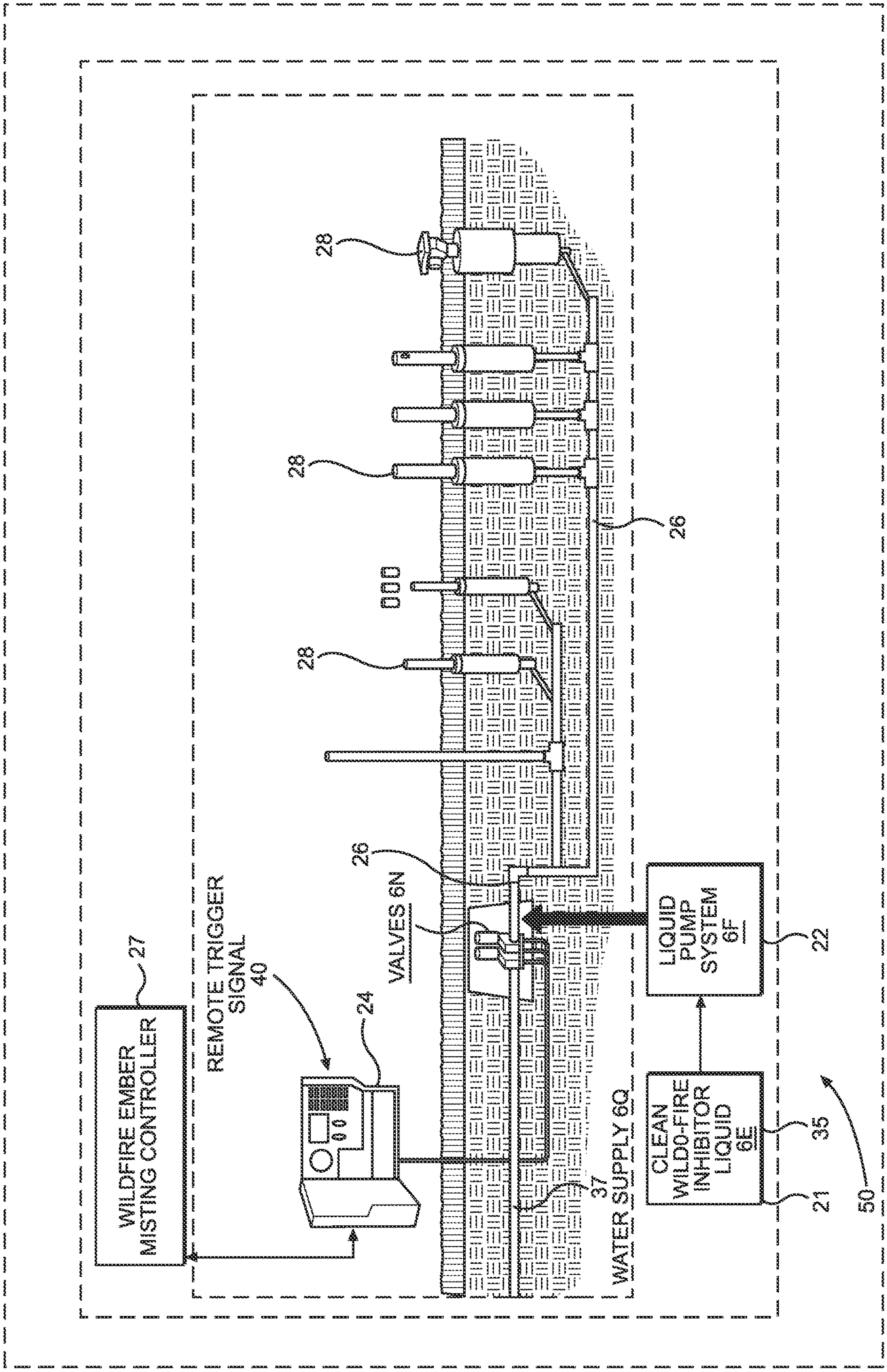

FIG. 18B shows that the spray heads 28, chemical storage tank 21 and electric pump 22 and components are mounted underground, and configured for automatically spraying preconfigured patterns of environmentally-clean fire inhibitor on ground surfaces requiring proactive protection against wildfires.

Figure 19:
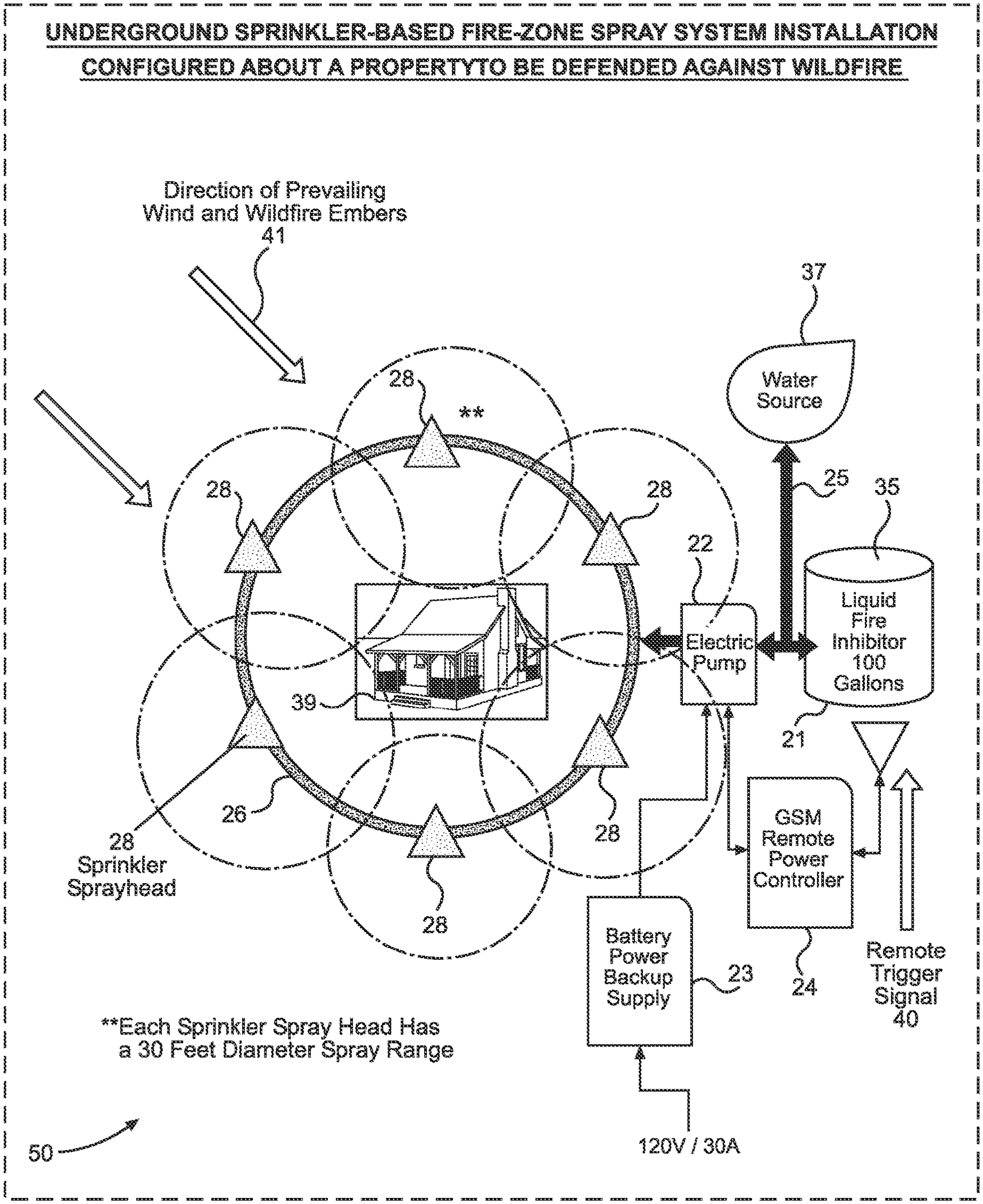
FIG. 19 is a schematic diagram showing the resulting linear spray pattern generated by the sprinkler sprayheads mounted underground before and/or about the property to be protected, and driven by the wildfire defense fire inhibiting spraying system of this illustrative embodiment of the present invention.

FIG. 19 shows the resulting linear spray pattern generated by the sprinkler heads 28 mounted underground before and/or about the property to be protected, and driven by the wildfire defense fire inhibiting spraying system of this illustrative embodiment 50 of the present invention.

Figure 20:
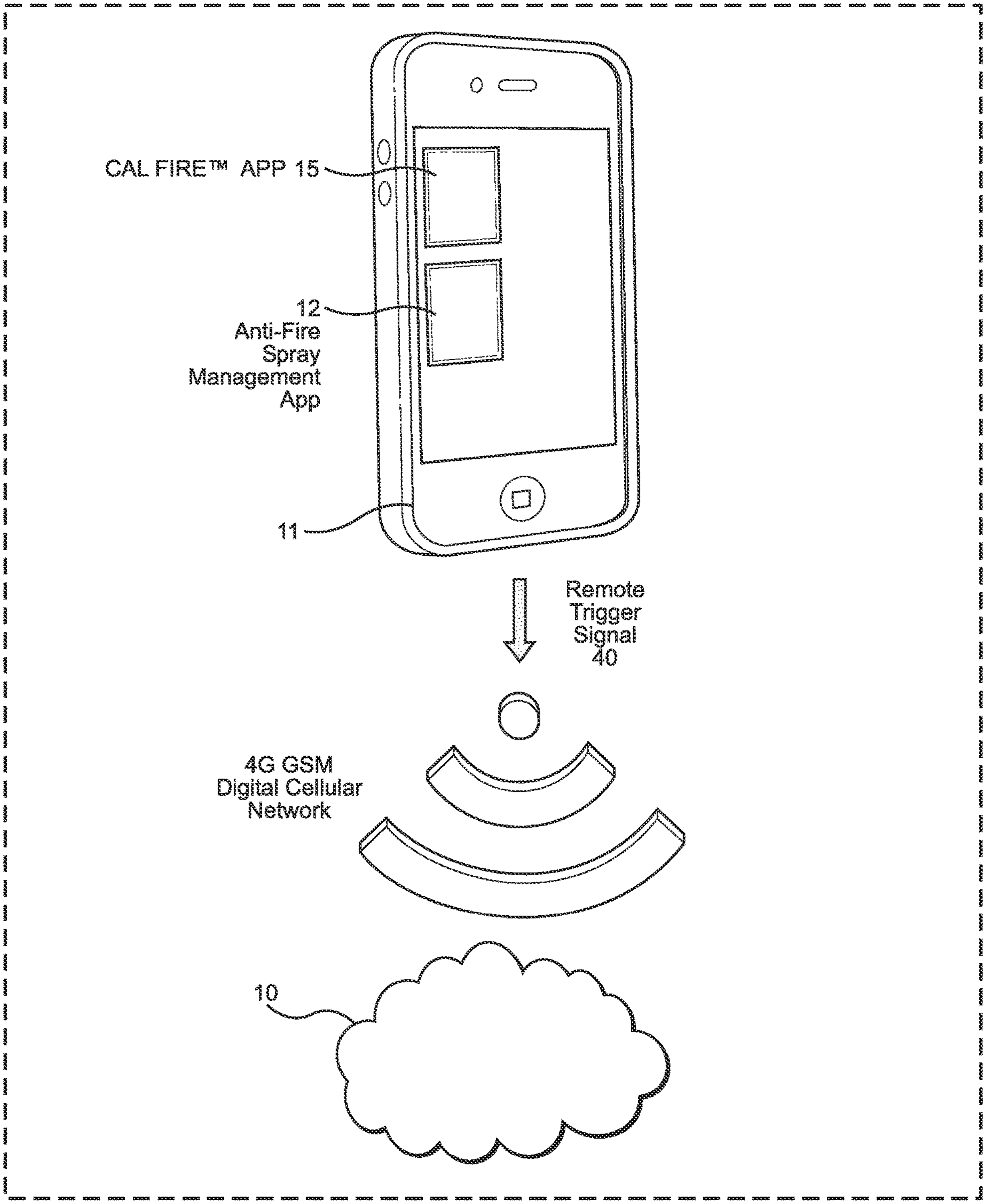
FIG. 20 is a schematic representation of mobile smartphone being used to remotely activate the spraying of fire inhibitor before the arrival of a wildfire on the property of the system installation of FIGS. 18A, 18B and 19, using SMS supported by a 4G GSM digital cellular communication link between the smartphone and the 4G GSM remote power control switch employed at the spraying system installation.

FIG. 20 shows a mobile smartphone 11 being used to remotely activate the spraying of fire inhibitor 35 before the arrival of a wildfire on the property of the system installation of FIGS. 18A, 18B and 19, using SMS supported by a 4G GSM digital cellular communication link between the smartphone 11 and the 4G GSM remote power control switch 24 employed at the spraying system installation 50. Specifically, the homeowner sends a text message via SMS over 4G GSM digital cellular network to automatically activate electric pump 21 via the 4G GSM remote power control switch 24 used in the wildfire defense spraying system 50. Specifically, the homeowner sends a text message 40 via SMS over 4G GSM digital cellular network to automatically activate electric pump 22 via the 4G GSM remote power control switch 24 used in the wildfire defense spraying system. 50 When the pump 21 completes pumping and spraying all the fire inhibitor 35 in the storage tank 21, the electric pump 22 will automatically shut off, and water molecules in the liquid fire inhibitor will begin to immediate evaporate forming fire-inhibiting potassium salt crystalline coatings on sprayed property 36.

Method of Operating the Wildfire Defense Spraying System of the Present Invention In the preferred embodiments described above, a building/home owner or manager can manually activate and operate the spraying system from anywhere to protect either the building and/or ground surfaces around the building, as desired or required, based on intelligence in the possession of the human operator or manager.

Alternatively, the automated wildfire ember controller 27 when activated, in cooperation with the local electronic wildfire and ember detection module 27 and associated 4G GSM cellular network, automatically activates and operates the electric pump of the spraying system to protect both the building and/or ground surfaces around the building, as required, based on intelligence automatically collected by ember/smoke detector deployed on the wireless network and linked to the homeowner's wildfire defense spraying system.

Preferably, each wildfire defense spraying system 50 will include automated mechanisms for remotely monitoring and reporting the amount of Citrotech® fire inhibitor chemical liquid available and remaining for use in supporting spraying operations. Such monitoring will help to ensure that adequate reserves of fire inhibiting chemical liquid are stored in GPS-tracked storage tanks 21 on each property before any given wildfire strike to support wildfire ember suppression spraying operations.

Typically, the locked and loaded home wildfire defense system will be manually triggered by the owners several hours and just before the owners are required to evacuate their homes and property for safety reasons, by authorities such as the local fire chief and deputies. Alternatively, the wildfire home defense system can also be remotely triggered using a mobile smartphone 11, if required, with the property owners not home to manually triggering the spraying defense mode of the system.

The system will be remotely controllable by the building manger/home-owner using a mobile computing system 11 running the mobile application. Suitable graphical user interfaces (GUIs) can be supported on the mobile application to enable the user to monitor and control the system locally, or from a remote location, in real-time, provided the wireless communication infrastructure is not disrupted by a wildfire. In the case of active wildfires, a wildfire detection and notification network can be provided for continuously collecting, recording and monitor intelligence about specific regions of land and any wildfires detected in such regions, and advise any specific home/building owner of the status of any specific building before, during and after a wildfire.

Modifications to the Present Invention which Readily Come to Mind

The illustrative kits and spray system embodiments disclose using environmentally clean fire inhibiting biochemical compositions of matter developed by Applicant and covered under pending U.S. patent application Ser. No. 17/167,084 filed Feb. 4, 2021, and titled ENVIRONMENTALLY-CLEAN WATER-BASED FIRE INHIBITING BIOCHEMICAL COMPOSITIONS, AND METHODS OF AND APPARATUS FOR APPLYING THE SAME TO PROTECT PROPERTY AGAINST WILDFIRE, incorporated herein by reference. However, it is understood that alternative clean fire inhibiting chemical compositions may be used to practice the wild fire defense methods according to the principles of the present invention.

In the illustrative embodiment of the wildfire home defense spraying system of the present invention, 4G GSM digital cellular communications is provided between the electrical pump components of the system and the homeowner's smartphone, enabling the remote triggering of automated fire inhibitor spraying operations on the property in response to a single SMS text message sent over the network from the homeowner's smartphone. This is a very reliable method of remote triggering because electrical power and internet service failure at homes during an active wildfire is more likely than loss of digital cellular service, all things considered.

However, it is understood that a web-based remote-control method for triggering the spraying system can be practiced as well by using a mobile application running a native mobile application or web browser application, and an Internet-based remote electrical power controller installed aboard the wildfire defense spraying system. Notably, in such a web-based alternative embodiment of the present invention, Internet service (and WIFI Service) will be required at the home-based property being protected, in order to enable remote-triggering of spraying operations executed using the homeowner's mobile smartphone running the native mobile application or web browser application, as the case may be.

All things considered, the 4G GSM remote control method would appear more reliable in most applications. However, in some applications, the web-based application might seem preferred. Also, in yet other environments and applications, use of both 4G GSM and web-based methods might be preferred to provide the homeowners two options of remote-control triggering of fire inhibitor spraying operations on a particular GPS-specified parcel of property.

While several modifications to the illustrative embodiments have been described above, it is understood that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. A wildfire defense spraying process for spraying a combustible building on property with an environmentally-clean water-based liquid fire inhibitor that inhibits fire ignition and flame spread caused by hot flying wildfire embers created during a wildfire storm, said wildfire defense spraying process comprising the steps of:

(a) maintaining a supply tank containing a supply of environmentally-clean water-based liquid fire inhibitor comprising a major amount of an alkali metal salt of a nonpolymeric carboxylic acid, and a minor amount of a coalescing agent realized in the form of an organic chemical compound dissolved in a major amount of water according to a prespecified formulation, wherein said environmentally-clean water-based liquid fire inhibitor remains stable without the formation of solids at expected operating temperatures, and ready for immediate spraying on the property;

(b) using an electric-powered hydraulic pump system to pump said environmentally-clean water-based liquid fire inhibitor from said supply tank through piping to a set of spray heads mounted about the building and said property, to produce a spray pattern of environmentally-clean water-based liquid fire inhibitor covering the building and property to be defended against wildfire; and (c) wherein, when said electric-powered hydraulic pump system completes pumping environmentally-clean water-based liquid fire inhibitor from said supply tank and its automated spraying operations, said electric-powered hydraulic pump system automatically stops pumping operations, and as water molecules in the environmentally-clean water-based liquid fire inhibitor evaporate to the environment, thin fire-inhibiting alkali metal salt crystalline coatings form on the sprayed property, inhibiting fire ignition and flame spread in the presence of wildfire.

2. The wildfire defense spraying process of claim 1, wherein step (b) comprises sending an electronic message over a digital cellular network to automatically activate said electric-powered hydraulic pump system via a wireless remote power control switch used in said wildfire defense spraying system.

3. The wildfire defense spraying process of claim 1, wherein step (b) comprises using a mobile smartphone to send an electronic message over a digital cellular communication link between said mobile smartphone and a wireless remote power control switch employed to supply electrical power to said electric-powered hydraulic pump system at said wildfire defense spraying system.

4. The wildfire defense spraying process of claim 1, wherein step (b) comprises receiving a radio control signal over a digital cellular communication network, and automatically triggering the spraying of said environmentally-clean water-based liquid fire inhibitor from said storage tank when said radio control signal is transmitted by a mobile smartphone operating over said digital cellular communication network.

5. The wildfire defense spraying process of claim 1, wherein said alkali metal salt comprises tripotassium citrate (TPC) and said coalescing agent comprises triethyl citrate (TEC), and wherein said thin fire-inhibiting alkali metal salt crystalline coatings comprise thin fire-inhibiting potassium salt crystalline coatings.

6. The wildfire defense spraying process of claim 1, wherein said expected operating temperatures of said wildfire defense spraying process extend over a range from about 34 F to about 120 F.

7. The wildfire defense spraying process of claim 1, wherein said spray pattern comprises a linear spray pattern generated by said spray heads mounted on the property to form a clean-chemical wildfire break against any incidence of a wildfire storm.

8. The wildfire defense spraying process of claim 1, wherein said spray pattern comprises a resulting spray pattern encircling the property generated by said spray heads mounted on the property to form a clean-chemical wildfire protection zone against any incidence of a wildfire storm.

9. A wildfire defense spraying process supported on a parcel of property having a building thereon, said wildfire defense spraying process comprising the steps of:

(a) maintaining a storage tank containing a supply of environmentally-clean water-based liquid fire inhibitor comprising a major amount of an alkali metal salt of a nonpolymeric carboxylic acid, and a minor amount of a coalescing agent realized in the form of an organic chemical compound dissolved in a major amount of water according to a prespecified formulation, wherein said environmentally-clean water-based liquid fire inhibitor remains stable without the formation of solids at expected operating temperatures, and ready for immediate spraying on the property;

(b) using a battery power supply system to supply electrical power to an electric-powered hydraulic pump system connected to said storage tank, and pumping environmentally-clean water-based liquid fire inhibitor through piping operably connected to a set of spray heads mounted about the building and property, and spraying said environmentally-clean liquid fire inhibitor according to spray patterns generated by said spray heads, and covering the property and building to be defended against wildfire; and (c) wherein, when said electric-powered hydraulic pump system completes pumping the environmentally-clean water-based liquid fire inhibitor from said storage tank through said piping and said spray heads to produce a spray pattern of environmentally-clean water-based liquid fire inhibitor over the property and building, said electric-powered hydraulic pump system automatically stops pumping operations, and as water molecules in the environmentally-clean water-based liquid fire inhibitor begin to evaporate, thin fire-inhibiting alkali metal salt crystalline coatings form on the sprayed property and building, inhibiting fire ignition and flame spread in the presence of wildfire.

10. The wildfire defense spraying process of claim 9, wherein said alkali metal salt comprises tripotassium citrate (TPC) and said coalescing agent comprises triethyl citrate (TEC), and wherein said thin fire-inhibiting alkali metal salt crystalline coatings comprise thin fire-inhibiting potassium salt crystalline coatings.

11. The wildfire defense spraying process of claim 9, wherein said expected operating temperatures of said wildfire defense spraying process extend over a range from about 34 F to about 120 F.

12. The wildfire defense spraying process of claim 9, wherein said spray pattern comprises a linear spray pattern generated by said spray heads mounted on the property to form a clean-chemical wildfire break against any incidence of a wildfire storm.

13. The wildfire defense spraying process of claim 9, wherein said spray pattern comprises a resulting spray pattern encircling the property generated by said spray heads mounted on the property to form a clean-chemical wildfire protection zone against any incidence of a wildfire storm.

14. A wildfire defense spraying process supported on property with a building to be protected against wildfire, said wildfire defense spraying process comprising the steps of:

(a) maintaining a storage tank containing a supply of environmentally-clean water-based liquid fire inhibitor comprising a major amount of an alkali metal salt of a nonpolymeric carboxylic acid, and a minor amount of a coalescing agent realized in the form of an organic chemical compound dissolved in a major amount of water according to a prespecified formulation, wherein said environmentally-clean water-based liquid fire inhibitor remains stable without the formation of solids at expected operating temperatures, and ready for immediate spraying on the property;

(b) mounting a GPS sensor to said storage tank for monitoring the GPS location thereof within a GPS tracking system;

(c) installing a hydraulic pump system, electrically powered from an electrical power source supplied to said property, and provided with a battery backup power supply system supporting a power line input from a local source of electrical power, for supplying electrical power to said battery backup power supply system and said hydraulic pump system;

(d) installing a plurality of spray heads and piping on the property to form one or more fluid pumping circuits on said property that are operably connected to said hydraulic pump system and said storage tank, and configured for pumping said environmentally-clean water-based liquid fire inhibitor to said sprayheads under pressure during spraying operations to produce a spray pattern of environmentally-clean water-based liquid fire inhibitor covering said property and the building; and (e) installing a wireless transceiver and a remote power control switch for remotely controlling the supply of electrical power from the power line input and/or said battery backup power supply system, to said hydraulic pump system by way of said remote power control switch; and (f) deploying a wildfire ember and/or smoke detection system operating around said property, for automatically detecting the presence of a wildfire storm before its arrival at the property, and sending a spray-triggering signal to said wireless transceiver and said remote power control switch, so that said hydraulic pump system automatically pumps said environmentally-clean water-based liquid fire inhibitor from said storage tank through the piping under pressure through said spray heads to produce a said spray pattern of environmentally-clean water-based liquid fire inhibitor over said property and building prior to the arrival of the wildfire at the property, and as water molecules in the environmentally-clean water-based liquid fire inhibitor evaporate to the environment, thin fire-inhibiting alkali metal salt crystalline coatings form over the property and building, inhibiting fire ignition, flame spread and smoke development in the presence of wildfire embers created during a wildfire storm.

15. The wildfire defense spraying process of claim 14, wherein said spray pattern comprises a linear spray pattern generated by said spray heads mounted on the property to form a clean-chemical wildfire break against any incidence of a wildfire storm.

16. The wildfire defense spraying process of claim 14, wherein said spray pattern comprises a resulting spray pattern encircling the property generated by said spray heads mounted on the property to form a clean-chemical wildfire protection zone against any incidence of a wildfire storm.

17. The wildfire defense spraying process of claim 14, wherein said alkali metal salt comprises tripotassium citrate (TPC) and said coalescing agent comprises triethyl citrate (TEC), and wherein said thin fire-inhibiting alkali metal salt crystalline coatings comprise thin fire-inhibiting potassium salt crystalline coatings.

18. The wildfire defense spraying process of claim 14, wherein said expected operating temperatures of said wildfire defense spraying process extend over a range from about 34 F to about 120 F.

19. A wildfire defense spraying process supported on property with a building to be protected against wildfire, said wildfire defense spraying process comprising the steps of:

(a) maintaining a storage tank containing a supply of environmentally-clean water-based liquid fire inhibitor comprising a major amount of an alkali metal salt of a nonpolymeric carboxylic acid, and a minor amount of a coalescing agent realized in the form of an organic chemical compound dissolved in a major amount of water according to a prespecified formulation, wherein said environmentally-clean water-based liquid fire inhibitor remains stable without the formation of solids at expected operating temperatures, and ready for immediate spraying on the property;

(b) mounting a GPS sensor to said storage tank for monitoring the GPS location thereof within a GPS tracking system;

(c) installing a hydraulic pump system, electrically powered from an electrical power source supplied to said property, and provided with a battery backup power supply system supporting a power line input from a local source of electrical power, for supplying electrical power to said battery backup power supply system said hydraulic pump system;

(d) installing a plurality of spray heads and piping on the property to form one or more fluid pumping circuits on said property connected to said hydraulic pump system and said storage tank, and configured for pumping said environmentally-clean water-based liquid fire inhibitor to said sprayheads under pressure during spraying operations to produce a spray pattern of environmentally-clean water-based liquid fire inhibitor covering said property and the building; and (e) installing a wireless transceiver and a remote power control switch for remotely controlling the supply of electrical power from the power line input and/or said battery backup power supply system, to said hydraulic pump system by way of said remote power control switch; and (f) using a mobile phone to send a spray-triggering signal to said wireless transceiver and said remote power control switch, so that said hydraulic pump system automatically pumps said environmentally-clean water-based liquid fire inhibitor from said storage tank through the piping under pressure through said spray heads to produce a spray pattern of environmentally-clean water-based liquid fire inhibitor over said property and building prior to the arrival of the wildfire storm at the property, and as water molecules in the environmentally-clean water-based liquid fire inhibitor evaporate to the environment, thin fire-inhibiting alkali metal salt crystalline coatings form over the property and building, inhibiting fire ignition, flame spread and smoke development in the presence of wildfire embers created during a wildfire storm.

20. The wildfire defense spraying process of claim 19, wherein said remote power control switch comprises a wireless remote power control switch, and said mobile phone uses wireless signaling supported by a digital cellular communication link between said mobile phone and said wireless remote power control switch to send said spray-triggering signal to said wireless transceiver and said wireless remote power control switch.

21. The wildfire defense spraying process of claim 19, wherein said spray pattern comprises a linear spray pattern generated by said spray heads mounted on the property to form a clean-chemical wildfire break against any incidence of a wildfire storm.

22. The wildfire defense spraying process of claim 19, wherein said spray pattern comprises a resulting spray pattern encircling the property generated by said spray heads mounted on the property to form a clean-chemical wildfire protection zone against any incidence of a wildfire storm.

23. The wildfire defense spraying process of claim 19, wherein said alkali metal salt comprises tripotassium citrate (TPC) and said coalescing agent comprises triethyl citrate (TEC), and wherein said thin fire-inhibiting alkali metal salt crystalline coatings comprise thin fire-inhibiting potassium salt crystalline coatings.

24. The wildfire defense spraying process of claim 19, wherein said expected operating temperatures of said wildfire defense spraying process extend over a range from about 34 F to about 120 F.

* * * * *